(12) United States Patent
Kato et al.

(10) Patent No.: US 7,782,846 B2
(45) Date of Patent: Aug. 24, 2010

(54) DATA STRUCTURE, INFORMATION PROCESSING DEVICE, INFORMATION PROCESSING METHOD, TRANSMISSION DEVICE, TRANSMISSION METHOD, MULTIPLEXING DEVICE, MULTIPLEXING METHOD, AND PROGRAM

(75) Inventors: Motoki Kato, Kanagawa (JP); Ayako Iwase, Kanagawa (JP)

(73) Assignee: Sony Corporation, Tokyo (JP)

( * ) Notice: Subject to any disclaimer, the term of this patent is extended or adjusted under 35 U.S.C. 154(b) by 340 days.

(21) Appl. No.: 11/577,137

(22) PCT Filed: Sep. 26, 2005

(86) PCT No.: PCT/JP2005/017606
§ 371 (c)(1),
(2), (4) Date: Nov. 13, 2007

(87) PCT Pub. No.: WO2006/040917
PCT Pub. Date: Apr. 20, 2006

(65) Prior Publication Data
US 2009/0028189 A1     Jan. 29, 2009

(30) Foreign Application Priority Data
Oct. 12, 2004   (JP) ............................. 2004-297683
Dec. 16, 2004   (JP) ............................. 2004-363959
Jul. 6, 2005    (JP) ............................. 2005-197050

(51) Int. Cl.
*H04L 12/28*   (2006.01)
(52) U.S. Cl. .................... 370/389; 370/474; 370/476
(58) Field of Classification Search ................ 370/474, 370/476, 395.64; 375/240.26, 240.28
See application file for complete search history.

(56) References Cited

U.S. PATENT DOCUMENTS 5,726,989 A * 3/1998 Dokic ........................ 370/509

(Continued)

FOREIGN PATENT DOCUMENTS

JP          9 322161          12/1997

(Continued)

OTHER PUBLICATIONS

C. Herpel, et al., "MPEG-4 Systems: Elementary stream management", Signal Processing: Image Communication, vol. 15, XP-000885367, Jan. 1, 2000, pp. 299-320.

(Continued)

*Primary Examiner*—Ricky Ngo
*Assistant Examiner*—Rasheed Gidado
(74) *Attorney, Agent, or Firm*—Oblon, Spivak, McClelland, Maier & Neustadt, L.L.P.

(57) ABSTRACT

The present invention relates to a data structure, an information processing apparatus, an information processing method, a transmitting apparatus, a transmitting method, a multiplexing apparatus, a multiplexing method, and a program that ensure a receiving side to decode hierarchically coded audio streams each including a base stream and an extension stream. A TS packetizing section 537 packetizes each of base and extension audio streams into TS packets. A control section 535 controls TS packet transmitting timing. At this time, the control section 535 control the TS packet transmitting timing with timing that an elementary buffer of a virtual receiver is prevented from overflowing and underflowing. The present invention is applicable to a multiplexing apparatus that multiplexes TS packets.

15 Claims, 64 Drawing Sheets

U.S. PATENT DOCUMENTS

| | | | |
|---|---|---|---|
| 5,801,781 A * | 9/1998 | Hiroshima et al. | 348/441 |
| 6,038,232 A * | 3/2000 | Jung et al. | 370/395.64 |
| 6,252,873 B1 * | 6/2001 | Vines | 370/389 |
| 6,654,421 B2 * | 11/2003 | Hanamura et al. | 375/240.26 |
| 6,816,491 B1 * | 11/2004 | Fujii et al. | 370/394 |
| 7,376,155 B2 * | 5/2008 | Ahn et al. | 370/503 |
| 7,630,366 B2 | 12/2009 | Iwase et al. | |
| 2002/0003948 A1 * | 1/2002 | Himeno et al. | 386/98 |
| 2004/0264929 A1 * | 12/2004 | Lee et al. | 386/95 |

FOREIGN PATENT DOCUMENTS

| | | |
|---|---|---|
| JP | 11 225168 | 8/1999 |
| JP | 2000 201126 | 7/2000 |
| JP | 2001 52467 | 2/2001 |
| JP | 2001 160968 | 6/2001 |
| JP | 2001 313630 | 11/2001 |
| JP | 2001 346166 | 12/2001 |
| JP | 2002 247565 | 8/2002 |
| JP | 2003 123395 | 4/2003 |
| JP | 2003 518354 | 6/2003 |
| JP | 2003 199045 | 7/2003 |
| JP | 2003-242717 | 8/2003 |

OTHER PUBLICATIONS

L. Atzori, et al., "Multimedia Information Broadcasting Using Digital TV Channels", IEEE Transactions on Broacasting, vol. 43, No. 3, XP-011006076, Sep. 1, 1997, pp. 242-251.

* cited by examiner

FIG. 7

```
Program Association Table(PAT) {
    program_entry{
                    program_number   PMT_PID
                           1            X
    }                      2            Y
}
```

FIG. 8

```
Program Map Table(PMT) {
  PID=X
  stream_entry() {
    Audio stream PID=y
    audio_stream_descriptor () {
      is_Base : 0=Base stream ABSENT, 1=PRESENT
      is_Ext1 : 0=Ext1 stream ABSENT, 1=PRESENT
      is_Ext2 : 0=Ext2 stream ABSENT, 1=PRESENT
         :
      is_ExtN : 0=ExtN stream ABSENT, 1=PRESENT
    }
    Video stream PID=z
    Audio stream PID2=y2
  }
}
```

FIG. 9

```
Program Map Table(PMT) {
  PID=X
  stream_entry() {
    Audio stream PID=y
    audio_stream_descriptor() {
      is_Base : 0=Base stream ABSENT, 1=PRESENT
      is_Ext1 : 0=Ext1 stream ABSENT, 1=PRESENT
      is_Ext2 : 0=Ext2 stream ABSENT, 1=PRESENT
      :
      is_ExtN : 0=ExtN stream ABSENT, 1=PRESENT
      if(is_Base==1) Base_stream_id_extension
      if(is_Ext1==1) Ext1_stream_id_extension
      if(is_Ext2==1) Ext2_stream_id_extension
      :
      if(is_ExtN==1) ExtN_stream_id_extension
    }
    Video stream PID=z
    Audio stream PID2=y2
  }
}
```

FIG. 10

| Syntax | No. of bits | Mnemonic |
|---|---|---|
| HDMV_Base_Ex_audio_registration_descriptor () { | | |
|     descriptor_tag | 8 | uimsbf |
|     descriptor_length | 8 | uimsbf |
|     format_identifier | 32 | uimsbf |
|     stuffing_bits | 8 | bslbf |
|     stream_coding_type | 8 | uimsbf |
|     Base_Ex_audio_coding_mode | 8 | uimsbf |
|     stuffing_bits | 8 | bslbf |
| } | | |

FIG. 11

| Base_Ex_audio_coding_mode | Meaning |
|---|---|
| 0 | reserved |
| 1 | THIS AUDIO STREAM HAS ONLY A BASE STREAM |
| 2 | THIS AUDIO STREAM HAS BOTH A BASE STREAM AND A STREAM HAVING EXTENSIBILITY |
| 3 | THIS AUDIO STREAM HAS ONLY A STREAM HAVING EXTENSIBILITY AND DOES NOT HAVE ANY BASE STREAM |
| 4 – 15 | reserved |

```
Audio_stream_info() {
        Stream_coding_type
        Audio stream PID=y
        descriptor() {
                is_Base
                is_Ext1
                is_Ext2
                ..
                is_ExtN
        }
        Audio stream PID2=y2
        Stream_coding_type
}
```

```
Audio_stream_info() {
      Stream_entry() {
            Stream_id_1 .. Stream_id_N
            Stream_coding_type
      }
      Stream_entry() {
            Stream_id_1 .. Stream_id_N
            Stream_coding_type
      }
      ...
}
```

| Syntax | No. of bits | Mnemonic |
|---|---|---|
| StreamTable() { | | |
|   number_of_streams | 8 | |
| | | |
|   for(I=0;I<number_of_streams;i++) { | | |
|     stream_entry() { | | |
|     ref_to_PID | 16 | |
|     } | | |
|     StreamCodingInfo() { | | |
|     length | 8 | uimsbf |
|     stream_coding_type | 8 | bslbf |
|     if(stream_coding_type is "Audio stream") { | | |
|       audio_presentation_type | 4 | bslbf |
|       sampling_frequency | 4 | bslbf |
|       if(stream_coding_type==0x82) { | | |
|         Base_Ex_audio_coding_mode | 4 | bslbf |
|         reserved_for_future_use | 12 | bslbf |
|       }else{ | | |
|         reserved_for_future_use | 16 | bslbf |
|       } | | |
|       reserved_for_future_use | | |
|     }else if(stream_coding_type=="Video"or others){ | | |
|       ... | | |
|     } | | |
|     } | | |
|   } | | |
| } | | |

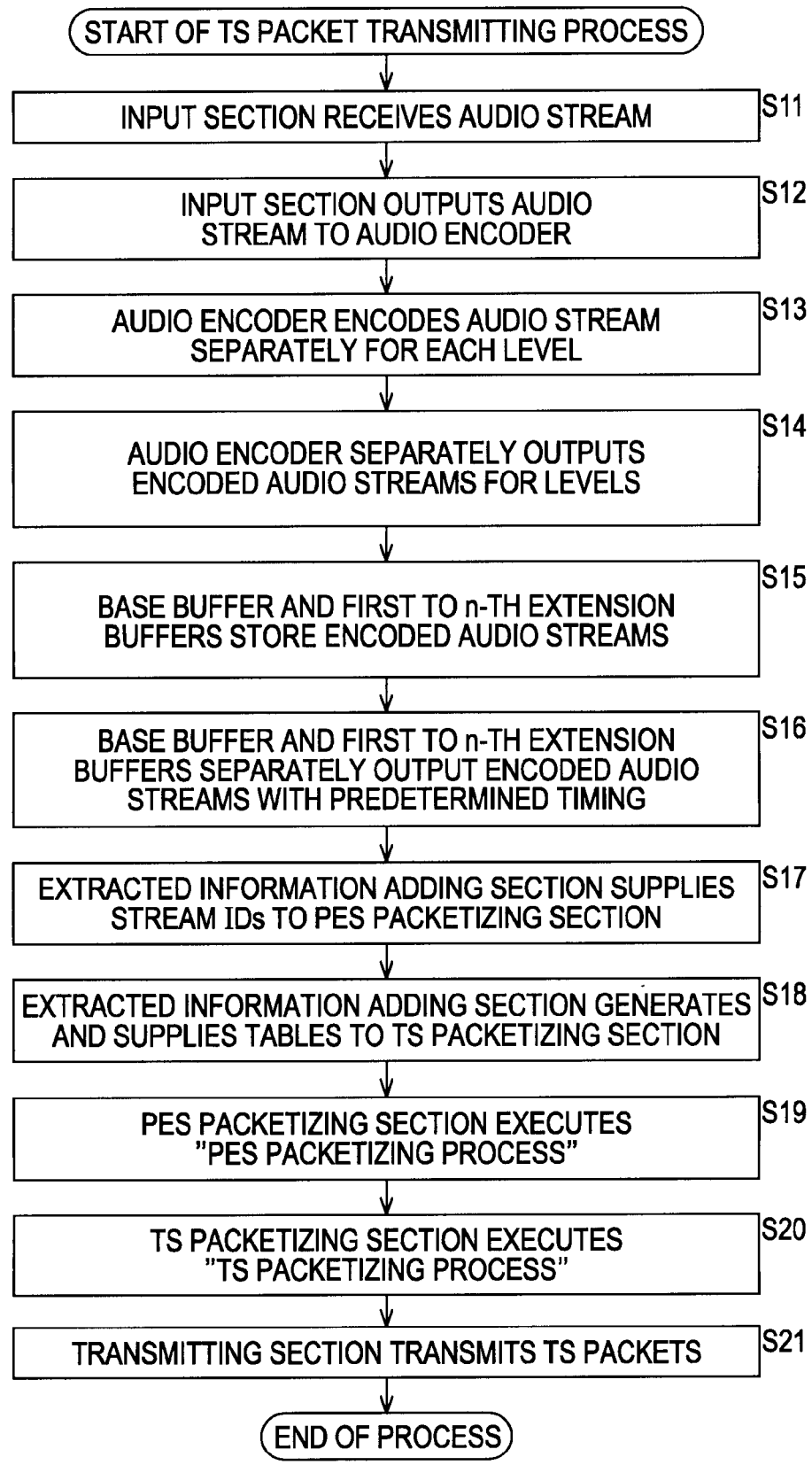

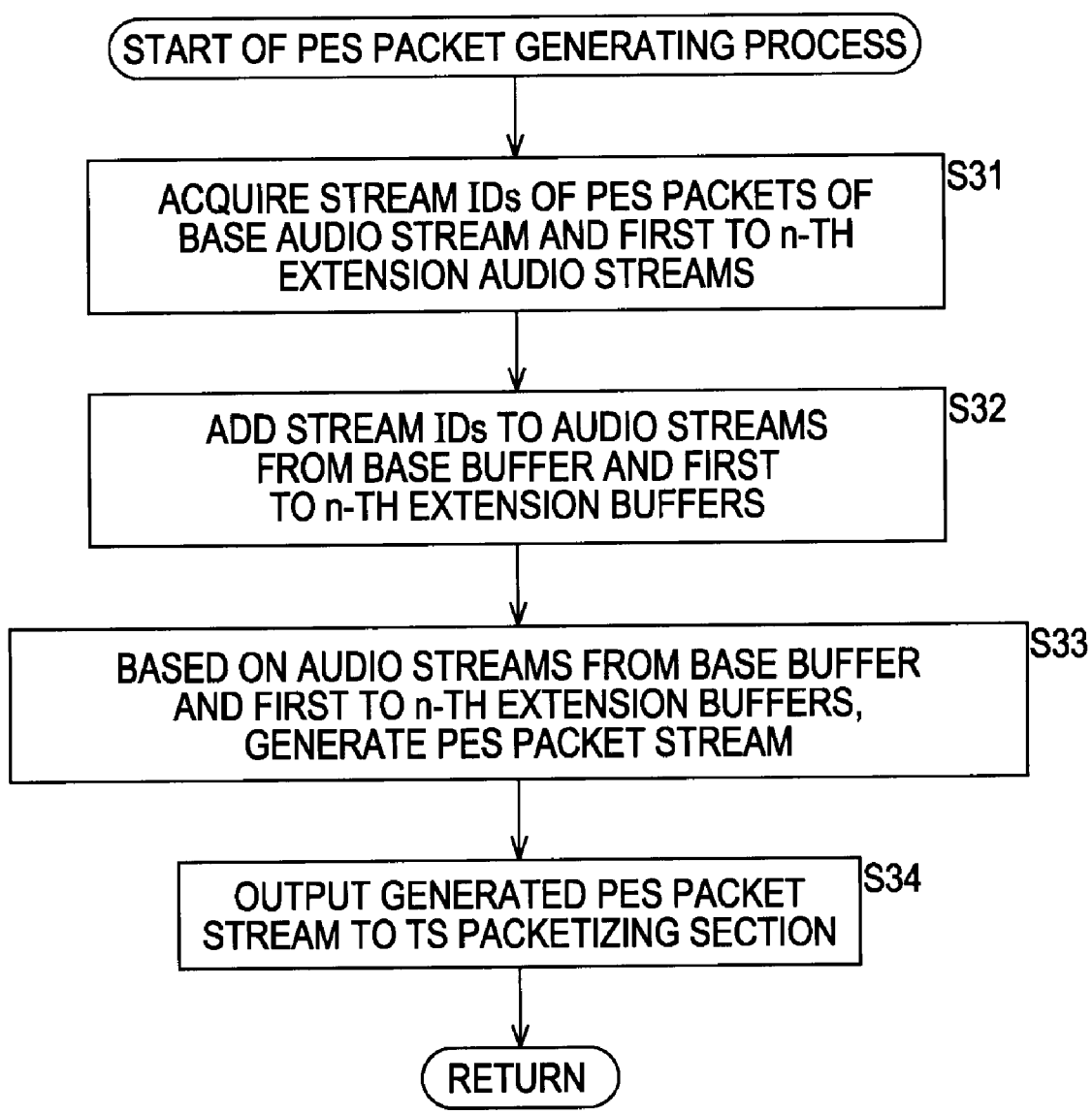

FIG. 58

| RESULT OF DETERMINING TS PACKET MULTIPLEXING WHEN ASSUMING BASE-AUDIO-DATA DECODING PORTION | ABILITY TO MULTIPLEX TS PACKETS | ABILITY TO MULTIPLEX TS PACKETS | INABILITY TO MULTIPLEX TS PACKETS | ABILITY TO MULTIPLEX TS PACKETS | INABILITY TO MULTIPLEX TS PACKETS |
| --- | --- | --- | --- | --- | --- |
| RESULT OF DETERMINING TS PACKET MULTIPLEXING WHEN ASSUMING BASE-AND-EXTENSION-AUDIO-DATA DECODING PORTION | ABILITY TO MULTIPLEX TS PACKETS | ABILITY TO MULTIPLEX TS PACKETS | INABILITY TO MULTIPLEX TS PACKETS | INABILITY TO MULTIPLEX TS PACKETS | INABILITY TO MULTIPLEX TS PACKETS |
| RESULT OF DETERMINING WHETHER TO MULTIPLEX TS PACKETS | ABILITY TO MULTIPLEX TS PACKETS | INABILITY TO MULTIPLEX TS PACKETS | INABILITY TO MULTIPLEX TS PACKETS | INABILITY TO MULTIPLEX TS PACKETS | INABILITY TO MULTIPLEX TS PACKETS |

FIG. 60

| RESULT OF DETERMINING TS PACKET MULTIPLEXING WHEN ASSUMING BASE-AUDIO-DATA DECODING PORTION | ABILITY TO MULTIPLEX TS PACKETS | ABILITY TO MULTIPLEX TS PACKETS | INABILITY TO MULTIPLEX TS PACKETS | ABILITY TO MULTIPLEX TS PACKETS | INABILITY TO MULTIPLEX TS PACKETS |
|---|---|---|---|---|---|
| RESULT OF DETERMINING TS PACKET MULTIPLEXING WHEN ASSUMING BASE-AND-EXTENSION-AUDIO-DATA DECODING PORTION | ABILITY TO MULTIPLEX TS PACKETS | INABILITY TO MULTIPLEX TS PACKETS | ABILITY TO MULTIPLEX TS PACKETS | INABILITY TO MULTIPLEX TS PACKETS | INABILITY TO MULTIPLEX TS PACKETS |
| RESULT OF DETERMINING WHETHER TO MULTIPLEX TS PACKETS | ABILITY TO MULTIPLEX TS PACKETS | ABILITY TO MULTIPLEX ONLY EXTENSION AUDIO TS PACKETS | ABILITY TO MULTIPLEX TS PACKETS | INABILITY TO MULTIPLEX TS PACKETS | INABILITY TO MULTIPLEX TS PACKETS |

DATA STRUCTURE, INFORMATION PROCESSING DEVICE, INFORMATION PROCESSING METHOD, TRANSMISSION DEVICE, TRANSMISSION METHOD, MULTIPLEXING DEVICE, MULTIPLEXING METHOD, AND PROGRAM

TECHNICAL FIELD

The present invention relates to data structures, information processing apparatuses, information processing methods, transmitting apparatuses, transmitting methods, multiplexing apparatuses and multiplexing methods, and programs, and, in particular, to a data structure, an information processing apparatus, an information processing method, a transmitting apparatus, a transmitting method, a multiplexing apparatus, a multiplexing method, and a program that ensure a receiving side to decode hierarchically coded audio streams each including a base stream and an extension stream.

BACKGROUND ART

Methods that packetize and encode (multiplex) video and audio streams include an MPEG (Moving Picture Experts Group) transport stream technique (hereinafter referred to as the MPEG2-TS technique).

FIG. 1 is an illustration of restriction in a case in which a transmitter 1 uses the MPEG2-TS technique to perform encoding. The transmitter 1 uses the MPEG2-TS technique to encode video and audio streams and transmits the coded streams. In this case, by assuming a virtual receiver 2, the transmitter 1 determines timing with which it packetizes MPEG2-TS video and audio streams so that a virtual decoder 3 in the virtual receiver 2 can decode the MPEG2-TS packets transmitted by the transmitter 1. Here, the virtual receiver 2 includes the virtual decoder 3, which is the T-STD (Transport Stream Standard Target Decoder) defined in, for example, ISO/IEC 13818-1 MPEG2 systems.

FIG. 2 shows an example of the configuration of the virtual decoder 3 in FIG. 1. In other words, the virtual decoder 3 in FIG. 2 is a model of the T-STD defined in the MPEG2 systems.

The standards of MPEG2 systems have restrictions in the case of using the MPEG2-TS technique to encode video streams defined in MPEG standards such as MPEG1 video, MPEG2 video, and MPEG4 AVC, and audio streams defined in MPEG standards such as MPEG1 audio, MPEG2 AAC audio. Specifically, the transmitter 1 encodes video and audio streams so that the coded video and audio can be decoded by the virtual decoder 3. In other words, the transmitter 1 encodes and packetizes video and audio streams so that the obtained video and audio can fall within the restrictions of the model in the virtual decoder 3 in FIG. 2.

An MPEG2-TS transmitted to the virtual receiver 2 (FIG. 1) is supplied to the virtual decoder 3. As shown in FIG. 2, a filter 2 filters the MPEG2-TS supplied to the virtual decoder 3 by packet type.

Specifically, the MPEG2-TS includes a plurality of packets, each packet bearing a PID (packet identification) for identifying the packet. Based on the PIDs borne by the packets included in the MPEG2-TS, the filter 4 supplies video-stream-forming TS packets to a video data decoding section 5 for processing a video stream, supplies audio-stream-forming TS packets to an audio data decoding section 6 for processing an audio stream, and supplies system-related TS packets to a system decoding section 7 for processing system data.

The video data decoding section 5 includes a transport buffer (indicated by TBv in FIG. 2) 11, a multiplex buffer (indicated by MBv in FIG. 2) 12, a base buffer (indicated by EBv in FIG. 2) 13, a video decoder (indicated by Dv in FIG. 2) 14, and an output ordering buffer (indicated by Ov in FIG. 2) 15.

When video-stream-forming TS packets are supplied to the video data decoding section 5 through the filter 4, the video-stream-forming TS packets are stored in the transport buffer 11. The TS packets stored in the transport buffer 11 are supplied to the multiplex buffer 12 with predetermined timing and are smoothed. The smoothed packets are supplied to the base buffer 13. The video decoder 14 extracts video access units of the packets stored in the base buffer 13 with predetermined timing, decodes the video access units, and outputs the decoded video access units. Part of the decoded data is output from a terminal 56 through the output ordering buffer 15, and the other part of the decoded data is output from a terminal 17 and is played back.

The audio data decoding section 6 includes a transport buffer (indicated by TBn in FIG. 2) 18, a base buffer (indicated by Bn in FIG. 2) 19, and an audio decoder (indicated by Dn in FIG. 2) 20.

When audio-stream-forming TS packets are supplied to the audio data decoding section 6 through the filter 4, the audio-stream-forming TS packets are stored in the transport buffer 18. The size (capacity) of the transport buffer 18 is 512 bytes. The size of the base buffer 19 differs depending on an audio encoding type such as MPEG1 audio or MPEG2 AAC audio. In the audio data decoding section 6, Rxn represents a leak rate from the transport buffer 18. When the transport buffer 18 stores data, the data from the transport buffer 18 is supplied at the rate (speed) of Rxn. When the transport buffer 18 stores no data, no data is supplied from the transport buffer 18 to the base buffer 19 (i.e., Rxn=0).

The audio decoder 20 extracts audio access units stored in the base buffer 19 with predetermined timing, decodes the audio access units, and outputs the decoded audio access units for playback. Specifically, when a presentation time stamp (PTS) of an audio access unit is equal to the time of a system time clock of the T-STD, the audio decoder 20 extracts the audio access unit from the base buffer 19. Audio access units are encoding units forming an audio stream, and are also used as decoding units.

The system decoding section 7 includes a transport buffer (indicated by TBsys in FIG. 2) 22, a base buffer (indicated by Bsys in FIG. 2) 23, and a system decoder (indicated by Dsys in FIG. 2) 24.

When system-related TS packets are supplied to the system decoding section 7 through filter 4, the system-related TS packets are stored as data@ in the transport buffer 22. The data stored in the transport buffer 22 is supplied to the elementary buffer 23. The system decoder 24 extracts system access units stored in the elementary buffer 23 with predetermined timing, decodes the system access units, and output the decoded system access units through a terminal 25.

The transmitter 1 in FIG. 1 needs to perform packetizing video and audio streams, determining transmitting timing, and encoding so that transmitted data can be correctly decoded by the virtual receiver 2 including the virtual decoder 3.

In other words, the transmitter 1 needs@ to perform determining timing for packetizing the audio stream and encoding so that, in terms of an audio decoder model in the virtual decoder 3 (T-STD) in FIG. 2, the transport buffer 18 does not overflow and the elementary buffer 19 does not overflow and underflow.

Regarding receivers (playback apparatuses), a receiver that processes and plays back a base stream and an extension stream having extensibility for the base stream, as shown in Patent Document 1, has been proposed.

An MPEG-2 (Moving Picture Experts Group) audio stream has backward compatibility so that it can be played back by even an MPEG-1 audio decoder. In other words, the MPEG2 audio stream has a structure including an MPEG-1 audio stream portion as a base portion and an MPEG-2 audio portion as an extension portion thereof.

In the DVD (Digital Versatile Disc) video format, a technology that multiplexes an MPEG2 audio stream to generate a program stream is disclosed (e.g., Non-Patent Document 1). FIG. 3 is an illustration of the structure of a program stream in the DVD video format. The program stream 30 in FIG. 3 includes a video pack 31, an MPEG2 audio pack 32, and a plurality of packs 33-1 to 33-$j$ (j represents an arbitrary natural number).

The MPEG2 audio pack 32 includes a pack header 34, a PES (Packetized Elementary Stream) packet header 35, an MPEG1 audio data (Base) 36, a PES packet header 37, and an mpeg2 audio data (Extension) 38. In addition, a payload of the MPEG2 audio pack 32 includes an MPEG1 audio PES packet including the PES packet header 35 and the audio data 36, and an MPEG2 audio extension PES packet including the PES packet header 37 and MPEG2 audio data 38.

When the MPEG2 audio pack 32 is played back, a playback apparatus (playback apparatus only for MPEG1) that can decode only an MPEG1 audio stream separately plays back only the PES packet header 35 and MPEG1 audio data 36 as an MPEG1 audio stream portion. A playback apparatus (playback apparatus having a capability of playback up to an extension audio stream) that can perform playback up to the MPEG2 audio stream separately plays back both base and extension audio streams. Specifically, the latter playback apparatus plays back, in addition to the PES packet header 35 and the MPEG1 audio data 36, the PES packet header 37 and MPEG2 audio data 38 as an MPEG2 audio stream.

[Patent Document 1] Japanese Unexamined Patent Application Publication No. 11-31362

[Non-Patent Document 1] DVD Specifications for Read-Only Disc Part 3; Version 1.1

DISCLOSURE OF INVENTION

Problems to be Solved by the Invention

However, for stream extensibility in the recent years, in the case of the program stream shown in FIG. 3, a stream structure is determined as a format. Thus, a further audio stream extension cannot be added.

This is related to reduction in extensibility and is a problem in that it is difficult to realize standardization of playback apparatuses.

In addition, when an audio stream is broadcast, it is common to perform broadcasting by using a TS (Transport Stream). However, the use of a TS is inappropriate in the program stream encoding method shown in FIG. 3. Specifically, since a TS packet corresponding to a pack (e.g., the MPEG2 audio pack 32 in FIG. 3) has a relatively small length of 188 bytes, when two PES packets, a base portion (MPEG1) and an extension portion (MPEG2), are multiplexed in the TS pack, a problem of bad encoding efficiency occurs.

Furthermore, the use of streams has been recently studied which are characterized in that the streams can be independently decoded with an audio stream (hereinafter referred to as an extension audio stream) in an extension portion even if there is no audio stream (hereinafter referred to as a base audio stream) in a base portion. However, if the existing technology is only used, it is very difficult to handle streams including no base audio stream among the above streams, that is, streams in which only an extension audio stream is multiplexed. In addition, when such a stream in which only an extension audio stream is multiplexed is supplied, it if very difficult for a playback apparatus that can decode only a base audio stream to determine whether to play back audio corresponding to the stream by using a method other than actually attempting to decode the stream.

In other words, in a case in which the transmitter 11 transmits, in multiplexed form, hierarchically coded streams including an extension stream having extensibility for a base stream, when the virtual receiver 2 including the virtual decoder 3 in FIG. 2 is assumed, a receiver (an actual receiver, which is not shown) that can handle both the base and extension streams can perform decoding. However, for a receiver (an actual receiver, which is not shown) that can handle only the base stream, it is difficult to perform decoding. Accordingly, there is a possibility that the transport buffer 18 may overflow, and there is a possibility that the base buffer 19 may overflow and underflow.

In other words, in a case in which the transmitter 1 transmits hierarchically coded streams including base and extension streams, if the virtual decoder 3 in the virtual receiver 2 is simply assumed as shown in FIG. 2, there is a case in which it is difficult for a receiver that only receives the base stream to sufficiently decode the stream.

The present invention has been made in view of the above circumstances, and is intended to ensure that a receiving side can decode @hierarchically coded audio streams including base and extension streams.

Means for Solving the Problems

A data structure of the present invention is a data structure for data used in a case in which, after a predetermined stream is encoded so that, among types of a base stream and the first to n-th (n represents an integer value equal to one or greater) extension streams having extensibility for the base stream, at least one type of stream is included, packetization into one or more packets is performed, and a stream including the one or more packets is supplied to an information processing apparatus, predetermined processing on the stream is executed by the information processing apparatus, wherein the data includes base-stream-presence/absence information indicating whether or not packets of the type of the base stream are present in the stream.

The data which is used in the information processing apparatus may further include extension-stream-presence/absence information indicating whether or not packets of the types of the first to n-th extension audio streams are present in the stream.

The stream may be a program stream.

The stream may be a TS (Transport Stream).

The data which is used by the information processing apparatus and which includes the base-stream-presence/absence information may be, among the TS packets included in the TS, TS packets corresponding to a PAT (Program Association Table) and PMT (Program Map Table) concerning the predetermined stream.

The data which is used by the information processing apparatus and which includes the base-stream-presence/absence information may be metadata concerning the predetermined stream which is supplied to the information processing apparatus separately from the stream.

The data which is used by the information processing apparatus may further include, in addition to the base-stream-presence/absence information, information representing an encoding type at the time the predetermined stream is encoded.

In a data structure of the present invention, as data used in a case in which, after a predetermined stream is encoded so that, among types of a base stream and the first to n-th (n represents an integer value equal to one or greater) extension streams having extensibility for the base stream, at least one type of stream is included, packetization into one or more packets is performed, and a stream including the one or more packets is supplied to an information processing apparatus, predetermined processing on the stream is executed by the information processing apparatus, it is defined that the data includes base-stream-presence/absence information indicating whether or not packets of the type of the base stream are present in the stream.

A first information processing apparatus of the present invention includes encoding means which encodes a predetermined stream so that, among types of a base stream and the first to n-th (n represents an integer value equal to one or greater) extension streams having extensibility for the base stream, at least one type of stream is included, first packetizing means which adds different unique values as stream IDs (Identifications) to, among the types of the base stream and the first to n-th extension streams, one or more types of streams actually obtained as the result of encoding the predetermined stream by the encoding means, and which packetizes the one or more types of streams having the added stream IDs into one or more PES (Packetized Elementary Stream) packets and outputs the one or more PES packets, second packetizing means which packetizes the one or more PES packets output from the first packetizing means into one or more predetermined packets and outputs the one or more predetermined packets; and generating means which generates base-stream-presence/absence information indicating whether packets of the type of the base stream are present among the one or more packets output from the second packetizing means.

The generating means may further generate extension-stream-presence/absence information indicating whether packets of the types of the first to n-th extension streams are present among the one or more packets output from the second packetizing means.

The first information processing apparatus may further includes output means which outputs, to the exterior of the information processing apparatus itself, a stream including at least the one or more packets output from the second packetizing means, and the base-stream-presence/absence information generated by the generating means.

The packets output from the second packetizing means may form a program stream.

The packets output from the second packetizing means may be TS (Transport Stream) packets.

The generating means may further generate, as tables including at least the base-stream-presence/absence information, a PAT (Program Association Table) and a PMT (Program Map Table). The second packetizing means may further packetize the PAT and PMT generated by the generating means into one or more TS packets and outputs the TS packets. The output means may further output, to the exterior of the information processing apparatus itself, in addition to the one or more TS packets corresponding to the stream output from the second packetizing means, a TS including the one or more TS packets corresponding to the PAT and PMT output from the second packetizing means.

The PMT generated by the generating means may further include the stream IDs added by the first packetizing means.

The first information processing apparatus of the present invention may further include metadata generating means which generates metadata concerning the predetermined stream, the metadata including at least the base-stream-presence/absence information generated by the generating means. The output means separately outputs, to the exterior of the information processing apparatus itself, the stream, which is formed by the one or more packets output from the second packetizing means, and the metadata generated by the metadata generating means.

The generating means may further generate information representing an encoding type at the time the predetermined stream is encoded by the encoding means.

A first information processing method including: an encoding step of encoding a predetermined stream so that, among types of a base stream and the first to n-th (n represents an integer value equal to one or greater) extension streams having extensibility for the base stream, at least one type of stream is included; a first packetizing step of adding different unique values as stream IDs (Identifications) to, among the types of the base stream and the first to n-th extension streams, one or more types of streams actually obtained as the result of encoding the predetermined stream in the encoding step, packetizing the one or more types of streams having the added stream IDs into one or more PES (Packetized Elementary Stream) packets, and outputting the one or more PES packets; a second packetizing step of packetizing the one or more PES packets output in the first packetizing step into one or more predetermined packets and outputting the one or more predetermined packets; and a generating step of generating base-stream-presence/absence information indicating whether packets of the type of the base stream are present among the one or more packets output in the second packetizing step.

A first program of the present invention is a program to be executed by a computer for controlling processing concerning a predetermined stream, the program including: an encoding step of encoding a predetermined stream so that, among types of a base stream and the first to n-th (n represents an integer value equal to one or greater) extension streams having extensibility for the base stream, at least one type of stream is included; a first packetizing step of adding different unique values as stream IDs (Identifications) to, among the types of the base stream and the first to n-th extension streams, one or more types of streams actually obtained as the result of encoding the predetermined stream in the encoding step, packetizing the one or more types of streams having the added stream IDs into one or more PES (Packetized Elementary Stream) packets, and outputting the one or more PES packets; a second packetizing step of packetizing each of the one or more PES packets output in the first packetizing step into one or more predetermined packets and outputting the one or more predetermined packets; and a generating step of generating base-stream-presence/absence information indicating whether packets of the type of the base stream are present among the one or more packets output in the second packetizing step.

In a first information processing apparatus and method, and first program of the present invention, a predetermined stream is encoded so that, among types of a base stream and the first to n-th (n represents an integer value equal to one or greater) extension streams having extensibility for the base stream, at least one type of stream is included. Different unique values are added as stream IDs (Identifications) to one or more streams actually obtained as the result of encoding, and the one or more streams having the added stream IDs are packetized into one or more PES (Packetized Elementary Stream) packets, whereby each of the one or more PES packets is packetized into predetermined packets. In addition, at least base-stream-presence/absence information indicating whether packets of the type of the base stream are present among the one or more packets is generated.

A second information processing apparatus of the present invention includes acquiring means in which, when a different apparatus performs: encoding a predetermined stream so that, among types of a base stream and the first to n-th (n represents an integer value equal to one or greater) extension streams having extensibility for the base stream, at least one type of stream is included; adding different unique values as stream IDs (Identifications) to one or more streams actually obtained as the result of encoding, and packetizing the one or more streams having the added stream IDs into one or more PES (Packetized Elementary Stream) packets; packetizing each of the one or more PES packets into predetermined packets; generating stream-presence/absence information indicating whether each of packets of one or more types including the type of the base stream among the base stream and the first to n-th extension streams is present among the one or more packets; and outputting a stream formed by the one or more packets and the stream-presence/absence information, the acquiring means acquires the stream and the stream-presence/absence information; storage means which restores the one or more PES packets from the stream acquired by the acquiring means; decoding means which decodes, among the one or more PES packets stored in the storage means, PES packets read from the storage means; and control means which determines, based on the stream-presence/absence information acquired by the acquiring means, whether or not, among the types of the base audio stream and the first to n-th extension streams, packets of types capable of being processed by the decoding means are included in the stream acquired by the acquiring means, and which performs control to prohibit reading of PES packets from the storage means when the control means determines that the packets of the types are not included, and performs control to read the PES packets having the added stream IDs, which correspond to types capable of being processed by the decoding means, when the control means determines that the packets of the types are included.

The stream acquired by the acquiring means may be a program stream.

The stream acquired by the acquiring means may be a TS (Transport Stream) including one or more TS packets.

When the different apparatus performs further generating, as tables including at least the stream-presence/absence information, a PAT (Program Association Table) and PMT (Program Map Table) concerning the predetermined stream, further packetizing the PAT and the PMT into one or more TS packets, and outputting, in addition to the one or more TS packets corresponding to the stream, a TS including the one or more TS packets corresponding to the PAT and the PMT, the acquiring means may acquire the TS, and the control means extracts, from the TS acquired by the acquiring means, the TS packets corresponding to the PAT and the PMT, and may recognize the stream-presence/absence information from the TS packets.

The PMT may include the stream IDs added by the different apparatus, and, when determining that the TS packets of types capable of being processed by the decoding means are included in the TS acquired by the acquiring means, the control means may recognize, from the PMT, stream IDs corresponding to types capable of being processed by the decoding means, and may perform control to read, from the storage means, PES packets having the stream IDs.

When the different apparatus performs further generating metadata concerning the predetermined stream, the metadata including at least the stream-presence/absence information, and separately outputting the stream and the metadata, the control means may separately acquire the stream and the metadata, and the control means may recognize the stream-presence/absence information from the metadata acquired by the acquiring means.

Information representing an encoding type at the time the predetermined stream is encoded may be output from the different apparatus. The acquiring means may further acquire the information, and the control means may further perform recognizing the encoding type of the stream acquired by the acquiring means on the basis of the information acquired by the acquiring means, and determining whether or not the packets of the types capable of being processed by the decoding means can be included in the stream, and, when the control means determines that the packets of the types can be included, the control means performs determination of whether or not the packets of the types capable of being processed by the decoding means are included in the TS, and, when the control means determines that the packets of the types cannot be included, the control means prohibits the determination.

A second information processing method of the present invention is an information processing method for an information processing apparatus in which, when a different apparatus performs: encoding a predetermined stream so that, among types of a base stream and the first to n-th (n represents an integer value equal to one or greater) extension streams having extensibility for the base stream, at least one type of stream is included; adding different unique values as stream IDs (Identifications) to one or more streams actually obtained as the result of encoding, and packetizing the one or more streams having the added stream IDs into one or more PES (Packetized Elementary Stream) packets; packetizing each of the one or more PES packets into predetermined packets; generating stream-presence/absence information indicating whether each of packets of one or more types including the type of the base stream among the base stream and the first to n-th extension streams is present among the one or more packets; and outputting a stream formed by the one or more packets and the stream-presence/absence information, the stream and the stream-presence/absence information are acquired, and the stream-presence/absence information is used to perform processing on the stream, the information processing method including: a storage control step of restoring the one or more PES packets from the stream acquired by the information processing apparatus and storing the one or more PES packets in a buffer of the information processing apparatus; a decoding step of decoding, among the one or more PES packets stored in the storage control step, PES packets read from the buffer; and a control step of determining, based on the stream-presence/absence information acquired by the information processing apparatus, whether or not, among the types of the base audio stream and the first to n-th extension streams, packets of types capable of being processed by the decoding means are included in the stream acquired by the acquiring means, and performing control to prohibit reading of PES packets from the storage means when it is determined that the packets of the types are not included, and, when it is determined that the packets of the types are included, performs control to read, from the buffer, as packets to be processed in the decoding step, the PES packets having the added stream IDs, which correspond to types capable of being processed in the decoding step.

A second program of the present invention is a program to be executed by a computer for controlling a receiver in which, when a transmitter performs: encoding a predetermined stream so that, among types of a base stream and the first to n-th (n represents an integer value equal to one or greater) extension streams having extensibility for the base stream, at least one type of stream is included; adding different unique values as stream IDs (Identifications) to one or more streams actually obtained as the result of encoding, and packetizing the one or more streams having the added stream IDs into one or more PES (Packetized Elementary Stream) packets; packetizing each of the one or more PES packets into predetermined packets; generating stream-presence/absence information indicating whether each of packets of one or more types including the type of the base stream among the base stream and the first to n-th extension streams is present among the one or more packets; and outputting a stream formed by the one or more packets and the stream-presence/absence information, the stream and the stream-presence/absence information are received, and the stream-presence/absence information is used to perform processing on the stream, the program including: a storage control step of restoring the one or more PES packets from the one or more packets forming the TS received by the receiver and storing the PES packets in a buffer of the receiver; a decoding step of decoding, among the one or more PES packets stored in the storage control step, PES packets read from the buffer; and a control step of determining, based on the stream-presence/absence information acquired by the receiver, whether or not, among the types of the base audio stream and the first to n-th extension streams, packets of types capable of being processed in the decoding step are included in the stream received by the receiver, and performing control to prohibit reading of PES packets from the storage means when it is determined that the packets of the types are not included, and, when it is determined that the packets of the types are included, performs control to read, from the buffer, as packets to be processed in the decoding step, the PES packets having the added stream IDs, which correspond to types capable of being processed in the decoding step.

In a second information processing apparatus and method, and second program of the present invention, when a different apparatus (or a transmitting apparatus, the different apparatus only mentioned below) performs: encoding a predetermined stream so that, among types of a base stream and the first to n-th (n represents an integer value equal to one or greater) extension streams having extensibility for the base stream, at least one type of stream is included; adding different unique values as stream IDs (Identifications) to one or more streams actually obtained as the result of encoding, and packetizing the one or more streams having the added stream IDs into one or more PES (Packetized Elementary Stream) packets; packetizing each of the one or more PES packets into predetermined packets; generating stream-presence/absence information indicating whether each of packets of one or more types including the type of the base stream among the base stream and the first to n-th extension streams is present among the one or more packets; and outputting a stream formed by the one or more packets and the stream-presence/absence information, a second information processing apparatus (or a receiving apparatus, the second information processing apparatus only mentioned below) acquires the stream and the stream-presence/absence information, and executes processing on a stream using the stream-presence/absence information. Specifically, the one or more PES packets are restored from at least one packet included the stream acquired, and the one or more PES packets are stored in a buffer (or storage means, the buffer only mentioned below) of the second information processing apparatus. A predetermined PES packet is read from the buffer before being decoded. In this case, based on the stream-presence/absence information acquired, it is determined whether or not, among the types of the base audio stream and the first to n-th extension streams, packets of types capable of being processed by the second information processing apparatus are included in the stream acquired. When it is determined that the packets are not included, reading of the PES packets from the buffer is prohibited. Conversely, when it is determined that the packets are included, the PES packets having the added stream IDs, which correspond to types capable of being processed by the second information processing apparatus itself, are read as packets to be decoded from the buffer.

A transmitting apparatus of the present invention includes encoding means which encodes an input stream so that a base stream and an extension stream having extensibility for the base stream are included, packetizing means which packetizes each of the base stream and extension stream obtained by the encoding means into TS (Transport Stream) packets, control means which controls timing with which the TS packets obtained by the packetizing means are transmitted; and transmitting means which transmits the TS packets to a receiver with the timing controlled by the control means. The control means controls the TS-packet transmitting timing at the time that, in a first virtual receiver including a first virtual decoder which handles only the base stream and which assumes that an elementary buffer has a first capacity and an input bit rate to the elementary buffer is a first rate, and a second virtual receiver including a second virtual decoder which handles the base stream and the extension stream and which assumes that an elementary buffer has a second capacity and an input bit rate to the elementary buffer is a second rate, the elementary buffers in the first and second virtual receivers are prevented from overflowing and underflowing.

The first capacity of the elementary buffer may be less than the second capacity, and the first rate as the input bit rate to the elementary buffer may be less than the second rate.

The control means may control the TS-packet transmitting timing by assuming that TS packets acquired by the first virtual receiver are only TS packets forming the base stream among the TS packets transmitted by the transmitting means, and assuming that TS packets acquired by the second virtual receiver are TS packets forming the base stream and extension stream transmitted by the transmitting means.

The first virtual receiver and the second virtual receiver may further include transport buffers, respectively, in a stage before the elementary buffers in the first virtual receiver and the second virtual receiver, and the control means may control the TS-packet transmitting timing at the time that the transport buffers are prevented from overflowing.

After calculating timing which prevents the elementary buffer in the first virtual receiver from overflowing and underflowing, by calculating timing which prevents the elementary buffer in the second virtual receiver from overflowing and underflowing, the control means may control the TS-packet transmitting timing.

A transmitting method of the present invention includes an encoding step of encoding an input stream so that a base stream and an elementary stream having extensibility for the base stream are included, a packetizing step of packetizing each of the base stream and extension stream obtained in the encoding step into TS packets, a controlling step of controlling timing with which the TS packets obtained in the packetizing step are transmitted, and a transmitting step of transmitting the TS packets to a receiver with the timing controlled by the controlling step. In the controlling step, the TS-packet transmitting timing is controlled at the time that, in a first virtual receiver including a first virtual decoder which handles only the base stream and which assumes that an elementary buffer has a first capacity and an input bit rate to the elementary buffer is a first rate, and a second virtual receiver including a second virtual decoder which handles the base stream and the extension stream and which assumes that an elementary buffer has a second capacity and an input bit rate to the elementary buffer is a second rate, the elementary buffers in the first and second virtual receivers are prevented from overflowing and underflowing.

A third program of the present invention is a program for allowing a computer to execute processing including: an encoding step of encoding an input stream so that a base stream and an elementary stream having extensibility for the base stream are included, a packetizing step of packetizing each of the base stream and extension stream obtained in the encoding step into TS packets, a controlling step of controlling timing with which the TS packets obtained in the packetizing step are transmitted, and a transmitting step of transmitting the TS packets to a receiver with the timing controlled by the controlling step, wherein, in the controlling step, the TS-packet transmitting timing is controlled at the time that, in a first virtual receiver including a first virtual decoder which handles only the base stream and which assumes that an elementary buffer has a first capacity and an input bit rate to the elementary buffer is a first rate, and a second virtual receiver including a second virtual decoder which handles the base stream and the extension stream and which assumes that an elementary buffer has a second capacity and an input bit rate to the elementary buffer is a second rate, the elementary buffers in the first and second virtual receivers are prevented from overflowing and underflowing.

In a transmitting apparatus and method, and third program of the present invention, an input stream is encoded so that a base stream and an elementary stream having extensibility for the base stream are included. Each of the base stream and extension stream is packetized into TS packets. With timing that the TS packets are transmitted, and the TS packets are transmitted to a receiver. The TS-packet transmitting timing is controlled at the time that, in a first virtual receiver including a first virtual decoder which handles only the base stream and which assumes that an elementary buffer has a first capacity and an input bit rate to the elementary buffer is a first rate, and a second virtual receiver including a second virtual decoder which handles the base stream and the extension stream and which assumes that an elementary buffer has a second capacity and an input bit rate to the elementary buffer is a second rate, the elementary buffers in the first and second virtual receivers are prevented from overflowing and underflowing.

A multiplexing apparatus of the present invention includes encoding means which encodes an input stream so that a base stream and an extension stream having extensibility for the base stream are included, packetizing means which packetizes each of the base stream and extension stream obtained by the encoding means into TS (Transport Stream) packets, control means which controls timing with which the TS packets obtained by the packetizing means are multiplexed, and multiplexing means which multiplexes the TS packets with the timing controlled by the control means. The control means controls the TS-packet multiplexing timing at the time that, in a first virtual receiver including a first virtual decoder which handles only the base stream and which assumes that an elementary buffer has a first capacity and an input bit rate to the elementary buffer is a first rate, and a second virtual receiver including a second virtual decoder which handles the base stream and the extension stream and which assumes that an elementary buffer has a second capacity and an input bit rate to the elementary buffer is a second rate, the elementary buffers in the first and second virtual receivers are prevented from overflowing.

The first capacity of the elementary buffer may be less than the second capacity, and the first rate as the input bit rate to the elementary buffer may be less than the second rate.

The control means may control the TS-packet multiplexing timing by assuming that TS packets acquired by the first virtual receiver are only TS packets forming the base stream among the TS packets multiplexed by the multiplexing means, and assuming that TS packets acquired by the second virtual receiver are TS packets forming the base stream and extension stream multiplexed by the multiplexing means.

The first virtual receiver and the second virtual receiver may further include transport buffers, respectively, in a stage before the elementary buffers, and the control means may control the TS-packet multiplexing timing at the time that the transport buffers are prevented from overflowing.

After calculating timing which prevents the elementary buffer in the first virtual receiver from overflowing and underflowing, by calculating timing which prevents the elementary buffer in the second virtual receiver from overflowing and underflowing, the control means may control the TS-packet multiplexing timing.

The control means may control the transport-stream packet multiplexing timing at the time that the elementary buffers in the first virtual receiver and the second virtual receiver are prevented from overflowing and underflowing.

The multiplexing apparatus of the present invention may further include recording control means which performs control so that the TS packets multiplexed by the multiplexing means are recorded in a recording medium.

The input stream may include at least one of an audio stream portion and a video stream portion.

A multiplexing method or program of the present invention includes an encoding step of encoding an input stream so that a base stream and an elementary stream having extensibility for the base stream are included, a packetizing step of packetizing each of the base stream and extension stream obtained in the encoding step into TS packets, a control step of controlling transport-stream packet multiplexing timing with which the TS packets obtained in the packetizing step are multiplexed, and a multiplexing step of multiplexing the TS packets with the timing controlled by the controlling step. In the controlling step, the TS-packet multiplexing timing is controlled at the time that, in a first virtual receiver including a first virtual decoder which handles only the base stream and which assumes that an elementary buffer has a first capacity and an input bit rate to the elementary buffer is a first rate, and a second virtual receiver including a second virtual decoder which handles the base stream and the extension stream and which assumes that an elementary buffer has a second capacity and an input bit rate to the elementary buffer is a second rate, the elementary buffers in the first and second virtual receivers are prevented from overflowing.

In a multiplexing apparatus and method, and fourth program of the present invention, an input stream is encoded so that a base stream and an elementary stream having extensibility for the base stream are included. Each of the base stream and extension stream is packetized into TS packets. Transport-stream packet multiplexing timing is controlled so that the TS packets obtained are multiplexed, and the TS packets are multiplexed with the timing controlled. The TS-packet multiplexing timing is controlled at the time that, in a first virtual receiver including a first virtual decoder which handles only the base stream and which assumes that an elementary buffer has a first capacity and an input bit rate to the elementary buffer is a first rate, and a second virtual receiver including a second virtual decoder which handles the base stream and the extension stream and which assumes that an elementary buffer has a second capacity and an input bit rate to the elementary buffer is a second rate, the elementary buffers in the first and second virtual receivers are prevented from overflowing.

The multiplexing apparatus may be an independent apparatus and may be a block that performs multiplexing of a transmitter.

Advantages

According to the present invention, it is ensured that hierarchically coded audio streams each including a base stream and an extension stream can be decoded at a receiving end.

BRIEF DESCRIPTION OF THE DRAWINGS

FIG. 7 is an illustration of an example of the configuration of a PAT among tables to which the present invention is applied.

FIG. 8 is an illustration of an example of the configuration of a PAT among tables to which the present invention is applied.

FIG. 9 is an illustration of an example of the configuration of a PAT among tables to which the present invention is applied.

FIG. 10 is an illustration of another example of the structure of audio_stream_descriptor ( ) inserted into the PMT in FIG. 9.

FIG. 11 is an illustration of the Base_Ex_audio_coding_mode in FIG. 10.

FIG. 13 is an illustration of an example of the structure of metadata to which the present invention is applied and which can be included in the playlist or clip information file in FIG. 12.

FIG. 14 is an illustration of another example of the structure of metadata to which the present invention is applied and which can be included in the playlist or clip information file in FIG. 12.

FIG. 15 is an illustration of a further example of the structure of metadata to which the present invention is applied and which can be included in the playlist or clip information file in FIG. 12.

FIG. 16 is a flowchart illustrating an example of a "TS packet receiving process" executed by the transmitter in FIG. 5.

FIG. 17 is a flowchart illustrating an example of a "PES packet generating process" executed in step S19 in FIG. 16.

FIG. 58 is an illustration of a first method in the case of determining TS packets to be multiplexed.

FIG. 60 is an illustration of a second method in the case of determining TS packets to be multiplexed.

Figure 1:
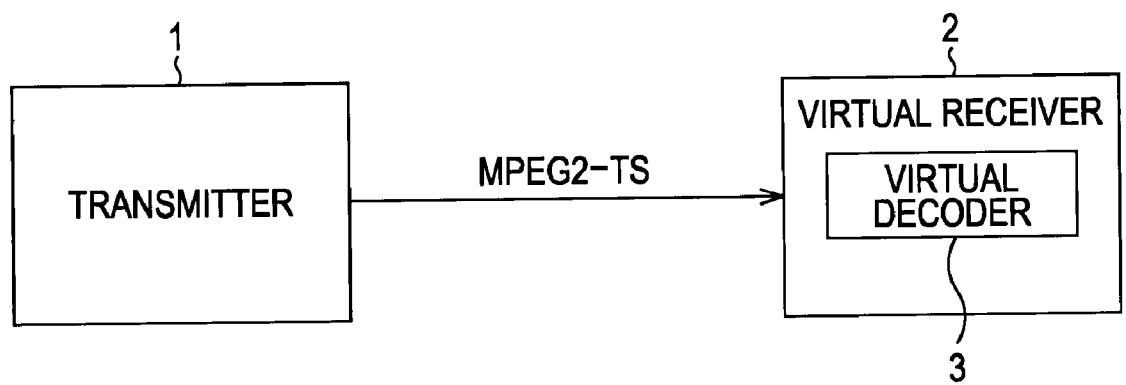
FIG. 1 is a block diagram illustrating restriction in a case of the related art in which a transmitter uses an MPEG2-TS for encoding.

REFERENCE NUMERALS 40 transmitting/receiving system
41 transmitter
42 receiver
71 input section
72 audio encoder
73 base buffer
74-1 to 74-$n$ extension buffers
75 extracted information adding section
76 PES packetizing section
77 TS packetizing section
78 metadata generating section
79 transmitting section
79-1 TS transmitting portion
79-2 metadata transmitting portion
81 base audio stream
82 extension audio stream
91 PES packet stream
101 to 110 TS packets
111 playlist
112 clip
121 clip AV stream file
122 clip information file
131, 131-1 to 131-3 metadata
151 receiving section
152, 152-1 to 152-3 audio stream processing sections
153 output section
161 metadata input portion
162 TS input portion
163 main control portion
164 PID filter
165 transport buffer
166 stream ID filter
167 base buffer
168 decoder for base
171 PES packet stream
181 to 186 TS packets
201 metadata input section
202 TS input section
203 main control section
204 PID filter
205 transport buffer
206 stream ID filter
207 base buffer
208 decoder for base
209 extension buffer
221 metadata input section
222 TS input portion
223 main control portion
224 PID filter
225 transport buffer
226 extension buffer
227 decoder for base and extension
211 PES packet stream
301-1 to 301-$n$ extension audio streams
311 PES packet stream
321 to 330 TS packets
511 transmitter
512 virtual receiver
521 virtual decoder
531 input section
532 audio encoder
533 buffer
534 extracted information adding section
535 control section
536 PES packetizing section
537 TS packetizing section
538 transmitting section
541 base buffer
542 extension buffer
581 base audio stream
582 extension audio stream
591 PES packet stream 601 transport stream
741 PID filter
761 transport priority filter
762 transport buffer
763 elementary buffer
764 audio decoder
811 transmitter
812 virtual receiver
821 virtual decoder
831 input section
832 audio encoder
833 buffer
834 extracted information adding section
835 control section
836 PES packetizing section
837 TS packetizing section
838 transmitting section
841 base buffer
842 extension buffer
881 base audio stream
882 extension audio stream
891 PES packet stream
901 transport stream
1041 PID filter
1061 transport priority filter
1062 transport buffer
1063 elementary buffer
1064 audio decoder
901 TS packetizing section
902 multiplexing portion

BEST MODE FOR CARRYING OUT THE INVENTION

First Embodiment

Figure 4:
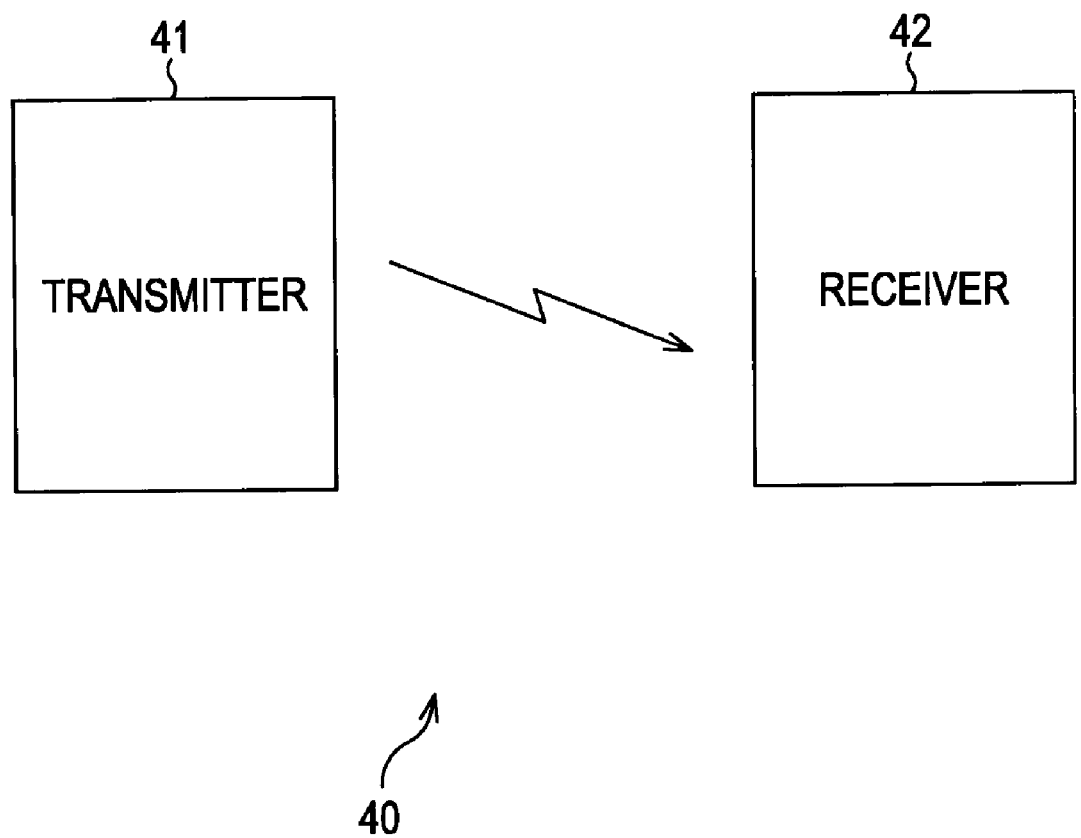
FIG. 4 is a block diagram showing an example of the configuration of the entirety of a transmitting/receiving system to which the present invention is applied.

FIG. 4 is a diagram showing an example of an entire configuration of a first embodiment of a transmitting/receiving system to which the present invention is applied.

This transmitting/receiving system 40 includes a transmitter 41 and a receiver 42. The transmitter 41 is, for example, an apparatus, such as a broadcasting station, that transmits a plurality of TS packets, and the receiver 42 is, for example, a household apparatus, such as a household set-top box.

In the first embodiment, the transmitter 41 encodes an audio stream and transmits the resultant TS packets, and the receiver 42 receives and decodes the TS packets and obtains the resultant audio stream.

Figure 5:
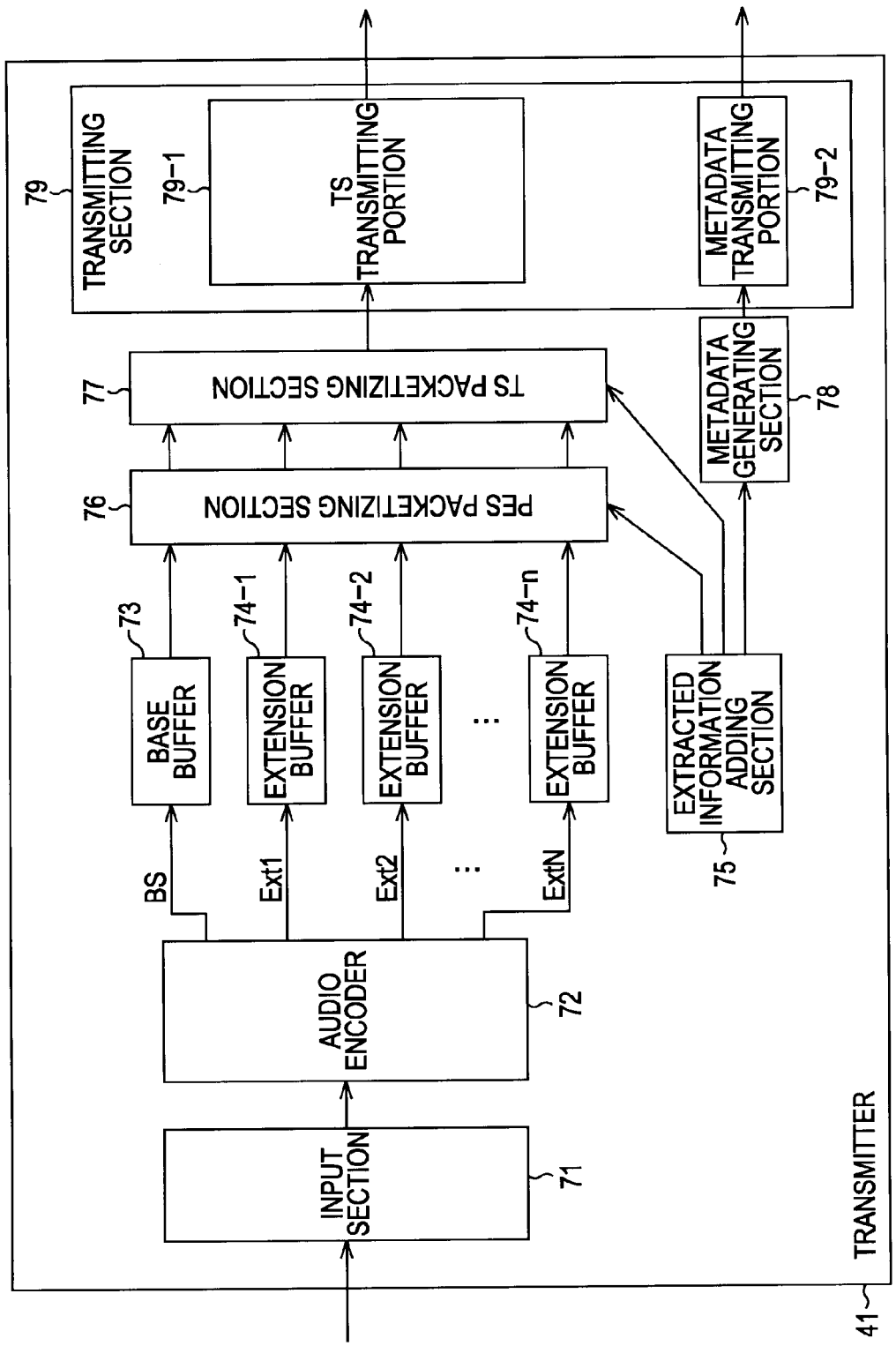
FIG. 5 is a block diagram showing an example of the configuration of a transmitter in the transmitting/receiving system in FIG. 4.

FIG. 5 is a block diagram showing an example of the configuration of the transmitter 41 in FIG. 4.

The transmitter 41 includes an input section 71, an audio encoder 72, a base buffer 73, extension buffers 74-1 to 74-$n$, an extracted information adding section 75, a PES packetizing section 76, a TS packetizing section 77, a metadata generating section 78, and a transmitting section 79. The letter n represents an arbitrary number equal to one or greater.

An audio stream to be transmitted is input to the input section 71. The audio stream input to the input section 71 is supplied to the audio encoder 72.

The audio encoder 72 encodes the audio stream supplied from the input section 71. The audio encoder 72 in FIG. 5 is an encoder for the n-stage extension audio stream. In other words, the audio encoder 72 can encode the audio stream so that at least one type of stream of a base audio stream and extension audio streams in plural stages from the first stage to the n-th stage is included.

The k-stage extension audio stream (k represents a value of 1 to n) is hereinafter referred to simply as the k-th extension audio stream.

In the first embodiment, as the number n of stages is greater, the extensibility is higher, audio playback quality is higher, and the functionality is higher. In addition, the first embodiment considers the case of audio streams characterized in that they can be independently decoded only with an extension audio stream even if there is no base audio stream.

In detail, the audio encoder 72 encodes an audio stream. The audio encoder 72 supplies the encoded base audio stream and first to n-th extension audio streams to the base buffer 73 and the extension buffers 74-1 to 74-$n$, respectively. Specifically, for example, the audio encoder 72 supplies the base audio stream to the encoded base audio stream to the base buffer 73, supplies the encoded first extension audio stream to the extension buffer 74-1, supplies the encoded second extension audio stream to the extension buffer 74-2, and similarly supplies the encoded n-th audio stream to the extension buffer 74-$n$. As described above, in the first embodiment, there are correspondences between the stage numbers of extension audio streams and the buffer signs. In the following, in conjunction with the description of FIG. 5, the base audio stream is represented by BS, and the first to n-th extension audio streams are represented by Ext1 to ExtN.

After separating the audio stream into the base audio stream and the first to n-th extension audio streams, audio encoder 72 in the first embodiment may encode the streams. Alternatively, as the result of encoding the audio stream, the base audio stream and the first to n-th extension audio streams may be output.

The base buffer 73 stores (buffers) the base audio stream, and the extension buffers 74-1 to 74-$n$ store (buffer) the first to n-th extension audio stream. Under the control of the PES packetizing section 76, the base buffer 73 and the extension buffers 74-1 to 74-$n$ read the audio streams stored therein and supply the read streams to the PES packetizing section 76.

The extracted information adding section 75 supplies the PES packetizing section 76 with the unique values of IDs (Identifications) uniquely added to the base audio stream and the first to n-th extension audio stream so that a decoding end can extract at least one type of stream from types of the base audio stream and the first to n-th extension audio stream.

The IDs are hereinafter referred to particularly as stream IDs so as to be distinguished from other IDs. Although the form of a stream ID is not particularly limited, in the first embodiment, Stream_id or Stream_id_extension is employed as a stream ID.

As described above, stream IDs are IDs that identify stream types (the base audio stream and the first to n-th extension audio stream), and are added to corresponding PES packets by the PES packetizing section 76, as described later.

In addition, the extracted information adding section 75 generates, as extracted information, information (hereinafter referred to as stream presence/absence information) which indicates, among types of the base audio stream and the first to n-th extension audio streams, which type of stream is present and which type of stream is absent in audio streams multiplexed in a TS transmitted by the transmitting section 79, which is described later.

The extracted information adding section 75 supplies this stream-presence/absence information to the metadata generating section 78 and generates a table including this stream-presence/absence information. Since this table is multiplexed in the TS transmitted from the transmitting section 79, which is described later, that is, this table is packetized into transport packets (hereinafter referred to as TS packets) by the TS packetizing section 77, which is described later, TS packet IDs (PID: Packet Identifications) are also described. Specifically, this table includes a PAT (Program Association Table) and a PMT (Program Map Table).

Details of this table are described later with reference to FIGS. 7 to 11. The extracted information adding section 75 supplies this table to the TS packetizing section 77.

The PES packetizing section 76 acquires the base audio stream and the first to n-th extension audio streams by controlling the base buffer 73 and the extension buffers 74-1 to 74-n, packetizes each audio stream into PES packets having corresponding one of the stream IDs supplied from the extracted information adding section 75, and sequentially supplies the PES packets to the TS packetizing section 77.

In other words, the stream ID of each PES packet supplied to the TS packetizing section 77 is to identify a corresponding PES packet type. The PES packet type is one of the base audio stream and the first to n-th extension audio streams. In other words, for example, PES packets of the type of the base audio stream represents PES packets including at least a part of data of the base audio stream.

Accordingly, in order for the receiver 42 in FIG. 4 at the receiving end to select PES packets of the extension audio streams of desired stage numbers, the values of stream IDs added to the PES packets may be identified.

As described above, the form of a stream ID is not particularly limited if it is an ID enabling the above-described identification. In the first embodiment, the stream ID is Stream_id or Stream_id_extension. Stream_id represents Stream_id included in the PES packet header defined in the MPEG2 systems standard. In addition, Stream_id_extension represents Stream_id_extension included in the PES packet header defined in the MPEG2 standard Amendment2 (2003). When the audio stream is one other than MPEG Audio (MPEG-1/2 Audio, MPEG AAC), it is preferable that Stream_id_extension be employed. When Stream_id_extension is used, MPEG2 systems standard Amendment2 (2003) provides setting of 1111 1101 (meaning extended_stream_id) in Stream_id. MPEG2 systems standard Amendment2 (2003) provides that Stream_id_extension having a unique value identifying stream types (the base audio stream and the first to n-th extension audio streams) can be used.

In addition, for example, in the first embodiment, the above PES packets are sequentially supplied from the PES packetizing section 76 to the TS packetizing section 77 in predetermined order. In this case, as a result, one stream (hereinafter referred to as a PES packet stream) including a plurality of PES packets is supplied from the PES packetizing section 76 to the TS packetizing section 77. A specific example of the PES packet stream is described later with reference to FIG. 6.

The TS packetizing section 77 packetizes the PES packets supplied from the PES packetizing section 76 into TS packets, and packetizes the table supplied from the extracted information adding section 75 into TS packets. The TS packetizing section 77 sequentially supplies these TS packets to a TS transmitting portion 79-1 of the transmitting section 79 in predetermined order. A specific example of each TS packet is described later with reference to FIG. 6.

The metadata generating section 78 generates metadata (additional information) concerning the audio stream that is multiplexed in the TS transmitted from the transmitting section 79, which is described later. At this time, the metadata generating section 78 generates metadata including at least the stream-presence/absence information supplied from the extracted information adding section 75. The metadata generating section 78 supplies the generated metadata to a metadata transmitting portion 79-2 of the transmitting section 79. A specific example of the metadata is described later with reference to FIGS. 12 and 13.

The transmitting section 79 is configured to include the TS transmitting portion 79-1 and the metadata transmitting portion 79-2.

The TS transmitting portion 79-1 transmits, to the receiver 42 in FIG. 4, the TS packets sequentially supplied in the predetermined order from the TS packetizing section 77. In other words, the TS transmitting portion 79-1 sequentially transmits the TS packets to the receiver 42, so that one stream including the TS packets, that is, a TS, is transmitted to the receiver 42. A specific example of the TS is described later with reference to FIG. 6.

The metadata transmitting portion 79-2 transmits, to the receiver 42, the metadata supplied from the metadata generating section 78.

As described above, the transmitter 41 in FIG. 5 can transmit the stream-presence/absence information in a form multiplexed in a TS, with the corresponding audio stream, and can transmit the stream-presence/absence information to the receiver 42 in a form included in metadata. The providing form of the stream-presence/absence information from the transmitter 41 to the receiver 42 is not limited to that in the example in FIG. 5 but may be an arbitrary form.

In other words, definitely, it is possible that, in accordance with the circumstances of the receiver 42, the transmitter 41 transmits the stream-presence/absence information and the corresponding audio stream in a form multiplexed in a TS without using a form included in metadata. In this case, the metadata generating section 78 and the metadata transmitting portion 79-2 are not essential components for the transmitter 41. Conversely, definitely, it is possible that the transmitter 41 also transmits the stream-presence/absence information to the receiver 42 in a form included in metadata without using a form included in a TS.

The example of the configuration of the transmitter 41 has been described with reference to FIG. 5.

Figure 6:
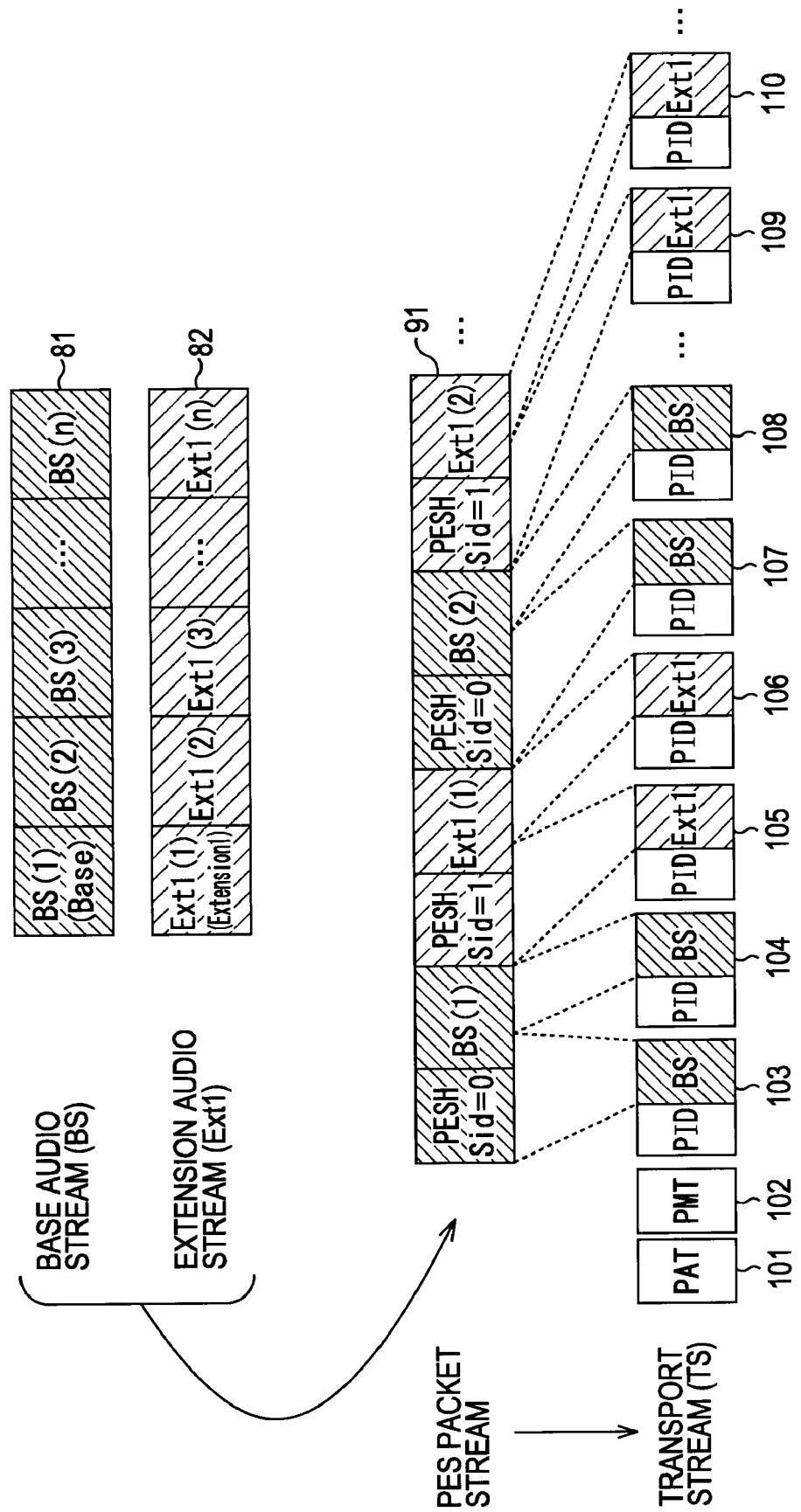
FIG. 6 is an illustration of an example of the structure of a TS in which the base audio stream and the first extension audio stream are multiplexed.

Next, a TS transmitted from the transmitter 41 having the configuration in FIG. 5, that is, the structure of a TS obtained by multiplexing the base audio stream and the first extension audio stream, is described, as an example of an TS to which the present invention is applied, with reference to FIG. 6. In other words, for the purpose of facilitating the understanding of a TS to which the present invention is applied, the structure of a TS in the case of one extension audio stream is described firstly with reference to FIG. 6. After the description, the structures of a TS in which no base audio stream is present, and a TS in which the base audio stream and the first to n-th extension audio streams are present are described, if necessary.

In the example in FIG. 6, a TS is configured to include TS packets 103 to 110 corresponding to a base audio stream 81 and an extension audio stream 82, and a table, including stream-presence/absence information concerning them, that is, TS packets 101 and 102 respectively corresponding to a PAT and a PMT.

Each of the base audio stream 81 and the extension audio stream 82 has an encoded form in which a predetermined number of audio samples is used as one unit. Each unit is indicated by a parenthesized subscript. Specifically, for example, the base audio stream 181 is separated for encoding into the plural units (audio access units), BS(1), BS(2), ..., BS(n). Similarly, for example, the extension audio stream 82 is separated for encoding into the plural units, Ext1(1), Ext1(2), ..., Ext1(n). Regarding the base audio stream 81 and the extension audio stream 82, a set of units having identical subscripts, for example, units BS(1) and Ext1(1) are synchronously obtained in encoding by the audio encoder 72 in FIG. 5, and are synchronously played back (decoded) by the receiver 42 in FIG. 6.

The PES packetizing section 76 in FIG. 5 packetizes the base audio stream 81 and the extension audio stream 82 to generate PES packets having different stream IDs, as shown in FIG. 6. Specifically, in the example of FIG. 6, the stream ID of PES packets corresponding to the base audio stream 81 is set to "0" as it is described as "PESH Sid=0". In addition, the stream ID of PES packets corresponding to the extension audio stream 82 is set to "1" as it is described as "PESH Sid=1".

As described above, the PES packetizing section 76 generates and supplies the PES packet stream 91 shown in FIG. 6 to the TS packetizing section 77.

The TS packetizing section 77 packetizes each PES packet of the PES packet stream 91 into packets 103 to 110 having the same PID, as shown in FIG. 6. In addition, the TS packetizing section 77 packetizes the table supplied from the extracted information adding section 75 into TS packets. Specifically, the TS packetizing section 77 packetizes a PAT of the table supplied from the extracted information adding section 75 into the TS packet 101 and packetizes a PMT of the supplied table into the TS packet 102.

Although, in the first embodiment of FIG. 6, the TS packet 102 corresponding to the PMT is shown as it can be transmitted from the TS transmitting portion 79-1 after the TS packet 101 corresponding to the PAT before the TS packet 103, actually, it is transmitted from the TS transmitting portion 79-1 in each predetermined period.

In addition, in the first embodiment such as the example in FIG. 6, the PIDs of TS packets corresponding to one audio stream, In other words, the PIDs of TS packets corresponding to all the types of the base audio stream and the first to n-th extension audio streams for the audio stream are set to be identical. Because this is to match the configuration (this configuration is described later with reference to FIG. 19 and the subsequent drawings) of the first embodiment on the side of the receiver 42. Therefore, depending on the configuration of the receiver 42, it is not always required that the PIDs of TS packets corresponding to all the types of the base audio stream and the first to n-th extension audio streams for the audio stream be set to be identical. For example, by using, as a unit, each type of the base audio stream and the first to n-th extension audio streams, a different PID is added to TS packets of the type.

Next, an example of the structure of a PAT corresponding to the TS packet 101 is described with reference to FIG. 7, and, subsequently, an example of the structure of a PMT corresponding to the TS packet 102 is described with reference to FIGS. 8 and 9.

FIG. 7 shows an example of the structure of a PAT. In this PAT, program_entry is written. This program_entry describes the numbers (program-number) of programs multiplexed in a TS including this PAT, and the PIDs of TS packets of PMTs for the programs in the program-number. Specifically, the program_entry indicates that PMT-PID for program-number 1 is "X" and PMT-PID for program-number 2 is "Y". The value of the PMT-PID is referred to by the PMTs shown in FIGS. 8 and 9. In other words, the TS packet 102 of the PMT bears PID, and this PID is written as the value of the PMT-PID in the PAT. Specifically, for example, when the PMT of the TS packet 102 is a PMT for program-number 1, the PID (PMT-PID) of the TS packet 102 is "X". In addition, for example, when the PMT of the TS packet 102 is a PMT for program-number 2, the PID (PMT-PID) of the TS packet 102 is "Y".

FIG. 8 shows an example of the structure of a PMT. In this PMT, stream_entry( ) when the PID is "x", that is, stream_entry( ) in the case of program-number 1, is written. In this stream_entry( ), it is written that TS packets corresponding to an audio stream (Audio stream PID=y) having "y" as a PID are included in a corresponding TS. As described above, TS packets having "y" as a PID include PES packets including at least one type of stream among the base audio stream and the first to n-th extension audio streams. Accordingly, as shown in FIG. 8, in this PMT, audio_stream_descriptor( ) is written as information of the stream-presence/absence information. In other words, in the audio_stream_descriptor( ), flag is_base indicating whether the base audio stream is present, and flags is_Ext1 to is_ExtN respectively indicating whether the first to n-th extension audio streams are present are written. In the first embodiment, as shown in FIG. 8, when each flag is on (one), it is indicated that an audio stream of a corresponding type is present. Conversely, when each flag is off (zero), it is indicated that an audio stream of a corresponding type is absent.

Accordingly, when, for example, in the TS in FIG. 6, the PIDs of the packets 103 to 110 which include one of the base audio stream 81 and the extension audio stream 82 are "Y's", in the PMT of the TS packet 102, only flags is_base and is_Ext1 are "1's", and the other flags is_Ext2 to is_ExtN are all "0's".

Although, as described above, in the PMT in FIG. 8, the flags are employed as stream-presence/absence information concerning the types of the base audio stream and the first to n-th extension audio streams, definitely, the form of the stream-presence/absence information is not limited to the flags. In other words, information in other forms, for example, information that includes a single predetermined symbol or a combination of predetermined symbols can be written as the stream-presence/absence information in the PMT.

In addition, in the PMT in FIG. 8, it is written that sets of TS packets corresponding to a video stream having "z" as a PID (Video stream PID=z) and an audio stream having "y2" as a PID (Audio stream PID2=y2) are included in the corresponding TS.

In many cases, actually, following the description of Audio stream PID=y2, audio_stream_descriptor( ) corresponding thereto is written although it is not written in the PMT in FIG. 8. In addition, similarly to the audio stream, when the video stream is encoded so that, among the base audio stream and the first to n-th extension audio streams, at least one type is included, it is preferable that, following the description of Video stream PID=z, a description of Video_stream_descriptor ( ) similar in structure to audio_stream_descriptor ( ) be added.

In addition, in the PMT in FIG. 9, in addition to the PMT structure in FIG. 8, in audio_stream_descriptor ( ), the stream ID (Stream_id or Stream_id_extension) of PES packets of the types of the base audio stream and the first to n-th extension audio streams is additionally written. In other words, FIG. 9 shows a PMT having a structure different from that in FIG. 8. In detail, in this PMT, when flag is_Base is on (if (is_Base==1)), it is stipulated that the stream ID (e.g., Base_stream_id_extension in the example of FIG. 9) of the type of the base audio stream is written. Similarly, in this PMT, when flag is_Extq (q represents the value of one of 1 to N) is on (if (is_Extq==1)), it is stipulated that the stream ID (e.g., Extq_stream_id_extension in the example of FIG. 9) of the q-th extension audio stream is written.

Therefore, as described above, if, for example, in the TS in FIG. 6, the PIDs of the packets 103 to 110 that include one of the base audio stream 81 and the extension audio stream 82 are "y's", in the PMT of the TS packet 102, only flags is_base and is_Ext1 are "1's", and the other flags is_Ext2 to is_ExtN are "0's". Accordingly, following the description of flag is_ExtN (=0), "0" is written as the stream ID (Base_stream_id_extension) of the type of the base audio stream, and "1" is written as the stream ID (Ext1_stream_id_extension) of the type of the first extension audio stream.

By employing the PMT having the structure in FIG. 9, an advantage can be obtained in that the need to use rules to determine the value of the stream ID of PES packets on transmitting and receiving ends is eliminated. In other words, in the case of employing a PMT having a structure in which the stream ID of PES packets is not written as shown in FIG. 8, it is necessary to use rules to determine the value of the stream ID of PES packets.

The HDMV_Base_Ex_audio_descriptor in FIG. 10 shows other examples of audio_stream_descriptoro inserted in the PMTs in FIGS. 8 and 9.

In Descriptor_tag, "0x05" (defined in ISO/IEC 13818-1) is written.

In Descriptor_length, "8" is written.

In Format_identifier, the value "0x48 44 4D 56" are written. This value represents "HDMV" in ASCII code.

In Stream_coding_type, for example, a value representing, for example, MPEG, AC3, DTS, or the like is written. Specifically, when, for example, MPEG is employed, "0x82" representing MPEG is written as Stream_coding_type.

In this case, an MPEG audio stream has a stream characteristic of having a stream having extensibility for the base audio stream. Accordingly, as information representing an audio stream encoding mode such as MPEG, as shown in FIG. 11, Base_Ex_audio_coding_mode is provided. In Base_Ex_audio_coding_mode, as shown in FIG. 11, a value of "0" to "15" can be written, and "0" and "4" to "15" are reserved. The Base_Ex_audio_coding_mode actually has a value of "1" to "3". Specifically, when "1" is written in the Base_Ex_audio_coding_mode, it is indicated that "this audio stream has only the base audio stream". When "2" is written in the Base_Ex_audio_coding_mode, it is indicated that "this audio stream has both the base stream and a stream (extension stream) having extensibility". When "3" is written in the Base_Ex_audio_coding_mode, it is indicated that "this audio stream has only a stream having extensibility and has no base stream". As described above, it may be said that that the Base_Ex_audio_coding_mode represents other examples of the stream-presence/absence information.

Information, such as Stream_coding_type, representing an audio stream encoding method, is included in a PMT or the like, and, before confirming stream-presence/absence information, the receiver 42 in FIG. 4 at the receiving end confirms the information representing the audio stream encoding method, whereby an advantage can be obtained in that it can be determined whether an audio stream to be processed (whether the audio stream is encoded to have extensibility) has extensibility. In other words an advantage can be obtained in that it can be further faster determined whether an audio stream to be processed has extensibility.

An example of a TS transmitted from the TS transmitting portion 79-1 in FIG. 5 has been described with reference to FIG. 6, and, subsequently, a table that is multiplexed in this TS, that is, examples of the structures of a PAT and a PMT have been described with reference to FIGS. 7 to 11.

By generating a table including stream-presence/absence information, that is, for example, by generating the PAT and PMT shown in FIGS. 7 to 11 and performing packetization into TS packets, the transmitter 41 in FIG. 5 can transmit stream-presence/absence information to the receiver 42 in FIG. 4 in a form multiplexed in a TS as well as a corresponding audio stream.

As described above, the transmitter 41 can generate metadata including stream-presence/absence information and can transmit the metadata to the receiver 42. Accordingly, an example of the metadata is described below with reference to FIGS. 12 to 15.

Figure 12:
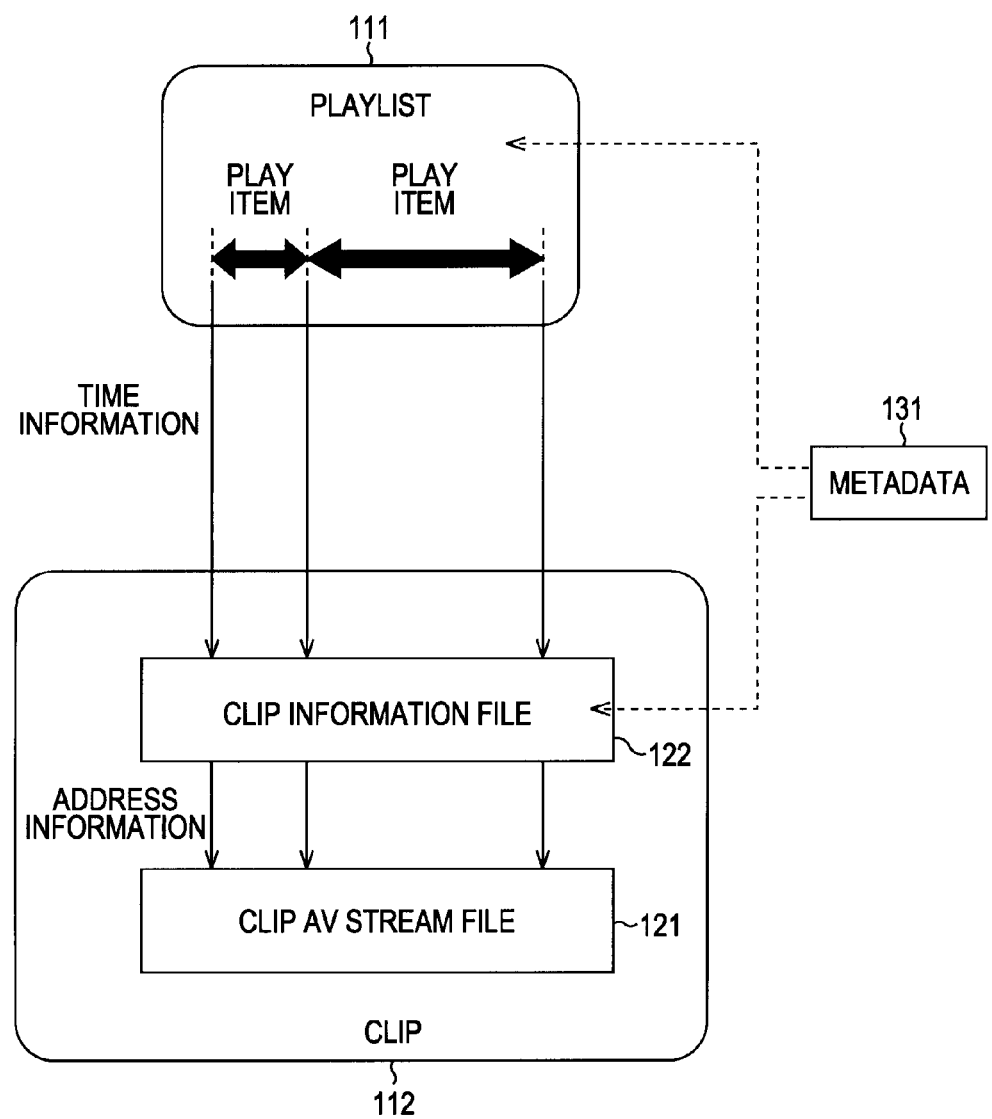
FIG. 12 is an illustration of an example of the structure of an application format to which the present invention is applied.

FIG. 12 shows a simplified structure of an application format on a recording medium for use in a predetermined recording/playback system. In other words, FIG. 12 shows a simplified structure of an application format on a recording medium in a case in which, for example, the receiver 42 in FIG. 4 forms at least a part of the predetermined recording/playback system.

The format shown in FIG. 12 has two layers, a playlist 111 and a clip 112, for managing an AV (Audio&Visual) stream.

One AV stream and additional information therefor are regarded as an object, and the object is called the clip 112. In other words, as shown in FIG. 12, a clip AV stream file 121 is the AV stream, and a clip information file 122 is the additional information. In other words, the clip AV stream file 121 corresponds to the above-described audio stream including the base audio stream and at least one type of stream among the first to n-th extension audio streams.

When the playlist 111 uses a time stamp (time information) to indicate an access point in the clip 112, the clip information file 122 is useful information for finding, in the clip AV stream file 121, address information in which stream decoding is to be initiated.

The playlist 111 is a set of playback intervals in the clip 112. One playback interval in the clip 112 is called a Playitem. The playitem is represented by a pair of an IN point and an OUT point on a time base. Therefore, it may be said that the playlist 111 is a set of one or more Playitems.

In the application format, as shown in FIG. 12, metadata 131 including the above-described stream-presence/absence information can be included in the playlist or the clip information file 122. In other words, it may be said that FIG. 12 shows an example of an application format including the metadata 131 (stream-presence/absence information).

In the transmitting/receiving system 40 in FIG. 4, when the application format in FIG. 12 is employed, the transmitter 41 can execute, for example, the following processing.

In other words, for example, the input section 71, audio encoder 72, base buffer 73, extension buffers 74-1 to 74-n, PES packetizing section 76, TS packetizing section 77, and TS transmitting portion 79-1 in FIG. 5 can receive an audio stream input as the clip AV stream file 121, and can generate and transmit a corresponding TS to the receiver 42.

In addition, for example, the metadata generating section 78 can generate the playlist 111 and the clip information file 122 concerning the clip AV stream file 121 transmitted as the TS from the TS transmitting portion 79-1. After the metadata generating section 78 generates the metadata 131 including the stream-presence/absence information concerning the clip AV stream file 121, and includes the metadata 131 in the playlist 111 or the clip information file 122, the metadata generating section 78 can provide the playlist 111 and the clip information file 122 to the metadata transmitting portion 79-2. The metadata transmitting portion 79-2 can transmit the playlist 111 and the clip information file 122 to the receiver 42.

When, in this case, the receiver 42 receives, for example, the clip AV stream file 121, the clip information file 122, the playlist 111, the receiver 42 can record them in a predetermined recording medium in accordance with the application format in FIG. 12.

The form of the metadata 131 that is included in the playlist 111 or the clip information file 122 is not particularly limited if it can be handled by the transmitter 41 and the receiver 42. Specifically, the metadata 131 can have, for example, the structure shown in FIG. 13. In other words, FIG. 13 shows an example of the structure of the metadata 131 including stream-presence/absence information.

When, in the following, the metadata 131 having the structure in FIG. 13 needs to be distinguished from metadata 131 having another structure such as that in FIG. 14, it is called metadata 131-1.

In the metadata 131-1 in FIG. 13, Audio_stream_info( ) is written. In the Audio_stream_info( ), it is written that TS packets for to an audio stream which have "y's" as PIDs are included in a corresponding TS. In addition, in stream_coding_type, an audio stream encoding method, such as MPEG audio or MPEG AAC, is written. When the audio stream has an audio characteristic of having extensibility for a base stream, the audio stream encoding method is written in stream_coding_type. In the Audio_stream_info( ), descriptor( ) is written as the above-described stream-presence/absence information. The descriptor( ) is information corresponding to the audio_stream_descriptor ( ) of the PMT in FIG. 8. In other words, in the descriptor ( ), flag is_base indicating whether a base audio stream is present and flags is_Ext1 to is_ExtN respectively indicating whether the first to n-th extension audio streams are present are written. Also in the descriptor( ), in the first embodiment, similar to Audio_stream_info( ), when each flag is on (one), it is indicated that an audio stream of a corresponding type is present. Conversely, when each flag is off (zero), it is indicated that an audio stream of a corresponding type is absent.

Therefore, if, for example, in the TS in FIG. 6, the PIDs of the packets 103 to 110 including one of the base audio stream 81 and the extension audio stream 82 are "y'", in descriptor( ) following the description of Audio stream PID=y in corresponding metadata 131, only flags is_base and is_Ext1 are "1's", and the other flags is_Ext2 to is_ExtN are "0's".

Although, in the above manner, in the metadata 131-1 in FIG. 13, flags are employed as stream-presence/absence information concerning types of the base audio stream and the first to n-th extension audio streams, definitely, the form of the stream-presence/absence information is not limited to the flags. In other words, definitely, information in other forms, for example, information including, for example, the single, predetermined symbol or a combination of predetermined symbols, can be written as stream-presence/absence information in the metadata 131.

In addition, in the metadata 131-1 in FIG. 13, it is written that TS packets for an audio stream which each have "y2" as a PID are included in a corresponding TS. Therefore, actually, in many cases, following the description of Audio stream PID2=y2, descriptor( ) corresponding thereto is written although it is not written in the metadata 131-1 in FIG. 13.

In the case of employing the metadata 131 having a structure as shown in FIG. 13 in which the stream ID of PES packets are not written, it is necessary for the transmitting and receiving ends to use rules to determine the value of the PES packets. Accordingly, to eliminate the need of such rules, similarly to the PMT in FIG. 9, metadata may be employed that has, in addition to the structure in FIG. 13, a structure in which the stream ID (Stream_id or Stream_id_extension) of PES packets for types of the base audio stream and the first to n-th extension audio streams is additionally written.

In the first embodiment, an example of an MPEG2 transport stream is described as an object for which metadata of stream-presence/absence information is to be used. However, the present invention is not limited to the first embodiment, but may be applied to a DSS transport stream and an MPEG2 program stream.

Figure 3:
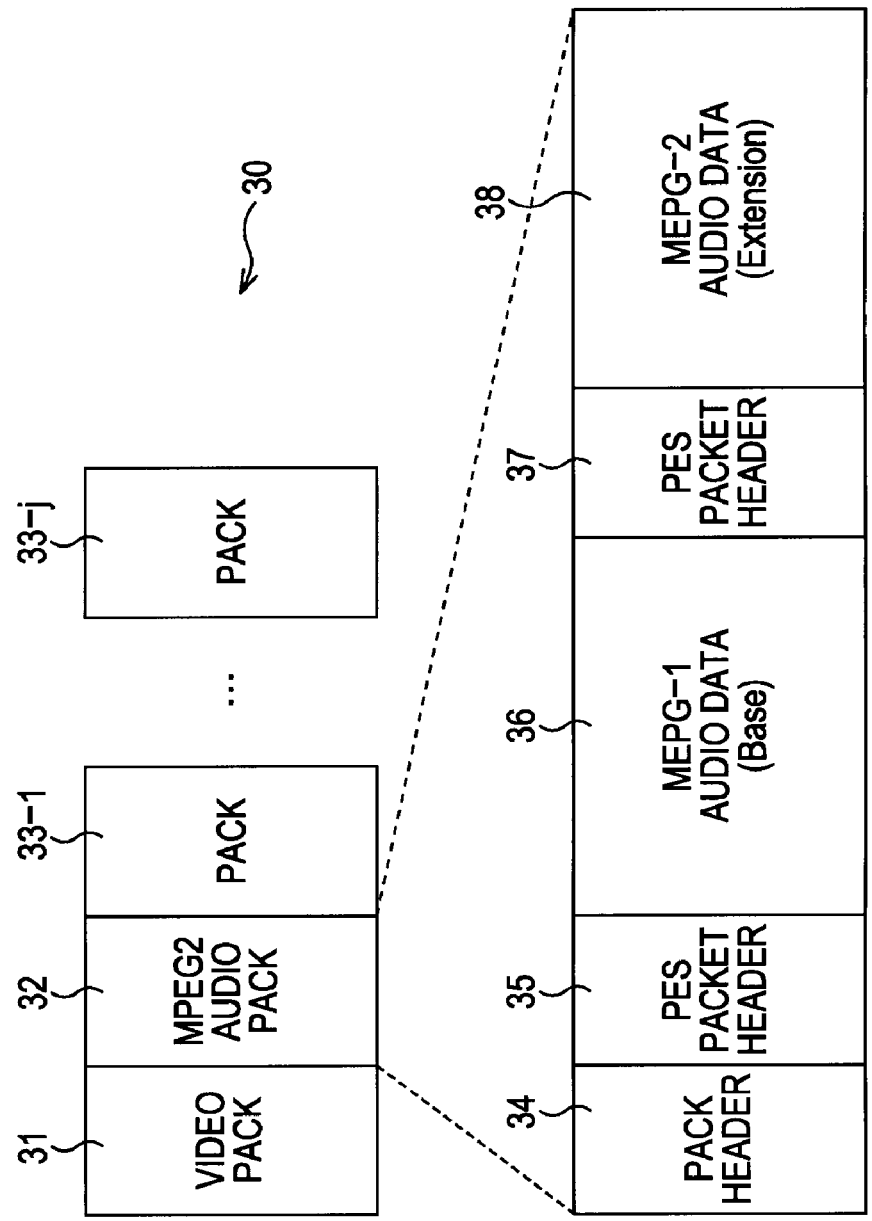
FIG. 3 is an illustration of an example of the configuration of a program stream in the DVD video format.

When an MPEG2 program stream is used, an audio stream having a stream characteristic of having extensibility for a base stream is multiplexed in, for example, a program stream, as described in FIG. 3. When the metadata 131 of stream-presence/absence information is added to the MPEG2 program stream, metadata 131-2 having the structure in FIG. 14 may be employed instead of the metadata 131-1 having the structure in FIG. 13. In other words, instead of the Audio_stream_PID information in FIG. 13, as shown in, for example, FIG. 14, the stream ID of a PES packet header of each of a base stream and extension streams included in the audio stream may be written. When the written information is, for example, the stream ID of an extension stream, and the stream ID of a base stream is absent, it is found that, in an audio stream of a targeted program stream, only extension streams are encoded. In other words, it is found that PES packets for the base stream are absent and only PES packets for extension streams are present.

In addition, FIG. 15 shows another example of the metadata 131 of the audio stream added to the clip information file 122 and the playlist 111 in FIG. 12. When the metadata 131 having the structure in FIG. 15 needs to be distinguished from metadata having another structure, it is called metadata 131-3. Regarding the metadata 131-3, StreamCodingInfo represents another example of the audio stream added to Clip or PlayList.

Item ref_to_PID is information corresponding to the Audio stream PID in FIG. 13. Therefore, in the metadata 131-3, it is written that, when the value of the stream_coding_type of the audio stream that is referred to by the ref_to_PID is "0x82", the state indicates that the audio stream is an audio stream having a stream characteristic of having extensibility for a base stream, and it is written that the field of Base_Ex_audio_coding_mode represents the encoding mode of the audio stream. In the Base_Ex_audio_coding_mode, one value of "1" to "3" in FIG. 11 is written.

An example of the structure of metadata transmitted from the metadata transmitting portion 79-2 in FIG. 5 has been described with reference to FIGS. 12 to 16.

Similarly to the PMT, by including, in the metadata 131, information, such as Stream_coding_type, representing the encoding method for the audio stream, the above advantage can be obtained. Specifically, an advantage can be obtained in that, before confirming the stream-presence/absence information, by confirming the information representing the encoding method for the audio stream, the receiver 42 in FIG. 4 on the receiving end can determine whether the audio stream, which is to be processed, has extensibility (whether it is encoded to have extensibility). In other words, an advantage can be obtained in that it can be further fast determined whether the audio stream to be processed has extensibility.

Next, a TS packet transmitting process of the transmitter 41 in FIG. 5 is described with reference to the flowchart in FIG. 16. This process is initiated when the power of the transmitter 41 is turned on to input an audio stream to the input section 71.

In step S11, the input section 71 receives the input audio stream. In step S12, the input section 71 outputs the received audio stream to the audio encoder 72.

In step S13, the audio encoder 72 encodes the base audio stream and the first to n-th extension audio streams. As a result, the audio encoder 72 outputs the base audio stream and first to n-th extension audio streams shown in FIG. 6 in (vertically) synchronized form.

In step S14, the audio encoder 72 outputs the encoded audio streams separately for levels (stream types) thereof. Specifically, the audio encoder 72 outputs the encoded base audio stream to the base buffer 73, outputs the encoded first extension audio stream to the extension buffer 74-1, outputs the encoded second extension audio stream to the extension buffer 74-2, and outputs the encoded n-th extension audio stream to the extension buffer 74-n.

In step S15, the base buffer 73 and the first to n-th extension buffers 74-1 to 74-n respectively store (buffer) the encoded audio streams.

In step S16, the base buffer 73 and the first to n-th extension buffers 74-1 to 74-n respectively output the encoded audio streams with predetermined timing. Actually, the PES packetizing section 76 controls the first to n-th extension buffers 74-1 to 74-n so that corresponding audio streams are read.

In step S17, the extracted information adding section 75 supplies stream IDs (Stream_id or Stream_id_extension) to the PES packetizing section 76. In step S18, the extracted information adding section 75 generates and supplies the PAT and PMT shown in FIGS. 7 to 11 to the TS packetizing section 77.

In step S19, the PES packetizing section 76 executes a "PES packet generating process". The "PES packet generating process" means that the base buffer 73 and the extension buffers 74-1 to 74-n are respectively controlled to acquire the base audio stream and the first to n-th extension audio streams, and the audio streams are packetized into PES packets having a corresponding one of stream IDs supplied from the extracted information adding section 75 before being sequentially supplied to the extracted information adding section 75. Details of the "PES packet generating process" are described later with reference to the flowchart in FIG. 17.

In step S20, the TS packetizing section 77 executes a "TS packet generating process". The "TS packet generating process" means that, as described above, after the PES packets supplied from the PES packetizing section 76 are packetized into TS packets, and the table supplied from the extracted information adding section 75 are packetized into TS packets, the TS packets are sequentially supplied to the TS transmitting portion 79-1 of the transmitting section 79 in predetermined order. Details of the "TS packet generating process" are described with reference to the flowchart in FIG. 18.

In step S21, the TS transmitting portion 79-1 of the transmitting section 79 transmits the TS packets (TS that is an audio stream including a plurality of TS packets) to the receiver 42. Specifically, for example, in the above example in FIG. 6, a stream including the TS packets 101 and 102 of the table and TS packets 103 to 110 of the audio stream is transmitted. After that, the "TS packet generating process" is finished. Although, in the first embodiment, the TS packets are transmitted to the receiver 42, they may be recorded in various types of recording media, which are not shown. In addition, when the TS packets are transmitted to the receiver 42, by temporarily recording them in a recording medium before providing the recording medium to the receiver 42, they may be indirectly transmitted.

In addition, separately from the "TS packet generating process", the transmitter 41 can execute processing that generates the metadata 131 in FIG. 13, and transmits, to the receiver 42, the metadata 131 as a single item, or the playlist 111 and clip information file 122 in FIG. 12 in which the metadata 131 is included in either one, if necessary, although the processing is not shown.

When this processing is executed, the metadata 131 alone, or the playlist 111 and clip information file 122 in FIG. 12 in which the metadata 131 is included in either one, may be recorded in various type of recording media, which are not shown. In addition, when transmitting, to the receiver 42, the metadata 131 alone, or the playlist 111 and clip information file 122 in FIG. 12 in which the metadata 131 is included in either one, by temporarily recording the metadata 131 or them, and providing the recording medium to the receiver 42, the metadata 131 or them may be indirectly transmitted.

Next, a detailed example of the "PES packet generating process" is described with reference to the flowchart in FIG. 17.

In step S31, the PES packetizing section 76 acquires, from the extracted information adding section 75, the stream IDs of PES packets corresponding to the base audio stream and the first to n-th extension audio streams.

In step S32, the PES packetizing section 76 adds the stream IDs to the audio streams from the base buffer 73 and the first to n-th extension buffers 74-1 to 74-n.

In step S33, the PES packetizing section 76 generates a PES packet stream based on the audio streams from the base buffer 73 and the first to n-th extension buffers 74-1 to 74-n.

In step S34, the PES packetizing section 76 outputs the PES packet stream generated in step S33 to the TS packetizing section 77.

This finishes the "PES packet generating process". In other words, step S19 in FIG. 16 finishes, and the process proceeds to step S20.

Figure 18:
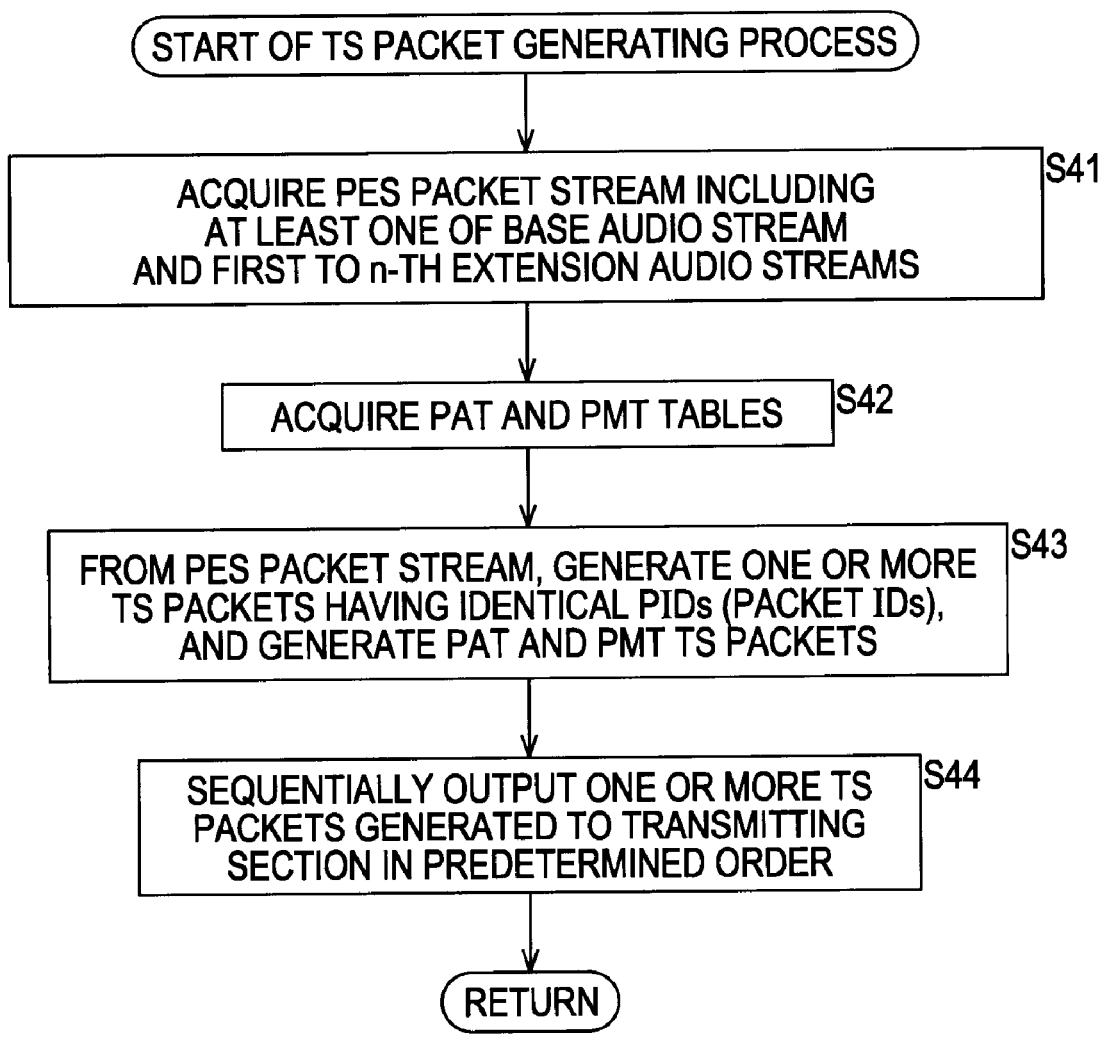
FIG. 18 is a flowchart illustrating the "TS packet receiving process" in step S20 in FIG. 16.

Next, the "TS packet generating process" executed in step S20 is described with reference to the flowchart in FIG. 18.

In step S41, the TS packetizing section 77 acquires, from the PES packetizing section 76, a PES packet stream including at least one of the base audio stream and the first to n-th extension audio streams. Specifically, for example, in the example in FIG. 6, the PES packet stream 91 including the base audio stream 81 and the extension audio stream 82 is acquired. In addition, for example, in the example in FIG. 22, which is described later, a PES packet stream 171 which does not include the base audio stream and which includes the first extension audio stream 82 is acquired. Furthermore, for example, in the example in FIG. 28, which is described later, a PES packet stream 311 including the base audio stream 81 and all the first to n-th audio streams 301-1 to 301-n is acquired.

In step S42, the TS packetizing section 77 acquires the tables of the PAT and the PMT from the extracted information adding section 75.

In step S43, the TS packetizing section 77 generates one or more TS packets bearing identical PIDs (packet IDs) from the PES packet stream acquired in step S41, and generates TS packets of the PAT and PMT. Specifically, for example, in the example in FIG. 6, the TS packets 103 to 110 are generated from the PES packet stream 91, and the PAT TS packet 101 and the PMT TS packet 102 are generated. In addition, for example, in the example in FIG. 22, which is described later, TS packets 183 to 186 are generated from a PES packet stream 171, and a PAT TS packet 181 and a PMT TS packet 182 are generated. Furthermore, for example, in the example in FIG. 28, which is described later, TS packets 323 to 330 are generated from a PES packet stream 311, and a PAT TS packet 321 and a PMT TS packet 322 are generated.

In step S44, the TS packetizing section 77 sequentially outputs the one or more TS packets generated in step S43 to the TS transmitting portion 79-2 of the transmitting section 79.

An example of the "TS packet generating process" that the transmitter 41 executes has been described with reference to the flowcharts in FIGS. 16 to 18.

As described above, by executing the above-described "TS packet generating process", the transmitter 41, which can encode the n-th extension audio stream, can divide the encoded audio streams into the types of the base audio stream and the first to n-th extension audio streams. In addition, the transmitter 41 can add unique stream IDs to the types of the base audio stream and the first to n-th extension audio streams before packetizing them into PES packets and can packetize the PES packets into TS packets before transmitting the TS packets. At this time, information indicating, in the audio streams packetized into TS packets after being packetized into PES packets, among the types of the base audio stream and the first to n-th extension audio streams, which type is included and which type is not included, that is, a table including stream-presence/absence information, can be packetized into TS packets by the receiver 42 for transmission. In other words, after packetizing a plurality of PES packets bearing stream IDs for identifying stream types and a table indicating the types (the types of streams included in the PES packets) of the PES packets into TS packets, the transmitter 41 can transmit, to the receiver 42, a TS including the resultant TS packets.

As described above, in the TS transmitted by the transmitter 41, PES packets of at least one type of stream among the first to n-th extension audio streams are multiplexed, and the PES packets bear a stream ID that identifies the type of the stream (one of the types of the base audio stream and the first to n-th extension audio streams). Thus, the receiver 42 at the receiving end can perform decoding in accordance with its processing capability by referring to the stream ID.

In addition, information that indicates whether, in the TS, each of the types of the base audio stream and the first to n-th extension audio streams is present, that is, also stream-presence/absence information, is transmitted to the receiver 42 in a form multiplexed in the TS. Before performing actual decoding, the receiver 42 can recognize whether the audio streams can be multiplexed with the its processing capability. As a result, an advantage can be obtained in that the receiver 42 can shorten the time for finding streams that it can decode.

This advantage can be identically obtained also when the stream-presence/absence information is transmitted to the receiver 42 in a form included in metadata. In other words, the form of providing the stream-presence/absence information is not limited to the example in FIG. 3. In any providing form, this advantage can be obtained.

The transmitter 41 at the transmitting end in the transmitting/receiving system 40 in FIG. 4 has been described.

Next, the receiver 42 at the receiving end is described.

In the first embodiment, the receiver 42 at the receiving (playback) has at least a capability to decode the base audio stream (BS). In addition, when the receiver 42 at the playback end can play back extension audio streams up to the predetermined m-th stage (m represents a natural number equal to one or greater), the receiver 42 can decode the base audio stream and the first to m-th extension audio streams. Regarding relationships between the base audio stream and the extension audio streams, as described above, for example, as extension audio streams up to an extension audio stream having n whose value is greater can be decoded, audio playback quality is improved and functionality is enhanced. The case of audio streams characterized in that they can be decoded with extension audio streams without the base audio stream is also considered.

Figure 19:
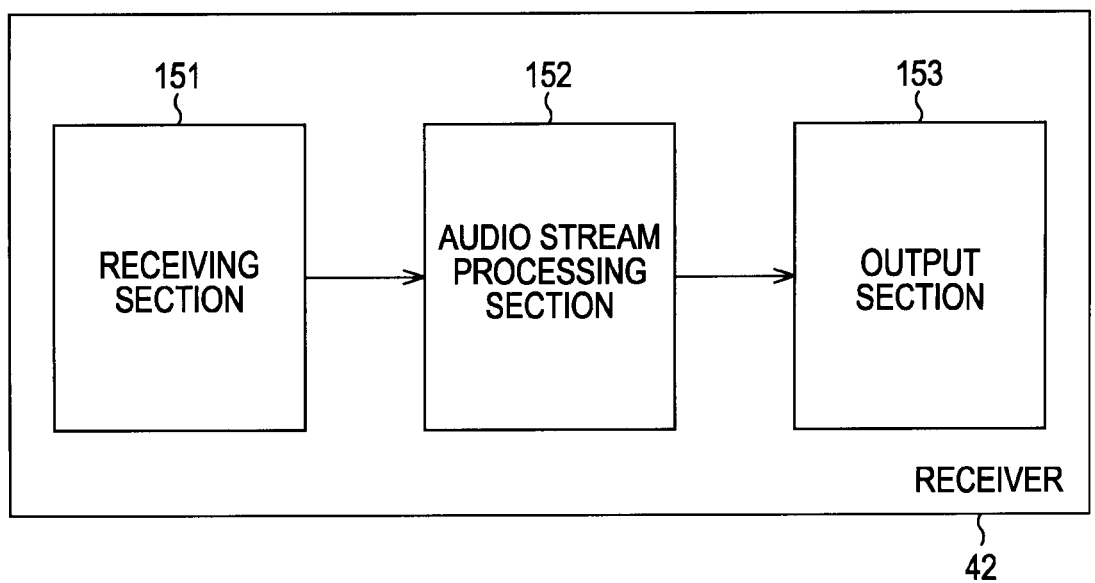
FIG. 19 is a block diagram showing an example of the configuration of the receiver in the transmitting/receiving system in FIG. 4.

FIG. 19 is a block diagram showing an example of the configuration of the receiver 42 in FIG. 4.

The receiver 42 includes a receiving section 151, an audio stream processing section 152, and an output section 153. The receiving section 151 receives the TS packets, and the audio stream processing section 152 executes audio stream processing. Specifically, the audio stream processing section 152 extracts the audio stream by performing processing such as decoding the received TS packets. The output section 153 outputs the audio stream processed by the audio stream processing section 152.

The audio stream processing section 152 extracts different audio streams depending on its decoding capability. The audio stream processing section 152 is described below.

Figure 20:
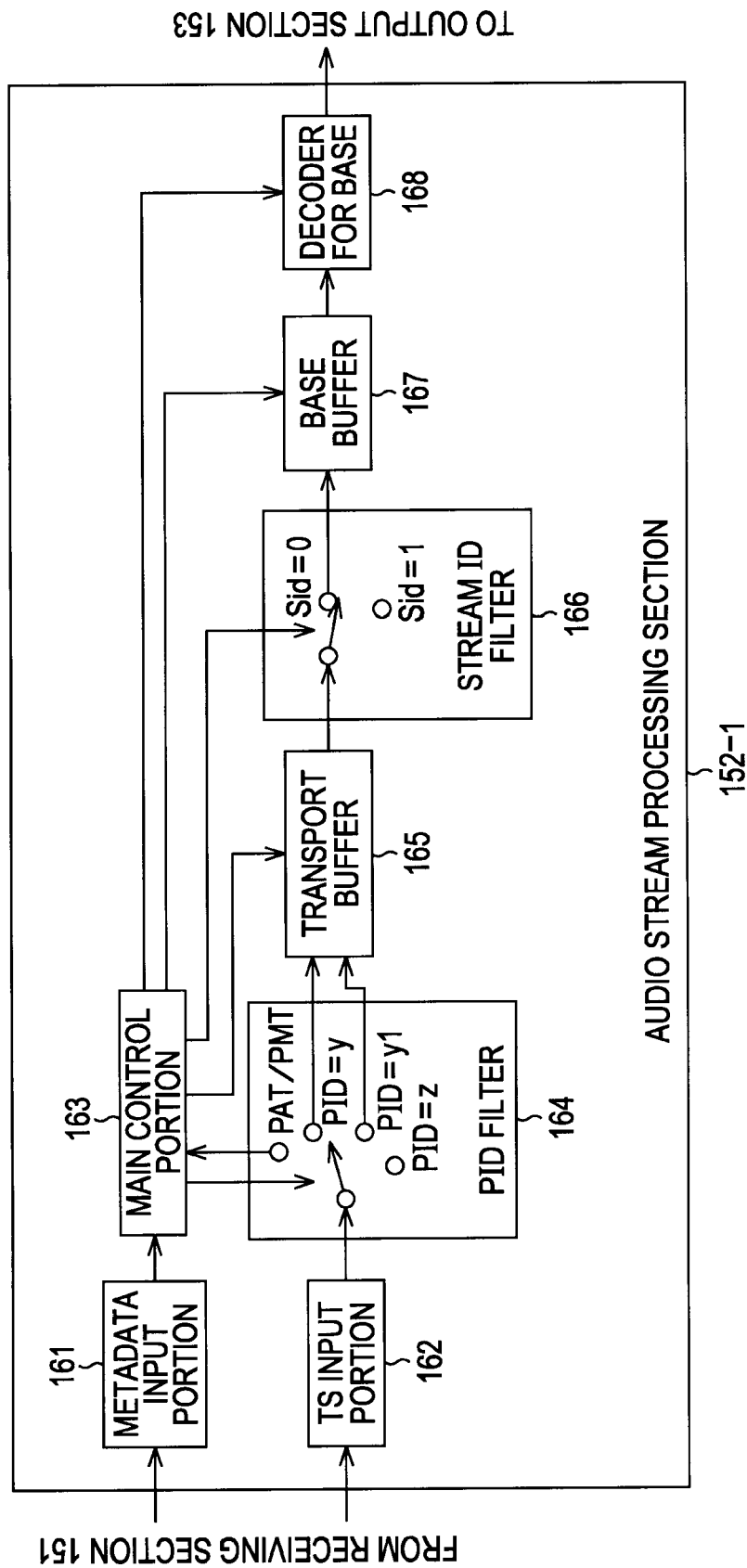
FIG. 20 is a block diagram showing a detailed example of the configuration of the audio stream processing section in the receiver in FIG. 19.

FIG. 20 is a block diagram showing an example of the configuration of the audio stream processing section 152 including an audio decoder (hereinafter referred to as a decoder for base) that can decode only the base audio stream. When it is necessary to distinguish, from another audio stream processing section 152, the audio stream processing section 152 including the decoder for base, it is called an audio stream processing section 152-1.

As shown in FIG. 20, the audio stream processing section 152-1 is configured to include a metadata input portion 161 to a decoder 168 for base.

Metadata received by the receiving section 151 is input to the metadata input portion 161. In other words, the metadata transmitted from the metadata transmitting portion 79-2 in the transmitter 41 in FIG. 5 is input to the metadata input portion 161. Specifically, for example, the metadata 131 having the structure in FIGS. 13 to 15, etc., is input to the metadata input portion 161.

When the transmitter 41 and the receiver 42 employ the application format in FIG. 12, the metadata 131 is included in either one of the clip information file 122 and the playlist 111. Therefore, in such a case, the clip information file 122 and the playlist 111 in which the metadata 131 is included in either one of them are input to the metadata input portion 161.

Figure 22:
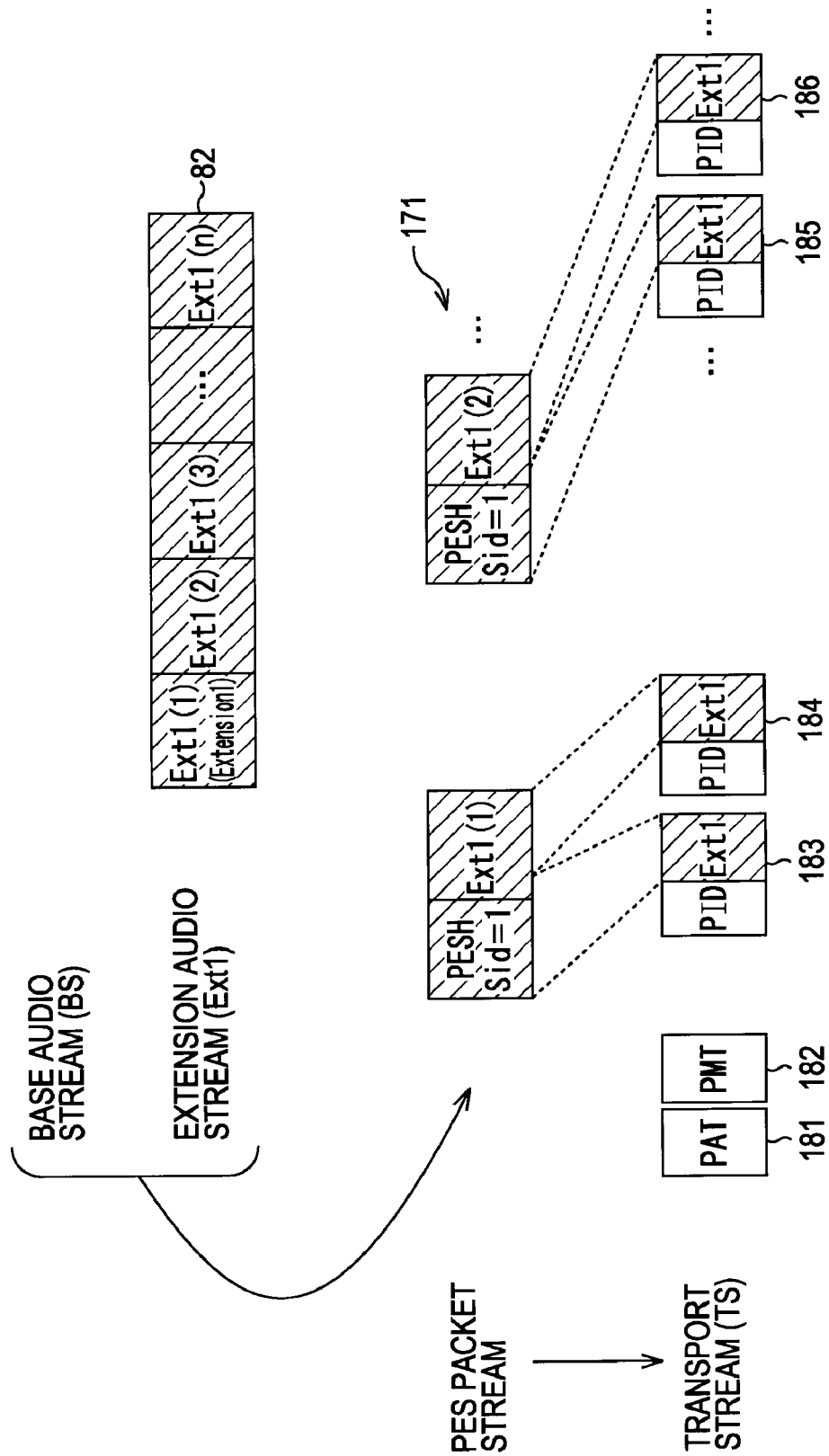
FIG. 22 is an illustration of an example of the structure of a TS in which only the first extension audio stream is multiplexed without including a base audio stream.

The TS received by the receiving section 151 is input to a TS input portion 162. In other words, the TS transmitted by the TS transmitting section 79-1 in the transmitter 41 in FIG. 5 is input to the TS input portion 162. Specifically, for example, the TS as shown in FIG. 6, FIG. 22, which is described later, or FIG. 28, which is described later, is input to the TS input portion 162.

A main control portion 163 controls the entirety of the audio stream processing section 152-1.

For example, the, 163 acquires, from the TS input to the TS input portion 162, TS packets corresponding to the table, and sets a PID in a PID filter 164 on the basis of the acquired TS packets. Setting of the PID is described later as a description of the PID filter 164.

In addition, for example, the main control portion 163 controls writing to and reading from a transport buffer 165 and a base buffer 167.

Furthermore, for example, the main control portion 163 sets a steam ID in a stream ID filter 166. Setting of the steam ID is described later as a description of the stream ID filter 166.

In addition, for example, the main control portion 163 controls decoding of the decoder 168 for base.

Furthermore, for example, the main control portion 163 acquires the metadata input to the metadata input portion 161 or the stream-presence/absence information included in the table TS packets in the TS input to the TS input portion 162. Based thereon, for performing actual decoding, it can determine whether to perform decoding on the TS input to the TS input portion 162.

In other words, based on the stream-presence/absence information, the main control portion 163 can determine whether, among the types of the base audio stream and the first to n-th extension audio streams, TS packets capable of being processed by the decoder 168 for base are included in the TS input portion 162. In the example in FIG. 20, the main control portion 163 can only process the type of the base audio stream, and, as described later, the PES packet stream corresponding to the TS input the TS input portion 162 is stored in a transport buffer 165. Accordingly, when it is determined that the base audio stream is not included, the main control portion 163 performs control so that reading of the PES packets from the transport buffer 165 is prohibited. When it is determined that the base audio stream is included, the main control portion 163 can control for reading PES packets bearing the steam ID (e.g., "1(sid=)0") corresponding to the type of the base audio stream.

Details of this process of the main control portion 163 are described later with reference to FIG. 21 and the subsequent drawings.

The PID filter 164 selectively extracts, from the TS input the TS input portion 162, TS packets bearing the set PID, and outputs the selected TS packets from a corresponding output end. In other words, the PID filter 164 is provided with output ends corresponding to PIDs, and a switch is changed over to the output end corresponding to the set PID. Setting the PID is performed by the main control portion 163, as described above. In addition, a PID in each TS packet included in the TS is described in the PAT or PMT. Accordingly, when the TS is input to the TS input portion 162, the main control portion 163 sets the PID of the PAT or PMT in the PID filter 164. This changes over the switch in the PID filter 164 to the output end indicated by the shown "PAT/PMT". The PID filter 164 selectively extracts the PAT or PMT TS packet from the TS input portion 162, and supplies the extracted packet to the main control portion 163. Then, by referring to the PAT or PMT, the main control portion 163 recognizes the PID of the audio stream (audio stream of interest which is described later) or video stream to be processed, and sets the PID in the PID filter 164.

Specifically, for example, the TS in the example in FIG. 6 is input to the TS input portion 162. In this case, at first, the PAT TS packet 101 or the PMT TS packet 102 is supplied to the main control portion 163 through the PID filter 164. In this case, when each PID of the TS packets 103 to 110 is "y", the main control portion 163 sets "y" as a PID in the PID filter 164. In other words, as shown in FIG. 20, the PID filter 164 changes over the switch to the output end indicated by the shown "PID=y". The PID filter 164 selectively extracts the TS packets whose PIDs are "y" in the TS input to the TS input portion 162, that is, the TS packets 103 to 110, and supplies the TS packets to the transport buffer 165.

The PID filter 164 in the example in FIG. 20 is a PID filter for the PAT and PMT shown in FIGS. 7 to 11. Accordingly, in addition to "y", only "y1" and "z" can be set as PIDs. Since the PID of the audio stream is "y" or "y1", only the output ends indicated by "PID=y" and "PID=y1" are connected to the transport buffer 165. In addition, the output end indicated by "PID=z" is connected to a block for processing the video stream, which is not shown.

The transport buffer 165 restores the original PES packets from the TS packets supplied from the PID filter 164, and stores them. Specifically, for example, in this case, the transport buffer 165 restores the PES packet stream 91 from the TS packets 103 to 110 in FIG. 6 which are supplied from the PID filter 164, and stores the PES packet stream 91.

The stream ID filter 166 selectively extracts PES packets having the set steam ID from the PES packets stored in the transport buffer 165, and outputs the PES packets to a corresponding end. In other words, the stream ID filter is provided with output ends corresponding to steam IDs, and the switch is changed over to the output end corresponding to the set steam ID.

Setting of the steam ID is performed by the main control portion 163, as described above. In other words, the audio stream processing section 152-1 in FIG. 20 has inability to decode the first to n-th extension audio streams since it include the decoder 168 for base that can handle only the base audio stream. In this case, the main control portion 163 stores only the type of the base audio stream as a type of stream that it can process, and sets, in the stream ID filter 166, the steam ID added for the type of the base audio stream. In this case, when the transmitting and receiving ends have a promise concerning the value of a steam ID beforehand, that is, when a steam ID added for the type of the base audio stream is stored beforehand, the steam ID is set in the stream ID filter 166. In addition, when there is not such a promise, the PMT having the structure shown in FIG. 9, that is, a PMT including the value of the steam ID, is employed. Accordingly, the main control portion 163 acquires the PMT TS packet, recognizes a steam ID added for the type of the base audio stream, and sets the steam ID in the stream ID filter 166.

Specifically, for example, assuming that the steam ID added for the type of the base audio stream is "0", the "0" is set in the stream ID filter 166. In other words, as shown in FIG. 20, the switch is changed over to the output end indicated by "Sid=0". The stream ID filter 166 selectively extracts PES packets in which the steam ID is "0" from the partial playback specification stored in the transport buffer 165, that is, the PES packets of the type of the base audio stream, and supplies the extracted PES packets to a base buffer 167.

In other words, the base buffer 167 stores the PES packets of the type of the base audio stream. Specifically, for example, in the example in FIG. 6, in the PES packet stream 91 stored in the transport buffer 165, only the PES packets of the base audio stream 81 are selectively extracted by the stream ID filter 166, and are stored in the base buffer 167.

The decoder 168 for base acquires the PES packets stored in the base buffer 167, decodes the acquired packets, and supplies the resultant decoded audio as played-back audio to the output section 153.

An example of the configuration of the audio stream processing section 152-1 that can decode only the base audio stream has been described with reference to FIG. 20.

Next, the "TS-packet receiving process" executed by the audio stream processing section 152-1 is described with reference to the flowchart in FIG. 21.

Figure 21:
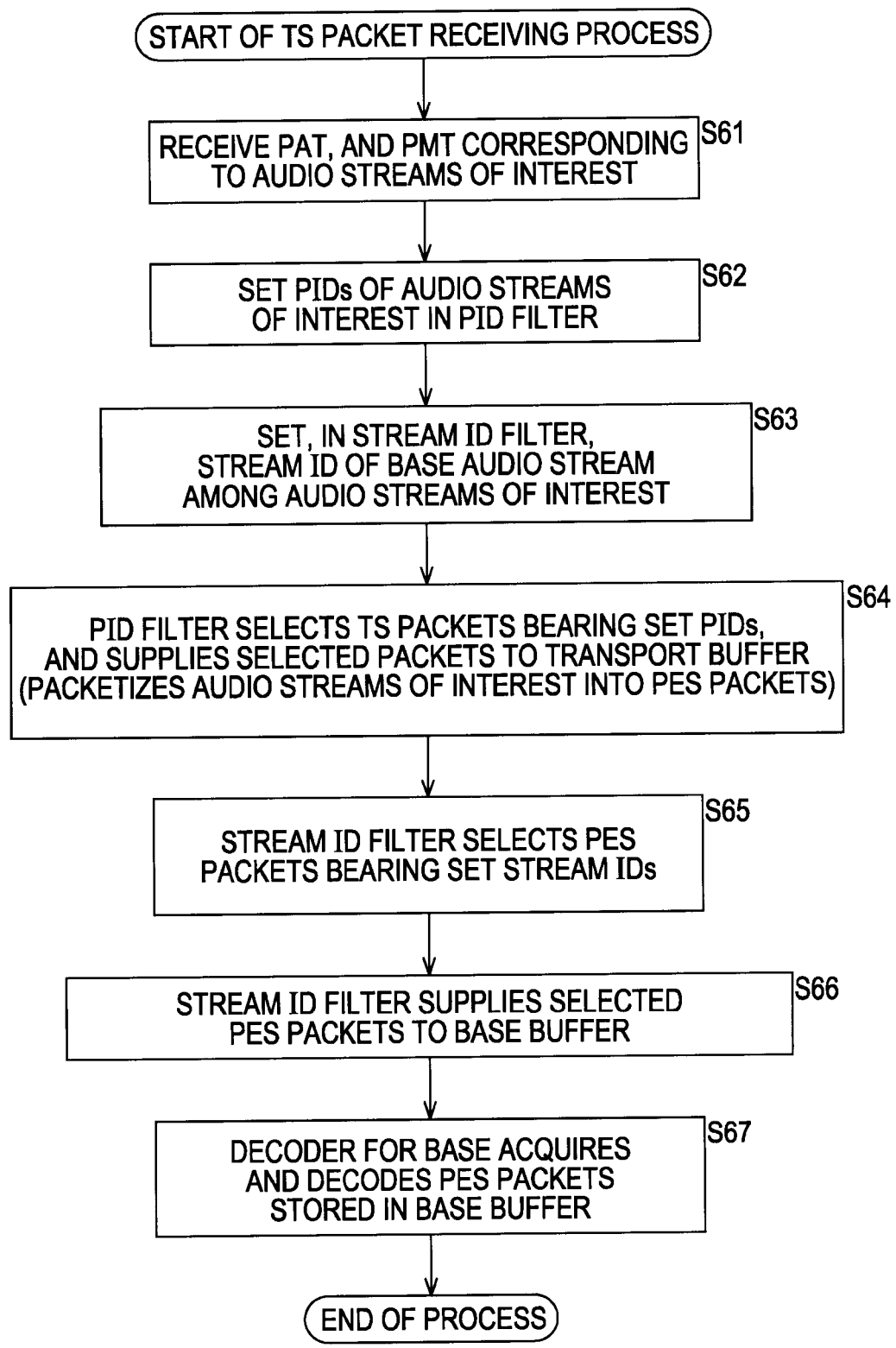
FIG. 21 is a flowchart illustrating an example of a "TS packet receiving process" executed by the audio stream processing section in FIG. 20.

The "TS-packet receiving process" in FIG. 21 is based on the condition that the TS (audio stream) transmitted from the transmitter 41 to the receiver 42 in FIG. 4 includes at least the base audio stream. However, as described above, TSs include one that does not include the base audio stream. Therefore, the "TS-packet receiving process", in which a TS including no base audio stream is also considered, is described later with reference to FIGS. 22 to 24.

In addition, TSs may include a plurality of audio streams, that is, TS packets of audio streams having different PIDs. Accordingly, in view of such a case, an audio stream of interest to be decoded, that is, an audio stream including TS packets having PIDs subject to decoding, are called an audio stream of interest.

The "TS-packet receiving process" in FIG. 21 is initiated when the TS is input to the TS input portion 162. Another "TS-packet receiving process", which is described later, is initiated when a TS is input to a corresponding TS input section.

In step S61, the main control portion 163 receives PATs and PMTs (TS packets) corresponding to audio streams of interest from the TS input portion 162 through the PID filter 164.

In step S62, the main control portion 163 recognizes the PIDs of the audio streams of interest from the PATs or PMTs, and sets the PIDs of the audio streams of interest in the PID filter 164.

In step S63, the main control portion 163 sets, in the stream ID filter 166, the steam ID of a base audio stream among the audio streams of interest.

In step S64, the PID filter 164 selects, from the TSs input to the TS input portion 162, the TS packets bearing the PIDs set in step S62, and supplies the TS packets to the transport buffer 165. At this time, the transport buffer 165 packetizes the audio streams of interest in TS packet form into PES packets.

In step S65, the stream ID filter 166 selects the PES packets bearing the steam ID set in step S63 from the PES packets stored in the transport buffer 165, and, in step S66, supplies the selected PES packets to the base buffer 167.

In step S67, the decoder 168 for base acquires and decodes the PES packets stored in the base buffer 167.

This finishes the "TS-packet receiving process" in FIG. 21.

The "TS-packet receiving process" in FIG. 21, that is, a "TS-packet receiving process" for audio streams of interest including at least the base audio stream, has been described.

However, as described above, the transmitter 41 in FIG. 4 may transmit, to the receiver 42, a TS in which only an extension audio stream is multiplexed without including the base audio stream. An example of such a TS is shown in FIG. 22.

In the example in FIG. 22, between the base audio stream 81 and first extension audio stream 82 shown in FIG. 6, only the first extension audio stream 82 is packetized into PES packets, and, as a result, a PES packet stream 171 is generated. The PES packet stream 171 is packetized into TS packets, and, as a result, TS packets 183 to 186 are generated. In addition, a table including information indicating that only the first extension audio stream 82 is present, that is, PAT and PMT TS packets 181 and 182, are generated. In other words, in the example in FIG. 22, a TS is configured to include TS packets 181 to 186.

When receiving a TS, such as an example in FIG. 22, in which an extension audio stream is multiplexed, an audio stream processing section, such as the audio stream processing section 152-1 in FIG. 20, cannot decode the TS.

In this case, when receiving a TS, such as an example in FIG. 22, in which an extension audio stream is multiplexed, until performing actual decoding on the TS, an audio stream processing section of the related art which has inability to decode an extension audio stream cannot recognize that it is impossible to decode the TS.

Unlike the related art, in the present invention, information indicating which types of audio streams are present in the TS, that is, stream-presence/absence information, is transmitted from the transmitter 41 to receiver 42 in FIG. 4. Accordingly, when the audio stream processing section 152-1 in FIG. 20 receives a TS, such as the example in FIG. 22, in which only an extension audio stream is multiplexed, it can easily recognize inability to decode the TS by referring to the stream-presence/absence information without performing actual decoding on the TS. This enables the audio stream processing section 152-1 to reduce a time for finding another stream that it can decode.

Figure 23:
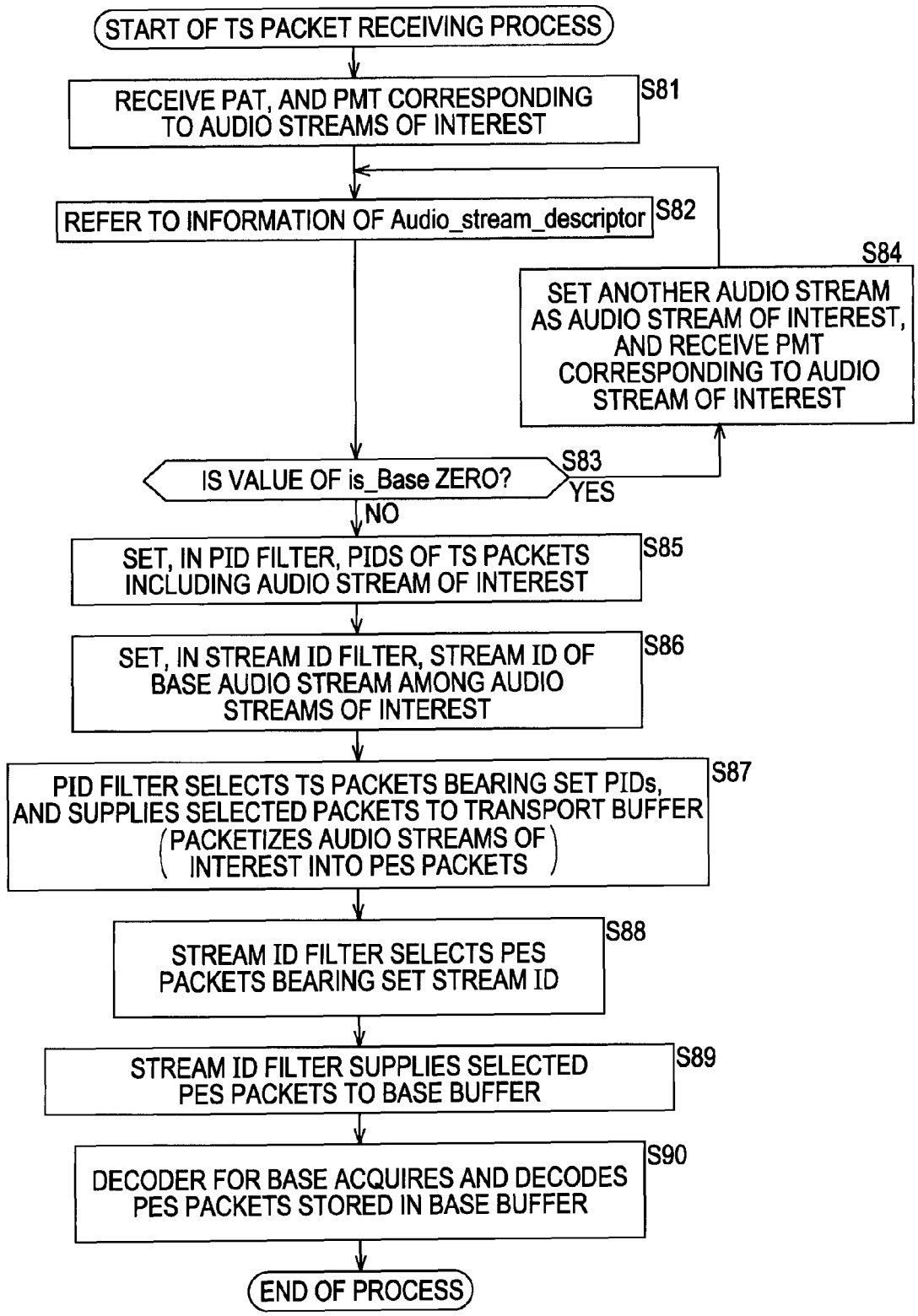
FIG. 23 is a flowchart illustrating another example of the "TS packet receiving process" executed by the audio stream processing section in FIG. 20.
Figure 24:
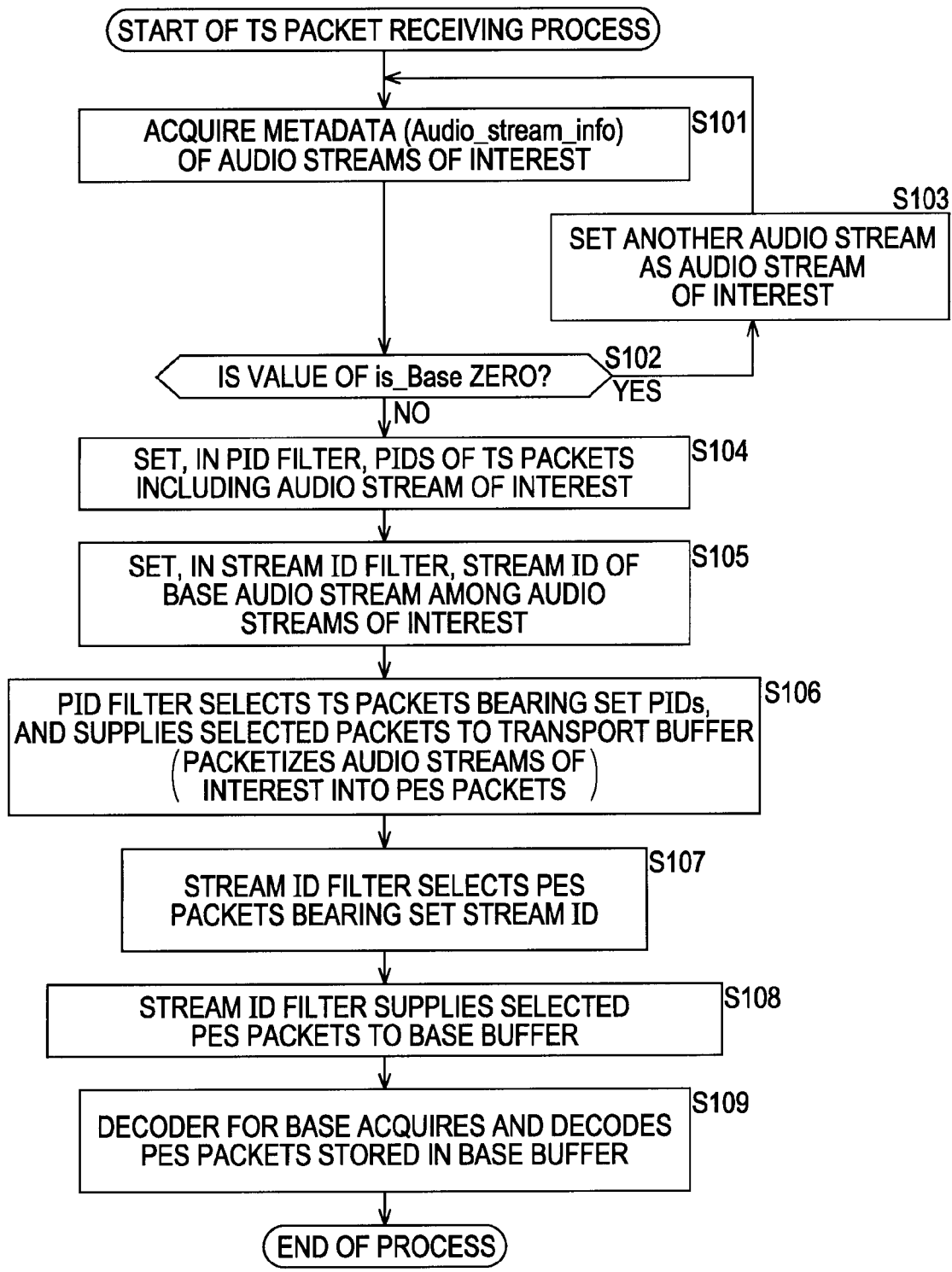
FIG. 24 is a flowchart illustrating a further example of the "TS packet receiving process" executed by the audio stream processing section in FIG. 20.

The stream-presence/absence information may be supplied to the audio stream processing section 152-1 in a form multiplexed in a TS, and may be supplied to the audio stream processing section 152-1 in a form included in metadata, as described above. Accordingly, in the former case, the audio stream processing section 152-1 can execute, for example, the "TS-packet receiving process" shown in FIG. 23. In the former case, the audio stream processing section 152-1 can execute, for example, the "TS-packet receiving process" in FIG. 22. In other words, each of the flowcharts in FIGS. 23 and 24 shows an example of a "TS-packet receiving process" considering that streams including no base audio stream can be audio streams of interest. The former shows an example of the "TS-packet receiving process", which uses stream-presence/absence information (PAT and PMT) included in a TS, and the latter shows an example of a "TS-packet receiving process", which uses stream-presence/absence information included in metadata.

The "TS-packet receiving processes" in FIGS. 23 and 24 are separately described below in the order given.

The "TS-packet receiving process" in FIG. 23 indicates an example of the "TS-packet receiving process" in the case of using the PMT having the structure in FIG. 8 or 9.

In step S81 in FIG. 23, the main control portion 163 in FIG. 20 receives the PATs and the PMTs (TS packets) corresponding to audio streams of interest from the TS input portion 162 through the PID filter 164.

By referring to the information, in the PMTs, of Audio_stream_descripter( ) concerning the audio streams of interest in step S82, in step S83, the main control portion 163 determines whether flag is_Base is zero (0).

As described above, flag is_Base is stream-presence/absence information indicating whether the base audio stream is present in the audio streams of interest (in the examples in FIGS. 8 and 9, audio streams in which the PID is "y").

Stream-presence/absence information, such as flag is_Base, indicating whether the base audio stream is present, is hereinafter referred to particularly as base-stream presence/absence information. Similarly, stream-presence/absence information indicating whether an extension audio stream is present, is hereinafter referred to particularly as extension-audio-stream presence/absence information.

In other words, when the value of flag is_Base as an example of base-stream presence/absence information, it is indicated that the base audio stream is present in audio streams of interest (in the examples in FIGS. 8 and 9, audio streams in which the PID is "y"). Conversely, when flag is_Base is "zero (0)", it is indicated that the base audio stream is not present in audio streams of interest.

Therefore, in step S83, the main control portion 163 determines whether flag is_Base is zero (0), whereby it is determined whether the audio streams of interest include a base audio stream capable of being decoded by the main control portion 163.

Specifically, for example, when the TS shown in FIG. 22 is input to the TS input portion 162, in the Audio_stream_descriptor of the PMT TS packet 182, only flag is_Ext1 is set to "1", and the other flags are set to "0's". In other words, flag is_Base is also set to "0". In this case, in step S83, the main control portion 163 determines that the value of flag is_Base is zero, that is, that the audio streams of interest cannot be decoded, and the process proceeds to step S84.

In step S84, the main control portion 163 sets the other audio streams, that is, audio streams of interest having other PIDs such as "y2", to audio streams of interest, and receives PMTs corresponding to the audio streams of interest.

After that, the process returns to step S82, and the subsequent steps are repeated. In other words, by repeatedly executing the loop processing in steps S82 to S84 without actually decoding the TS input to the TS input portion 162, the main control portion 163 can find, from the TS, audio streams of interest in which flag is_Base is "1", that is, audio streams including the base audio stream.

When such audio streams including the base audio stream are found, in step S83, it is determined that flag is_Base is not zero, and the process proceeds to step S85.

In other words, the audio streams including the base audio stream are set as audio streams of interest, and steps S85 to S90 concerning the audio streams of interest are executed. Processing in each of steps S85 to S90 is basically similar to that in each of steps S62 to S67 in FIG. 21. Accordingly, their description is omitted.

The "TS-packet receiving process" in FIG. 23 that uses the stream-presence/absence information (PAT and PMT) included in the TS has been described.

When, for example, the PMT having the structure is transmitted from the transmitter 41, the main control portion 163 may execute the following processing before the loop processing in steps S82 to S84 after step S81. In other words, the main control portion 163 recognizes an encoding type (one of types such as MPEG, AC3, and DTS) of the audio streams of interest by referring to the information of stream_coding_type, Based on the result of recognition, the decoder 168 for base determine whether the audio streams of interest include TS packets of a type capable of being decoded by the decoder 168 for base. If it is determined that they can be included, the process proceeds to step S82. If it is determined that they cannot be included, by performing processing corresponding to step S84, repetition of its determination may be executed. By executing the above processing, the receiver 42 at the receiving end has an advantage in that it can faster find audio streams that it can decode.

Next, the "TS-packet receiving process" in FIG. 24 that uses the stream-presence/absence information included in metadata is described.

The "TS-packet receiving process" in FIG. 24 indicates an example of the "TS-packet receiving process" that uses the metadata 131 having the structure in FIG. 13. Also the flow of the "TS-packet receiving process" in the case of using the metadata 131 having the structures in FIGS. 14 and 15, and another structure, is basically similar.

In step S101 in FIG. 24, the main control portion 163 in FIG. 20 acquires metadata 131 (Audio_stream_info) of audio streams of interest from the metadata input portion 161.

In step S102, the main control portion 163 determines whether flag is_Base in the metadata 131 is zero (0).

If, in step S102, it is determined that the value of flag is_Base is zero, that is, if it is determined that the audio streams of interest cannot be decoded, the process proceeds to step S103.

In step S103, in the main control portion 163, another audio stream, that is, an audio stream having another PID, is set to an audio stream of interest.

After that, the process returns to step S101, and the subsequent steps are repeated. In other words, by repeatedly executing the loop processing in steps S101 to without actually decoding the TS input to the TS input portion 162, the main control portion 163 can find, from the TS, audio streams in which the value of flag is_Base is "1", that is, audio streams including the base audio stream.

When the audio streams including the base audio stream are found, in step S102, it is determined that the value of is_Base is not zero, and the process proceeds to step S104.

In other words, the audio streams including the base audio stream are set to audio streams of interest, and processing in steps S104 to S109 for the audio streams of interest is executed. Since steps S104 to S109 are basically similar to the above-described steps S85 to S90 in FIG. 23, that is, they are basically similar to the above-described steps S62 to S67 in FIG. 21, their description is omitted.

An advantage can be obtained in that, as described above, since the audio stream processing section 152-1 in FIG. 20 does not need to receive the PMT of the TS by preferably executing the "TS packet receiving process" in FIG. 24 compared with the case of executing the "TS packet receiving process" in FIG. 23, it can faster find audio streams that it can decode.

Furthermore, the degree of the advantage is further enhanced such that the main control portion 163 executes the following processing after step S101 before step S102. In other words, the main control portion 163 further recognizes an encoding type (one of types such as MPEG, AC3, and DTS) of the audio streams of interest by referring to the information of stream_coding_type included in metadata, and determines, based on the result of recognition, whether TS packets of a type capable of being processed by the decoder 168 for base can be included in the audio streams of interest. If it is determined that they can be included, the process proceeds to step S102. If they cannot be included, the process proceeds to step S103.

The audio stream processing section 152-1 that can decode only the base audio stream has been described with reference to FIGS. 20 to 24.

Next, the audio stream processing section 152 including an audio decoder (hereinafter referred to as a decoder for base and extension) that can decode the base audio stream and the first extension audio stream is described. When the audio stream processing section 152 including the decoder for base and extension needs to be distinguished from another audio stream processing section 152, it is called an audio stream processing section 152-2.

Figure 25:
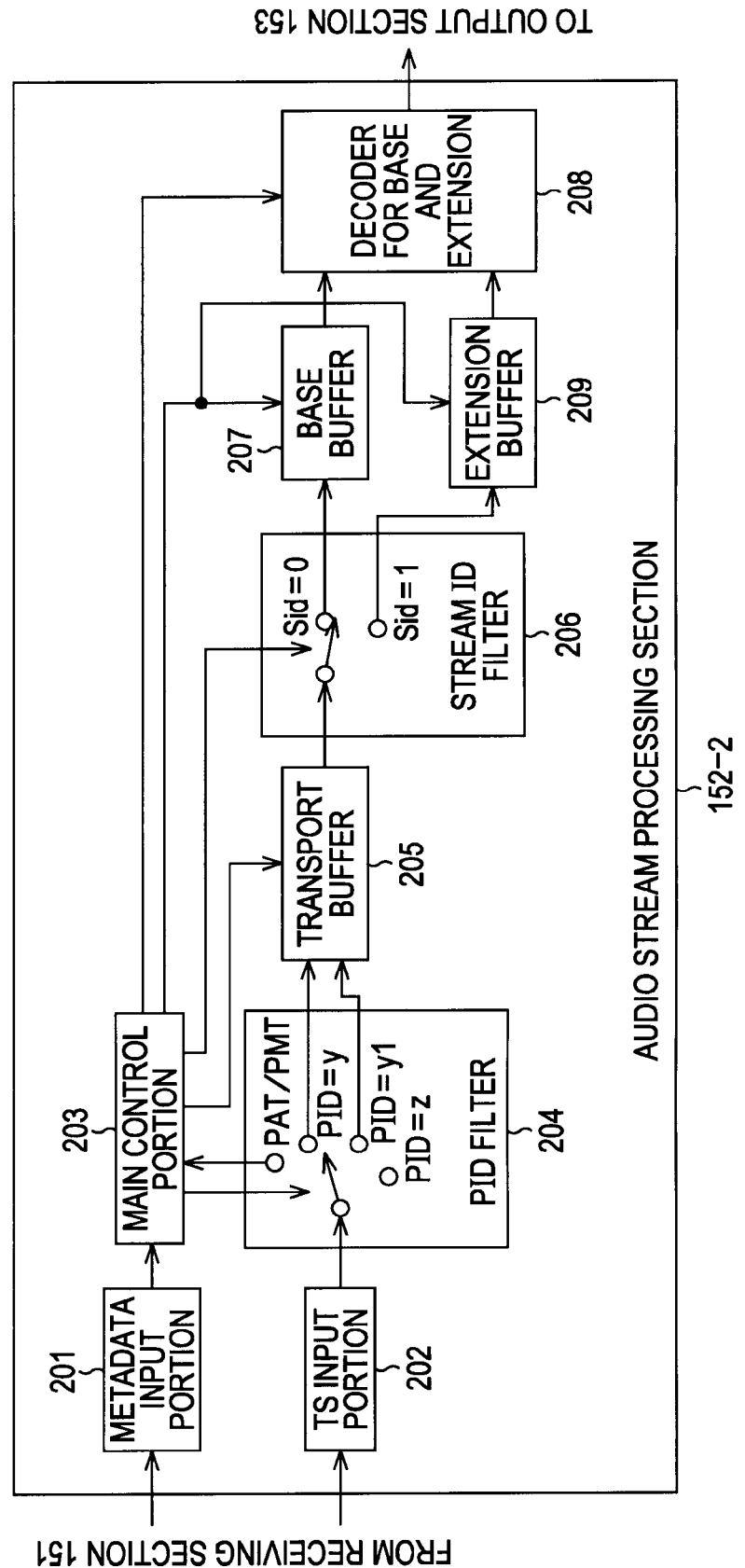
FIG. 25 is a block diagram showing another detailed example of the audio stream processing section in the receiver in FIG. 19.

FIG. 25 is a block diagram showing an example of the configuration of the audio stream processing section 152-2.

As shown in FIG. 25, the audio stream processing section 152 is configured to include a metadata input section 201 to a buffer 209.

The metadata input section 201 to a base buffer 207 basically have functions and configurations similar to those of the metadata input portion 161 to base buffer 167 in FIG. 20. Accordingly, a description of blocks of the metadata input section 201 to the base buffer 207 excluding an ID filter 206 is omitted. The ID filter 206 is described later.

In other words, it may be said that, for the audio stream processing section 152-1, the audio stream processing section 152-2 in FIG. 25 has a configuration of including a decoder 208 for base and extension instead of the decoder 168 for base, and, in addition, the extension buffer 209.

The ID filter 206 selectively extracts, from the PES packets stored in the transport buffer 205, PES packets bearing the set stream ID, and outputs the extracted packets to a corresponding output end. In other words, the ID filter 206 is provided with output ends corresponding to stream IDs, and its switch is changed over to an output end corresponding to the set stream ID.

Setting of the stream ID is performed by a main control section 203. In other words, the audio stream processing section 152-2 in FIG. 25 includes the decoder 208 for base and extension which handles the base audio stream and the first extension audio stream. In this case, the main control section 203 stores beforehand information indicating that types of streams capable of being processed by the main control section 203 are the base audio stream and the first extension audio stream, the main control section 203 sets, in the ID filter 206, a stream ID added to the type of the base audio stream and a stream ID added fro the type of the first extension audio stream. In this case, when there is beforehand no promise concerning stream ID values between the transmitting and receiving ends, that is, when two stream IDs added for the types of the base audio stream and the first extension audio stream are stored beforehand, both the two stream IDs are set in the ID filter 206. Conversely, when there is not such a promise, the PMT having the structure shown in FIG. 9, that is, the PMT including stream ID values, is employed. Accordingly, the main control section 203 acquires the TS packet of the PMT, recognizes, based thereon, the stream IDs added for the types of the base audio stream and the first extension audio stream, and sets both the two stream IDs in the ID filter 206.

Specifically, for example, it is assumed that the stream ID added for the type of the base audio stream is "0" and the stream ID for the type of the first extension audio stream is "1". In this case, each of "0" and ill is set in the ID filter 206. In other words, in FIG. 25, the switch is changed over to the output end indicated by "Sid=0" and the output end indicated by "Sid=1". Accordingly, by changing over the switch to the output end indicated by "Sid=0", the stream ID filter 206 can selectively extract, among the PES packets stored in the transport buffer 205, PES packets in which the stream ID is "0", that is, PES packets of the type of the base audio stream, and can supply the packets to the base buffer 207. In addition, by changing over to the output end indicated by "Sid=1", the stream ID filter 166 can selectively extract, among the PES packets stored in the transport buffer 205, PES packets in which the stream ID is "1", and can supply the packets to the extension buffer 209.

In other words, the base buffer 207 stores the PES packets of the type of the base audio stream, and the buffer stores the PES packets of the type of the first extension audio stream. Specifically, for example, in the above example in FIG. 6, in the PES packet stream 91 stored in the transport buffer 205, the PES packets of the base audio stream 81 are stored in the base buffer 207, and the PES packets of the first extension audio stream 82 are stored in the buffer 209.

The decoder 208 for base and extension acquires the PES packets stored in the base buffer 207, and decodes the acquired packets to obtain first decoded audio. In addition, the decoder 208 for base and extension acquires the PES packets stored in the buffer 209, and decodes the acquired packets to obtain second decoded audio. At this time, the decoder 208 for base and extension combines the first audio and the second audio, which bear the same PTS (Presentation Time Stamp), and supplies the resultant combined decoded audio as played-back audio to the output section 153.

The decoder 208 for base and extension can also perform acquiring only the PES packets stored in the base buffer 207, decoding only these packets, and supplying the resultant first decoded audio as played-back audio to the output section 153. Similarly, the decoder 208 for base and extension can also perform acquiring the PES packets stored in the buffer 209, decoding only these packets, and supplying the resultant second decoded audio as played-back audio to the output section 153.

An example of the configuration of the audio stream processing section 152-2 that can decode at least one of the base audio stream and the first extension audio stream has been described with reference to FIG. 25.

Next, a "TS packet receiving process" executed by the audio stream processing section 152-2 is described with reference to the flowchart in FIG. 26.

In step S121, the main control section 203 receives a PATs and PMTs (TS packets) corresponding to audio streams of interest from the TS input section 202 through the PID filter 204.

In step S122, the main control section 203 recognizes the PIDs of the audio streams of interest from the PATs and PMTs, and sets the PIDs of the audio streams of interest in the PID filter 204.

In step S123, by referring to the PMTs, the main control section 203 determines whether the base audio stream is included in the audio streams of interest.

When, in the PMTs, the value of flag is_Base (see FIG. 8 or FIG. 9) concerning the audio streams of interest is "1", in step S123, it is determined that the base audio stream is included in the audio streams of interest, and the process proceeds to step S124.

In step S124, the main control portion 163 sets, in the stream ID filter 206, the stream ID ("0" in the example in FIG. 25) of the base audio stream among the audio streams of interest. After that, the process proceeds to step S125. Conversely, when, in the PMTs, the value of flag is_Base concerning the audio streams of interest is "0", in step S123, it is determined that the base audio stream is not included in the audio streams of interest. The process proceeds to step S125 without executing step S124, that is, without setting, in the stream ID filter 206, the stream ID of the base audio stream among the audio streams of interest.

In step S125, by referring to the PMTs, the main control section 203 determines whether the first extension audio stream is included in the audio streams of interest.

When, in the PMTs, the value of flag is_Ext1 (see FIG. 8 or FIG. 9) concerning the audio streams of interest is "1", in step S125, it is determined that the first extension audio stream is included in the audio streams of interest, and the process proceeds to step S126.

In step S126, the main control portion 163 sets, in the stream ID filter 206, the stream ID ("1" in the example in FIG. 25) of the first extension audio stream among the audio streams of interest. After that, the process proceeds to step S127.

Conversely, when, in the PMTs, the value of flag is_Ext1 (see FIG. 8 or FIG. 9) concerning the audio streams of interest is "0", in step S125, it is determined that the first extension audio stream is not included in the audio streams of interest. Accordingly, the process proceeds to step S127 without executing step S126, that is, without setting, in the stream ID filter 206, the stream ID of the first extension audio stream among the audio streams of interest.

In step S127, the PID filter 204 selects, from the TS input to the TS input section 202, TS packets bearing the PID set in step S122, and supplies the TS packets to the transport buffer 205. At this time, the audio streams of interest in a form packetized into TS packets are packetized into PES packets by the transport buffer 205.

In step S128, the stream ID filter 206 selects, from the PES packets stored in the transport buffer 205, the PES packets bearing the stream ID set in at least one of steps S124 and S126.

In step S129, the stream ID filter 206 supplies the PES packets selected in step S128 to a corresponding buffer. In other words, when the type of the selected PES packets is the type of the base audio stream, the stream ID filter 206 supplies the PES packets to the base buffer 207, and, when the type of the selected PES packets is the type of the first extension audio stream, the stream ID filter 206 supplies the PES packets to the extension buffer 209.

In step S130, the decoder 208 for base and extension acquires the PES packets stored in each buffer, that is, the PES packets stored in the base buffer 207 and the extension buffer 209, and decodes the acquired PES packets.

In step S131, the decoder 208 for base and extension determines whether decoded audio corresponding to two types of PES packets is present.

When, in step S130, the PES packets stored in the base buffer 207 and the decoder 208 for base and extension are acquired and decoded, in step S131, it is determined that decoded audio corresponding to two type of PES packets is present, and the process proceeds to step S132.

In step S132, the decoder 208 for base and extension combines decoded audio being the same PTS, and outputs the resultant played-back audio (combined decoded audio) to the output section 153. This finishes the "TS packet receiving process" in FIG. 37 by the audio stream processing section 152-2.

Conversely, when, in step S130, only the PES packets stored in one of the base buffer 207 and the extension buffer 209 are acquired and decoded, in step S131, it is determined that decoded audio according to two types of PES packets is present, and the process proceeds to step S133.

In step S133, the decoder 208 for base and extension outputs, to the output section 153, as played-back audio, the decoded audio obtained as the result of step S130, that is, decoded audio corresponding to only one of the base audio stream and the first extension audio stream. This finishes the "TS packet receiving process" in FIG. 37 by the audio stream processing section 152-2.

When, for example, the PMT having the structure in FIG. 10 is transmitted from the transmitter 41, the main control portion 163 may execute the following processing before step S122. Specifically, the main control portion 163 recognizes an encoding type (one of types such as MPEG, AC3, and DTS) of the audio streams of interest by referring to the information of stream_coding_type, and determines, based on the result of recognition, whether TS packets of a type that the decoder 208 for base and extension can process can be included in the audio streams of interest. If it is determined that they can be included, the process proceeds to step S122. If it is determined that they cannot be included, processing may be executed in which the process returns to step S121 after setting another audio stream of interest in the audio streams of interest. The receiver 42 can have an advantage in that, by executing the processing, it can faster find an audio stream capable of being decoded by it.

The audio stream processing section 152-2 that can decode at least one of the audio stream and the first extension audio stream has been described with reference to FIGS. 25 and 26.

Figure 27:
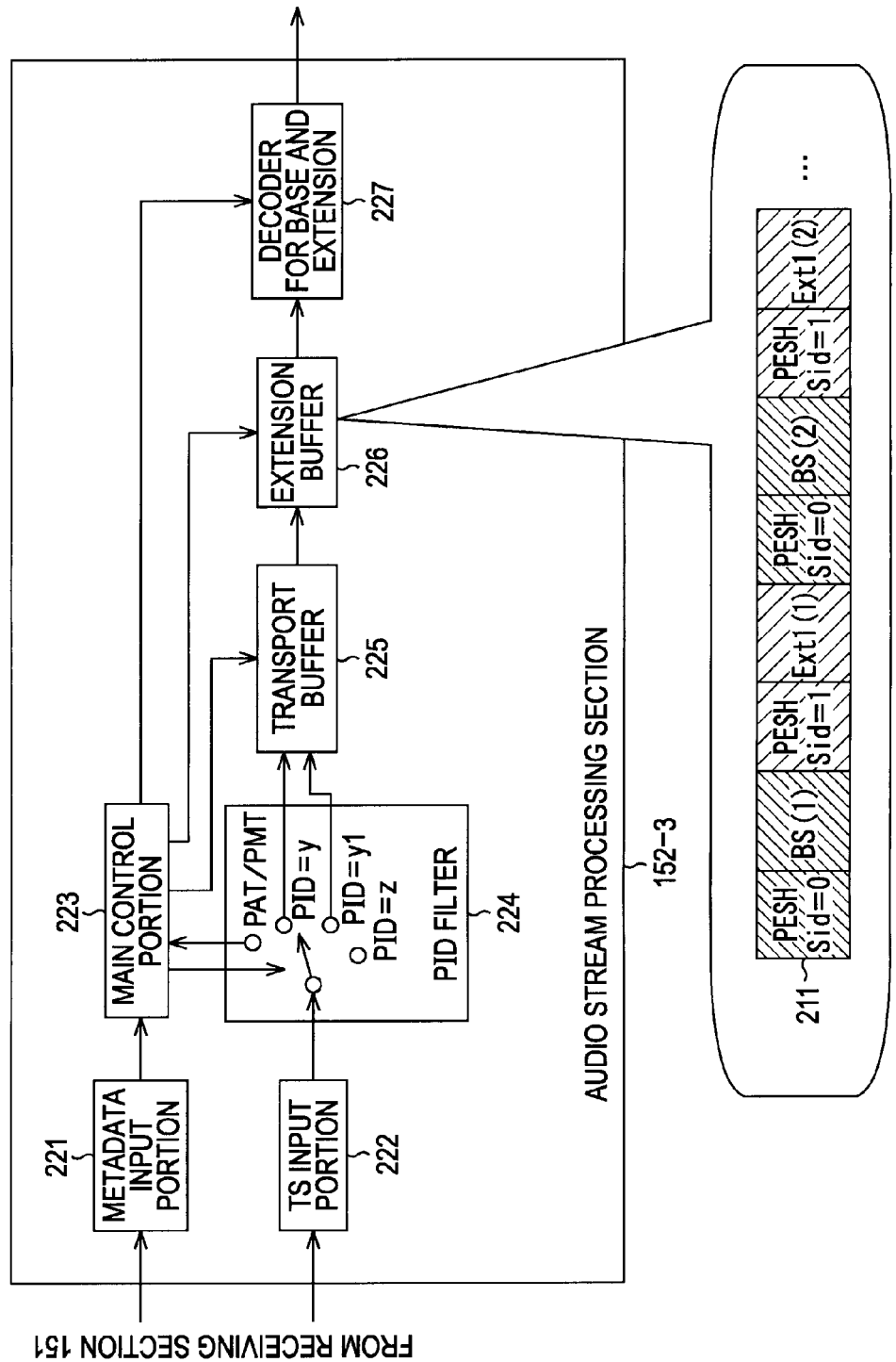
FIG. 27 is a block diagram showing another detailed example of the audio stream processing section in the receiver in FIG. 19.

When there is a predetermined promise concerning stream ID values between the transmitting and receiving ends, and operation of up to the base audio stream and the first extension audio stream is performed, as the audio stream processing section 152 in FIG. 19, instead of the audio stream processing section 152-2 in FIG. 25, the audio stream processing section 152-3 shown in FIG. 27, obtained by simplifying the audio stream processing section 152-2, can be included. In other words, FIG. 27 is an illustration of an example of the configuration of the audio stream processing section 152, which is an example different from that in FIG. 25.

As shown in FIG. 27, the audio stream processing section 152-3 is configured to include a metadata input section 221 to a decoder 227 for base and extension.

The metadata input section 221 to the decoder 227 for base and extension respectively have functions and configurations basically similar to those of corresponding blocks of the metadata input section 201 to extension buffer 209 in FIG. 25. Accordingly, a description of the metadata input section 221 to the decoder 227 for base and extension is omitted.

In other words, it may be said that the that the audio stream processing section 152-3 is re-configured for the audio stream processing section 152-2 so that the stream ID filter 206 and the base buffer 207 are eliminated and an extension buffer 226 (corresponding to the extension buffer 209 in FIG. 25) buffers the PES packets of all the types of the base audio stream and the first extension audio stream. In other words, the extension buffer 226 does not store the PES packets of the types of the base audio stream and the first extension audio stream in a divided form, but stores a PES packet stream 211, as shown in FIG. 27.

As described above, the decoder 227 for base and extension does not need to separately acquire the PES packets from two different buffers (the base buffer 207 and the extension buffer 209) as in the decoder 208 for base and extension in FIG. 25, whereby decoding can be easily and faster executed. In addition, this results in a reduction in also the circuit size of the decoder 227 for base and extension compared with that of the decoder 208 for base and extension. Therefore, in a view from the entirety of the audio stream processing section 152-3 in FIG. 27, the circuit size of the audio stream processing section 152-3 can be reduced than the audio stream processing section 152-2 in FIG. 25 for the elimination of the stream ID filter 206 and the base buffer 207 and for reduction in size of the decoder 227 for base and extension, etc.

The "TS packet receiving process" of the audio stream processing section 152-3 in FIG. 27 is basically similar to, in the "TS packet receiving process" in FIG. 24 of the audio stream processing section 152-2 in FIG. 25, processing in a case in which streams including the base audio stream and the first extension audio stream are set as the audio streams of interest. Accordingly, its description is omitted.

As described above, the transmitter 41 in FIG. 4 can transmit, to the receiver 42, not only a TS in which the base audio stream and the first extension audio stream are multiplexed, but also a TS in which the base audio stream and the first to n-th extension audio streams are multiplexed. An example of such a TS is shown in FIG. 28.

Figure 28:
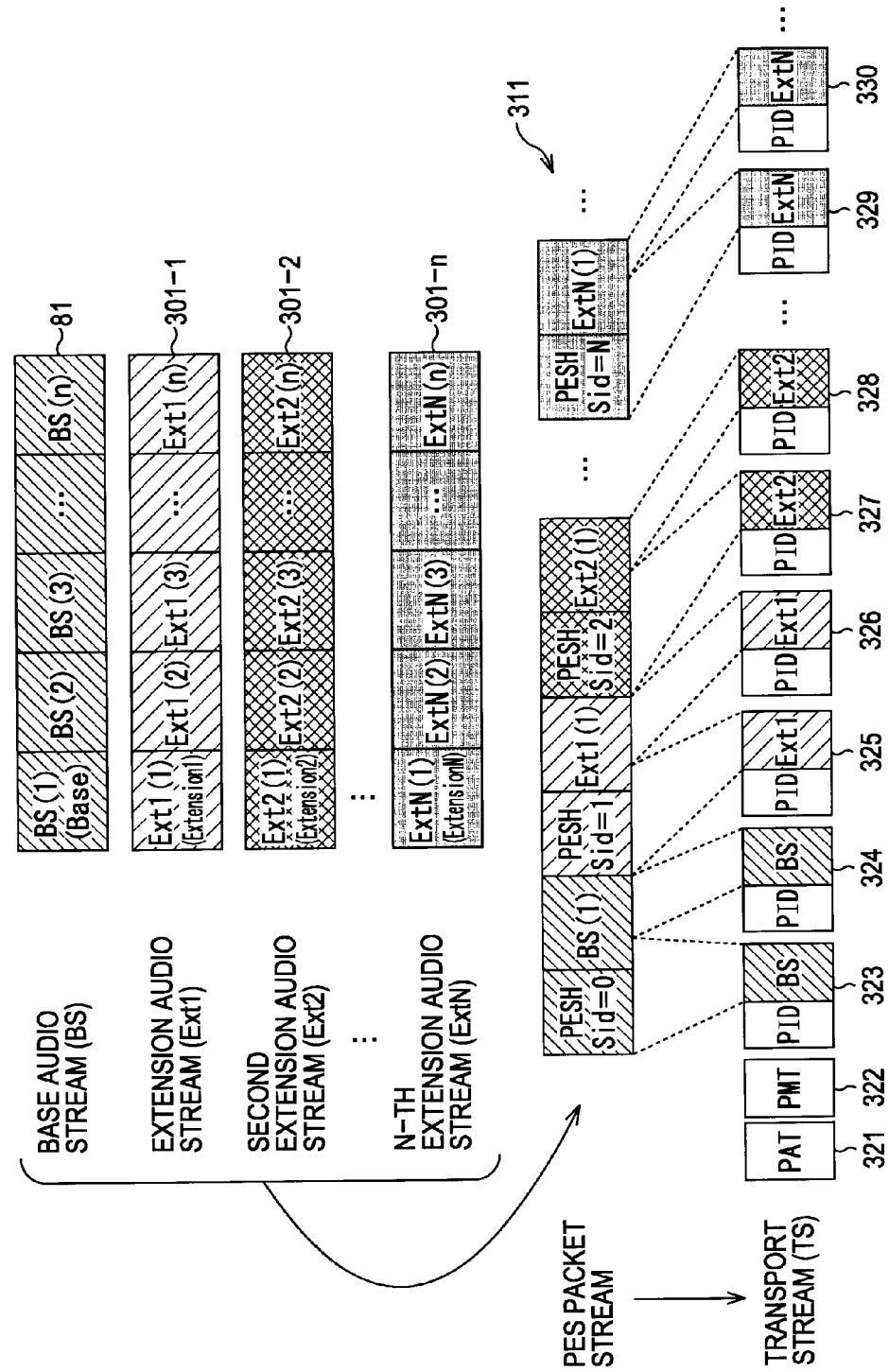
FIG. 28 is an illustration of another example of a TS in which only a base audio stream and the first to n-th extension audio streams are multiplexed.

In the example in FIG. 28, the base audio stream 81 and extension audio stream 82 (the first extension audio stream in the example in FIG. 28) shown in FIG. 6, and, in addition, the second to n-th extension audio streams 301-2 to 301-n are packetized into PES packets, whereby a PES packet stream 311 is generated. Furthermore, the PES packet stream 311 is packetized into TS packets, so that TS packets 323 to 330 are generated. In addition, a table including stream-presence/absence information indicating that the base audio stream 81 and the first to n-th extension audio streams 301-1 to 301-n are present, that is, PAT and PMT TS packets 321 and 322 are generated. In other words, in the example in FIG. 28, the TS is configured to include the TS packets 321 to 330.

Since, for example, the audio stream processing section 152-2 in FIG. 25 has inability to decode streams of types higher in level than the first extension audio stream, when it receives a TS as in the example in FIG. 28, it decodes only TS packets corresponding to the base audio stream 81 and first extension audio stream 301-1 in the TS.

Accordingly, when the audio stream processing section 152 in FIG. 19 needs to have decoding ability or streams higher in level than the first extension audio stream, the following audio stream processing section 152 may be employed although it is not shown. In other words, for example, for the audio stream processing section 152-2 in FIG. 25, the audio stream processing section 152 may be employed, which includes, instead of the stream ID filter 206, a stream ID filter that can separately set the types of the base audio stream and the first to n-th extension audio streams, a buffer that buffers the base audio stream and the first to n-th extension audio streams, and, instead of the decoder 208 for base and extension, a decoder for base and extension that handles each of the base audio stream and the first to n-th extension audio streams.

Figure 26:
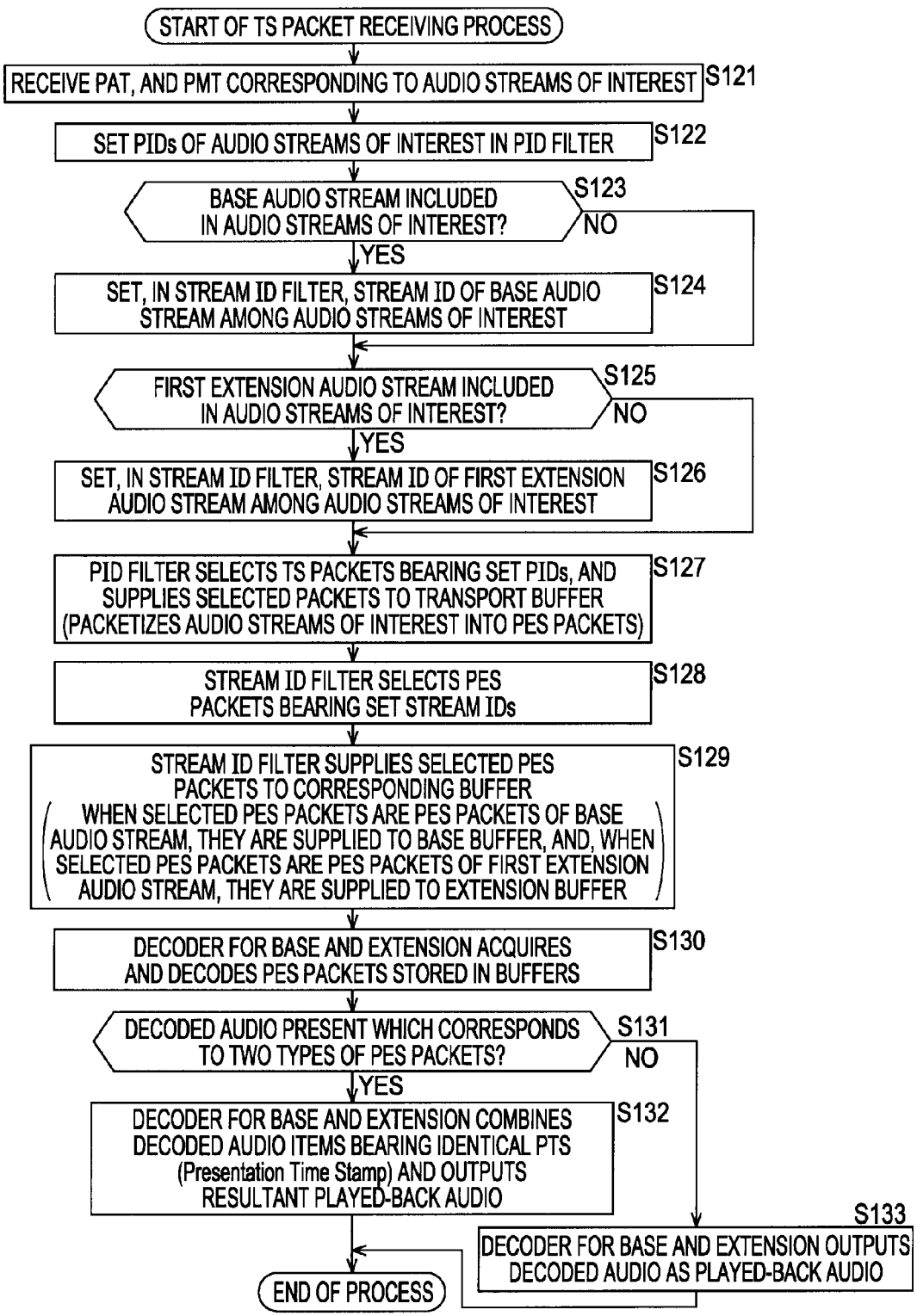
FIG. 26 is a flowchart illustrating a further example of the "TS packet receiving process" executed by the audio stream processing section in FIG. 25.

Also the "TS packet receiving process" of the audio stream processing section 152 that has a decoding ability to decode streams higher in level than the first extension audio stream resultantly has a processing flow basically similar to the "TS packet receiving process" in FIG. 26. However, in this case, processing that corresponds to steps S125 and S126 concerning the types of the second to n-th extension audio streams is needed. In addition, in step S132, decoded audio is generated by combination of types decoded in step S130.

As described above, according to the transmitting/receiving system of the first embodiment, processing for extension of streams can be performed. In particular, according to the present invention, also in a case in which an extended stream is input, the input stream can be decoded in accordance with the processing capability of one that performs processing. In addition, since, before stream decoding is attempted, it can be known whether decoding can be performed in accordance with the processing capability of one that performs processing, a time for finding a stream capable of being decoded by the one that performs processing can be reduced.

The present invention is not limited to the transmitter 41 including the encoder but can be applied to all information processing apparatuses that perform encoding. In addition, the present invention is not limited to the receiver 42 including the decoder but can be applied to all information processing apparatuses that perform decoding.

In the above examples, cases in which the present invention is applied to encoding and decoding of audio streams have been described. However, the present invention is not limited thereto but can be applied to encoding and decoding of video streams.

Second Embodiment

Next, a second embodiment of the transmitting/receiving system to which the present invention is applied is described.

Figure 29:
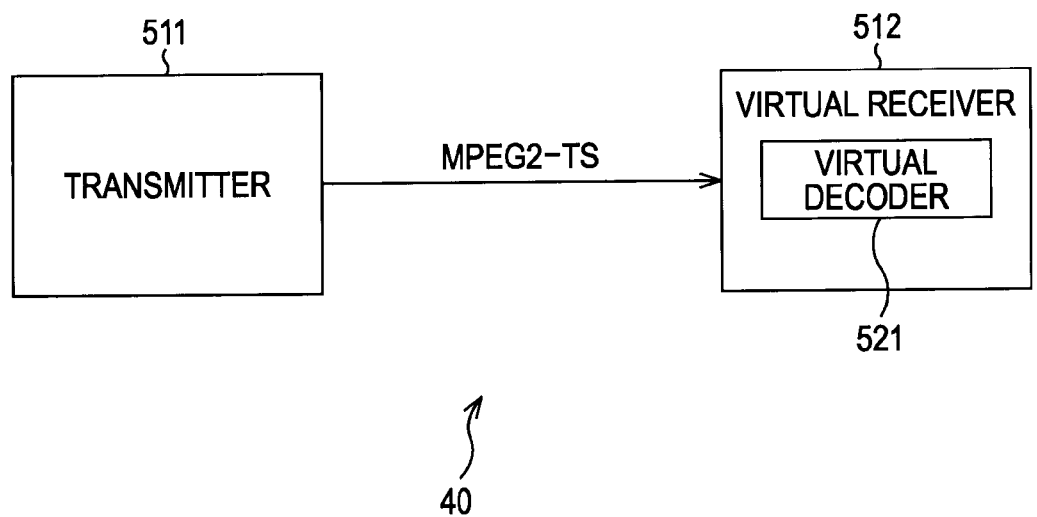
FIG. 29 is a block diagram illustrating restriction in a case in which a transmitter to which an embodiment of the transmitter is applied uses an MPEG2-TS technique to encode an audio stream.

FIG. 29 shows an example of the second embodiment of the transmitting/receiving system to which the present invention is applied. Restriction in a case in which a transmitter 511 encodes an audio stream by using the MPEG (Moving Picture Experts Group) 2-TS (Transport stream) (hereinafter referred to as MPEG2-TS) technique is described with reference to FIG. 29.

The transmitter 511 is a device in a place, such as a broadcasting station, for transmitting a stream including a plurality of MPEG2-TS packets. For example, the transmitter 511 encodes a video or audio stream by using the MPEG2-TS technique while assuming a virtual receiver 512 at a receiving end, and transmits the coded streams to an actual receiver (not shown).

The second embodiment is described assuming that the transmitter 511 encodes an audio stream into TS packets (as MPEG2-TS packets) and transmits the packets. In addition, in the second embodiment, a case in which a hierarchically coded audio stream having extensibility for a base stream is encoded and transmitted is described. Here, regarding a relationship between a base audio stream and an extension audio stream, the base audio stream alone can be played back as audio. When both the base audio stream and the extension audio stream are decoded, audio playback quality is higher than the case of playing back only the base audio stream, and, in addition, functionality is enhanced.

The transmitter 511 encodes the audio stream by using the MPEG2-TS technique. At this time, the transmitter 511 internally assumes the virtual receiver 512, and performs packetizing the audio stream and determining packet-transmitting timing so that the virtual decoder 521 in the transmitter 511 can decode the MPEG2-TS packets transmitted by the transmitter 511. An example of the configuration of the virtual decoder 521 is described later with reference to FIG. 33.

Figure 30:
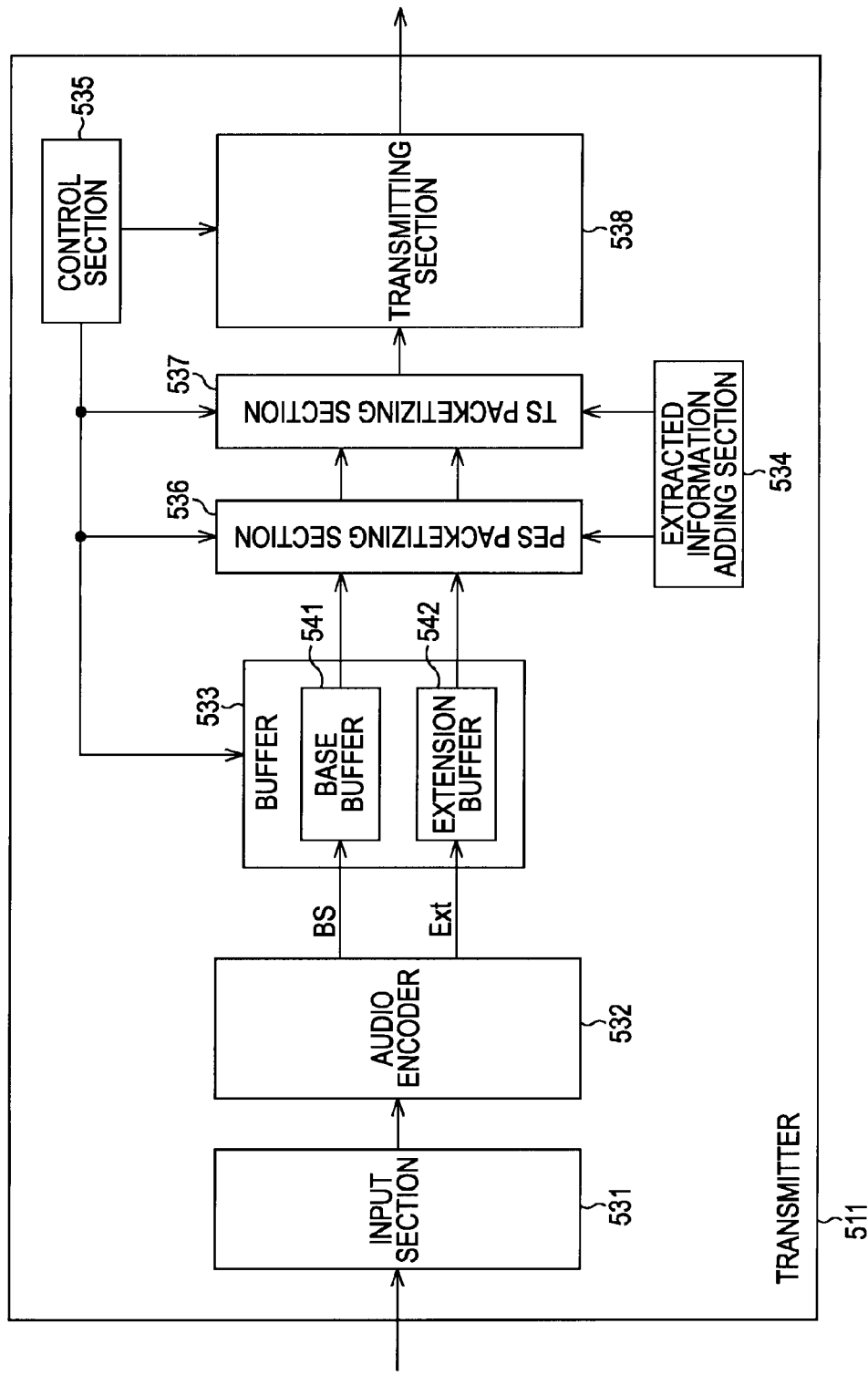
FIG. 30 is a block diagram showing an example of the configuration of the transmitter shown in FIG. 29.

FIG. 30 is a block diagram showing an example of the transmitter 511 in FIG. 29.

The transmitter 511 includes an input section 531, an audio encoder 532, a buffer 533, an extracted information adding section 534, a control section 535, a PES (packetized base stream) packetizing section 536, a TS packetizing section 537, and a transmitting section 538. The buffer 533 includes a base buffer 541 and an extension buffer 542.

An audio stream to be transmitted is input to the input section 531. The audio stream input to the input section 531 is supplied to the audio encoder 532.

The audio stream supplied from the input section 531 is encoded and supplied to the buffer 533 by the audio encoder 532. The audio encoder 532 in FIG. 30 is an encoder for hierarchical coding. In other words, the audio encoder 532 can encode the input audio stream so that base and extension audio streams are included. In detail, the audio encoder 532 encodes the audio stream so that the base and extension audio streams are included. The audio encoder 532 supplies the coded base audio stream to the base buffer 541 in the buffer 533 and supplies the extension audio stream to the extension buffer 542 in the buffer 533.

The base buffer 541 stores (buffers) the base audio stream and the extension buffer 542 stores (buffers) the extension audio stream. Under the control of the control section 535, the base buffer 541 and the extension buffer 542 read the audio streams stored therein, and supply the audio streams to the PES packetizing section 536.

The control section 535 monitors the (base and extension) audio streams stored (buffered) in the buffer 533, and controls the PES packetizing section 536, the TS packetizing section 537, and the transmitting section 538. The control section 535 also manages PTSs. The control section 535 calculates a buffer occupying amount of the virtual decoder 521 (described later) shown in FIG. 33, and determines (adjusts) TS-packet transmitting timing. In other words, based on the calculated buffer occupying amount, the control section 535 adjusts (controls) transmitting timing with which the transmitting section 538 transmits TS packets.

Under the control of the control section 535, the PES packetizing section 536 performs PES packetization on the audio streams supplied from the base buffer 541 and the extension buffer 542. Specifically, the PES packetizing section 536 acquires the base and extension audio streams by controlling the base buffer 541 and the extension buffer 542, and packetizes the acquired audio streams into PES packets. At this time, the PES packetizing section 536 stores, in the PES packets, PTSs supplied from the control section 535. In other words, the PES packets output from the PES packetizing section 536 store the PTSs.

When a stream ID (e.g., stream_id_extension) is supplied from the extracted information adding section 534, the PES packetizing section 536 may packetize the base and extension audio streams into PES packets, each having corresponding one (stream_id_extension) of stream IDs supplied from the extracted information adding section 534. The stream ID of each PES packet is used to identify a corresponding PES packet type. The PES packet type represents either of the base and extension audio streams. For example, a PES packet of the base audio stream type represents a PES packet including at least a part of data of the base stream. Accordingly, in order for the virtual receiver 512 in FIG. 29 at the receiving end to select a PES packet of a desired audio stream type, the value of a stream ID added to the PES packet may be recognized.

In the second embodiment, the PES packets are sequentially supplied from the PES packetizing section 536 to the TS packetizing section 537 in predetermined order. In this case, one stream (hereinafter referred to as a PES packet stream) consequently including a plurality of PES packets is supplied from the PES packetizing section 536 to the TS packetizing section 537. A specific example of PES packet stream is described later with reference to FIGS. 31 and 32.

Under the control of the control section 535, the TS packetizing section 537 packetizes the PES packet stream supplied from the PES packetizing section 536 into TS packets.

The extracted information adding section 534 supplies the TS packetizing section 537 with unique IDs added for base and extension audio stream types so that base and extension audio streams can be extracted on a decoding side (the side of the virtual receiver 512 in FIG. 29). In other words, the extracted information adding section 534 supplies the TS packetizing section 537 with identification information (ID) for identifying base and extension audio streams.

For example, a Transport_priority flag in a transport packet header can be used as the ID. The extracted information adding section 534 supplies the TS packetizing section 537 with information (extracted information) which sets Transport_priority=1 for a transport packet for transmitting the base audio stream, and which sets Transport_priority=0 for a transport packet for the extension audio stream.

The extracted information adding section 534 may not only supply ID as extracted information to the TS packetizing section 537, but may further transmit the extracted information to the PES packetizing section 536. For example, to enable the decoding side (e.g., the virtual receiver 512 in FIG. 29) to extract the base and extension audio streams, the extracted information adding section 534 supplies the PES packetizing section 536 with unique-valued IDs for the base and extension audio streams. The PES packetizing section 536 adds the IDs supplied from the extracted information adding section 534 to the generated PES packets.

In the second embodiment, Stream_id or Stream_id_extension is used as each ID. Stream_id represents Stream_id in a PES packet header defined in the systems standard. In addition, Stream_id_extension represents Stream_id_extension in a PES packet header defined in Amendment2 (2003) in MPEG2 systems. When the audio stream is one of streams other than MPEG Audio (MPEG-1/-2 Audio, MPEG AAC), it is preferable to employ Stream_id_extension. MPEG2 systems Amendment2 (2003) stipulates that, when Stream_id_extension is used, the value "1111 1101" (representing extension_stream_id) is set as Stream_id. In addition, MPEG2 systems Amendment2 (2003) stipulates that Stream_id_extension having a unique value for identifying stream types (base and extension audio streams) can be used.

Actually, although the transmitter 511 in FIG. 30 decodes system data and video data other than the audio stream, only the case of transmitting the audio stream has been described.

An example of the configuration of the transmitter 511 is described below with reference to FIG. 30.

Figure 31:
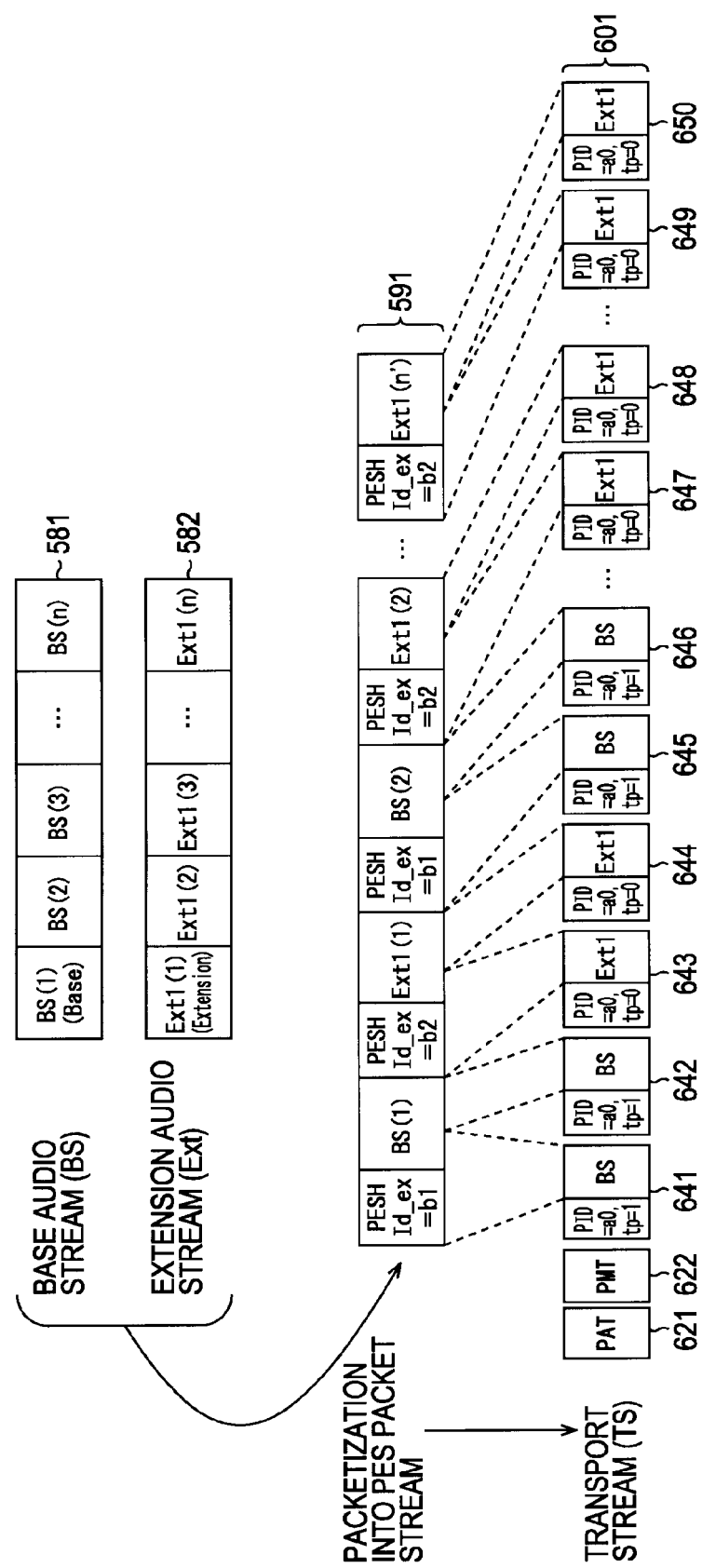
FIG. 31 is an illustration of the structure of a transport stream in which a base audio stream and an extension audio stream are multiplexed.
Figure 32:
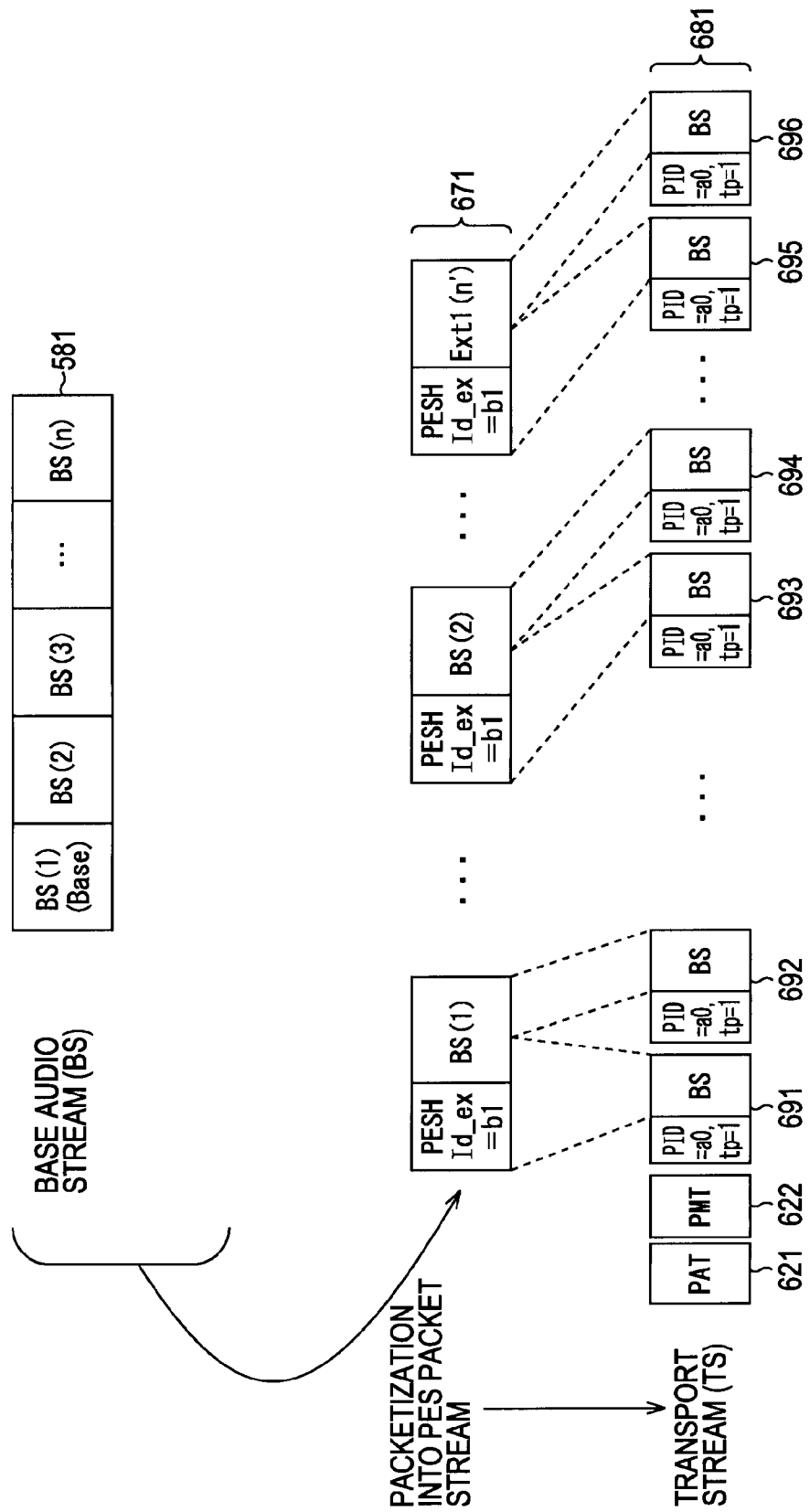
FIG. 32 is an illustration of the structure of a transport stream in which a base audio stream is multiplexed.

Next, the structure of a TS in which base stream and extension audio stream are multiplexed is described, as an example TS transmitted from the transmitter 511 in FIG. 30, that is, a TS to which the present invention is applied, with reference to FIGS. 31 and 32. In the example of FIG. 5, a base audio stream 581 and an extension audio stream 582 in the top part indicate a state encoded and output by the audio encoder 532 in FIG. 30. A PES packet stream 191 in the second part indicates a state output by the PES packetizing section 536 in FIG. 30. A TS 601 in the third part indicates a state output by the TS packetizing section 537 in FIG. 30.

In the example of FIG. 5, the TS (MPEG2-TS) is configured to include a TS packet 221 corresponding to a PAT (program association table), a TS packet 622 corresponding to a PMT (program map table), and TS packets 241 to 250 corresponding to the base audio stream 581 and the extension audio stream 582.

Each of the base audio stream 581 and the extension audio stream 582 has an encoded form in which a predetermined number of audio samples is used as one unit. Each unit is indicated by a parenthesized subscript. Specifically, for example, the base audio stream 581 is separated for encoding into the plural units (audio access units), BS(1), BS(2), . . . , BS(n). Similarly, for example, the extension audio stream 582 is separated for encoding into the plural units (audio access units), Ext1(1), Ext1(2), . . . , Ext1(n). Regarding the base audio stream 581 and the (first) extension audio stream 582, a set of units having identical subscripts, for example, units BS(1) and Ext1(1) are synchronously obtained in encoding by the audio encoder 532 in FIG. 30, and are synchronously played back (decoded) by the receiver, which is not shown. The subscript n represents an arbitrary natural number.

The PES packetizing section 536 in FIG. 30 packetizes the base audio stream 581 and the extension audio stream 582 to generate PES packets having different stream IDs, as shown in FIG. 31. Specifically, in the example of FIG. 31, the stream ID of the PES packets corresponding to the base audio stream 581 is "Stream_id_extension=b1" as it is described as "PESH Id_ex=b1". The stream ID of the PES packets corresponding to the extension audio stream 582 is Stream_id_extension=b2 as it is described as PESH Id_ex=b2. The subscript n' is an arbitrary natural number.

As described above, the PES packetizing section 536 generates and supplies the PES packet stream 191 shown in FIG. 31 to the TS packetizing section 537.

Unlike that, the TS packetizing section 537 packetizes each PES packet of the PES packet stream 591 into each TS packet having the same PID, as shown in the third part of FIG. 31. Specifically, the TS packetizing section 537 packetizes the PES packets of the base audio stream 581 and the extension audio stream 582 to generate transport packets having different IDs, as shown in FIG. 31. In the example of FIG. 31, the ID of the transport packets corresponding to the base audio stream 581 is "transport_priority=1" as it is described as "PID=a0, tp=1". The ID of the transport packets corresponding to the extension audio stream 582 is "transport_priority=0" as it is described as "PID=a0, tp=0". Accordingly, the transport stream (TS) 601 is generated (TS packets are formed) by the TS packetizing section 537.

As described above, identical PIDs are added for one stream, and, in order to identify base and extension streams included in one stream, different "tp" (transport_priority) items are added to them.

In the second embodiment, encoding units that are synchronously played back need to be ordered and encoded in the order of sets of base audio streams and extension audio streams in the transport stream. In other words, in the transport stream, BS(1), Ext1(1), BS(2), Ext1(2), ..., BS(n), and Ext1(n) need to be encoded in the order given.

FIG. 32 shows an example of a case in which a TS 681 is formed so as to include a TS packet 621 corresponding to the PAT, a TS packet 622 corresponding to the PMT, and the base audio stream 581. In other words, in the case in FIG. 32, the TS 681 indicates the structure of a transport stream obtained by multiplexing only the base audio stream 581. The comparison between FIGS. 31 and 32 indicates that FIG. 32 is an extraction of the base audio stream 581 from FIG. 31. Portions corresponding to those in FIG. 31 are denoted by identical reference numerals, and their description is omitted to avoid repeated description.

In the case in FIG. 32, the base audio stream 581 in the top part of FIG. 32 indicates a state encoded and output by the audio encoder 532 in FIG. 30. A reference numeral 271 in the second part of FIG. 32 denotes PES packets output by the PES packetizing section 536 in FIG. 30. A reference numeral 681 in the third part of FIG. 32 denotes TS packets output by the TS packetizing section 537 in FIG. 30.

As shown in FIG. 32, the PES packetizing section 536 in FIG. 30 packetizes the base audio stream 581 to generate PES packets having identical stream IDs. Specifically, in the case in FIG. 32, the stream ID of each PES packet corresponding to the base audio stream 581 is "Stream_id_extension=b1" as it is described as "PESH Id_ex=b1". As described above, the PES packetizing section 536 generates and supplies the PES packets shown in FIG. 32 to the TS packetizing section 537.

The TS packetizing section 537 packetizes each of PES packets forming the PES packet stream 271 into TS packets having identical PIDs, as shown in the third part of FIG. 32, and multiplexes the TS packets to generate a transport stream (TS) 681. As shown in FIG. 32, the TS packetizing section 537 packetizes the PES packets of the base audio stream 581 into transport packets 291 to 296 having identical IDs. Specifically, in the case in FIG. 32, the ID of each transport packet of the base audio stream 581 is "transport_priority=1" as it is described as "PID=a0, tp=1".

As described above, when the same PID is added to one stream and the types of streams in the stream include only a base audio stream, the same tp (transport_priority) is added.

In the second embodiment, when the transmitter 511 transmits a hierarchically coded audio stream having a structure including a base audio stream and an extension audio stream, the transmitter 511 adjusts TS-packet transmitting timing in accordance with the capability of the virtual receiver 512 (FIG. 29). In other words, even if the virtual receiver 512 can handle (decode) both a base audio stream and an extension audio stream, or only the base audio stream, the transmitter 511 adjusts timing with which it transmits TS packets so that the virtual receiver 512 can perform decoding without overflowing and underflowing of a buffer of the virtual receiver 512.

Specifically, when transmitting the TS packets forming the TS 601 in FIG. 31, the transmitter 511 adjusts TS-packet transmitting timing so as to respond to a virtual receiver (first virtual receiver) that can decode the transport stream 601 in FIG. 31 and to respond to a virtual receiver (second virtual receiver) that can decode only the TS 681 in FIG. 32. In other words, when the virtual receiver 512 extracts and decodes only the base audio stream, the transmitter 511 adjusts timing (packet transmitting timing) with which it packetizes a hierarchically coded audio stream so that a predetermined-sized decoder buffer for base audio stream does not overflow and underflow.

Accordingly, when the virtual receiver 512 only has a capability to decode a base audio stream, that is, when the virtual receiver 512 only has a capability to decode only the TS 681 corresponding to the base audio stream 581 in FIG. 32, a minimum necessary size (capacity) of an audio buffer of the virtual receiver 512 is determined, and, in addition, the value of an input bit rate to the audio buffer is determined.

In addition, when the virtual receiver 512 has a capability to decode both a base audio stream and an extension audio stream, that is, when the virtual receiver 512 has a capability to decode both the base audio stream 581 and extension audio stream 582 in FIG. 31, the virtual receiver 512 determines the minimum necessary size (capacity) of its audio buffer, and further determines the value of an input bit rate to the audio buffer.

Figure 2:
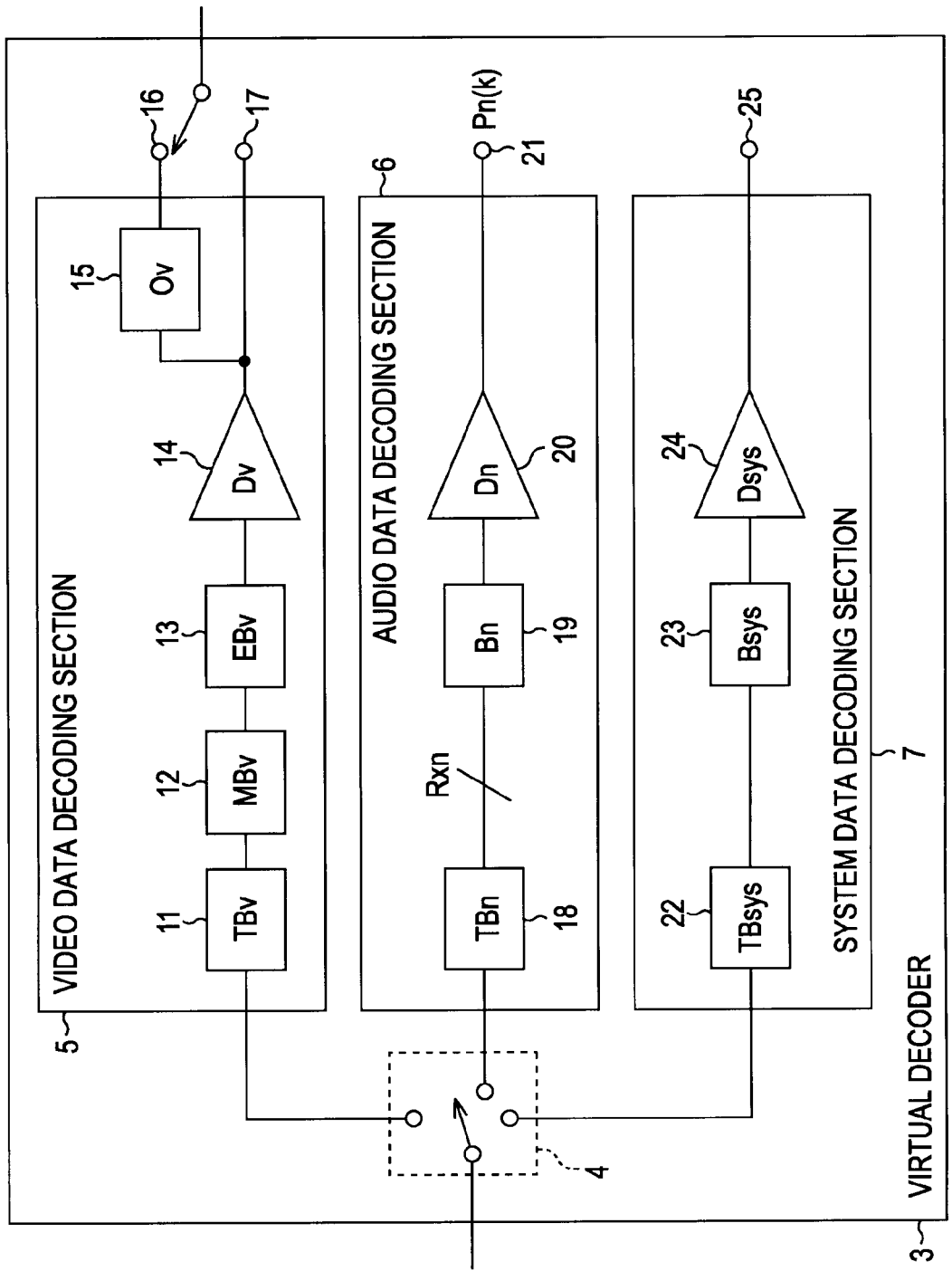
FIG. 2 is a block diagram showing an example of the configuration of the decoder shown in FIG. 1.

The size of the audio buffer corresponds to the size of the elementary buffer 19 in FIG. 2, and the value of the input bit rate to the audio buffer corresponds to Rxn in FIG. 2.

In other words, for each of cases in which the virtual receiver 512 has a capability to decode a base audio stream, and in which the virtual receiver 512 has a capability to decode both a base audio stream and an extension audio stream, the size of the audio buffer and the value of the input bit rate to the audio buffer are set.

In the second embodiment, the size of the elementary buffer of the virtual receiver 512 which only has a capability to decode a base audio stream is set as Bn=bn0, and the value of the input bit rate (leak rate to the audio buffer) to the audio buffer is set as Rxn=rxn0. In addition, the size of the elementary buffer of the virtual receiver 512 which has a capability to decode both the base audio stream and the extension audio stream is set as Bn=bn1, and the value of the input bit rate (leak rate to the audio buffer) to the audio buffer is set as Rxn=rxn1. Furthermore, the relationships bn0<bn1 and rxn0<rxn1 hold. In other words, relationships are established in which the size Bn0 of the elementary buffer is less than size Bn1 and in which the value rxn0 of the input bit rate to the elementary buffer is less than the value rxn1.

Figure 33:
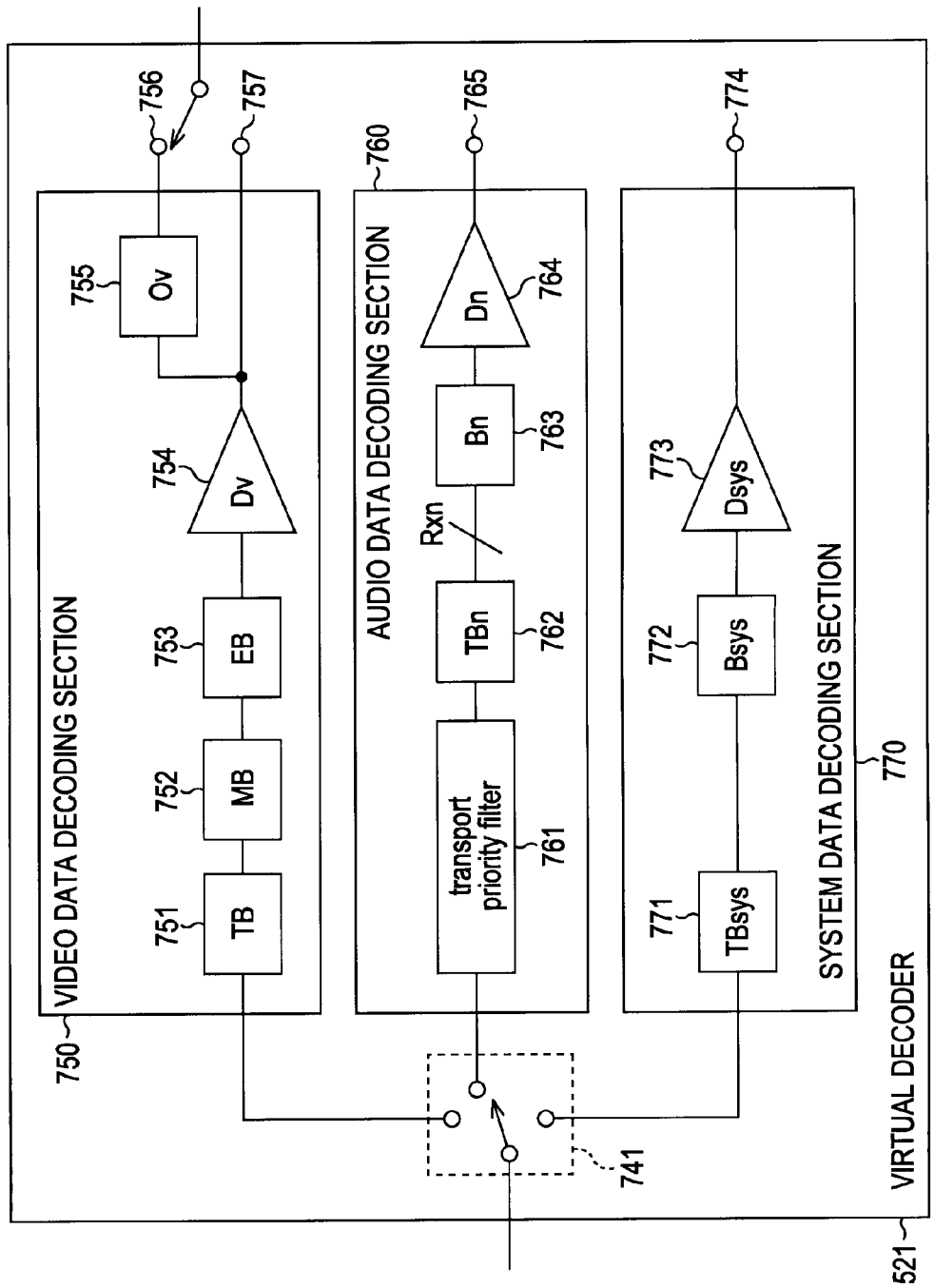
FIG. 33 is a block diagram illustrating a mode of the virtual decoder shown in FIG. 29.

FIG. 33 illustrates a model of the virtual decoder 521 for restricting encoding of a transport stream in which a base audio stream and an extension audio stream are multiplexed. Specifically, FIG. 33 shows an example model of the virtual decoder 521 (FIG. 29) in the virtual receiver 512 which is assumed by the transmitter 511 when it uses the MPEG2-TS technique to encode a base audio stream and an extension audio stream for transmission. In other words, FIG. 33 shows a model of the virtual decoder 521 which is assumed when a base audio stream and an extension audio stream are decoded and packetized for transmission by the transmitter 511.

The MPEG2-TS transmitted to the virtual receiver 512 is supplied to the virtual decoder 521. The MPEG2-TS supplied to the virtual decoder 521 is filtered by packet type in a filter 741, as shown in FIG. 33.

Specifically, the MPEG2-TS includes a plurality of packets, each packet bearing a PID (Packet Identification) for identifying the packet. Based on the PIDs added to the packets forming the MPEG2-TS, the filter 741 supplies video-stream-forming TS packets to a video data decoding section 750 for processing a video stream, supplies audio-stream-forming TS packets to an audio data decoding section 760 for processing an audio stream, and supplies system-related TS packets to a system data decoding section 770 for processing system data.

The video data decoding section 750 includes a transport buffer (indicated by TBv in FIG. 33) 751, a multiplex buffer (indicated by MBv in FIG. 33) 752, an elementary buffer (indicated by EBv in FIG. 33) 753, a video decoder (indicated by Dv in FIG. 33) 754, and an output re-ordering buffer (indicated by Ov in FIG. 33) 755.

When the video-stream-forming transport packets are supplied to the video data decoding section 750 through the filter 741, the video-stream-forming transport packets are stored as data in the transport buffer 751. The data is supplied to the multiplex bovver 752 at a predetermined bit rate. After storing and smoothing the supplied data, the multiplex buffer 752 supplies the smoothed data to the elementary buffer 753. The video decoder 754 extracts video access units stored in the elementary buffer 753 with predetermined timing, decodes the extracted video access units, and outputs the decoded video access units. Part of the decoded data is output from a terminal 756 through the output re-ordering buffer 755, and the other data is output from a terminal 357 and is played back.

The audio data decoding section 760 includes a transport priority filter 761, a transport buffer 762 (indicated by TBn), an elementary buffer 763 (indicated by Bn), and an audio decoder 764 (indicated by Dn).

When the audio-stream-forming TS packets are supplied to the audio data decoding section 760 through the filter 741, the transport priority filter 761 filters the TS packets in accordance with the capability of the virtual decoder 521. For example, the transport priority filter 761 performs filtering based on the value of the tp (see FIG. 31) added to each TS packet. The TS packets filtered by the transport priority filter 761 are supplied to the transport buffer 762 in a subsequent stage. The transport buffer 762 stores the TS packets filtered and supplied by the transport priority filter 761. The size (capacity) of the transport priority filter 761 is 512 bytes.

The TS packets stored in the transport buffer 762 are supplied to the elementary buffer 763 at rate Rxn in accordance with the capability of the virtual decoder 521. Rxn is a leak rate from the transport buffer 762, and, when the transport buffer 762 stores data, the data is input at the rate Rxn from the transport buffer 762 to the elementary buffer 763. When the transport buffer 762 stores no data, Rxn is zero.

The elementary buffer 763 stores the data that is supplied at the rate Rxn from the transport buffer 762. The size of the elementary buffer 763 differs depending on audio encoding types (such as MPEG1 audio and MPEG2 AAC audio). When the transport buffer 762 stores data, the data is supplied at the rate (speed) Rxn from the transport buffer 762 to the elementary buffer 763. When the transport buffer 762 stores no data, no data is supplied from the transport buffer 762 to the elementary buffer 763 (i.e., Rxn=0).

The audio decoder 764 extracts audio access units stored in the elementary buffer 763 with predetermined timing, decodes the extracted audio access units, and outputs the decoded audio access units for playback from a terminal 365. Specifically, when a PTS (Presentation Time Stamp) of an audio access unit is equal to the time of a system time clock of the T-STD, the audio decoder 764 extracts the audio access unit from the elementary buffer 763. Audio access units are encoding units that form an audio stream, and are used as decoding units.

A value that is changed in accordance with the capability of the virtual decoder 521 in the audio data decoding section 760 in FIG. 33 is described below.

(1) When, from a transport stream obtained by multiplexing a base audio stream and an extension audio stream, the base audio stream is extracted and decoded, or a transport stream obtained by multiplexing only a base audio stream is decoded, the virtual decoder 521 (the first virtual decoder in the first virtual receiver) satisfies the following.

(1-1) The transport priority filter 761 selects only TS packets in which tp=1, and supplies the selected TS packets to the transport buffer 762.

(1-2) The value Rxn of the input bit rate from the transport buffer 762 to the elementary buffer 763 is set to rxn0.

(1-3) The size Bn of the elementary buffer 763 is set to bn0.

(2) When, from a transport stream obtained by multiplexing a base audio stream and an extension audio stream, both the base audio stream and the extension audio stream are decoded, the virtual decoder 521 (the second virtual decoder in the second virtual receiver) satisfies the following.

(2-1) The transport priority filter 761 supplies the transport buffer 762 with all transport packets (TS packets in which tp=0 and tp=1).

(2-2) The value Rxn of the input bit rate from the transport buffer 762 to the elementary buffer 763 is set to rxn1.

(2-3) The size Bn of the elementary buffer 763 is set to bn1.

As described above, the filtering conditions (1-1 and 2-1) of the transport priority filter 761, the values (1-2 and 2-2) of the input bit rate to the elementary buffer 763, the sizes (1-3 and 2-3) of the elementary buffer 763 differ depending on the capability of the virtual decoder 521. The transmitter 511 can transmit TS packets while controlling transmitting timing so that, in each of the first virtual receiver assumed in the case (1) and the second virtual receiver assumed in the case (2), the size of the elementary buffer does not overflow and underflow. In the following description, those obtained by applying the conditions in the case (1) to the virtual receiver 512 and the virtual decoder 521 included therein are called a "first virtual receiver 512" and a "first virtual decoder 521", and those obtained by applying the conditions in the case (2) to the virtual receiver 512 and the virtual decoder 521 included therein are called a "second virtual receiver 512" and a "second virtual decoder 521".

The system data decoding section 770 includes a transport buffer (indicated by TBsys) 771, an elementary buffer (indicated by Bsys) 772, and a system decoder (indicated by Dsys) 773.

When the system-related TS packets are supplied to the system data decoding section 770 through the filter 741, the system-related TS packets are stored as data in the transport buffer 771. The data stored in the transport buffer 771 is supplied to the elementary buffer 772. The system decoder 773 extracts system access units stored in the elementary buffer 72 with predetermined timing, decodes the system access units, and outputs the decoded units from a terminal 374.

The system-related TS packets include, for example, the PAT TS packets 221 and PMT TS packets 622 in FIGS. 31 and 32.

The transmitter 511 in FIG. 30 needs to perform packetizing a transport stream corresponding to the base audio stream and the extension audio stream, and encoding the packets after determining transmitting timing so that the packets are correctly decoded by the virtual receiver 512 including the virtual decoder 521 in FIG. 33.

In other words, it is necessary for the transmitter 511 to perform audio-stream packetizing timing and encoding so that, for example, the transport buffer 762 in the virtual decoder 521 in FIG. 33 does not overflow and the elementary buffer 763 does not overflow and underflow.

Accordingly, the transmitter 511 adjusts audio-stream packetizing timing so that the transport stream obtained by multiplexing the base audio stream and extension audio stream in FIG. 31 satisfies the conditions in the cases (1) and (2). Specifically, the transmitter 511 controls TS-packet transmitting timing at the time that the buffers of the first virtual transmitter and the second virtual transmitter are prevented from overflowing and underflowing.

In other words, the transmitter 511 determines audio-stream packetizing timing and performs encoding so that the transport buffer 762 of the model of the virtual decoder 521 in FIG. 33 does not overflow and the elementary buffer 763 does not overflow and underflow.

Figure 34:
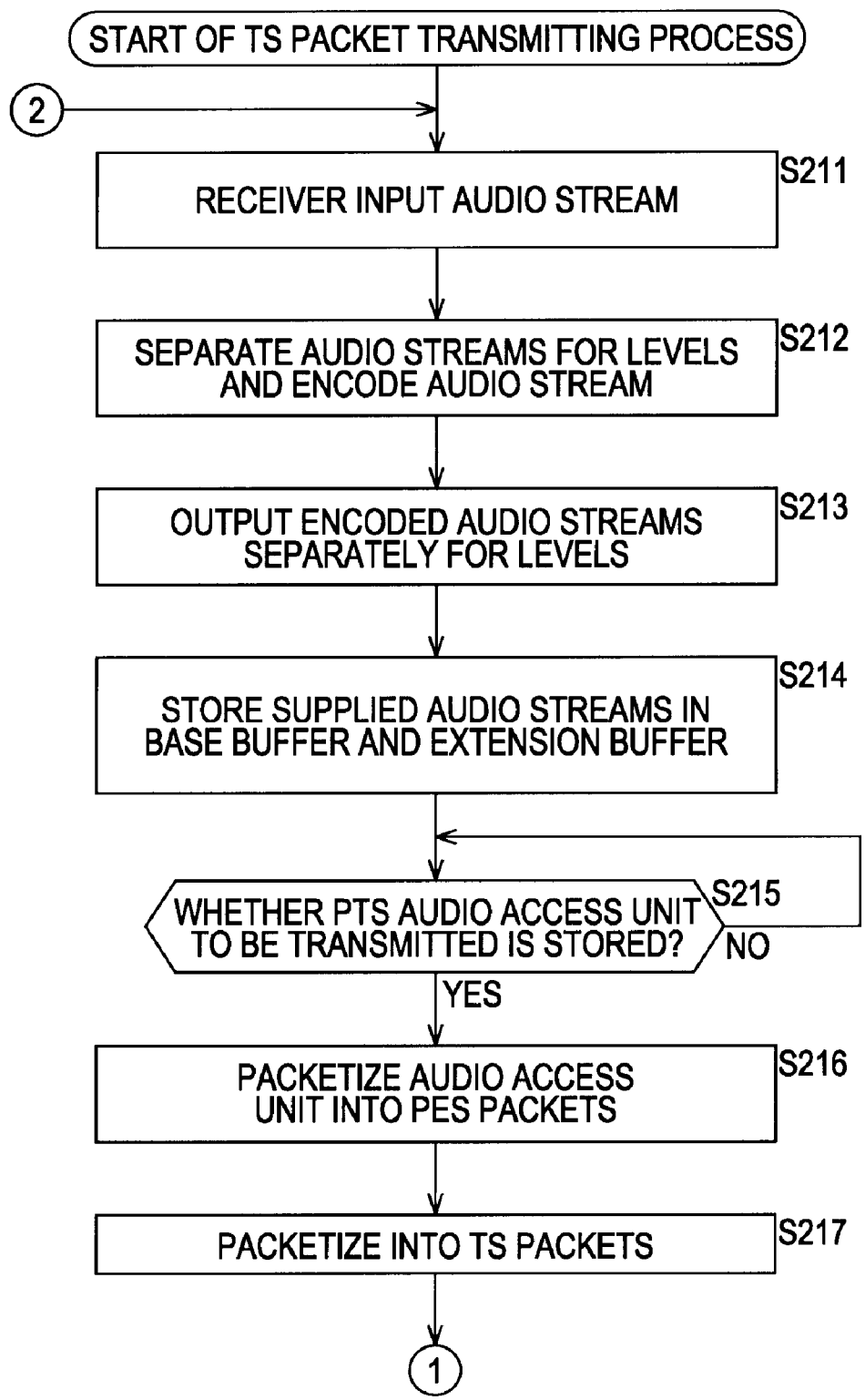
FIG. 34 is a flowchart illustrating a TS packet transmitting process.
Figure 35:
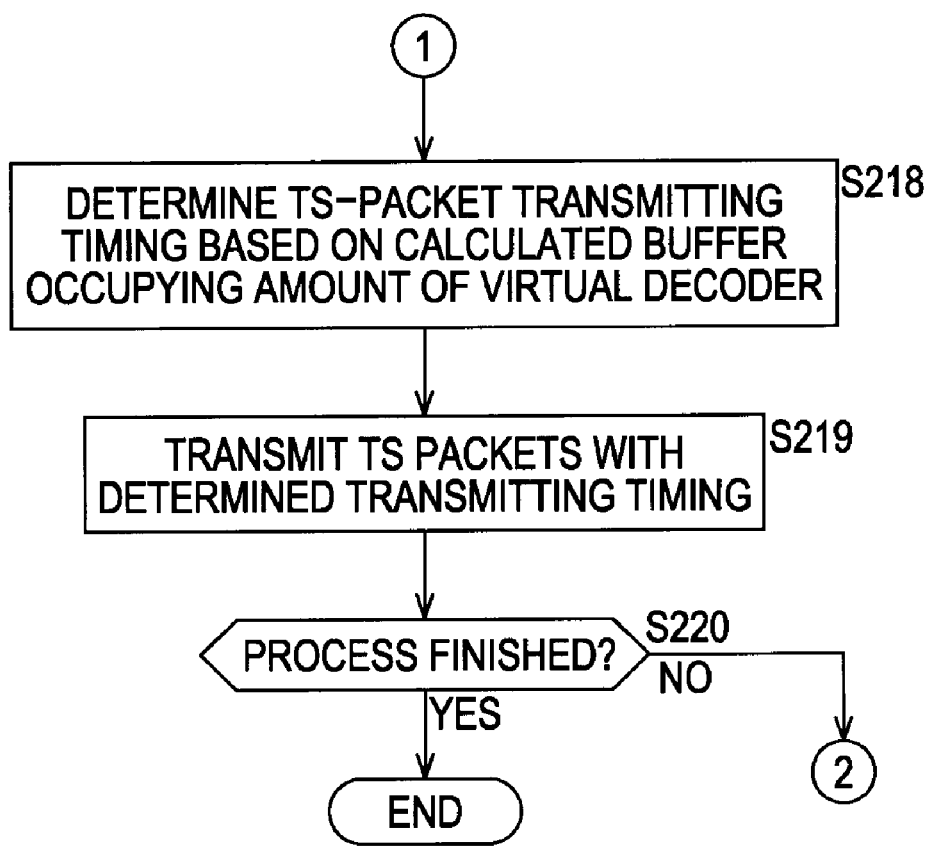
FIG. 35 is a flowchart illustrating the TS packet transmitting process.

Next, a process of the above-described transmitter 511 in which it encodes and packetizes an audio stream and transmits the resultant packets based on consideration of the capability of the virtual receiver 512 is described below. FIGS. 34 and 35 are flowcharts illustrating a TS packet transmitting process of the transmitter 511 in FIG. 30. This process is initiated when the power of the transmitter 511 is turned on to input an audio stream to the input section 531.

In step S211, the input section 531 receives the input audio streams, and outputs the received audio stream to the audio encoder 532.

In step S212, the audio encoder 532 encodes the audio stream so that the encoded result includes a base audio stream and an extension audio stream (having extensibility for the base audio stream). As a result, the audio encoder outputs the base audio stream 581 and extension audio stream 582 in FIG. 31 in (vertically) synchronized form.

In step S213, the audio encoder 532 outputs the encoded result separately for each level (stream type). Specifically, the audio encoder 532 outputs the base audio stream 581 to the base buffer 541 of the buffer 533, and outputs the extension audio stream 582 to the extension buffer 542 of the buffer 533.

In step S214, the base buffer 541 and the extension buffer 542 store (buffer) the encoded audio streams supplied from the audio encoder 532. Specifically, the base buffer 541 stores the encoded base audio stream supplied from the audio encoder 532, and the extension buffer 542 stores the encoded extension audio stream supplied from the audio encoder 532.

In step S215, the control section 535 determines whether a PTS audio access unit to be transmitted is stored in the buffer 533. The control section 535 is on standby until it determines that the PTS audio access unit to be transmitted is stored in the buffer 533. The control section 535 monitors the audio streams (the base audio stream and the extension audio stream) stored in the buffer 533, and performs PTS management. Thus, the control section 535 determines in step S215 based on these. The audio access units (e.g., BS(1), BS(2), ..., BS(n)) have fixed lengths (e.g., time T0). Thus, the control section 535 determines whether audio access units (audio access units corresponding to the parenthesized subscript j in FIG. 31) which correspond to, for example, PTS=T0×j (j represents the parenthesized subscript number in FIG. 31) are stored in the buffer 533. If, in step S215, it is determined that a PTS audio access unit to be transmitted is stored in the buffer 533, the control section 535 supplies the PTS corresponding to the audio access unit to the PES packetizing section 536, and instructs the PES packetizing section 536 to perform PES packetization. The process proceeds to step S216.

In step S216, the PES packetizing section 536 performs PES packetization on each audio access unit. For example, the PES packetizing section 536 controls the base buffer 541 and the extension buffer 542 to acquire the base audio stream and the extension audio stream, and to packetize the audio streams into PES packets. At this time, the PES packetizing section 536 stores PTSs supplied from the control section 535 in PES packets forming the PES packet stream. The PES packetizing section 536 supplies the TS packetizing section 537 with the generated PES packets (e.g., in the PES packet stream 591 in FIG. 31, PES packets generated in step S216).

In step S217, the TS packetizing section 537 packetizes the PES packets supplied from the PES packetizing section 536 into TS packets, and supplies the TS packets to the transmitting section 538. Specifically, the TS packetizing section 537 packetizes each of the base audio stream 581 and the extension audio stream 582 to generate TS packets having different IDs as shown in the third part of FIG. 31. Accordingly, as shown in FIG. 31, each TS packet corresponding to the base audio stream 581 includes "PID=a0, tp=1", and each TS packet corresponding to the extension audio stream 582 includes "PID=a0, tp=0".

In step S218, the control section 535 determines TS-packet transmitting timing based on calculated buffer occupying amounts of the virtual decoder 521 in FIG. 33. Specifically, based on calculated buffer occupying amounts of the first virtual decoder and the second virtual decoder (i.e., based on calculated buffer occupying amounts of the virtual decoder 521 under two conditions), the control section 535 determines the TS-packet transmitting timing, and controls the transmitting section 538 to transmit the TS packets. Calculation of the buffer occupying amounts of (the first virtual decoder and the second virtual decoder) the virtual decoder 521 in FIG. 33 is described later with reference to FIGS. 36 and 38.

In step S219, the transmitting section 538 transmits, to a receiver at the receiving side, the TS packets supplied from the TS packetizing section 537 with the transmitting timing determined in step S218 by the control section 535. This receiver is not the virtual receiver 512 in FIG. 29 but a receiver (including a decoder), which is not shown, that actually receives the TS packets. Although, in this example, the transmitting section 538 transmits the TS packets to the receiver, which is not shown, the transmitting section 538 may transmit the TS packets to a drive and may use the drive to record the TS packets in a removable medium.

In step S220, the control section 535 determines whether to finish the process. For example, the control section 535 determines to finish the process in one of cases in which input of the audio streams to the input section 531 finishes, in which a user gives an instruction to finish the TS-packet transmitting process, and in which transmission of one audio stream finishes. If, in step S220, the control section 535 has determined not to finish the process, the process returns to step S211 and the subsequent steps are repeatedly performed. In other words, input audio streams are received again and are packetized to generate TS packets, and the TS packets are transmitted with transmitting timing controlled based on the calculated buffer occupying amounts of the virtual decoder 521. If, in step S220, the control section 535 has determined to finish the process, the process is finished.

Since, in the TS-packet transmitting process in FIGS. 34 and 35, TS packets are transmitted with transmitting timing controlled based on the buffer occupying amounts (under two conditions) of the virtual decoder 521 in FIG. 33, it is ensured that any receiver (not shown) that includes a decoder for the model of the virtual decoder 521 in FIG. 33 can decode the TS packets transmitted in the TS-packet transmitting process.

Next, calculation of the buffer occupying amounts of the virtual decoder (the virtual decoder 521 under two conditions), executed in step S218 in FIG. 35, is described below with reference to FIGS. 35 to 39.

At first, a process for calculating a buffer occupying amount for the base audio stream is described with reference to the flowchart in FIG. 36. This process is executed by the control section 535 in FIG. 30, assuming that the virtual decoder 521 at the receiving end can decode only a base audio stream, that is, assuming that the virtual decoder 521 at the receiving end is the first virtual decoder. In other words, in the above process, the control section 535 calculates TS-packet decoding (transmitting) timing, assuming that it transmits only the base audio stream 581 in FIG. 32.

In step S241, if the transport buffer 762 in the virtual decoder 521 (first virtual decoder) in FIG. 33 has free space to store TS packets in which tp=1, the control section 535 controls the transmitting section 538 to transmit TS packets. In other words, if the transport buffer 762 has storage space to store TS packets corresponding to the base audio stream, the control section 535 controls the transmitting section 538 to transmit TS packets.

In step S242, if the elementary buffer 763 (Bn=bn0) in the virtual decoder 521 in FIG. 33 has free space, calculation is performed, assuming that data is extracted at a bit rate of Rxn (=rxn0) and is supplied to the elementary buffer 763. As described above, the input bit rate to the elementary buffer 763 of the first virtual decoder is Rxn=rxn0. Thus, calculation is performed assuming that the data is extracted at a rate of rxn0, and calculation is performed assuming that the capacity of the elementary buffer 763 is Bn=bn0.

Figure 37:
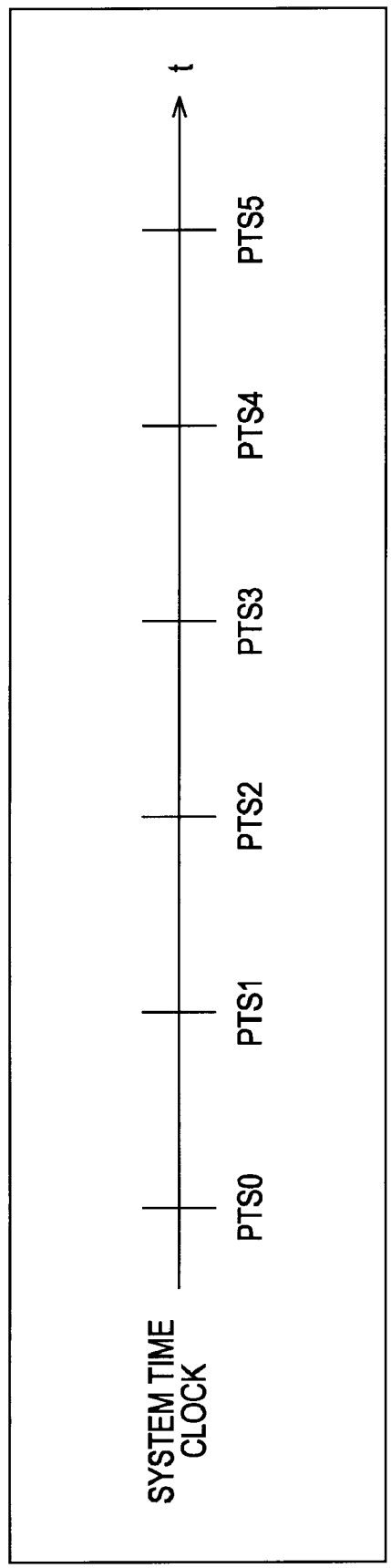
FIG. 37 is an illustration of a system time clock of decoder.

In step S243, when the PTS of the audio access unit is equal to the time of the system time clock of the virtual decoder 521, the control section 535 performs calculation, assuming that the audio access unit is extracted and supplied to the audio decoder 764. For example, if the system time clock of the virtual decoder 521 is indicated as t=PTS0 (horizontal axis t indicates time), as shown in FIG. 37, the control section 535 performs calculation, assuming that an audio access unit in which PTS=PTS0 is extracted and supplied to the audio decoder 764. For example, when t=PTS1 in FIG. 37, the control section 535 performs calculation, assuming that an audio access unit (bearing PTS1) in which PTS=PTS1 is extracted from the elementary buffer 763 and is supplied to the audio decoder 764. After that, the process is finished.

Figure 36:
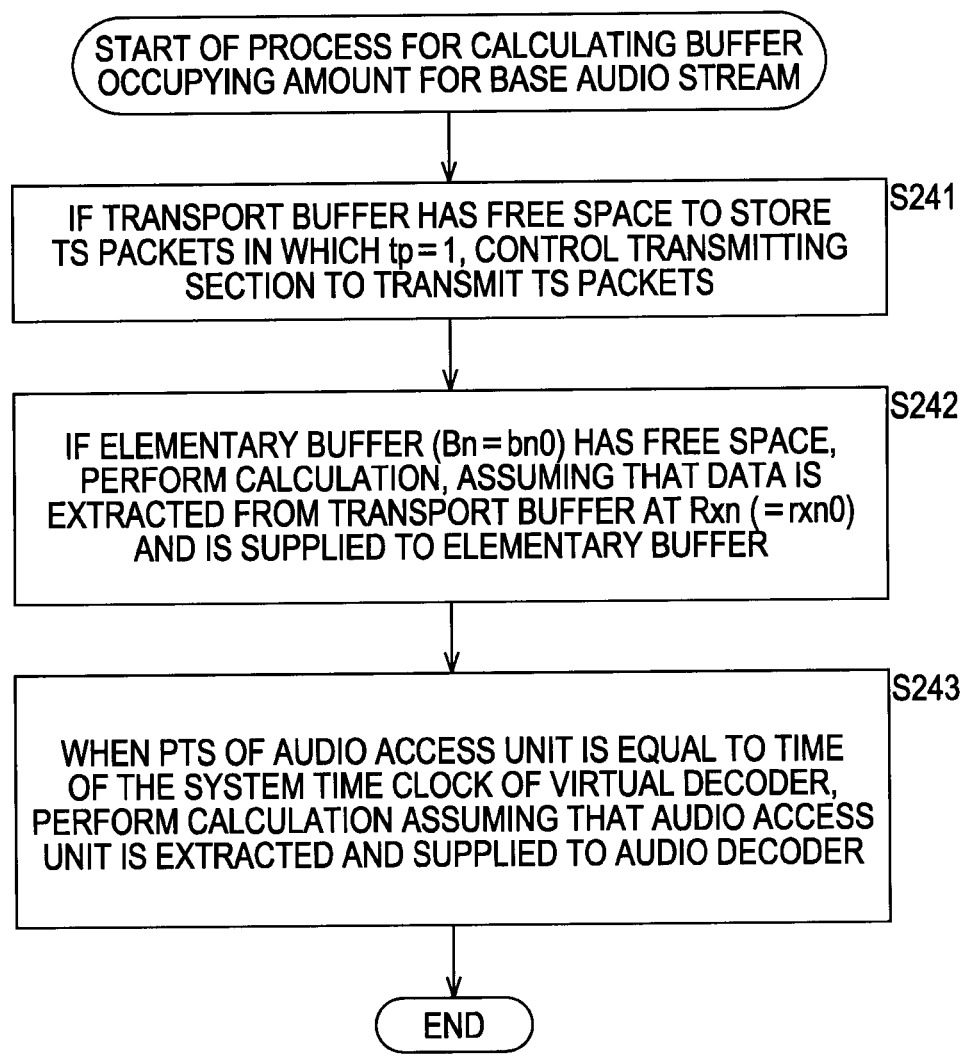
FIG. 36 is a flowchart illustrating a process for calculating a buffer occupying amount for a base audio stream.

The process in FIG. 36 is executed when step S218 in FIG. 35 is executed. The process in FIG. 36 is repeatedly executed.

As described above, the control section 535 calculates a decoder-buffer occupying amount, assuming a decoder (the first virtual decoder) that can decode only a base audio stream. In other words, the control section 535 calculates a buffer occupying amount of the virtual decoder 521, assuming the three conditions in the case (1) described with reference to FIG. 33, and determines the TS-packet transmitting timing. This ensures that the decoder (actual decoder) that can decode only a base audio stream can decode a base audio stream without causing overflowing and underflowing of the buffer occupying amount.

Next, a process for calculating a buffer occupying amount for each of the base audio stream and the extension audio stream is described below with reference to the flowchart in FIG. 38. This process is executed such that the control section 535 in FIG. 30 assumes that the virtual decoder 521 at the receiving end can decode the base audio stream and the extension audio stream, that is, that the virtual decoder 521 at the receiving end is the second virtual decoder. In other words, in this process, the control section 535 calculates TS-packet decoding (transmitting) timing, assuming that the base audio stream 581 and extension audio stream 582 in FIG. 31 are transmitted.

In step S281, if the transport buffer 762 in the virtual decoder 521 (the second virtual decoder) in FIG. 33 has free space to store TS packets in which tp=1, the control section 535 controls the transmitting section 538 to transmit the TS packets, and, if the transport buffer 762 has free space to store TS packets in which tp=0, the buffer 533 controls the transmitting section 538 to transmit the TS packets. In other words, if the transport buffer 762 has free space to store TS packets corresponding to a base audio stream, the control section 535 controls (satisfies the condition in step S241 in FIG. 36) the transmitting section 538 to transmit the TS packets. If the transport buffer 762 has free space to store TS packets corresponding to an extension audio stream, the control section 535 controls the transmitting section 538 to transmit the TS packets.

In step S282, if the elementary buffer 763 (Bn=bn1) in the virtual decoder 521 in FIG. 33 has free space, the control section 535 extracts data from the transport buffer 762 at a bit rate of Rxn (=rxn1), and supplies the data to the elementary buffer 763. As described above, the input bit rate to the elementary buffer 763 of the second virtual decoder is Rxn=rxn1. Thus, calculation is performed assuming that the data is extracted at a rate of rxn1, and calculation is performed assuming that the capacity of the elementary buffer 763 is represented by Bn=bn1.

In step S283, if the PTS of an audio access unit is equal to the time of the system time clock of the virtual decoder 521, the control section 535 performs calculation, assuming that the audio access unit is extracted from the elementary buffer 763 and is supplied to the audio decoder 764. For example, when the system the system time clock of the virtual decoder 521 is represented as t=PTS0, as shown in FIG. 37, the control section 535 performs calculation, assuming that an audio access unit in which PTS=PTS0 is extracted from the elementary buffer 763 and is supplied to the audio decoder 764. Similarly, when t=PTS1 in FIG. 37, the control section 535 performs calculation, assuming that an audio access unit (bearing PTS1) in which PTS=PTS1 is extracted from the elementary buffer 763 and is supplied to the audio decoder 764. After that, the process is finished.

Figure 38:
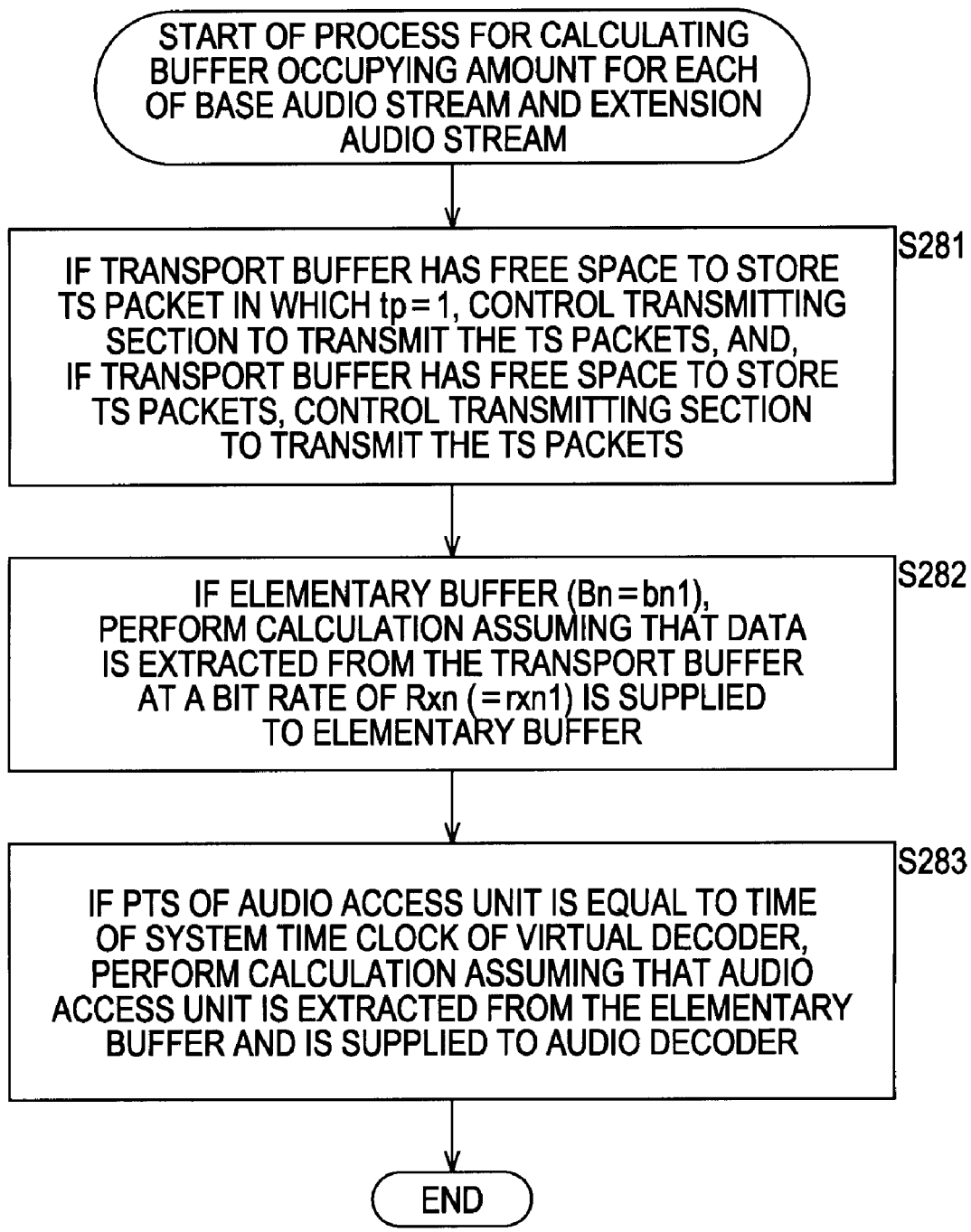
FIG. 38 is a flowchart illustrating a process for calculating buffer occupying amounts for a base audio stream and an extension audio stream.

The process in FIG. 38 is executed when step S218 is executed. The process in FIG. 38 is repeatedly executed. In other words, when step S218 in FIG. 35 is executed, the process in FIGS. 36 and 38 are executed in parallel. More specifically, when step S219 in FIG. 35 is executed, the control section 535 initially performs the process in FIG. 36 to calculate timing with which TS packets corresponding to the base audio stream are transmitted, and further performs the process in FIG. 38 to calculate timing with which TS packets corresponding to the base audio stream and the extension audio stream are transmitted. The control section 535 repeatedly performs this processing (the process in FIG. 36 is re-executed and the process in FIG. 38 is subsequently re-executed).

In other words, after the control section 535 calculates such timing that the elementary buffer of the first virtual decoder including the first virtual decoder does not overflow and underflow, the control section 535 calculates such timing that the elementary buffer in the second virtual receiver including the second virtual decoder does not overflow and underflow, and controls the transmitting section 538 to transmit TS packets so as to satisfy the timing for the first and second virtual receivers.

As described above, the control section 535 calculates decoder-buffer occupying amounts, assuming a virtual decoder (the second virtual decoder) that can decode the base audio stream and the extension audio stream. In other words, assuming the three conditions in the case (2) described above with reference to FIG. 33, the control section 535 calculates buffer occupying amounts of the second virtual decoder 521, and determines TS-packet transmitting timing. This ensures that the decoder (actual decoder) that can decode a base audio stream and an extension audio stream can decode a base audio stream and an extension audio stream without causing overflowing and underflowing of the buffer occupying amounts.

By repeatedly executing the processes in FIGS. 36 and 38 in parallel and calculating the buffer occupying amounts of the virtual decoder 521, the control section 535 in the transmitter 511 adjusts (determines) the TS-packet transmitting timing. Thus, any of the first virtual decoder (121) that can decode only a base audio stream, and the second virtual decoder (121) that can decode both a base audio stream and an extension audio stream can perform decoding. In other words, even if a receiver that actually receives TS packets transmitted from the transmitter 511 can decode only a base audio stream or can decode both a base audio stream and an extension audio stream, the receiver can perform smooth decoding without causing its buffer to overflow and underflow.

Figure 39:
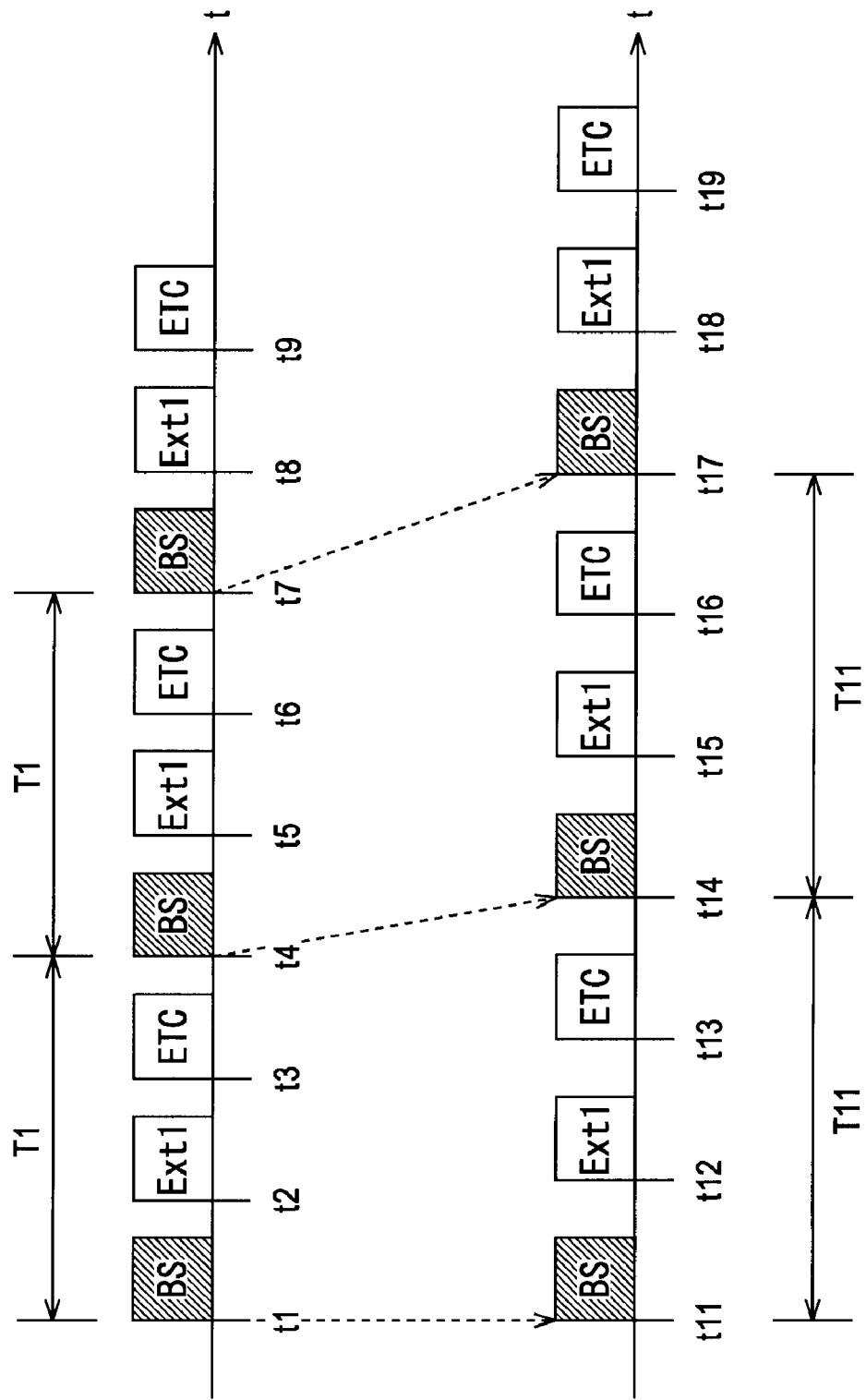
FIG. 39 is a time chart illustrating TS packet transmitting timing.

For example, in a case in which the transmitter 511 in FIG. 30 transmits, to the actual receiver, which is not shown, TS packets corresponding to the base audio stream and the extension audio stream, if the control section 535 executes only the process in FIG. 38 as step S218 in FIG. 35 (i.e., the second virtual decoder is assumed), TS packets are transmitted with the timing shown in upper part of FIG. 39. As shown in upper part of FIG. 39, TS packets corresponding to the base audio stream are transmitted at times t1, t4, and t7, TS packets corresponding to the extension audio stream are transmitted at times t2, t5, and t8, and other TS packets (indicated by ETC in FIG. 39) are transmitted at times t3, t6, and t9. In this case, a time after transmitting the first TS packet (the TS packet 241 in the case of FIG. 31) corresponding to the base audio stream until transmitting the second TS packet (the TS packet 242 in the case of FIG. 31) corresponding to the base audio stream is represented by time T1.

In addition, in a case in which the transmitter 511 in FIG. 30 transmits, to the actual receiver, which is not shown, the TS packets corresponding to the base audio stream and the extension audio stream, when the control section 535 further executes the process in FIG. 36 as step S218 in FIG. 35 in parallel with the process in FIG. 38 (i.e., when the first and second virtual decoders are assumed), the TS packets are transmitted with the timing shown in lower part of FIG. 39. As shown in lower part of FIG. 39, the TS packets corresponding to base audio stream are transmitted at times t11, t14, and t17, the TS packets corresponding to the extension audio stream are transmitted at times t12, t15, and t18, and the other TS packets (indicated by ETC in FIG. 39) are transmitted at times t13, t16, and t19. In this case, a time after transmitting the first TS packet (the TS packet 241 in the case of FIG. 31) corresponding to the base audio stream until transmitting the second TS packet (the TS packet 242 in the case of FIG. 31) corresponding to the base audio stream is represented by time T11.

The comparison between upper and lower parts of FIG. 39 indicates that a time after transmitting a base audio stream until transmitting the next base audio stream differs (time T11−T1). In the case of transmission with the timing shown in lower part of FIG. 39, even a decoder that can decode only a base audio stream can perform smooth decoding without causing its buffer (the elementary buffer 763) to overflow and underflow. However, in the case of transmission with the timing shown in upper part of FIG. 39, the decoder that can decode only the base audio stream may have overflowing of the buffer (the elementary buffer 763). This is because only a decoder that can decode both the base audio stream and the extension audio stream is assumed as the virtual decoder 521 for transmission with the timing shown in upper part of FIG. 39. In the decoder that can decode both the base audio stream and the extension audio stream, the data capacity (bn1) of the elementary buffer 763 and the value (rxn1) of the input bit rate to the elementary buffer 763 are greater than those (bn0 and rxn0) of the decoder that can decode only the base audio stream. Accordingly, when TS packets are transmitted with the timing shown in upper part of FIG. 39 to the decoder that can decode only the base audio stream, an overflow and underflow of the TS packets occurs. However, by considering, in addition to the condition in FIG. 38, the buffer occupying amount of the first virtual decoder corresponding to only the base audio stream described using FIG. 36, even the decoder that can decode only the base audio stream can perform smooth decoding.

As described above, in the case of transmitting, in a form encoded into an MPEG2-TS, hierarchically coded audio streams including a base audio stream and an extension audio stream, TS packets can be transmitted by considering the capability of a receiver at the receiving end so that the TS packets can be decoded by even the (first) virtual receiver 512 including a decoder that can decode only a base audio stream. In other words, when the virtual receiver 512 includes a decoder (the first virtual decoder) that can decode only a base audio stream, and the virtual receiver 512 decodes an only extracted base audio stream, the transmitter 511 determines packetizing (packet-transmitting) timing of the hierarchically coded audio streams (including the base audio stream and the extension audio stream) so that a predetermined-sized decoder buffer for base audio stream does not overflow and underflow. Thus, even if only the base audio stream is decoded at the receiving end, smooth decoding can be performed.

In other words, the transmitter 511 determines transmitting timing for TS packets corresponding to hierarchically coded audio streams so that, in each of the first virtual receiver including the decoder (the first virtual decoder) that can decode only the base audio stream, and the second virtual decoder (the second virtual decoder) that can decode both the base audio stream and the extension audio stream, the transport buffer 762 does not overflow and the elementary buffer does not overflow and underflow. Thus, even if only the base audio stream is decoded at the receiving end, smooth decoding can be performed.

As described above, according to the transmitting/receiving system of the second embodiment, a stream can be encoded and transmitted considering capability of a receiving side. In particular, a hierarchically coded audio stream can be encoded and transmitted so that the coded stream can be smoothly decoded by the receiving side.

Third Embodiment

Next, a third embodiment of the transmitting/receiving system to which the present invention is applied is described.

Figure 40:
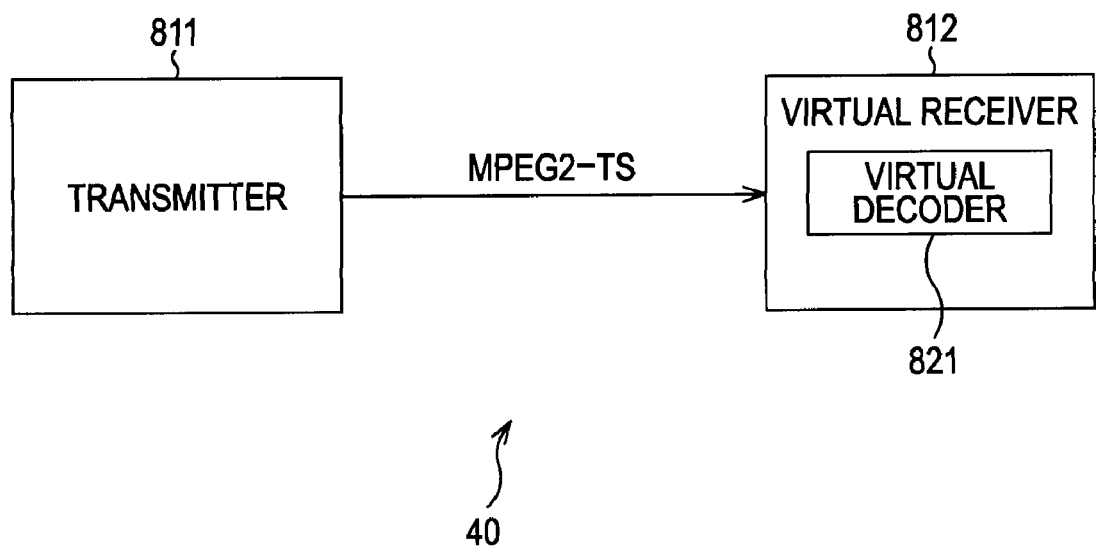
FIG. 40 is a block diagram illustrating restriction in a case in which a transmitter to which an embodiment of the transmitter is applied uses an MPEG2-TS technique to encode an audio stream.

FIG. 40 shows an example of the configuration of a third embodiment of a transmitting/receiving system to which the present invention is applied. Restriction in a case a transmitter 811 uses the MPEG (Moving Picture Experts Group) 2-TS (Transport stream) (hereinafter referred to as MPEG2-TS) technique to encode an audio stream is described with reference to FIG. 40.

The transmitter 811 is a device in a place, such as a broadcasting station, for transmitting a stream including a plurality of MPEG2-TS packets. For example, the transmitter encodes a video or audio stream by using the MPEG2-TS technique while assuming a virtual receiver 812 at a receiving end, and transmits the coded streams to an actual receiver (not shown). The transmitter 811 also encodes (multiplexes TS packets) the stream by using the MPEG2-TS technique while assuming the virtual receiver 812, and uses a drive to record the coded stream in a removable medium such as a magnetic disk, an optical disc, a magneto-optical disc, or a semiconductor memory. In other words, in this case, the transmitter 811 transmits the streams to the removable medium. The stream recoded in the removable medium is read by, for example, the actual receiver (not shown). In other words, the transmitter 811 is configured to also transmit the stream to the actual receiver, which is not shown, through the removable medium.

In the third embodiment, the transmitter 811 encodes an audio stream into TS packets (MPEG2-TS packets), multiplexes the packets, and transmits the multiplexed packets. In addition, in the third embodiment, the case of encoding a hierarchically coded audio stream including an extension stream having extendibility for a base stream and transmitting the encoded, hierarchically coded audio stream is described. Regarding relationships between the base audio stream and the extension audio stream, the use of only the base audio stream enables playback of audio, and, when both the base and extension audio streams are decoded, the quality of audio reproduction is improved and functionality is enhanced compared with the case of playing back only the base audio stream. One access unit of a base audio stream has a fixed length. One access unit of an extension access unit is not limited to a fixed length and can have a variable length.

The transmitter 811 encodes the audio stream by using the MPEG2-TS technique. At this time, the transmitter 811 internally assumes the virtual receiver 812, and performs packetizing the audio stream and determining packet-transmitting timing so that the virtual decoder 121 in the transmitter 811 can decode the MPEG2-TS packets transmitted by the transmitter 811. An example of the configuration of the virtual decoder 821 is described later with reference to FIG. 44.

Figure 41:
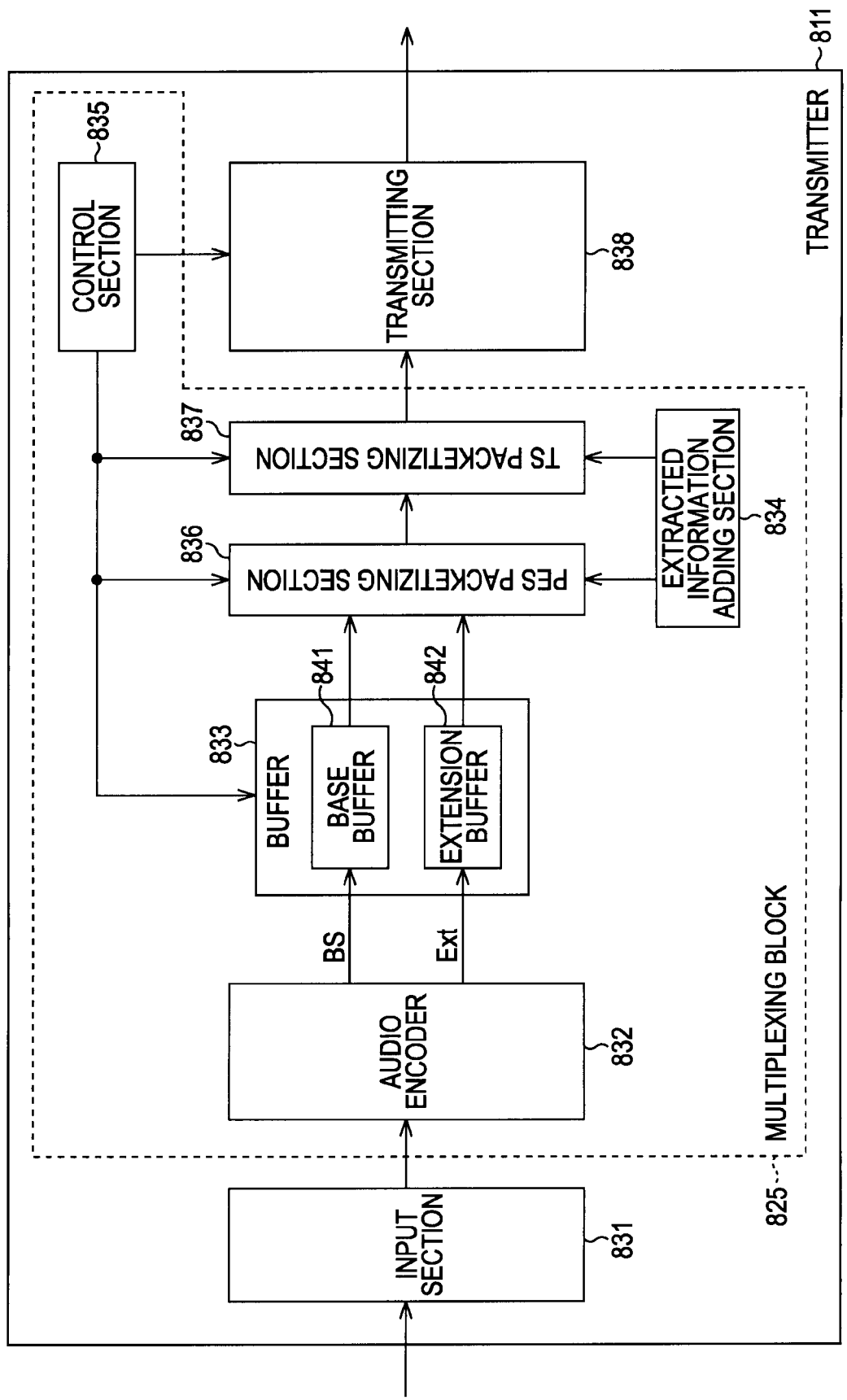
FIG. 41 is a block diagram showing an example of the configuration of the transmitter shown in FIG. 40.

FIG. 41 is a block diagram showing an example of the transmitter 811 in FIG. 40.

The transmitter 811 includes an input section 831, an audio encoder 832, a buffer 833, an extracted information adding section 834, a control section 835, a PES (packetized base stream) packetizing section 836, a TS packetizing section 837, and a transmitting section 838. The buffer 833 includes a elementary buffer 841 and an extension buffer 842.

An audio stream to be transmitted is input to the input section 831. The audio stream input to the input section is supplied to the audio encoder 832.

The audio stream supplied from the input section 831 is encoded and supplied to the buffer 833 by the audio encoder 832. The audio encoder 832 in FIG. 41 is an encoder for hierarchical coding. In other words, the audio encoder 832 can encode the input audio stream so that base and extension audio streams are included. In detail, the audio encoder 832 encodes the audio stream so that the base and extension audio streams are included. The audio encoder 832 supplies the coded base audio stream to the elementary buffer 841 in the buffer 833 and supplies the extension audio stream to the extension buffer 842 in the buffer 833.

The elementary buffer 841 stores (buffers) the base audio stream and the extension buffer 842 stores (buffers) the extension audio stream. Under the control of the control section 835, the elementary buffer 841 and the extension buffer 842 read the audio streams stored therein, and supply the audio streams to the PES packetizing section 836.

The control section 835 monitors the (base and extension) audio streams stored (buffered) in the buffer 833, and controls the PES packetizing section 836, the TS packetizing section 837, and the transmitting section 838. The control section 835 also manages PTSs. The control section 835 calculates a buffer occupying amount of the virtual decoder 821 (described later) shown in FIG. 41, and determines (adjusts) TS-packet transmitting timing. In other words, based on the calculated buffer occupying amount, the control section 835 adjusts (controls) transmitting timing with which the transmitting section 838 transmits TS packets.

Under the control of the control section 835, the PES packetizing section 836 performs PES packetization on the audio streams supplied from the elementary buffer 841 and the extension buffer 842. Specifically, the PES packetizing section 836 acquires the base and extension audio streams by controlling the elementary buffer 841 and the extension buffer 842, and packetizes the acquired audio streams into PES packets. At this time, the PES packetizing section 836 stores, in the PES packets, PTSs supplied from the control section 835. In other words, the PES packets output from the PES packetizing section 836 store the PTSs.

When a stream ID (e.g., stream-id_extension) is supplied from the extracted information adding section 834, the PES packetizing section 836 may packetize the base and extension audio streams into PES packets, each having corresponding one (stream_id_extension) of stream IDs supplied from the extracted information adding section 834. The stream ID of each PES packet is used to identify a corresponding PES packet type. The PES packet type represents either of the base and extension audio streams. For example, a PES packet of the base audio stream type represents a PES packet including at least a part of data of the base stream. Accordingly, in order for the virtual receiver 812 in FIG. 40 at the receiving end to select a PES packet of a desired audio stream type, the value of a stream ID added to the PES packet may be recognized.

In the third embodiment, the PES packets are sequentially supplied from the PES packetizing section 836 to the TS packetizing section 837 in predetermined order. In this case, one stream (hereinafter referred to as a "PES packet stream") consequently including a plurality of PES packets is supplied from the PES packetizing section 836 to the TS packetizing section 837. A specific example of PES packet stream is described later with reference to FIGS. 5 and 6.

Under the control of the control section 835, the TS packetizing section 837 packetizes the PES packet stream supplied from the PES packetizing section 836 into TS packets.

The extracted information adding section 834 supplies the TS packetizing section 837 with unique IDs added for base and extension audio stream types so that base and extension audio streams can be extracted on a decoding side (the side of the virtual receiver 812 in FIG. 40). In other words, the extracted information adding section 834 supplies the TS packetizing section 837 with identification information (ID) for identifying base and extension audio streams.

For example, a Transport_priority flag in a transport packet header can be used as the ID. The extracted information adding section 834 supplies the TS packetizing section 837 with information (extracted information) which sets Transport_priority=1 for a transport packet for transmitting the base audio stream, and which sets Transport_priority=0 for a transport packet for the extension audio stream.

The extracted information adding section 834 may not only supply ID as extracted information to the TS packetizing section 837, but may further transmit the extracted information to the PES packetizing section 836. For example, to enable the decoding side (e.g., the virtual receiver 812 in FIG. 40) to extract the base and extension audio streams, the extracted information adding section 834 supplies the PES packetizing section 836 with unique-valued IDs for the base and extension audio streams. The PES packetizing section 836 adds the IDs supplied from the extracted information adding section 834 to the generated PES packets.

In the third embodiment, Stream_id or Stream_id_extension is used as each ID. Stream_id represents Stream_id in a PES packet header defined in the MPEG2 systems standard. In addition, Stream_id_extension represents Stream_id_extension in a PES packet header defined in Amendment2 (2003) in MPEG2 systems. When the audio stream is one of streams other than MPEG Audio (MPEG-1/-2 Audio, MPEG AAC), it is preferable to employ Stream_id_extension. MPEG2 systems Amendment2 (2003) stipulates that, when Stream_id_extension is used, the value "1111 1101" (representing extension_stream_id) is set as Stream_id. In addition, MPEG2 systems Amendment2 (2003) stipulates that Stream_id_extension having a unique value for identifying stream types (base and extension audio streams) can be used.

Actually, although the transmitter 811 in FIG. 41 decodes system data and video data other than the audio stream, only the case of transmitting the audio stream has been described.

An example of the configuration of the transmitter 811 is described below with reference to FIG. 41.

Figure 42:
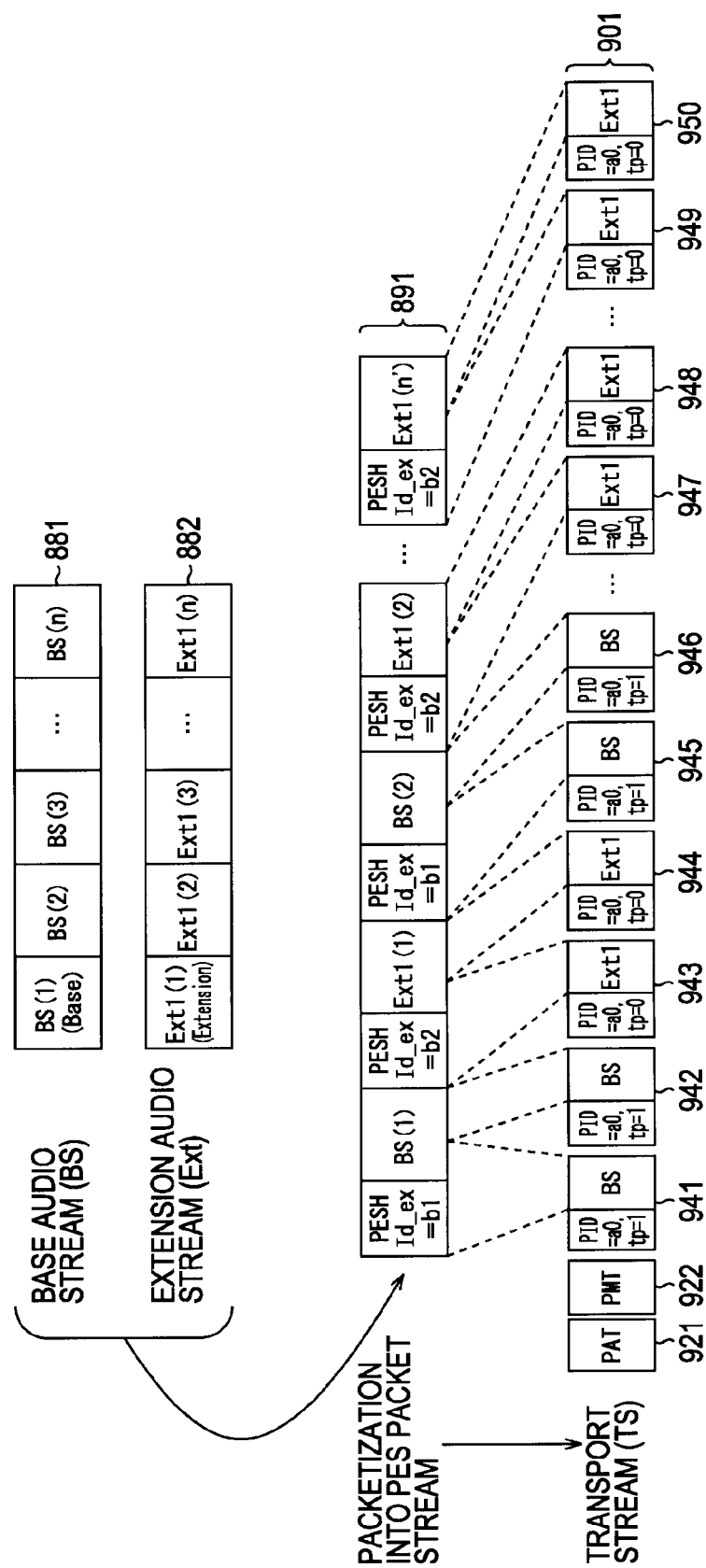
FIG. 42 is an illustration of the structure of a transport stream in which a base audio stream and an extension audio stream are multiplexed.
Figure 43:
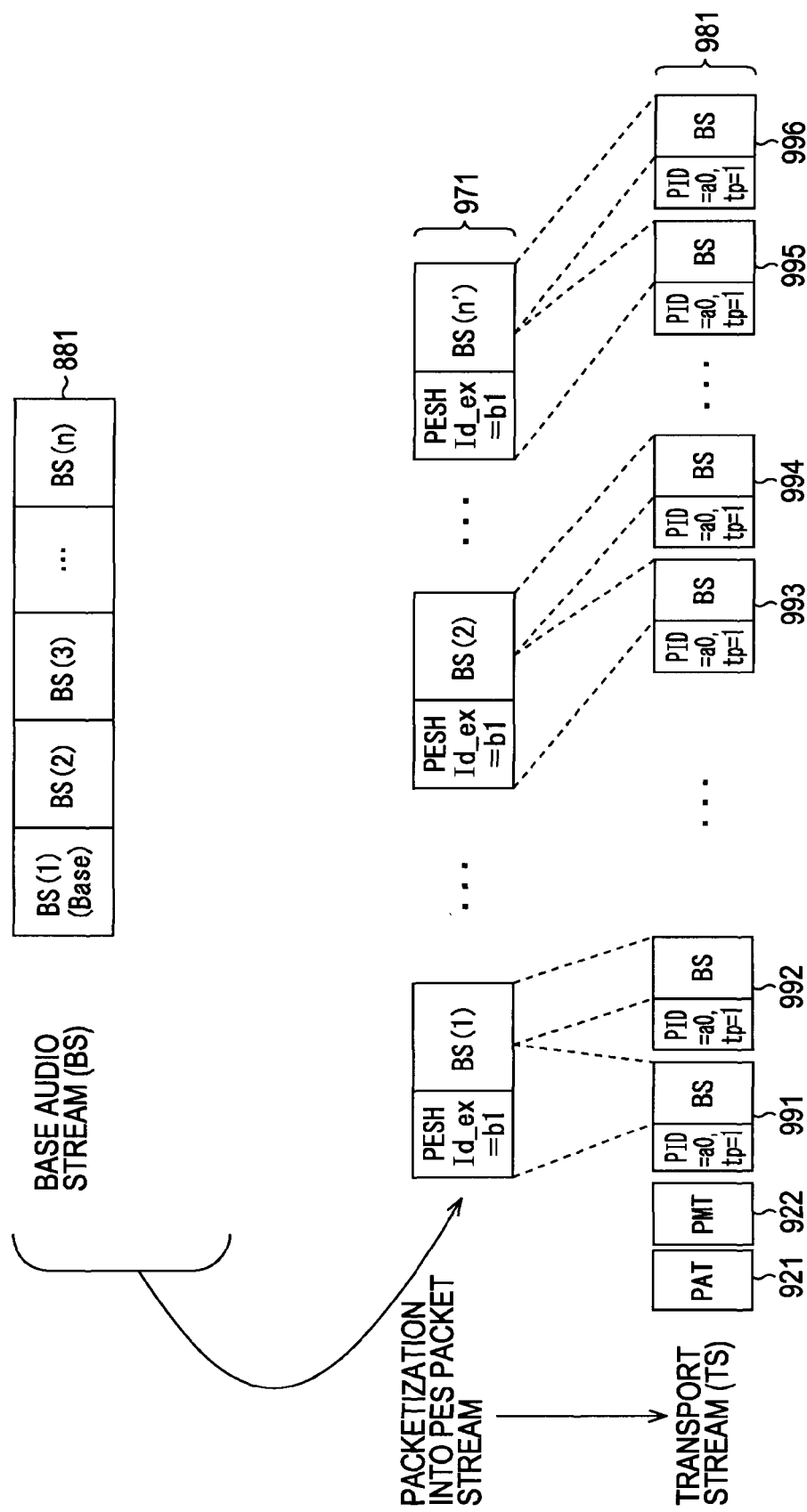
FIG. 43 is an illustration of the structure of a transport stream in which a base audio stream is multiplexed.

Next, the structure of a TS in which base stream and extension audio stream are multiplexed is described, as an example TS transmitted from the transmitter 811 in FIG. 41, that is, a TS to which the present invention is applied, with reference to FIGS. 42 and 43. In the example of FIG. 42, a base audio stream 181 and an extension audio stream 182 in the top part indicate a state encoded and output by the audio encoder 832 in FIG. 41. A PES packet stream 891 in the second part indicates a state with a PES packet output by the PES packetizing section 836 in FIG. 41. A TS901 in the third part indicate @the TS packets@ output by the TS packetizing section 837 in FIG. 41.

In the example of FIG. 42, the transport stream (MPEG2 TS) is configured to include a TS packet 921 corresponding to a PAT (program association table), a TS packet 922 corresponding to a PMT (program map table), and TS packets 941 to 950 corresponding to the base audio stream 881 and the extension audio stream 882.

Each of the base audio stream 881 and the extension audio stream 882 has an encoded form in which a predetermined number of audio samples is used as one unit. Each unit is indicated by a parenthesized subscript. Specifically, for example, the base audio stream 881 is separated for encoding into the plural units (audio access units), BS(1), BS(2), . . . , BS(n). Similarly, for example, the extension audio stream 882 is separated for encoding into the plural units (audio access units), Ext1(1), Ext1(2), . . . , Ext1(n). Regarding the base audio stream 881 and the (first) extension audio stream 882, a set of units having identical subscripts, for example, units BS(1) and Ext1(1) are synchronously obtained in encoding by the audio encoder 832 in FIG. 41, and are synchronously played back (decoded) by the receiver, which is not shown. The subscript n represents an arbitrary natural number.

The PES packetizing section 836 in FIG. 41 packetizes the base audio stream 881 and the extension audio stream 882 to generate PES packets having different stream IDs, as shown in FIG. 42. Specifically, in the example of FIG. 42, the stream ID of the PES packets corresponding to the base audio stream 881 is "Stream_id_extension=b1" as it is described as "PESH Id_ex=b1". The stream ID of the PES packets corresponding to the extension audio stream 882 is Stream_id_extension=b2 as it is described as PESH Id_ex=b2. The subscript n' is an arbitrary natural number.

As described above, the PES packetizing section 836 generates and supplies the PES packet stream 891 shown in FIG. 42 to the TS packetizing section 837.

Unlike that, the TS packetizing section 837 packetizes each PES packet of the PES packet stream 891 into each TS packet having the same PID, as shown in the third part of FIG. 42. Specifically, the TS packetizing section 837 packetizes the PES packets of the base audio stream 881 and the extension audio stream 882 to generate transport packets having different IDs, as shown in FIG. 42. In the example of FIG. 42, the ID of the transport packets corresponding to the base audio stream 881 is "transport_priority=1" as it is described as "PID=a0, tp=1". The ID of the transport packets corresponding to the extension audio stream 882 is "transport_priority=0" as it is described as "PID=a0, tp=0". Accordingly, the TS 901 is generated (TS packets are formed) by the TS packetizing section 837.

As described above, identical PIDs are added for one stream, and, in order to identify base and extension streams included in one stream, different "tp" (transport_priority) items are added to them.

In the third embodiment, encoding units that are synchronously played back need to be ordered and encoded in the order of sets of base audio streams and extension audio streams in the transport stream. In other words, in the transport stream, BS(1), Ext1(1), BS(2), Ext1(2), . . . , BS(n), and Ext1(n) need to be encoded in the order given.

FIG. 43 shows an example of a case in which a transport stream 981 is formed so as to include a TS packet 921 corresponding to the PAT, a TS packet 922 corresponding to the PMT, and the base audio stream 881. In other words, in the case in FIG. 43, the transport stream 981 indicates the structure of a transport stream obtained by multiplexing only the base audio stream 881. The comparison between FIGS. 42 and 43 indicates that FIG. 43 is an extraction of the base audio stream 881 from FIG. 42. Portions corresponding to those in FIG. 42 are denoted by identical reference numerals, and their description is omitted to avoid repeated description.

In the case in FIG. 43, the base audio stream 881 in the top part of FIG. 43 indicates a state encoded and output by the audio encoder 832 in FIG. 41. A reference numeral 271 in the second part of FIG. 43 denotes PES packets output by the PES packetizing section 836 in FIG. 41. A reference numeral 281 in the third part of FIG. 43 denotes TS packets output by the TS packetizing section 837 in FIG. 41.

As shown in FIG. 43, the PES packetizing section 836 in FIG. 41 packetizes the base audio stream 881 to generate PES packets having identical stream IDs. Specifically, in the case in FIG. 43, the stream ID of each PES packet corresponding to the base audio stream 881 is "Stream_id_extension=b1" as it is described as "PESH Id_ex=b1". As described above, the PES packetizing section 836 generates and supplies the PES packets shown in FIG. 43 to the TS packetizing section 837.

The TS packetizing section 837 packetizes each of PES packets forming the PES packet stream 271 into TS packets having identical PIDs, as shown in the third part of FIG. 43, and multiplexes the TS packets to generate a transport stream (TS) 281. As shown in FIG. 43, the TS packetizing section 837 packetizes the PES packets of the base audio stream 881 into transport packets 291 to 296 having identical IDs. Specifically, in the case in FIG. 43, the ID of each transport packet of the base audio stream 881 is "transport_priority=1" as it is described as "PID=a0, tp=1".

As described above, when the same PID is added to one stream and the types of streams in the stream include only a base audio stream, the same tp (transport_priority) is added.

In the third embodiment, when the transmitter 811 transmits a hierarchically coded audio stream having a structure including a base audio stream and an extension audio stream, the transmitter 811 adjusts TS-packet transmitting timing in accordance with the capability of the virtual receiver 812 (FIG. 40). In other words, even if the virtual receiver 812 can handle (decode) both a base audio stream and an extension audio stream, or only the base audio stream, the transmitter 811 adjusts timing with which it transmits TS packets so that the virtual receiver 812 can perform decoding without overflowing and underflowing of a buffer of the virtual receiver 812.

Specifically, when transmitting the TS packets forming the TS 801 in FIG. 42, the transmitter 811 adjusts TS-packet transmitting timing so as to respond to a virtual receiver (first virtual receiver) that can decode the TS 901 in FIG. 42 and to respond to a virtual receiver (second virtual receiver) that can decode only the transport stream 981 in FIG. 43. In other words, when the virtual receiver 812 extracts and decodes only the base audio stream, the transmitter 811 adjusts timing (packet transmitting timing) with which it packetizes a hierarchically coded audio stream so that a predetermined-sized decoder buffer for base audio stream does not overflow and underflow.

Accordingly, when the virtual receiver 812 only has a capability to decode a base audio stream, that is, when the virtual receiver 812 only has a capability to decode only the transport stream 981 corresponding to the base audio stream 881 in FIG. 43, a minimum necessary size (capacity) of an audio buffer of the virtual receiver 812 is determined, and, in addition, the value of an input bit rate to the audio buffer is determined.

In addition, when the virtual receiver 812 has a capability to decode both a base audio stream and an extension audio stream, that is, when the virtual receiver has a capability to decode both the base audio stream and extension audio stream 882 in FIG. 42, the virtual receiver 812 determines the minimum necessary size (capacity) of its audio buffer, and further determines the value of an input bit rate to the audio buffer.

The size of the audio buffer corresponds to the size of the elementary buffer 19 in FIG. 2, and the value of the input bit rate to the audio buffer corresponds to Rxn in FIG. 2.

In other words, for each of cases in which the virtual receiver 812 has a capability to decode a base audio stream, and in which the virtual receiver 812 has a capability to decode both a base audio stream and an extension audio stream, the size of the audio buffer and the value of the input bit rate to the audio buffer are set.

In the third embodiment, the size of the elementary buffer of the virtual receiver 812 which only has a capability to decode a base audio stream is set as Bn=bn0, and the value of the input bit rate (leak rate to the audio buffer) to the audio buffer is set as Rxn=rxn0. In addition, the size of the elementary buffer of the virtual receiver 812 which has a capability to decode both the base audio stream and the extension audio stream is set as Bn=bn1, and the value of the input bit rate (leak rate to the audio buffer) to the audio buffer is set as Rxn=rxn1. Furthermore, the relationships bn0<bn1 and rxn0<rxn1 hold. In other words, relationships are established in which the size Bn0 of the elementary buffer is less than size Bn1 and in which the value rxn0 of the input bit rate to the elementary buffer is less than the value rxn1.

FIG. 41 illustrates a model of the virtual decoder 821 for restricting encoding of a transport stream in which a base audio stream and an extension audio stream are multiplexed. Specifically, FIG. 41 shows an example model of the virtual decoder 821 (FIG. 40) in the virtual receiver 812 which is assumed by the transmitter 811 when it uses the MPEG2-TS technique to encode a base audio stream and an extension audio stream for transmission. In other words, FIG. 41 shows a model of the virtual decoder 821 which is assumed when a base audio stream and an extension audio stream are decoded and packetized for transmission by the transmitter 811.

The MPEG2-TS transmitted to the virtual receiver 812 is supplied to the virtual decoder 821. The MPEG2-TS supplied to the virtual decoder 821 is filtered by packet type in a PID filter 741, as shown in FIG. 41.

Specifically, the MPEG2-TS includes a plurality of packets, each packet bearing a PID for identifying the packet. Based on the PIDs added to the packets forming the MPEG2-TS, the filter 741 supplies video-stream-forming TS packets to a video data decoding section 1050 for processing a video stream, supplies audio-stream-forming TS packets to an audio data decoding section 1060 for processing an audio stream, and supplies system-related TS packets to a system data decoding section 1070 for processing system data.

The video data decoding section 1050 includes a transport buffer 1051 (indicated by TBv in FIG. 41) a multiplex buffer 1052 (indicated by MBv in FIG. 41), an elementary buffer 1053 (indicated by EBv in FIG. 41), a video decoder 1054 (indicated by Dv in FIG. 41), and an output re-ordering buffer 1055 (indicated by Ov in FIG. 41).

When the video-stream-forming transport packets are supplied to the video data decoding section 1050 through the filter 741, the video-stream-forming transport packets are stored as data in the transport buffer 1051. The data is supplied to the multiplex bovver 1052 at a predetermined bit rate. After storing and smoothing the supplied data, the multiplex buffer 1052 supplies the smoothed data to the elementary buffer 1053. The video decoder 1054 extracts video access units stored in the elementary buffer 1053 with predetermined timing, decodes the extracted video access units, and outputs the decoded video access units. Part of the decoded data is output from a terminal 1056 through the output re-ordering buffer 1055, and the other data is output from a terminal 1057 and is played back.

The audio data decoding section 1060 includes a transport priority filter 1061, a transport buffer 1062 (indicated by TBn), an elementary buffer 1063 (indicated by Bn), and an audio decoder 1064 (indicated by Dn).

When the audio-stream-forming TS packets are supplied to the audio data decoding section 1060 through the filter 741, the transport priority filter 1061 filters the TS packets in accordance with the capability of the virtual decoder 821. For example, the transport priority filter 1061 performs filtering based on the value of the tp (see FIG. 42) added to each TS packet. The TS packets filtered by the transport priority filter 1061 are supplied to the transport buffer 1062 in a subsequent stage. The transport buffer 1062 stores the TS packets filtered and supplied by the transport priority filter 1061. The size (capacity) of the transport priority filter 1061 is 512 bytes.

The TS packets stored in the transport buffer 1062 are supplied to the elementary buffer 1063 at rate Rxn in accordance with the capability of the virtual decoder 821. Rxn is a leak rate from the transport buffer 1062, and, when the transport buffer 1062 stores data, the data is input at the rate Rxn from the transport buffer 1062 to the elementary buffer 1063. When the transport buffer 1062 stores no data, Rxn is zero.

The elementary buffer 1063 stores the data that is supplied at the rate Rxn from the transport buffer 1062. The size of the elementary buffer 1063 differs depending on audio encoding types (such as MPEG1 audio and MPEG2 AAC audio). When the transport buffer 1062 stores data, the data is supplied at the rate (speed) Rxn from the transport buffer 1062 to the elementary buffer 1063. When the transport buffer 1062 stores no data, no data is supplied from the transport buffer 1062 to the elementary buffer 1063 (i.e., Rxn=0).

The audio decoder 1064 extracts audio access units stored in the elementary buffer 1063 with predetermined timing, decodes the extracted audio access units, and outputs the decoded audio access units for playback from a terminal 1065. Specifically, when a PTS (Presentation Time Stamp) of an audio access unit is equal to the time of a system time clock of the T-STD, the audio decoder 1064 extracts the audio access unit from the elementary buffer 1063. Audio access units are encoding units that form an audio stream, and are used as decoding units.

A value that is changed in accordance with the capability of the virtual decoder 821 in the audio data decoding section 1060 is described below.

(1) When, from a transport stream obtained by multiplexing a base audio stream and an extension audio stream, the base audio stream is extracted and decoded, or a transport stream obtained by multiplexing only a base audio stream is decoded, the virtual decoder 821 (the first virtual decoder in the first virtual receiver) satisfies the following.

(1-1) The transport priority filter 1061 selects only TS packets in which tp=1, and supplies the selected TS packets to the transport buffer 1062.

(1-2) The value Rxn of the input bit rate from the transport buffer 1062 to the elementary buffer 1063 is set to rxn0.

(1-3) The size Bn of the elementary buffer 1063 is set to bn0.

(2) When, from a transport stream obtained by multiplexing a base audio stream and an extension audio stream, both the base audio stream and the extension audio stream are decoded, the virtual decoder 821 (the second virtual decoder in the second virtual receiver) satisfies the following.

(2-1) The transport priority filter 1061 supplies the transport buffer 1062 with all transport packets (TS packets in which tp=0 and tp=1).

(2-2) The value Rxn of the input bit rate from the transport buffer 1062 to the elementary buffer 1063 is set to rxn1.

(2-3) The size Bn of the elementary buffer 1063 is set to bn1.

As described above, the filtering conditions (1-1 and 2-1) of the transport priority filter 1061, the values (1-2 and 2-2) of the input bit rate to the elementary buffer 1063, the sizes (1-3 and 2-3) of the elementary buffer 1063 differ depending on the capability of the virtual decoder 821. The transmitter 811 can transmit TS packets while controlling transmitting timing so that, in each of the first virtual receiver assumed in the case (1) and the second virtual receiver assumed in the case (2), the size of the elementary buffer does not overflow and underflow. In the following description, those obtained by applying the conditions in the case (1) to the virtual receiver 812 and the virtual decoder 821 included therein are called a "first virtual receiver 812" and a "first virtual decoder 821", and those obtained by applying the conditions in the case (2) to the virtual receiver 812 and the virtual decoder 821 included therein are called a "second virtual receiver 812" and a "second virtual decoder 821".

The system data decoding section 1070 includes a transport buffer 1071 (indicated by TBsys), an elementary buffer 1072 (indicated by Bsys), and a system decoder 1073 (indicated by Dsys).

When the system-related TS packets are supplied to the system data decoding section 1070 through the filter 741, the system-related TS packets are stored as data in the transport buffer 1071. The data stored in the transport buffer 1071 is supplied to the elementary buffer 1072. The system decoder 1073 extracts system access units stored in the elementary buffer 23 with predetermined timing, decodes the system access units, and outputs the decoded units from a terminal 1074.

The system-related TS packets include, for example, the PAT TS packets 221 and PMT TS packets 222 in FIGS. 42 and 43.

The transmitter 811 in FIG. 41 needs to perform packetizing a transport stream corresponding to the base audio stream and the extension audio stream, and encoding the packets after determining transmitting timing so that the packets are correctly decoded by the virtual receiver 812 including the virtual decoder 821 in FIG. 41.

In other words, it is necessary for the transmitter 811 to perform audio-stream packetizing timing and encoding so that, for example, the transport buffer 1062 in the virtual decoder 821 in FIG. 41 does not overflow and the elementary buffer 1063 does not overflow and underflow.

Accordingly, the transmitter 811 adjusts audio-stream packetizing timing so that the transport stream obtained by multiplexing the base audio stream and extension audio stream in FIG. 42 satisfies the conditions in the cases (1) and (2). Specifically, the transmitter 811 controls TS-packet transmitting timing at the time that the buffers of the first virtual transmitter and the second virtual transmitter are prevented from overflowing and underflowing. In other words, the transmitter 811 determines audio-stream packetizing timing and performs encoding so that the transport buffer 1062 of the model of the virtual decoder in FIG. 41 does not overflow and the elementary buffer 1063 does not overflow and underflow.

Figure 45:
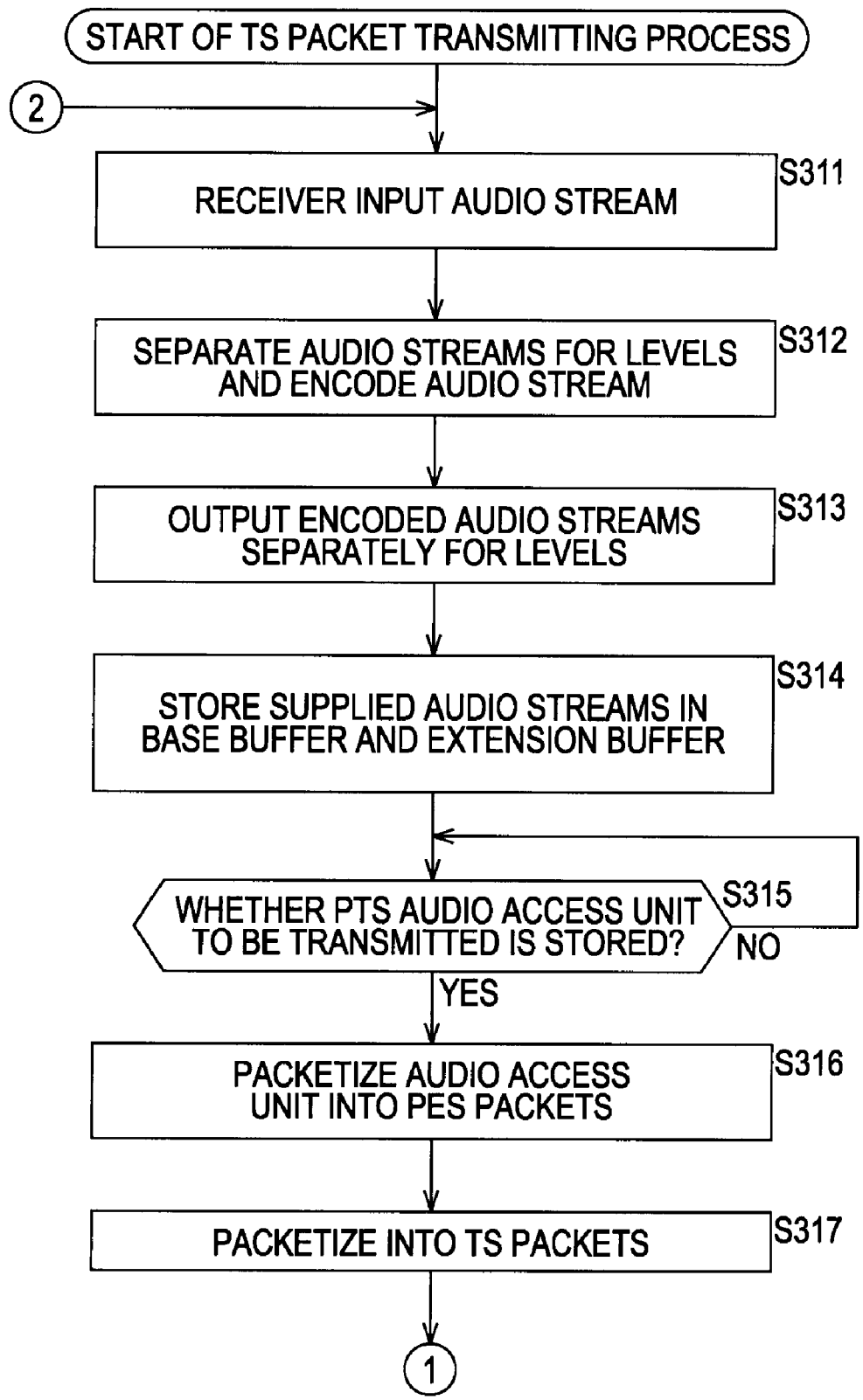
FIG. 45 is a flowchart illustrating a TS packet transmitting process.
Figure 46:
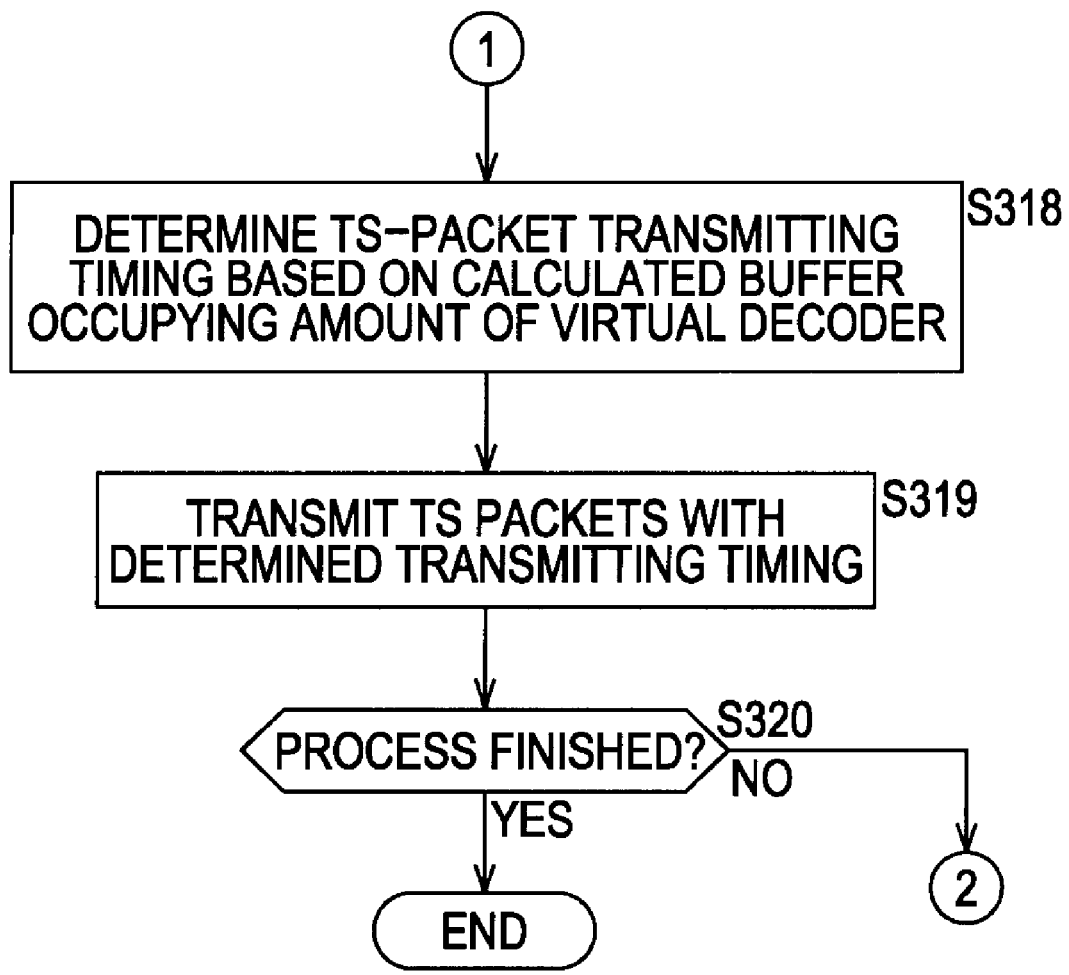
FIG. 46 is a flowchart illustrating the TS packet transmitting process.

Next, a process of the above-described transmitter 811 in which it encodes and packetizes an audio stream and transmits the resultant packets based on consideration of the capability of the virtual receiver 812 is described below. FIGS. 45 and 46 are flowcharts illustrating a TS packet transmitting process of the transmitter 811 in FIG. 41. This process is initiated when the power of the transmitter 811 is turned on to input an audio stream to the input section 831.

In step S311, the input section 831 receives the input audio streams, and outputs the received audio stream to the audio encoder 832.

In step S312, the audio encoder 832 encodes the audio stream so that the encoded result includes a base audio stream and an extension audio stream (having extensibility for the base audio stream). As a result, the audio encoder outputs the base audio stream 881 and extension audio stream 882 in FIG. 42 in (vertically) synchronized form.

In step S313, the audio encoder 832 outputs the encoded result separately for each level (stream type). Specifically, the audio encoder 832 outputs the base audio stream 881 to the elementary buffer 841 of the buffer 833, and outputs the extension audio stream 882 to the extension buffer 842 of the buffer 833.

In step S314, the elementary buffer 841 and the extension buffer 842 store (buffer) the encoded audio streams supplied from the audio encoder 832. Specifically, the elementary buffer 841 stores the encoded base audio stream supplied from the audio encoder 832, and the extension buffer 842 stores the encoded extension audio stream supplied from the audio encoder 832.

In step S315, the control section 835 determines whether a PTS audio access unit to be transmitted is stored in the buffer 833. The control section 835 is on standby until it determines that the PTS audio access unit to be transmitted is stored in the buffer 833. The control section 835 monitors the audio streams (the base audio stream and the extension audio stream) stored in the buffer 833, and performs PTS management. Thus, the control section 835 determines in step S315 based on these. The audio access units (e.g., BS(1), BS(2), . . . , BS(n)) have fixed lengths (e.g., time T0). Thus, the control section 835 determines whether audio access units (audio access units corresponding to the parenthesized subscript j in FIG. 42) which correspond to, for example, PTS=T0×j (j represents the parenthesized subscript number in FIG. 42) are stored in the buffer 833. If, in step S315, it is determined that a PTS audio access unit to be transmitted is stored in the buffer 833, the control section 835 supplies the PTS corresponding to the audio access unit to the PES packetizing section 836, and instructs the PES packetizing section 836 to perform PES packetization. The process proceeds to step S316.

In step S316, the PES packetizing section 836 performs PES packetization on each audio access unit. For example, the PES packetizing section 836 controls the elementary buffer 841 and the extension buffer 842 to acquire the base audio stream and the extension audio stream, and to packetize the audio streams into PES packets. At this time, the PES packetizing section 836 stores PTSs supplied from the control section 835 in PES packets forming the PES packet stream. The PES packetizing section 836 supplies the TS packetizing section 837 with the generated PES packets (e.g., in the PES packet stream 891 in FIG. 42, PES packets generated in step S316).

In step S317, the TS packetizing section 837 packetizes the PES packets supplied from the PES packetizing section 836 into TS packets, and supplies the TS packets to the transmitting section 838. Specifically, the TS packetizing section 837 packetizes each of the base audio stream 881 and the extension audio stream 882 to generate TS packets having different IDs as shown in the third part of FIG. 42. Accordingly, as shown in FIG. 42, each TS packet corresponding to the base audio stream 881 includes "PID=a0, tp=1", and each TS packet corresponding to the extension audio stream 882 includes "PID=a0, tp=0".

In step S318, the control section 835 determines TS-packet transmitting timing based on calculated buffer occupying amounts of the virtual decoder 821 in FIG. 41. Specifically, based on calculated buffer occupying amounts of the first virtual decoder and the second virtual decoder (i.e., based on calculated buffer occupying amounts of the virtual decoder 821 under two conditions), the control section 835 determines the TS-packet transmitting timing, and controls the transmitting section 838 to transmit the TS packets. Calculation of the buffer occupying amounts of (the first virtual decoder and the second virtual decoder) the virtual decoder 821 in FIG. 41 is described later with reference to FIGS. 10 and 12.

In step S319 (FIG. 46), the transmitting section 838 transmits, to a receiver, the TS packets supplied from the TS packetizing section 837 with the transmitting timing determined in step S318 (FIG. 46) by the control section 835. This receiver is not the virtual receiver 812 in FIG. 40 but a receiver (including a decoder), which is not shown, that actually receives the TS packets. Although, in this example, the transmitting section 838 transmits the TS packets to the receiver, which is not shown, the transmitting section 838 may transmit the TS packets to a drive and may use the drive to record the TS packets in a removable medium.

In step S320, the control section 835 determines whether to finish the process. For example, the control section 835 determines to finish the process in one of cases in which input of the audio streams to the input section 831 finishes, in which a user gives an instruction to finish the TS-packet transmitting process, and in which transmission of one audio stream finishes. If, in step S320, the control section 835 has determined not to finish the process, the process returns to step S311 and the subsequent steps are repeatedly performed. In other words, input audio streams are received again and are packetized to generate TS packets, and the TS packets are transmitted with transmitting timing controlled based on the calculated buffer occupying amounts of the virtual decoder 821. If, in step S320, the control section 835 has determined to finish the process, the process is finished.

Figure 44:
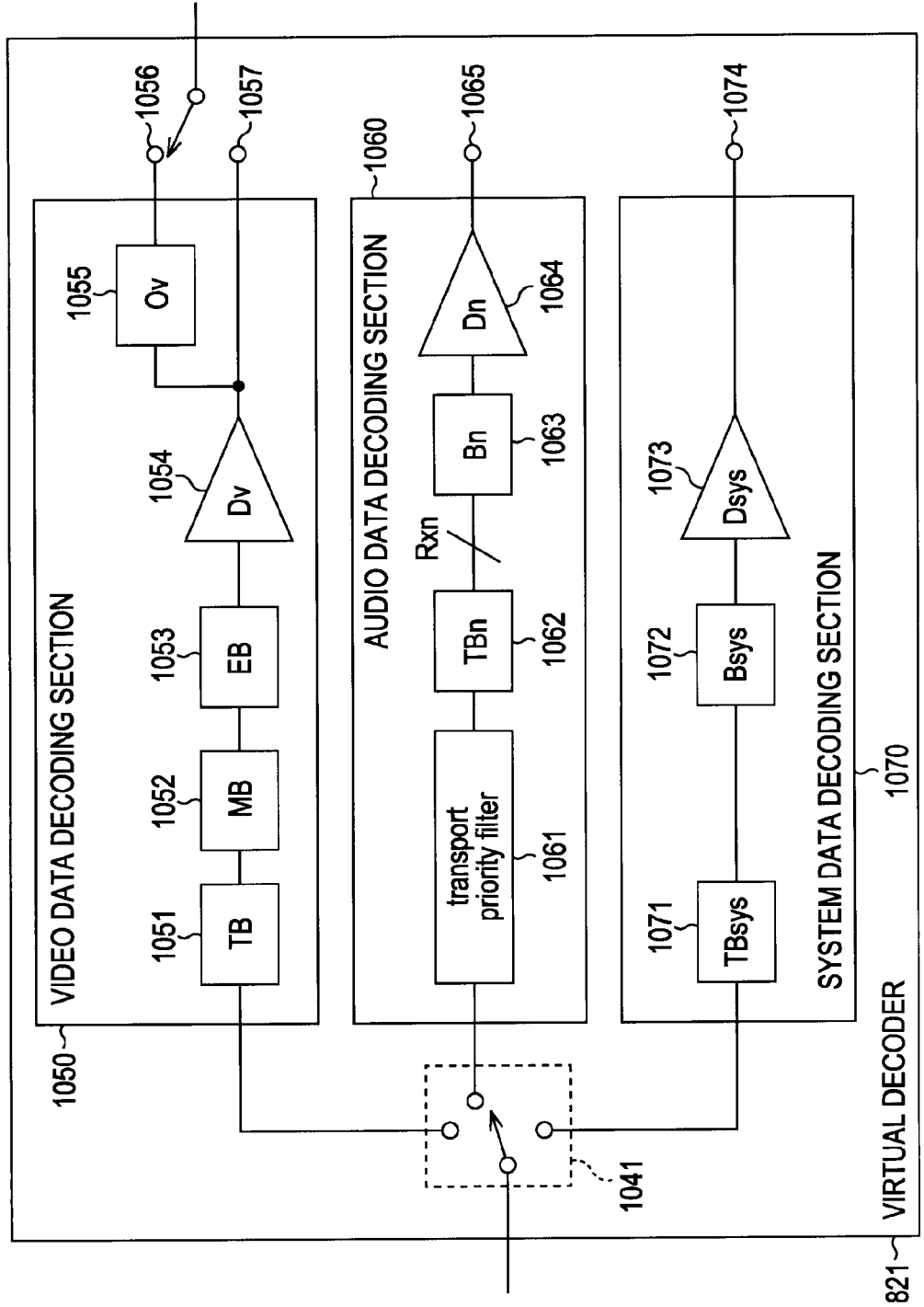
FIG. 44 is a block diagram illustrating a mode of the virtual decoder shown in FIG. 40.

Since, in the TS-packet transmitting process in FIGS. 45 and 46, TS packets are transmitted with transmitting timing controlled based on the buffer occupying amounts (under two conditions) of the virtual decoder 821 in FIG. 44, it is ensured that any receiver (not shown) that includes a decoder for the model of the virtual decoder 821 in FIG. 44 can decode the TS packets transmitted in the TS-packet transmitting process.

Next, calculation of the buffer occupying amounts of the virtual decoder (the virtual decoder 821 under two conditions), executed in step S318 in FIG. 46, is described below with reference to FIGS. 10 to 13.

At first, a process for calculating a buffer occupying amount for the base audio stream is described with reference to the flowchart in FIG. 47. This process is executed by the control section 835 in FIG. 41, assuming that the virtual decoder 821 at the receiving end can decode only a base audio stream, that is, assuming that the virtual decoder 821 at the receiving end is the first virtual decoder. In other words, in the above process, the control section 835 calculates TS-packet decoding (transmitting) timing, assuming that it transmits only the base audio stream 881 in FIG. 43.

In step S341, if the transport buffer 1062 in the virtual decoder 821 (first virtual decoder) in FIG. 44 has free space to store TS packets in which tp=1, the control section 835 controls the transmitting section 838 to transmit TS packets. In other words, if the transport buffer 1062 has storage space to store TS packets corresponding to the base audio stream, the control section 835 controls the transmitting section 838 to transmit TS packets.

In step S342, if the elementary buffer 1063 (Bn=bn0) in the virtual decoder 821 in FIG. 44 has free space, calculation is performed, assuming that data is extracted at a bit rate of Rxn (=rxn0) and is supplied to the elementary buffer 1063. As described above, the input bit rate to the elementary buffer 1063 of the first virtual decoder is Rxn=rxn0. Thus, calculation is performed assuming that the data is extracted at a rate of rxn0, and calculation is performed assuming that the capacity of the elementary buffer 1063 is Bn=bn0.

In step S343, when the PTS of the audio access unit is equal to the time of the system time clock of the virtual decoder 821, the control section 835 performs calculation, assuming that the audio access unit is extracted and supplied to the audio decoder 1064. For example, if the system time clock of the virtual decoder 821 is indicated as t=PTS0 (horizontal axis t indicates time), as shown in FIG. 11, the control section 835 performs calculation, assuming that an audio access unit in which PTS=PTS0 is extracted and supplied to the audio decoder 1064. For example, when t=PTS1 in FIG. 47, the control section 835 performs calculation, assuming that an audio access unit (bearing PTS1) in which PTS=PTS1 is extracted from the elementary buffer 1063 and is supplied to the audio decoder 1064. After that, the process is finished.

Figure 47:
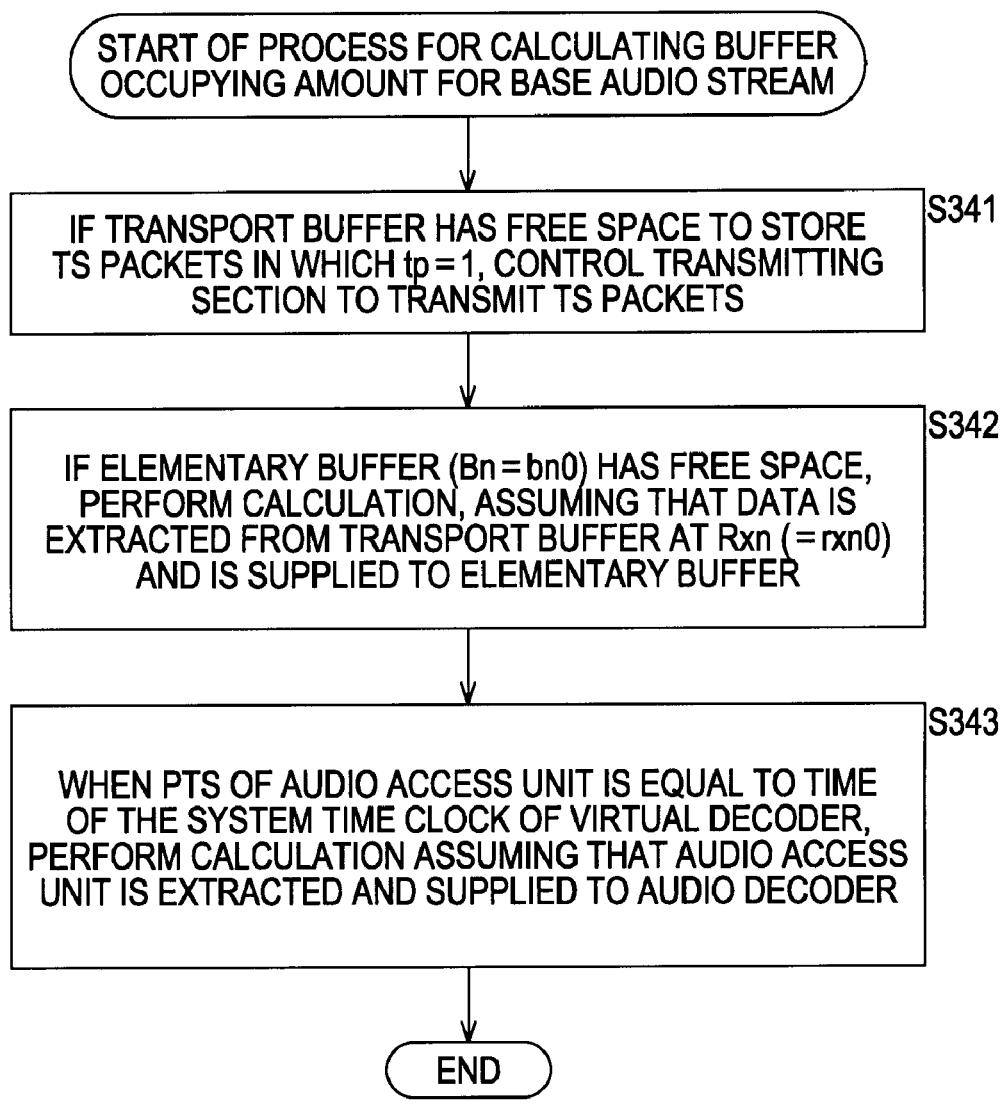
FIG. 47 is a flowchart illustrating a process for calculating a buffer occupying amount for a base audio stream.
Figure 48:
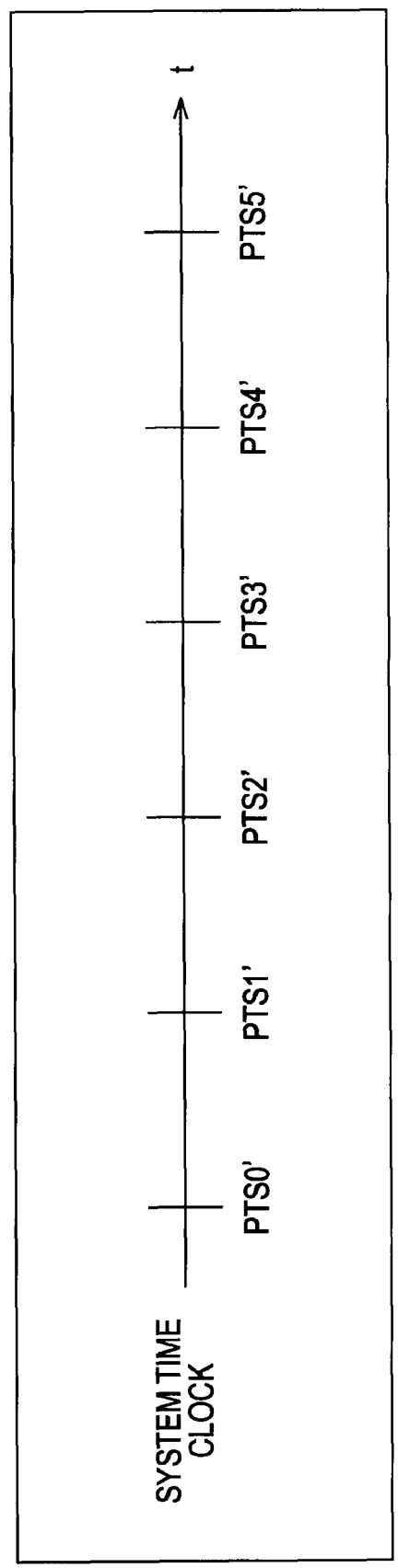
FIG. 48 is an illustration of a system time clock of decoder.

The process in FIG. 47 is executed when step S318 in FIG. 35 is executed. The process in FIG. 47 is repeatedly executed.

As described above, the control section 535 calculates a decoder-buffer occupying amount, assuming a decoder (the first virtual decoder) that can decode only a base audio stream. In other words, the control section 535 calculates a buffer occupying amount of the virtual decoder 821, assuming the three conditions in the case (1) described with reference to FIG. 44, and determines the TS-packet transmitting timing. This ensures that the decoder (actual decoder) that can decode only a base audio stream can decode a base audio stream without causing overflowing and underflowing of the buffer occupying amount.

Next, a process for calculating a buffer occupying amount for each of the base audio stream and the extension audio stream is described below with reference to the flowchart in FIG. 49. This process is executed such that the control section 835 in FIG. 41 assumes that the virtual decoder 821 at the receiving end can decode the base audio stream and the extension audio stream, that is, that the virtual decoder 821 at the receiving end is the second virtual decoder. In other words, in this process, the control section 835 calculates TS-packet decoding (transmitting) timing, assuming that the base audio stream 881 and extension audio stream 882 in FIG. 42 are transmitted.

In step S81, if the transport buffer 1062 in the virtual decoder 821 (the second virtual decoder) in FIG. 44 has free space to store TS packets in which tp=1, the control section 835 controls the transmitting section 838 to transmit the TS packets, and, if the transport buffer 1062 has free space to store TS packets in which tp=0, the buffer 833 controls the transmitting section 838 to transmit the TS packets. In other words, if the transport buffer 1062 has free space to store TS packets corresponding to a base audio stream, the control section 835 controls (satisfies the condition in step S341 in FIG. 47) the transmitting section 838 to transmit the TS packets. If the transport buffer 1062 has free space to store TS packets corresponding to an extension audio stream, the control section 835 controls the transmitting section 838 to transmit the TS packets.

In step S82, if the elementary buffer 1063 (Bn=bn1) in the virtual decoder 821 in FIG. 44 has free space, the control section 835 extracts data from the transport buffer 1062 at a bit rate of Rxn (=rxn1), and supplies the data to the elementary buffer 1063. As described above, the input bit rate to the elementary buffer 1063 of the second virtual decoder is Rxn=rxn1. Thus, calculation is performed assuming that the data is extracted at a rate of rxn1, and calculation is performed assuming that the capacity of the elementary buffer 1063 is represented by Bn=bn1.

In section S383, if the PTS of an audio access unit is equal to the time of the system time clock of the virtual decoder 821, the control section 835 performs calculation, assuming that the audio access unit is extracted from the elementary buffer 1063 and is supplied to the audio decoder 1064. For example, when the system the system time clock of the virtual decoder 821 is represented as t=PTS0, as shown in FIG. 37, the control section 835 performs calculation, assuming that an audio access unit in which PTS=PTS0 is extracted from the elementary buffer 1063 and is supplied to the audio decoder 1064. Similarly, when t=PTS1 in FIG. 47, the control section 835 performs calculation, assuming that an audio access unit (bearing PTS1) in which PTS=PTS1 is extracted from the elementary buffer 1063 and is supplied to the audio decoder 1064. After that, the process is finished.

Figure 49:
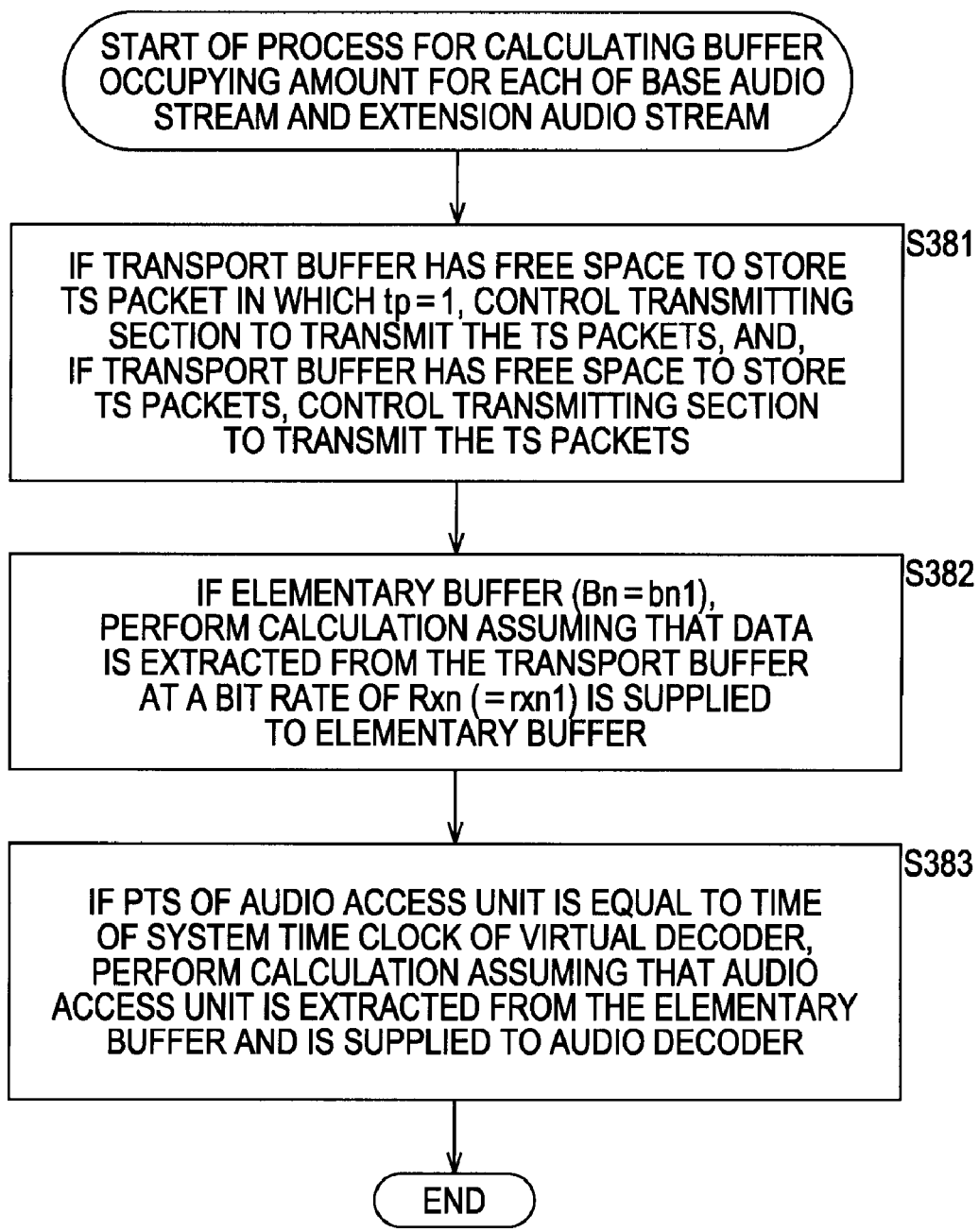
FIG. 49 is a flowchart illustrating a process for calculating buffer occupying amounts for a base audio stream and an extension audio stream.

The process in FIG. 49 is executed when step S318 is executed. The process in FIG. 49 is repeatedly executed. In other words, when step S318 in FIG. 46 is executed, the process in FIGS. 10 and 12 are executed in parallel. More specifically, when step S319 in FIG. 46 is executed, the control section 835 initially performs the process in FIG. 47 to calculate timing with which TS packets corresponding to the base audio stream are transmitted, and further performs the process in FIG. 49 to calculate timing with which TS packets corresponding to the base audio stream and the extension audio stream are transmitted. The control section 835 repeatedly performs this processing (the process in FIG. 47 is re-executed and the process in FIG. 49 is subsequently re-executed).

In other words, after the control section 835 calculates such timing that the elementary buffer of the first virtual decoder including the first virtual decoder does not overflow and underflow, the control section 835 calculates such timing that the elementary buffer of the second virtual decoder including the second virtual decoder does not overflow and underflow, and controls the transmitting section 838 to transmit TS packets so as to satisfy the timing for the first and second virtual receivers.

As described above, the control section 835 calculates decoder-buffer occupying amounts, assuming a virtual decoder (the second virtual decoder) that can decode the base audio stream and the extension audio stream. In other words, assuming the three conditions in the case (2) described above with reference to FIG. 44, the control section 835 calculates buffer occupying amounts of the second virtual decoder 821, and determines TS-packet transmitting timing. This ensures that the decoder (actual decoder) that can decode a base audio stream and an extension audio stream can decode a base audio stream and an extension audio stream without causing overflowing and underflowing of the buffer occupying amounts.

By repeatedly executing the processes in FIGS. 47 and 49 in parallel and calculating the buffer occupying amounts of the virtual decoder 821, the control section 835 in the transmitter 811 adjusts (determines) the TS-packet transmitting timing. Thus, any of the first virtual decoder (121) that can decode only a base audio stream, and the second virtual decoder (121) that can decode both a base audio stream and an extension audio stream can perform decoding. In other words, even if a receiver that actually receives TS packets transmitted from the transmitter 811 can decode only a base audio stream or can decode both a base audio stream and an extension audio stream, the receiver can perform smooth decoding without causing its buffer to overflow and underflow.

Figure 50:
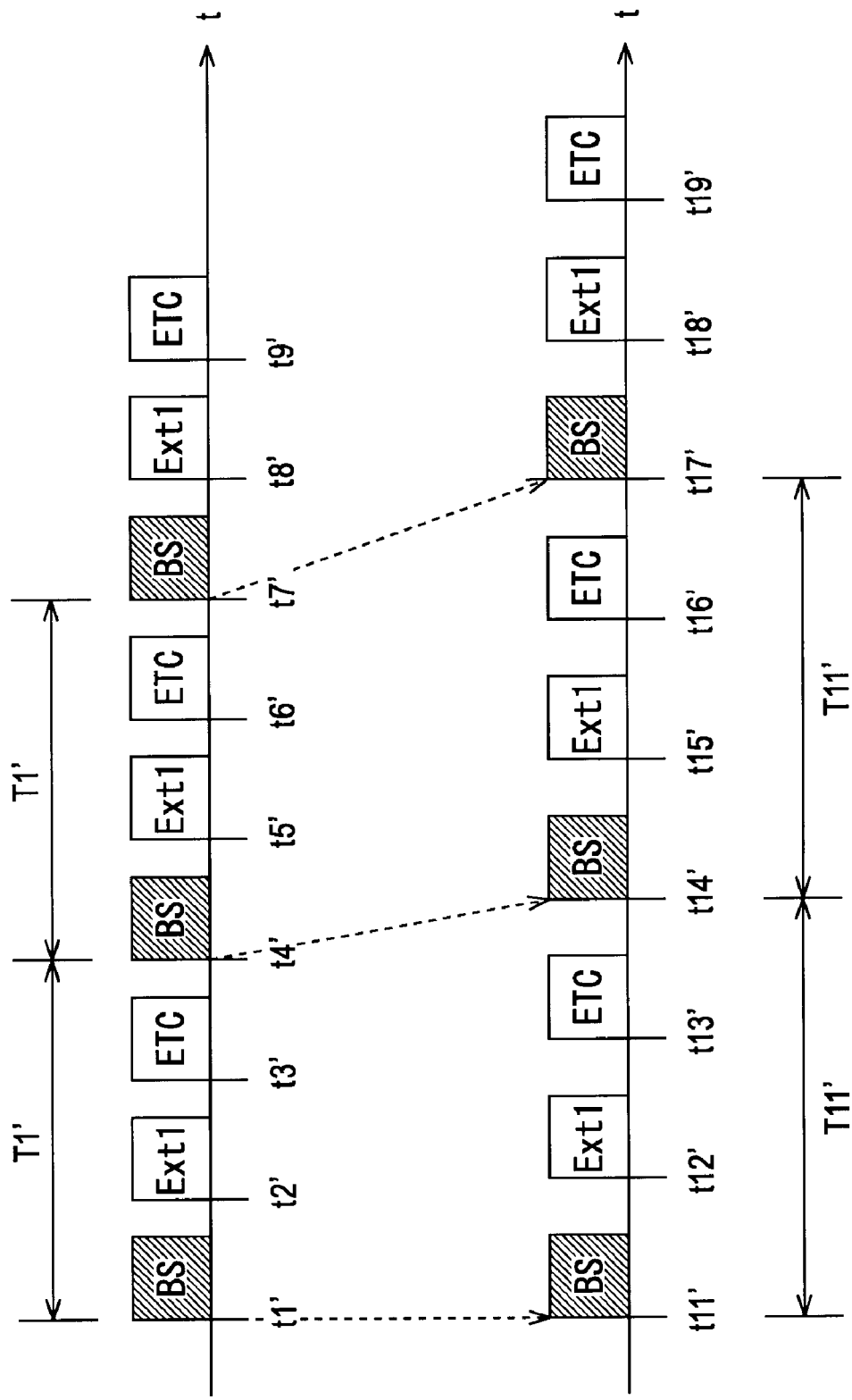
FIG. 50 is a time chart illustrating TS packet transmitting timing.

For example, in a case in which the transmitter 811 in FIG. 41 transmits, to the actual receiver, which is not shown, TS packets corresponding to the base audio stream and the extension audio stream, if the control section 835 executes the process in FIG. 49 as step S318 in FIG. 46 (i.e., the second virtual decoder is assumed), TS packets are transmitted with the timing shown in upper part of FIG. 50. As shown in upper part of FIG. 50, TS packets corresponding to the base audio stream are transmitted at times t1, t4, and t7, TS packets corresponding to the extension audio stream are transmitted at times t2, t5, and t8, and other TS packets (indicated by ETC in FIG. 50) are transmitted at times t3, t6, and t9. In this case, a time after transmitting the first TS packet (the TS packet 941 in the case of FIG. 42) corresponding to the base audio stream until transmitting the second TS packet (the TS packet 942 in the case of FIG. 42) corresponding to the base audio stream is represented by time T1.

In addition, in a case in which the transmitter 811 in FIG. 41 transmits, to the actual receiver, which is not shown, the TS packets corresponding to the base audio stream and the extension audio stream, when the control section 835 further executes the process in FIG. 47 as step S318 in FIG. 46 in parallel with the process in FIG. 49 (i.e., when the first and second virtual decoders are assumed), the TS packets are transmitted with the timing shown in lower part of FIG. 50. As shown in lower part of FIG. 50, the TS packets corresponding to base audio stream are transmitted at times t11, t14, and t17, the TS packets corresponding to the extension audio stream are transmitted at times t12, t15, and t18, and the other TS packets (indicated by ETC in FIG. 50) are transmitted at times t13, t16, and t19. In this case, a time after transmitting the first TS packet (the TS packet 941 in the case of FIG. 42) corresponding to the base audio stream until transmitting the second TS packet (the TS packet 942 in the case of FIG. 42) corresponding to the base audio stream is represented by time T11.

The comparison between upper and lower parts of FIG. 50 indicates that a time after transmitting a base audio stream until transmitting the next base audio stream differs (time T11-T1). In the case of transmission with the timing shown in lower part of FIG. 50, even a decoder that can decode only a base audio stream can perform smooth decoding without causing its buffer (the elementary buffer 1063) to overflow and underflow. However, in the case of transmission with the timing shown in upper part of FIG. 50, the decoder that can decode only the base audio stream may have overflowing of the buffer (the elementary buffer 1063). This is because only a decoder that can decode both the base audio stream and the extension audio stream is assumed as the virtual decoder 821 for transmission with the timing shown in upper part of FIG. 50. In the decoder that can decode both the base audio stream and the extension audio stream, the data capacity (bn1) of the elementary buffer 1063 and the value (rxn1) of the input bit rate to the elementary buffer 1063 are greater than those (bn0 and rxn0) of the decoder that can decode only the base audio stream. Accordingly, when TS packets are transmitted with the timing shown in upper part of FIG. 50 to the decoder that can decode only the base audio stream, an overflow and underflow of the TS packets occurs. However, by considering, in addition to the condition in FIG. 49, the buffer occupying amount of the first virtual decoder, even the decoder that can decode only the base audio stream can perform smooth decoding.

As described above, in the case of transmitting, in a form encoded into an MPEG2-TS, hierarchically coded audio streams including a base audio stream and an extension audio stream, TS packets can be transmitted by considering the capability of a receiver at the receiving end so that the TS packets can be decoded by even the (first) virtual receiver 812 including a decoder that can decode only a base audio stream. In other words, when the virtual receiver 812 includes a decoder (the first virtual decoder) that can decode only a base audio stream, and the virtual receiver 812 decodes an only extracted base audio stream, the transmitter 811 determines packetizing (packet-transmitting) timing of the hierarchically coded audio streams (including the base audio stream and the extension audio stream) so that a predetermined-sized decoder buffer for base audio stream does not overflow and underflow. Thus, even if only the base audio stream is decoded at the receiving end, smooth decoding can be performed.

In other words, the transmitter 811 determines transmitting timing for TS packets corresponding to hierarchically coded audio streams so that, in each of the first virtual receiver including the decoder (the first virtual decoder) that can decode only the base audio stream, and the second virtual decoder (the second virtual decoder) that can decode both the base audio stream and the extension audio stream, the transport buffer 1062 does not overflow and the elementary buffer does not overflow and underflow. Thus, even if only the base audio stream is decoded at the receiving end, smooth decoding can be performed.

In the above description, the TS packetizing section 837 performs TS packetization and multiplexing, and the transmitting section 838 sequentially transmits the resultant multiplexed transport streams with timing based on control by the control section 835. However, after the TS packets generated by the TS packetizing section 837 are multiplexed with timing based on control by the control section 835, the transmitting section 838 may simply transmit the multiplexed transport stream in a sequential manner. In other words, timing with which the multiplexed transport stream is transmitted may be controlled, and, in addition, by controlling the configuration (timing) of TS packets when multiplexing the TS packets, a similar transport stream can be transmitted. This represents equivalence.

Accordingly, a method in which the TS packetizing section 837 in the transmitter 811 adjusts multiplexing timing when performing packetization into TS packets and multiplexing is described as a second embodiment. Specifically, in the transmitter 811 in FIG. 41, a multiplexing process in which the TS packetizing section 837 packetizes PES packets into TS packets and multiplexes the TS packets is described below.

Figure 51:
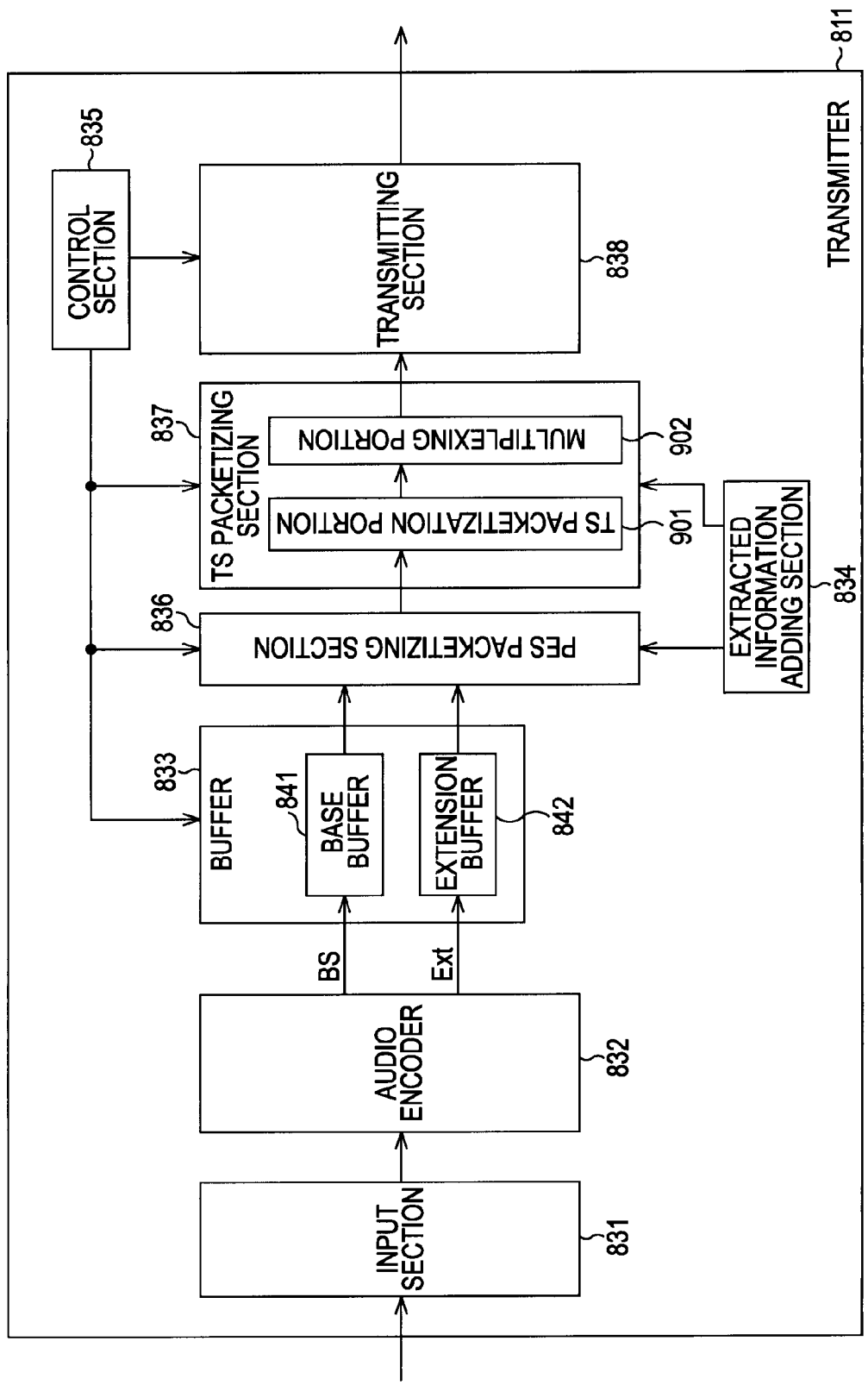
FIG. 51 is a block diagram which shows an example of the configuration of a transmitter and which illustrates details of multiplexing.

FIG. 51 shows an example of the configuration of the transmitter 811 for describing the multiplexing in detail. In FIG. 51, portions corresponding to those in FIG. 41 are denoted by identical reference numerals, and a repeated description thereof is omitted.

The comparison between FIGS. 51 and 41 indicates that the TS packetizing section 837 in FIG. 51 includes a TS packetizing portion 901 and a multiplexing portion 902. In other words, since, as also described with reference to FIG. 41, the TS packetizing section 837 packetizes PES packets into TS packets and multiplexes the TS packets to generate a transport stream, in FIG. 51, its function is divided into the TS packetizing portion 901 and the multiplexing portion 902.

Under the control of the control section 835, the TS packetizing portion 901 in FIG. 51 packetizes PES packets (PES packet stream) supplied from the PES packetizing section 836 to generate TS packets, and supplies the TS packets to the multiplexing portion 902. Under the control of the control section 835, the multiplexing portion 902 generates a transport stream by multiplexing the TS packets supplied from the TS packetizing portion 901, and supplies the transport stream to the transmitting section 838.

In the transmitter 811 in FIG. 51, portions other than the TS packetizing section 837 are similar in configuration to those in FIG. 41, and their description is omitted. Although, in the description of the second embodiment, the transmitting section 838 in the transmitter 811 transmits an MPEG2-TS, the transmitting section 838 uses a drive to record the MPEG2-TS in a removable medium such as a magnetic disk, an optical disc, a magneto-optical disc, or a semiconductor memory. For example, the transmitting section 838 records the MPEG2-TS in the removable medium, and a receiver, which is not shown, reads the MPEG2-TS from the removable medium, whereby the MPEG2-TS is transmitted to the receiver.

Figure 52:
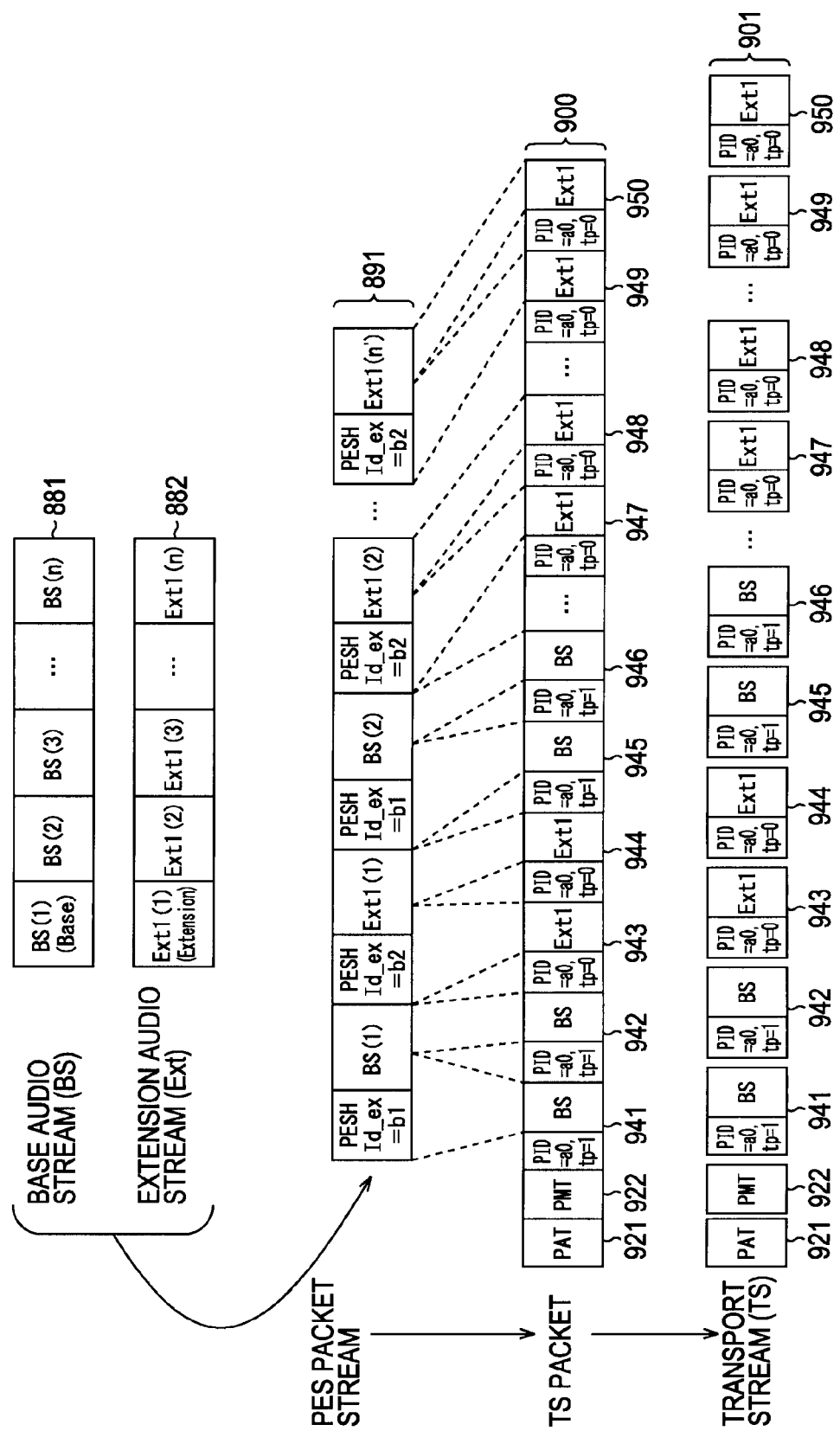
FIG. 52 is an illustration of a transport stream in which a base audio stream and an extension audio stream are multiplexed.

Next, the structure of the transport stream, transmitted from the transmitter 811 in FIG. 51, that is, a transport stream in which a base audio stream and an extension audio stream are multiplexed, is described with reference to FIG. 52. In FIG. 52, portions corresponding to those in FIG. 31 are denoted by identical reference numerals, and their description is omitted to avoid repetition.

In the example in FIG. 52, a base audio stream 881 and an extension audio stream 882 in a top part of FIG. 52 indicates states encoded and output from the audio encoder 532 in FIG. 51, and a PES packet stream 891 in a second part of FIG. 52 indicates a state output in a PES packet form by the PES packetizing section 836 in FIG. 51. A plurality of TS packets 900 in a third part of FIG. 52 indicates a state output in TS-packet form by the TS packetizing portion 901 in the TS packetizing section 837, and a TS 901 in a fourth part of FIG. 52 indicates a state output in multiplexed form by the multiplexing portion 902.

In other words, the TS 901 is generated such that the multiplexing portion 902 multiplexes the TS packets 900 generated by the TS packetizing portion 901. The multiplexing portion 902 multiplexes the TS packets to generate the TS 901 with timing based on control by the control section 835. At this time, the control section 835 controls TS-packet multiplexing timing, assuming the virtual receiver 812 at the receiving end. Details of this control are described later with reference to FIGS. 21 to 24. Although FIGS. 51 and 52 are used to describe the audio stream, actually, TS packets corresponding to a video stream and other data (system data) are multiplexed and transmitted as a transport stream. This example is briefly described with reference to FIG. 53.

Figure 53:
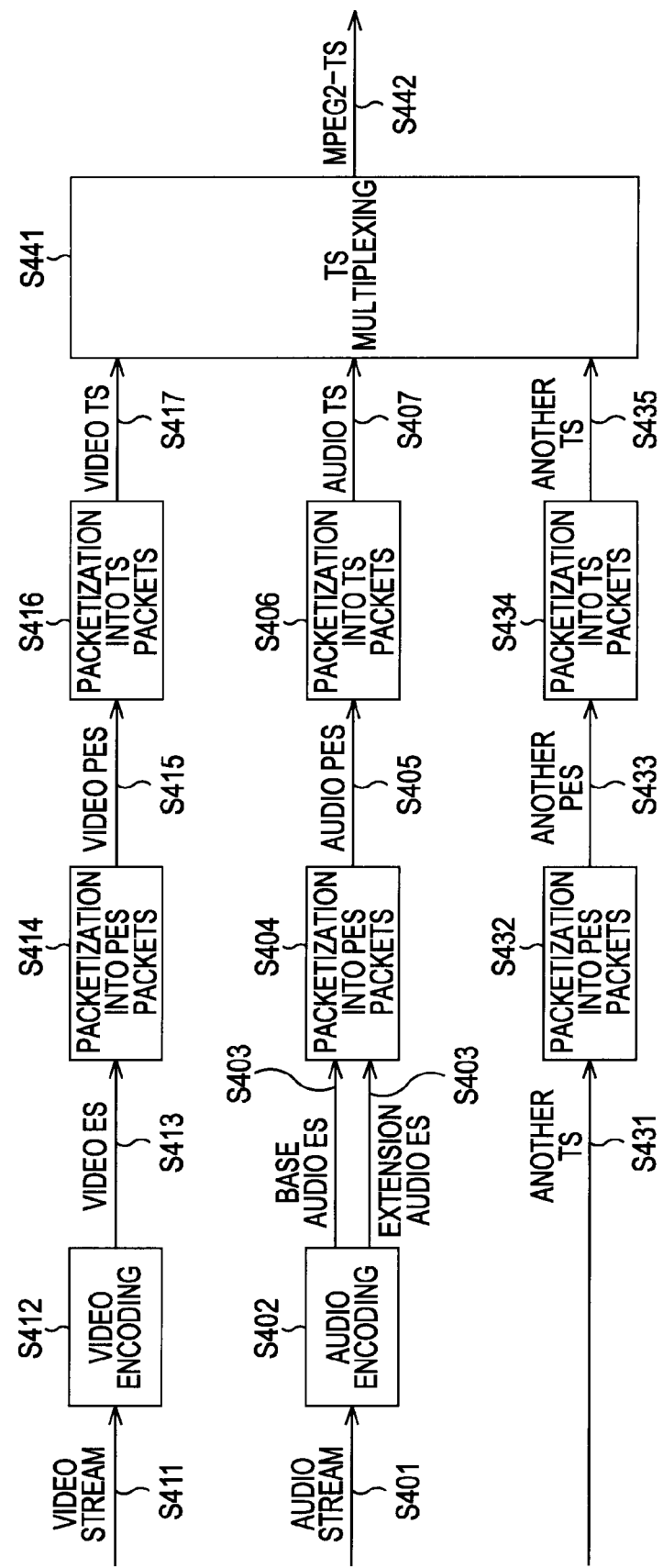
FIG. 53 is an illustration of a flow to multiplexing of a video stream, audio streams, and other elementary streams.

Referring to FIG. 53, after, in step S401, an audio stream is input to the audio encoder 532 (FIG. 51), in step S402, the audio stream is encoded by the audio encoder 532. In step S403, the encoded result is output to the PES packetizing section 836 in a form separated into a base audio ES (elementary stream) and an extension audio ES. In step S404, by packetizing the base audio ES and the extension audio ES into PES packets, the PES packetizing section 836 generates an audio PES (audio PES including a plurality of PES packets). In step S405, the PES packetizing section 836 supplies the audio PES to the TS packetizing portion 901 of the TS packetizing section 837. In step S406, the TS packetizing portion 901 packetizes the audio PES into TS packets. In step S407, the TS packetizing portion 901 supplies the TS packets to the multiplexing portion 902 of the TS packetizing section 837.

The base audio ES and extension audio ES output from the audio encoder 832 in step S403 correspond to the base audio stream 881 and extension audio stream 882 shown in FIG. 52, respectively. The audio PES output from the PES packetizing section 836 in step S405 corresponds to the PES packet stream 891 shown in FIG. 52. The TS packets output from the TS packetizing portion 901 of the TS packetizing section 837 in step S407 corresponds to the TS packets 900 shown in FIG. 52.

A video stream and other ESs are packetized into TS packets similarly to the case of the audio stream. The video stream is envisaged by an MPEG standard such as MPEG2 or MPEG-AVC. The other ESs include, for example, a graphics stream and streams such as text subtitles (text subtitle data).

Specifically, in the case of video stream, after, in step S411, a video stream is input to a video encoder (not shown), in step S412, the input video stream is encoded by the video encoder into a video ES, and, in step S413, the video ES is output. In step S414, the video ES is packetized into PES packets. In step S415, the resultant video PES is output. In step S416, the video PES is packetized into TS packets. In step S417, the TS packets are supplied to the multiplexing portion 902 of the TS packetizing section 837.

In addition, in the case of the other ESs, after, in step S431, the other ESs are input to the PES packetizing section 836, in step S432, the input ESs are packetized into PES packets. In step S433, the resultant other PES is output. In step S434, the other PES is packetized into TS packets. In step S435, the TS packets are supplied to the multiplexing portion 902 of the TS packetizing section 837.

In step S441, in the multiplexing portion 902 of the TS packetizing section 837, the TS packets for audio supplied in step S407, the TS packets for video supplied in step S417, and the other TS packets supplied in step S435 are multiplexed with timing based on control by the control section 835. In step S441, the resultant MPEG2-TS (TS) generated by multiplexing is output. At this time, the MPEG2-TS is generated so as to satisfy the model of the virtual decoder 812 (FIG. 40) shown in FIG. 44.

As described above, TS packets for audio, video, and other data are multiplexed and output as an MPEG2-TS.

In this case, as described with reference to FIG. 52, the PAT 921 and the PMT 922 are also included in the multiplexed TS packets. The PAT 921 and the PMT 922 include data items corresponding to video, audio, and other data.

Next, examples of the multiplexed TS packets, that is, the TS packets output in steps S407, S417, and S435 in FIG. 53, are described below with reference to FIG. 54.

Figure 54:
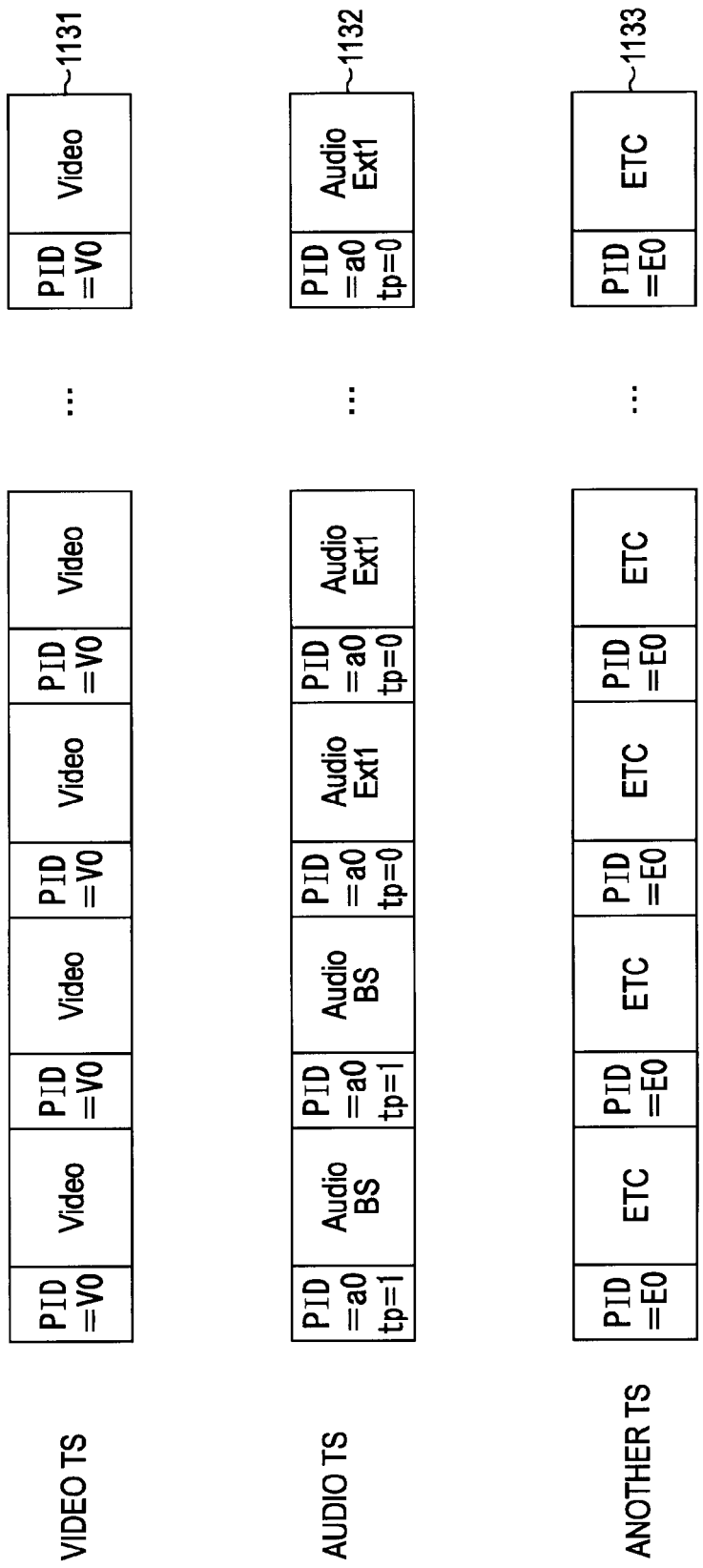
FIG. 54 is an illustration of examples of transport streams corresponding to a video stream, an audio stream, and another elementary stream.

Referring to FIG. 54, a video transport stream 1131 (TS packets for video) is output in step S417 in FIG. 53, an audio transport stream 1132 (TS packets for audio) is output in step S407 in FIG. 53, and another transport stream 1133 (TS packets for other data) is output in step S435 in FIG. 53. The audio transport stream 1132 corresponds to the above TS packets 900 in FIG. 52.

As shown in FIG. 54, the headers of the TS packets constituting the video transport stream 1131 bear identical PIDs. Specifically, the PID of each of the TS packets constituting the video transport stream 1131 is represented as PID=V0.

The headers of the TS packets constituting the audio transport stream 1132 bear identical PIDs. Specifically, the PID of each of the TS packets constituting the audio transport stream 1132 is represented as PID=a0. Each TS packet for the base audio stream 881 and each TS packet for the extension audio stream 882 have different IDs. In the examples in FIG. 54, the TS packet for the base audio stream 881 has "tp=1", and the TS packet for the extension audio stream 882 has "tp=0", as described above in FIG. 54. As described above, the same PID is added to one stream, and, in order to distinguish between a base audio stream and an extension audio stream which are included in one stream, a different tp (transport_priority) is added to each stream.

The headers of the TS packets constituting the other transport stream 1133 bear identical PIDs. Specifically, the PID of each of the TS packets constituting the other transport stream 1133 is represented as PID=E0. Although, in FIG. 54, the number of PIDs of the other TS packets is one (PID=E0), when the other TS packets include two types of streams such as an interactive graphics stream and presentation graphics stream, a different PID is assigned to each type of stream. In other words, when the other transport stream includes two types of streams, two types of PIDs are assigned in the other transport stream.

Since, as described above, for a video stream, an audio stream, and another elementary stream, different types of PIDs are assigned when the streams are packetized into TS packets, the type of each TS packet can be identified only by confirming the PID of the TS packet. In addition, it is recognized whether a TS packet for an audio stream corresponds to one of the base audio stream 881 and the extension audio stream 882 only by confirming a tp flag added to the header of the TS packet.

The video transport stream 1131, the audio transport stream 1132, and the other transport stream 1133 are multiplexed in step S441 in FIG. 53 to generate one transport stream.

As described above, when transmitting a transport stream, the transmitter 811 adjusts TS-packet transmitting (multiplexing) timing in accordance with the capability of the virtual receiver 812 (FIG. 40). In other words, even if the virtual receiver 812 can handle (decode) both a base audio stream and an extension audio stream, or even if the virtual receiver 812 can handle (decode) only a base audio stream, the transmitter 811 adjusts timing for transmitting (multiplexing) encoded TS packets so that the packets can be decoded without causing the buffer of the virtual receiver 812 to overflow and underflow.

The virtual receiver 812 that is assumed by the transmitter 811 is described below. As described above, the transmitter 811 assumes the model in FIG. 44 of the virtual decoder 812 (FIG. 40). In other words, when the transmitter 811 decodes the base audio stream and the extension audio stream, packetizes the streams, and multiplexing the packets, the transmitter 811 assumes the model in FIG. 44 of the virtual decoder 812.

FIG. 44 is not described since it is described above. However, a detailed example of the configuration of the audio data decoding section 1060 in FIG. 44 is described with reference to FIG. 18. In this example of the configuration, those to which the conditions in the cases (1) and (2) described with reference to FIG. 44 are applied are shown in block diagram form. Specifically, one to which the conditions in the case (1) are applied is a base-audio-data decoding portion 1060-1, and one to which the conditions in the case (2) are applied is a base-and-extension-audio-data decoding portion 1060-2.

Figure 55:
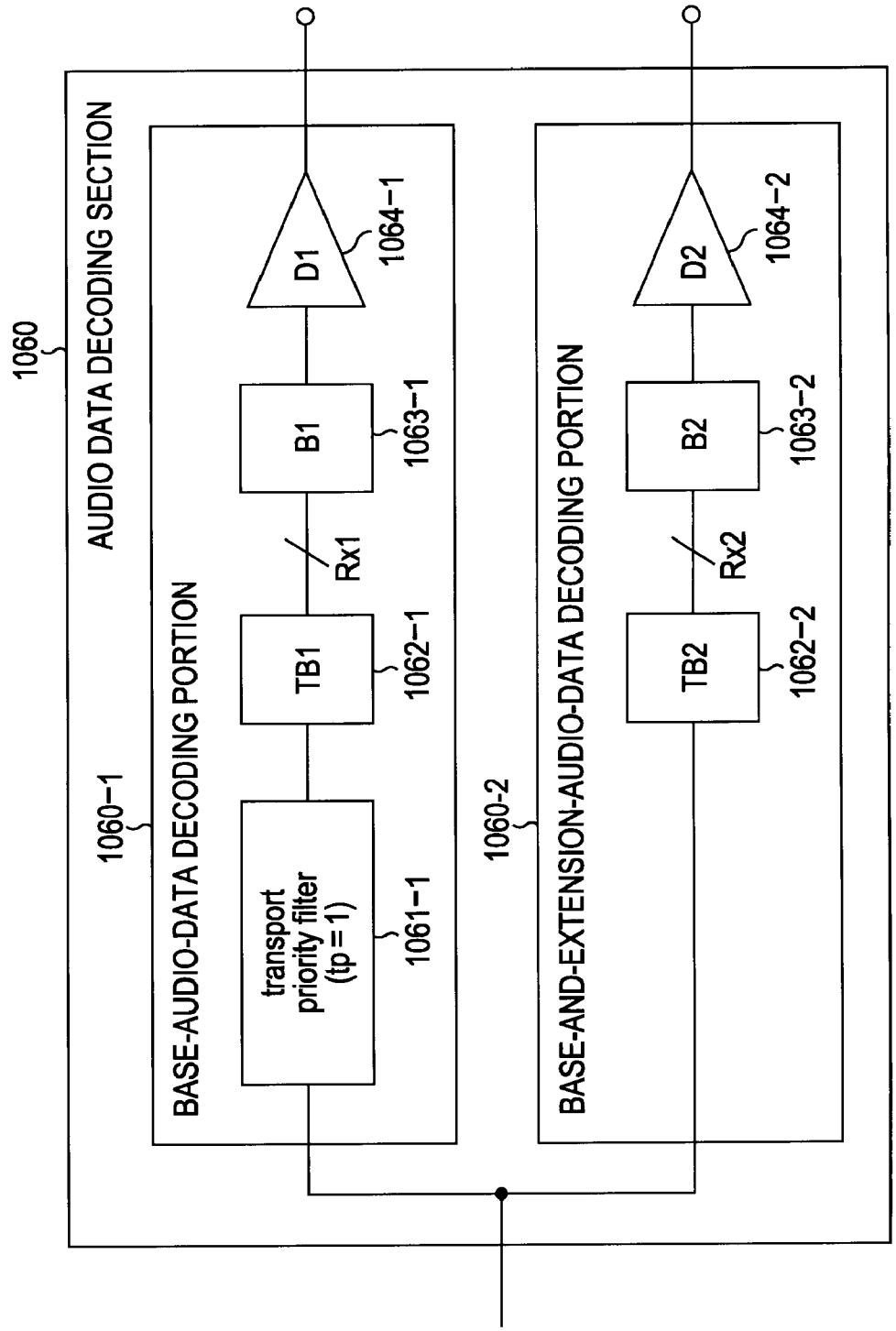
FIG. 55 is a block diagram showing an example of the configuration of the audio data decoding section shown in FIG. 44.

As shown in FIG. 55, the audio data decoding section 1060 is internally divided into two systems, that is, the base-audio-data decoding portion 1060-1 and the base-and-extension-audio-data decoding portion 1060-2. This is because both the base-audio-data decoding portion 1060-1, which is a decoder model for decoding only a base audio stream, and the base-and-extension-audio-data decoding portion 1060-2, which is a decoder model for decoding both a base audio stream and an extension audio stream, are verified at a time.

The base-audio-data decoding portion 1060-1 includes a transport priority filter 1061-1 (indicated by TRANSPORT PRIORITY FILTER (tp=1) in FIG. 55), a transport buffer (indicated by TB1 in FIG. 55), an elementary buffer (indicated by B1 in FIG. 55), and an audio decoder (indicated by D1 in FIG. 55). In other words, the transport priority filter 1061-1, transport buffer 1062-1, elementary buffer 1063-1, and audio decoder 1064-1 of the base-audio-data decoding portion 1060-1 in FIG. 55 correspond to the transport priority filter 1061, transport buffer 1062, elementary buffer 1063, and audio decoder 1064 of the audio data decoding section 1060 in FIG. 44, respectively.

The transport priority filter 1061-1 selects only TS packets in which tp=1, and supplies the TS packets to the transport buffer 1062-1. The transport buffer 1062-1 supplies data with Rx1 as the input bit rate (Rxn) to the elementary buffer 1063-1. The elementary buffer 1063-1 stores the data supplied from the transport buffer 1062-1 at the bit rate of Rx1. The capacity (Bn) of the elementary buffer 1063-1 is set to B1. The audio decoder 1064-1 extracts an audio access unit stored in the elementary buffer 1063-1 with predetermined timing, decodes the audio access units, and outputs the decoded units. Specifically, when the PTS of an audio access unit is equal to the time of the system time clock of the T-STD, the audio decoder 1064-1 extracts the audio access unit from the elementary buffer 1063-1. The extracted audio access unit is decoded and output by the audio decoder 1064-1.

As described above, the base-audio-data decoding portion 1060-1 is a virtual decoder assuming decoding of a base audio ES. A decoder in which the audio data decoding section 1060 of the virtual decoder 812 is replaced by the base-audio-data decoding portion 1060-1 is hereinafter referred to as a first virtual decoder. In other words, the virtual decoder included in the first virtual receiver is the first virtual decoder.

The base-and-extension-audio-data decoding portion 1060-2 includes a transport buffer 1062-2 (indicated by TB2 in FIG. 55), an elementary buffer 1063-2 (indicated by B2_1 in FIG. 55), and an audio decoder 1064-2. In other words, the transport buffer 1062-2, elementary buffer 1063-2, and audio decoder 1064-2 of the base-and-extension-audio-data decoding portion 1060-2 in FIG. 55 correspond to the transport buffer 1062, elementary buffer 1063, and audio decoder 1064 of the audio data decoding section 1060 in FIG. 44, respectively. The reason that the base-and-extension-audio-data decoding portion 1060-2 does not include the transport priority filter 1061 is that the base-and-extension-audio-data decoding portion 1060-2 processes both a base audio ES and an extension audio ES. In other words, this is because no filter is needed since all the base audio ES and the extension audio ES (all audio TS packets in which tp=1 and tp=0) are processed by the base-and-extension-audio-data decoding portion 1060-2.

The transport buffer 1062-2 is supplied with the base audio ES and the extension audio ES (audio ESs in which tp=1 and tp=0). The transport buffer 1062-2 supplies data, by using, as Rx2, the input bit rate (Rxn) to the elementary buffer 1063-2. The elementary buffer 1063-2 stores the data supplied at the bit rate of Rx2 from the transport buffer 1062-2. The capacity (Bn) of the elementary buffer 1063-2 is set to B2.

The audio decoder 1064-2 extracts audio access units stored in the elementary buffer 1063-2, decodes the audio access units, and outputs the decoded units. Specifically, when a PTS of the audio access units is equal to the time of the system time clock of the T-STD, the audio decoder 1064-2 extracts the audio access units from the elementary buffer 1063-2. The audio decoder 1064-2 decodes the extracted audio access units and outputs the decoded audio access units.

As described above, the base-and-extension-audio-data decoding portion 1060-2 is a virtual decoder assuming decoding of the base audio ES and the extension audio ES. A decoder in which the audio data decoding section 1060 of the virtual decoder 812 is replaced by the base-and-extension-audio-data decoding portion 1060-2 is hereinafter referred to as a second virtual decoder. In other words, the virtual decoder included in the second virtual receiver is the second virtual decoder.

The description so far of the virtual decoder is summarized as follows. The virtual decoder 812 to which the conditions in the case (1) described above with reference to FIG. 44 are applied, that is, one in which the audio data decoding section 1060 of the virtual decoder 812 is replaced by the base-audio-data decoding portion 1060-1 in FIG. 55, is the first virtual decoder. In addition, the virtual decoder 812 to which the conditions in the case (2) described above with reference to FIG. 44 are applied, that is, one in which the audio data decoding section 1060 of the virtual decoder 812 is replaced by the base-and-extension-audio-data decoding portion 1060-2 in FIG. 55, is the second virtual decoder.

In FIG. 55, the capacity of the elementary buffer 1063-(B1) is greater than that of the elementary buffer 1063-2, and the leak rate Rx1 to the elementary buffer 1063-1 (B1) is greater than that to the elementary buffer 1063-2. For example, the elementary buffer 1063-1 (B1) has a buffer size of 43972 bytes, and the elementary buffer 1063-2 has a buffer size of 714×210 bytes. In addition, leak rate Rx1 is 2 Mbps, and leak rate Rx2 is 29.4 Mbps. The transmitter 811 in FIG. 51 needs to perform sequentially determining TS packets to be multiplexed from among base audio TS packets and base-and-extension audio TS packets and multiplexing the determined packets so that correct decoding can be performed by the virtual receiver 20 including the virtual decoder 812 in FIG. 44. In other words, the transmitter 811 is requested to perform determining (adjusting) audio TS packets to be multiplexed and multiplexing the TS packets so that the transport buffer 1062-1 and transport buffer 1062-2 (FIG. 55) in the virtual decoder 812 do not overflow and the elementary buffer 1063-1 and elementary buffer 1063-2 do not overflow and underflow.

Accordingly, the transmitter 811 adjusts multiplexing timing for multiplexing the TS packets 900 (in FIG. 52) (TS packets generated by packetizing the base audio stream 881 and TS packets generated by packetizing the extension audio stream 882) to generate the TS 901 so that the above-described virtual decoder 812 in FIG. 44 is satisfied, that is, so that decoding can be performed by both the base-audio-data decoding portion 1060-1 and base-and-extension-audio-data decoding portion 1060-2 in FIG. 55. In other words, the transmitter 811 sequentially determines TS packets to be multiplexed and multiplexes the TS packets so that the buffers of the first virtual receiver (the first virtual decoder, that is, the virtual decoder 812 including the base-audio-data decoding portion 1060-1) and the second virtual receiver (the second virtual decoder, that is, the virtual decoder 812 including the base-and-extension-audio-data decoding portion 1060-2) do not overflow and underflow.

Figure 56:
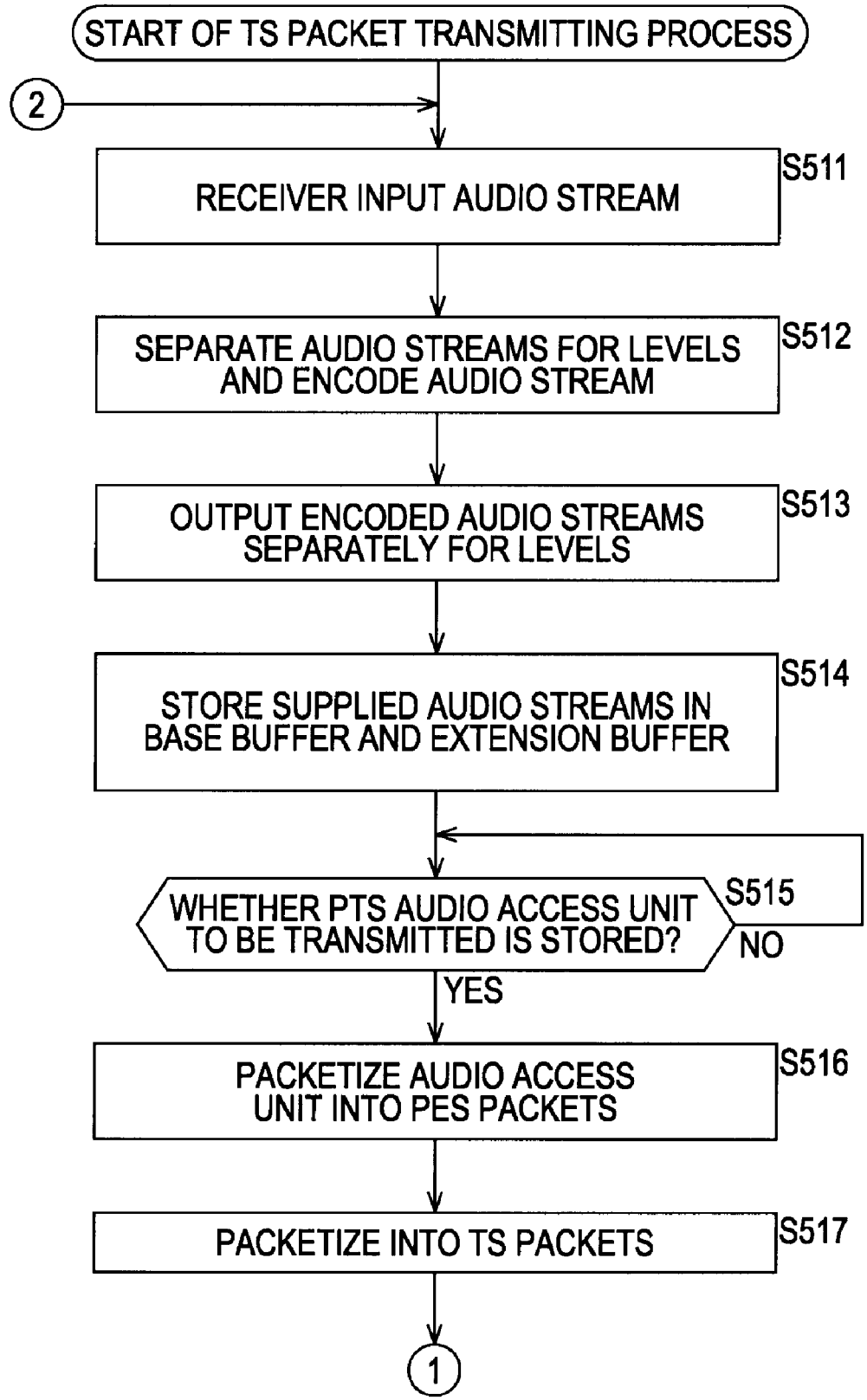
FIG. 56 is a flowchart illustrating another example of the TS packet transmitting process.
Figure 57:
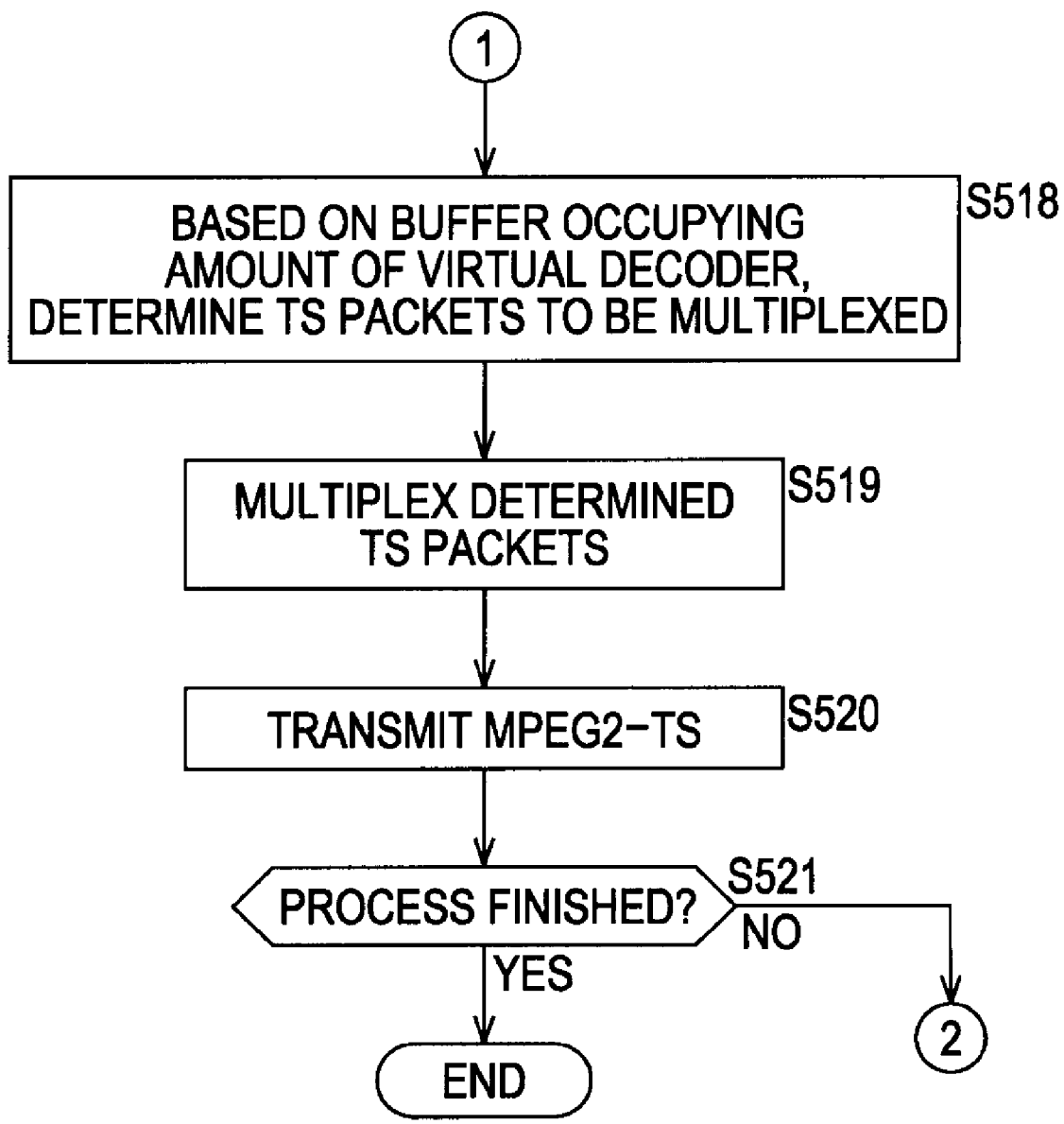
FIG. 57 is a flowchart illustrating another example of the TS packet transmitting process.

Next, a process in which, considering the capability of the virtual receiver 812, the transmitter 811 in FIG. 51 encodes and packetizes an audio stream into TS packets, and transmits the TS packets in multiplexed form is described below. FIGS. 56 and 57 are flowcharts illustrating a TS packet transmitting process of the transmitter 811 in FIG. 51. This process is initiated when the power of the transmitter 811 is turned on to input an audio stream to the input section 831.

Steps S511 to S516 are not described since they are similar to steps S311 to S316 in FIG. 45, and step S517 and the subsequent steps are described below.

In step S517, the TS packetizing portion 901 of the TS packetizing section 837 packetizes the PES packets supplied from the PES packetizing section 836 into TS packets, and supplies the TS packets to the transmitting section 838. For example, the TS packetizing section 837 packetizes the PES packets corresponding to the base audio stream 881 and the extension audio stream 882 into the TS packets 900 shown in the third part of FIG. 52. The TS packetizing portion 901 supplies the multiplexing portion 902 with the TS packets corresponding to the base audio and extension audio streams.

At this time, as shown in FIG. 52, the headers of each base audio TS packet and each extension audio TS packet bear identical PIDs and different transport_priority values. In the case of FIG. 52, the header of each base audio TS packet includes "PID=a0, tp=1", and the header of each extension audio TS packet includes "PID=a0, tp=0".

In step S518, based on calculated buffer occupying amounts of the virtual decoder 812, the control section 835 determines TS packets to be multiplexed. Specifically, based on calculated buffer occupying amounts of the first virtual decoder and the second virtual decoder (see FIGS. 44 and 55), the control section 835 determines TS packets (either type of TS packets between the base audio TS packets and the extension audio TS packets) to be next multiplexed, and controls the TS packetizing section 838 to multiplex the TS packets determined to be multiplexed. In other words, the control section 835 determines the order of TS packets to be multiplexed in order to multiplex the TS packets 900 in FIG. 52 (the audio TS packets in FIG. 54) to generate the TS 901. A process for calculating the buffer occupying amounts of the virtual decoder 812 (the first and second virtual decoders) is described later with reference to FIGS. 59 and 61.

When the number of TS packets that can be multiplexed is plural, the control section 835 may perform control so that, among the TS packets that can be multiplexed, TS packets having earlier DTSs (decoding time stamps) are sequentially multiplexed, and may perform control so that TS packets of a stream having a smaller buffer occupying amount of the virtual decoder 812 are sequentially multiplexed.

When the TS packets to be multiplexed includes the video TS packets 431 and the other TS packet 433 shown in FIG. 54, the control section 835 determines TS packets to be multiplexed from among the base audio TS packets, the extension audio TS packets, the video TS packets 431, the other TS packet 433.

In step S519, the multiplexing portion 902 multiplexes, among the TS packets supplied from the TS packetizing portion 901, the TS packets determined in step S518 by the control section 835 to be multiplexed. Specifically, among the base audio TS packet and extension audio TS packets in FIG. 52, the TS packets determined in step S519 to be multiplexed are (sequentially) multiplexed. This generates the TS 901 (FIG. 52) multiplexed so as to be decoded at the receiving end. The multiplexing portion 902 supplies the transmitting section 838 with the TS 901 generated by multiplexing the base audio TS packets and the extension audio TS packets.

In step S520, the transmitting section 838 transmits the TS 901 (FIG. 52) supplied from the multiplexing portion 902 of the TS packetizing section 837. After transmitting the TS 901 to, for example, a drive, which is not shown, the transmitting section 838 uses the drive to record the TS 901 as the MPEG2-TS in a removable medium, and controls a communication section, which is not shown, to transmit the TS 901 to a receiver through a network. This receiver is not the receiver 20 described with reference to FIG. 40, but a receiver (including a decoder) that actually receives the MPEG2-TS.

In step S521, the control section 835 determines whether to finish the process. For example, in one of cases in which input of audio data to the input section 831 is finished, in which the transmitter 811 is instructed to finish the TS packet transmitting process, and, in which transmission of an audio stream finishes, the control section 835 determines to finish the process. In step S521, if the control section 835 has determined not to finish the process, the process returns to step S511, and the subsequent steps are repeatedly performed. In other words, input audio data is received again and packetized into TS packets. Based on the buffer occupying amounts of the virtual decoder 812, TS packets to be multiplexed are determined and multiplexed, and a transport stream generated by the multiplexing is transmitted. If, in step S521, the control section 835 has determined not to finish the process, the process is finished.

In the process in FIGS. 56 and 57, based on a calculated buffer occupying amount of each of the first virtual decoder and the second virtual decoder (the virtual decoder 812), the TS packets are multiplexed with timing determined for multiplexing. Thus, it is ensured that any receiver (not shown) that includes a decoder corresponding to the model of the virtual decoder 812 in FIGS. 44 and 55 can decode a transport stream (TS packets) generated by multiplexing in the above process.

Next, a method, executed in step S518 in FIG. 57, for calculating the buffer occupying amounts of the virtual decoder (the virtual decoder 812 under two conditions), and a method or determining TS packets to be multiplexed are described below.

As described above in step S518 in FIG. 57, the control section 835 assumes the first virtual decoder and the second virtual decoder, and, based on the buffer occupying amount of each virtual decoder, determines TS packets to be multiplexed. Two methods therefor are described below.

In a first method (hereinafter referred to as Method 1), in a case in which the audio data decoding section 1060 (FIG. 55) determines, in its entirety, TS packets to be multiplexed, when both the base-audio-data decoding portion 1060-1 and the base-and-extension-audio-data decoding portion 1060-2 can perform multiplexing, it is determined that the TS packets can be multiplexed.

In other words, in Method 1, in accordance with the conditions shown in FIG. 58, based on calculated buffer occupying amounts of two virtual decoders (the first virtual decoder and the second virtual decoder) at an arbitrary time, it is determined whether TS packets can be multiplexed.

In FIG. 58, in a case in which the result of determining TS packet multiplexing when assuming the base-audio-data decoding portion 1060-1 indicates "ability to multiplex TS packets" (TS packets can be multiplexed), and the result of determining TS packet multiplexing when assuming the base-and-extension-audio-data decoding portion indicates "ability to multiplex TS packets" (TS packets can be multiplexed), the result of determining whether to multiplex TS packets indicates "ability to multiplex TS packets". In other words, when it is determined that TS packets to be transmitted can be multiplexed at an arbitrary time by both the base-audio-data decoding portion 1060-1 and the base-and-extension-audio-data decoding portion 1060-2, it is determined that the TS packets can be multiplexed.

In a case in which the result of determining TS packet multiplexing when assuming the base-audio-data decoding portion 1060-1 indicates "inability to multiplex TS packets", and the result of determining TS packet multiplexing when assuming the base-and-extension-audio-data decoding portion 1060-2 indicates "ability to multiplex TS packets", the result of determining whether to multiplex TS packets indicates "inability to multiplex TS packets". In other words, when it is determined that, at an arbitrary time, the base-audio-data decoding portion 1060-1 is unable to multiplex TS packets to be transmitted, even if the base-and-extension-audio-data decoding portion 1060-2 can multiplex the transport packets, inability to multiplex the transport packets is determined.

In a case in which the result of determining TS packet multiplexing when assuming the base-audio-data decoding portion 1060-1 indicates "ability to multiplex TS packets", and the result of determining TS packet multiplexing when assuming the base-and-extension-audio-data decoding portion indicates "inability to multiplex TS packets", the result of determining whether to multiplex TS packets indicates "inability to multiplex TS packets". In other words, even if, at an arbitrary time, transport packets to be transmitted can be multiplexed by the base-audio-data decoding portion 1060-1, when the base-and-extension-audio-data decoding portion 1060-2 is unable to multiplex the TS packets, inability to multiplex TS packets is determined.

In a case in which the result of determining TS packet multiplexing when assuming the base-audio-data decoding portion 1060-1 indicates "inability to multiplex TS packets", and the result of determining TS packet multiplexing when assuming the base-and-extension-audio-data decoding portion 1060-2 indicates "inability to multiplex TS packets", the result of determining whether to multiplex TS packets indicates "inability to multiplex TS packets". In other words, if it is determined that, at an arbitrary time, both the base-audio-data decoding portion 1060-1 and the base-and-extension-audio-data decoding portion 1060-2 are unable to multiplex TS packets to be transmitted, it is determined that the TS packets have inability to be multiplexed.

In other words, in Method 1, only when it is determined that, at an arbitrary time, TS packets to be transmitted have ability to be multiplexed by both the base-audio-data decoding portion 1060-1 and the base-and-extension-audio-data decoding portion 1060-2 do the TS packets have ability to be multiplexed.

Next, a process, for calculating a buffer occupying amount by an audio stream, corresponding to Method 1 in FIG. 58 is described below. This process is executed such that the control section 835 in FIG. 51 assumes two types of the virtual decoder 812, that is, the first virtual decoder and the second virtual decoder. In addition, this process is a detailed example (Method 1) of processing executed in step S518 in FIG. 57.

In step S601, the control section 835 determines whether the transport buffer 1062-1 of the base-audio-data decoding portion 1060-1 has free space to store TS packets. Specifically, based on the capacity of the transport buffer 1062-1 and the input bit rate Rx1 from the transport buffer 1062-1 to the elementary buffer 1063-1, the control section 835 determines whether the transport buffer 1062-1 has free space to store TS packets (188 bytes per TS packet).

If, in step S601, it is determined that the transport buffer 1062-1 of the base-audio-data decoding portion 1060-1 has free space to store TS packets, the process proceeds to step S602. In step S602, the control section 835 determines whether the transport buffer 1062-2 of the base-and-extension-audio-data decoding portion 1060-2 has free space to store TS packets. Specifically, based on the capacity of the transport buffer 1062-2 and the input bit rate Rx2 from the transport buffer 1062-2 to the elementary buffer 1063-2, the control section 835 determines whether the transport buffer 1062-2 has free space to store TS packets (188 bytes per TS packet).

If, in step S602, it is determined that the transport buffer 1062-2 of the base-and-extension-audio-data decoding portion 1060-2 has free space to store the TS packets, the process proceeds to step S603. In step S603, the control section 835 determines whether the elementary buffer 1063-1 of the base-audio-data decoding portion 1060-1 has free space to store the TS packets. Specifically, based on the input bit rate Rx1 from the transport buffer 1062-1 to the elementary buffer 1063-1, the capacity of the elementary buffer 1063-1, and a PTS (i.e., timing with which extraction is performed by the audio decoder 1064-1) corresponding to the TS packets, the control section 835 determines whether the elementary buffer 1063-1 has free space to store the TS packets (188 bytes).

If, in step S603, it is determined that the elementary buffer 1063-1 of the base-audio-data decoding portion 1060-1 has the free space to store the TS packets, the process proceeds to step S604. In step S604, the control section 835 determines whether the elementary buffer 1063-2 of the base-and-extension-audio-data decoding portion 1060-2 has free space to store TS packets. Specifically, based on the input bit rate Rx2 from the transport buffer 1062-2 to the elementary buffer 1063-2, the capacity of the elementary buffer 1063-2, and a PTS (i.e., timing with which extraction is performed by the audio decoder 1064-2) corresponding to the TS packets, the control section 835 determines whether the elementary buffer 1063-2 has free space to store the TS packets (188 bytes).

If, in step S604, it is determined that the elementary buffer 1063-2 of the base-and-extension-audio-data decoding portion 1060-2 has the free space to store the TS packets, the process proceeds to step S605 and the control section 835 determines that the TS packets can be multiplexed. In other words, if it is affirmatively determined in step S604, by performing steps S601 to S604, both the result in FIG. 58 of determining TS packet multiplexing when assuming the base-audio-data decoding portion 1060-1 and the result in FIG. 58 of determining TS packet multiplexing when assuming the base-and-extension-audio-data decoding portion 1060-2 indicate the ability to multiplex TS packets. Thus, it is determined that the TS packets can be multiplexed. More specifically, the determinations in steps S601 and S603 in FIG. 22 correspond to the "result, shown in FIG. 58, of determining TS packet multiplexing when assuming the base-audio-data decoding portion 1060-1". If the results of the determinations in both steps are affirmative (YES), it is determined that the TS packets can be multiplexed. The determinations in steps S603 and S604 in FIG. 58 correspond to the result in FIG. 58 of determining TS packet multiplexing when assuming the base-and-extension-audio-data decoding portion 1060-2. If the results of the determinations in both steps are affirmative (YES), it is determined that the TS packets can be multiplexed.

The process proceeds to step S606 in one of cases in which, in step S601, it is determined that the transport buffer 1062-1 of the base-audio-data decoding portion 1060-1 has no free space to store the TS packets, in which, in step S602, it is determined that the transport buffer 1062-2 of the base-and-extension-audio-data decoding portion 1060-2 has no free space to store the TS packets, in which, in step S603, it is determined that the elementary buffer 1063-1 of the base-audio-data decoding portion 1060-1 has no free space to store the TS packets, and in which, in step S604, it is determined that the elementary buffer 1063-2 of the base-and-extension-audio-data decoding portion 1060-2 has no free space to store the TS packets.

In step S606, the control section 835 determines that the TS packets have inability to be multiplexed. In other words, when "inability to multiplex TS packets" is indicated by at least one of the result of determining TS packet multiplexing when assuming the base-audio-data decoding portion 1060-1 and the result of determining TS packet multiplexing when assuming the base-and-extension-audio-data decoding portion 1060-2, the control section 835 determines that the TS packets have inability to be multiplexed.

After step S605 or S606, the process finishes. In the process in FIG. 58, after determining the transport buffer of the base-audio-data decoding portion 1060-1 and the transport buffer 1062-2 of the base-and-extension-audio-data decoding portion 1060-2 have free spaces to store the TS packets, it is determined whether the elementary buffer of the base-audio-data decoding portion 1060-1 and the elementary buffer 1063-2 of the base-and-extension-audio-data decoding portion 1060-2 have free spaces to store the TS packets. This is because, even if the elementary buffer 1063-1 of the base-audio-data decoding portion 1060-1 has free space to store the TS packets, it is determined that the TS packets have inability to be multiplexed unless the transport buffer 1062-1 of the base-and-extension-audio-data decoding portion 1060-2 has no free space.

Figure 59:
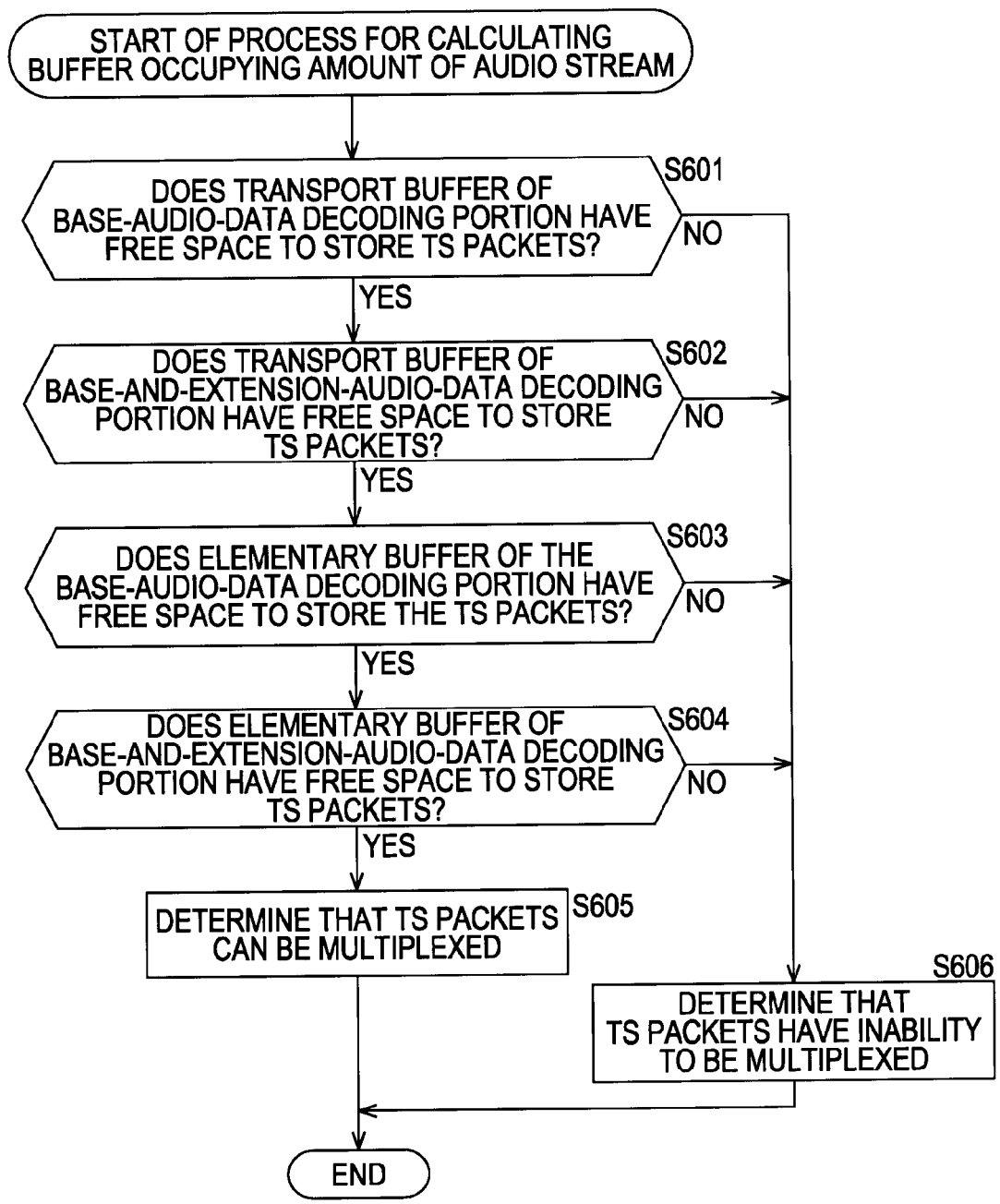
FIG. 59 is a flowchart illustrating a process, corresponding to the method in FIG. 58, for calculating a buffer occupying amount of an audio stream.

The process in FIG. 59 is executed when step S518 in FIG. 57 is executed. The process in FIG. 58 is repeatedly executed.

As described above, the control section 835 calculates buffer occupying amounts by assuming the first virtual decoder including the base-audio-data decoding portion 1060-1 capable of decoding only a base audio stream and the second virtual decoder including the base-and-extension-audio-data decoding portion 1060-2 capable of decoding base and extension audio streams. Based on the calculated amounts, it is determined whether TS packets to be multiplexed can be multiplexed.

In other words, by assuming the base-audio-data decoding portion 1060-1 and base-and-extension-audio-data decoding portion 1060-2 in FIG. 55, the control section 835 calculates a buffer occupying amount of the virtual decoder as the first virtual decoder and a buffer occupying amount of the virtual decoder 812 as the second virtual decoder, and determines whether TS packets to be multiplexed can be multiplexed. This ensures decoding of a base audio stream without causing overflowing and underflowing of buffer occupying amounts both in the decoder (actual decoder) capable of decoding only the base audio stream and in the decoder (actual decoder) capable of decoding base and extension audio streams.

Next, a second method in the case of assuming first and second decoders and determining, based on a buffer occupying amount of each virtual decoder, TS packets to be multiplexed.

In the second method (hereinafter referred to as Method 2), the entirety of the audio data decoding section 1060 (FIG. 55) determines TS packet multiplexing on the basis of consideration of characteristics of base and extension audio streams. The characteristics of the base and extension audio streams mean that the base-audio-data decoding portion 1060-1 processes only base audio TS packets and the base-and-extension-audio-data decoding portion 1060-2 processes both base audio TS packets and extension audio TS packets. In a more specific description of Method 2, when TS packets to be processed are TS packets of an extension audio stream, if the base-and-extension-audio-data decoding portion 1060-2 can multiplex the TS packets, it is determined that the TS packets can be multiplexed.

In other words, in Method 2, in accordance with the conditions shown in FIG. 60, based on buffer occupying amounts of two virtual decoders (the first virtual decoder and the second virtual decoder) at an arbitrary time, it is determined whether TS packets can be multiplexed.

In FIG. 60, in a case in which the result of determining TS packet multiplexing when assuming the base-audio-data decoding portion 1060-1 indicates "ability to multiplex TS packets" (TS packets can be multiplexed), and the result of determining TS packet multiplexing when assuming the base-and-extension-audio-data decoding portion indicates "ability to multiplex TS packets" (TS packets can be multiplexed), the result of determining whether to multiplex TS packets indicates "ability to multiplex TS packets". In other words, when it is determined that TS packets to be transmitted can be multiplexed at an arbitrary time by both the base-audio-data decoding portion 1060-1 and the base-and-extension-audio-data decoding portion 1060-2, it is determined that the TS packets can be multiplexed.

In a case in which the result of determining TS packet multiplexing when assuming the base-audio-data decoding portion 1060-1 indicates "inability to multiplex TS packets", and the result of determining TS packet multiplexing when assuming the base-and-extension-audio-data decoding portion 1060-2 indicates "ability to multiplex TS packets", the result of determining whether to multiplex TS packets indicates "ability to multiplex only extension audio TS packets". In other words, when it is determined that, at an arbitrary time, the base-audio-data decoding portion 1060-1 is unable to multiplex TS packets to be transmitted, and it is determined that the base-and-extension-audio-data decoding portion 1060-2 can perform multiplexing, if the TS packets are extension audio TS packets, it is determined that the TS packets can be multiplexed, and, if the TS packets are base audio TS packets, it is determined that the TS packets have inability to be multiplexed.

In a case in which the result of determining TS packet multiplexing when assuming the base-audio-data decoding portion 1060-1 indicates "ability to multiplex TS packets", and the result of determining TS packet multiplexing when assuming the base-and-extension-audio-data decoding portion 1060-2 indicates "inability to multiplex TS packets", the result of determining whether to multiplex TS packets indicates "inability to multiplex TS packets". In other words, even if, at an arbitrary time, transport packets to be transmitted can be multiplexed by the base-audio-data decoding portion 1060-1, when the base-and-extension-audio-data decoding portion 1060-2 is unable to multiplex the TS packets, it is determined that the TS packets have inability to be multiplexed.

In a case in which the result of determining TS packet multiplexing when assuming the base-audio-data decoding portion 1060-1 indicates "inability to multiplex TS packets", and the result of determining TS packet multiplexing when assuming the base-and-extension-audio-data decoding portion 1060-2 indicates "inability to multiplex TS packets", the result of determining whether to multiplex TS packets indicates "inability to multiplex TS packets". In other words, if it is determined that, at an arbitrary time, both the base-audio-data decoding portion 1060-1 and the base-and-extension-audio-data decoding portion 1060-2 are unable to multiplex TS packets to be transmitted, it is determined that the TS packets have inability to be multiplexed.

In other words, in Method 2, in addition to a case (condition as in Method 1) in which it is determined that TS packets to be transmitted can be multiplexed at an arbitrary time both by the base-audio-data decoding portion 1060-1 and by the base-and-extension-audio-data decoding portion 1060-2, and in a case in which the TS packets to be transmitted are extension audio TS packets, and can be multiplexed by the base-and-extension-audio-data decoding portion 1060-2, it is determined that the TS packets can be multiplexed.

Next, a buffer-occupying-amount calculating process, based on consideration of the characteristics of base and extension audio streams, corresponding to the Method 2 in FIG. 60, is described below. This process is executed by the control section 835 in FIG. 51 while it assumes two virtual decoders (121), that is, first and second virtual decoders. In addition, this process is a detailed example (Method 2) of processing executed in step S518 in FIG. 57.

In step S651, the control section 835 determines whether TS packets to be transmitted (multiplexed) which include a PTS audio access unit are TS packets in which tp=1 (i.e., base audio TS packets). In other words, the control section 835 determines whether the next TS packets to be multiplexed which include a PTS audio access unit are base audio TS packets. When the TS packets to be transmitted (multiplexed) which include a PTS audio access unit are TS packets in which tp=1 (i.e., base audio TS packets), the process proceeds to step S652.

In step S652, the control section 835 determines whether the transport buffer 1062-1 of the base-audio-data decoding portion 1060-1 has free space to store TS packets. Specifically, based on the capacity of the transport buffer 1062-1 and the input bit rate Rx1 from the transport buffer 1062-1 to the elementary buffer 1063-1, the control section 835 determines whether the transport buffer 1062-1 has free space to store TS packets (188 bytes per TS packet). In this case, the TS packets are base audio TS packets.

If, in step S652, it is determined that the transport buffer 1062-1 of the base-audio-data decoding portion 1060-1 has free space to store TS packets, the process proceeds to step S653. In step S653, the control section 835 determines whether the transport buffer 1062-2 of the base-and-extension-audio-data decoding portion 1060-2 has free space to store the TS packets specifically, based on the capacity of the transport buffer 1062-2, and the input bit rate Rx2 from the transport buffer 1062-2 to the elementary buffer 1063-2, the control section 835 determines whether the transport buffer 1062-2 has free space to store the TS packets (188 bytes per TS packet).

If, in step S653, it is determined that the transport buffer 1062-2 of the base-and-extension-audio-data decoding portion 1060-2 has free space to store the TS packets, the process proceeds to step S654, and the control section 835 determines whether the elementary buffer 1063-1 of the base-audio-data decoding portion 1060-1 has free space to store the TS packets. Specifically, based on the input bit rate Rx1 from the transport buffer 1062-1 to the elementary buffer 1063-1, the capacity of the elementary buffer 1063-1, and a PTS (i.e., timing with which extraction is performed by the audio decoder 1064-1) corresponding to the TS packets, the control section 835 determines whether the elementary buffer 1063-1 has free space to store the TS packets (188 bytes).

If, in step S654, it is determined that the elementary buffer 1063-1 of the base-audio-data decoding portion 1060-1 has free space to store the TS packets, the process proceeds to step S655 and the control section 835 determines whether the elementary buffer 1063-2 of the base-and-extension-audio-data decoding portion 1060-2 has free space to store the TS packets. Specifically, based on the input bit rate Rx2 from the transport buffer 1062-2 to the elementary buffer 1063-2, the capacity of the elementary buffer 1063-2, and a PTS (i.e., timing with which extraction is performed by the audio decoder 1064-2) corresponding to the TS packets, the control section 835 determines whether the elementary buffer 1063-2 has free space to store the TS packets (188 bytes).

If, in step S655, it is determined that the elementary buffer 1063-2 of the base-and-extension-audio-data decoding portion 1060-2 has free space to store the TS packets, the process proceeds to step S656 and the control section 835 determines that the TS packets can be multiplexed. In other words, if it is affirmatively determined in step S655, by performing steps S652 to S655, both the result in FIG. 60 of determining TS packet multiplexing when assuming the base-audio-data decoding portion 1060-1 and the result in FIG. 60 of determining TS packet multiplexing when assuming the base-and-extension-audio-data decoding portion 1060-2 indicate the ability to multiplex TS packets. Thus, it is determined that the TS packets can be multiplexed. More specifically, steps S652 and S654 in FIG. 24 correspond to the base audio TS packets in the result, shown in FIG. 60, of determining TS packet multiplexing when assuming the base-audio-data decoding portion 1060-1. If the results of the determinations in both steps are affirmative (YES), it is determined that the TS packets can be multiplexed. The determinations in steps S653 and S655 correspond to the base audio TS packets in the result in FIG. 60 of determining TS packet multiplexing when assuming the base-and-extension-audio-data decoding portion 1060-2. If the results of the determinations in both steps are indicated by YES, it is determined that the TS packets can be multiplexed. After step S656, the process finishes.

If, in step S651, it is determined that TS packets to be transmitted (multiplexed) which include a PTS audio access unit are not transport packets in which tp=1 (i.e., base audio), that is, if TS packets to be transmitted (multiplexed) which include a PTS audio access unit are TS packets in which tp=0 (i.e., extension audio), the process proceeds to step S657.

In step S657, the control section 835 determines whether the transport buffer 1062-2 of the base-and-extension-audio-data decoding portion 1060-2 has free space to store the TS packets. Specifically, based on the capacity of the transport buffer 1062-2, and the input bit rate Rx2 from the transport buffer 1062-2 to the elementary buffer 1063-2, the control section 835 determines whether the transport buffer 1062-2 has free space to the TS packets bytes per TS packet).

If, in step S657, it is determined that the transport buffer 1062-2 of the base-and-extension-audio-data decoding portion 1060-2 has the free space to store the TS packets, the process proceeds to step S658 and the control section 835 determines whether the elementary buffer 1063-2 of the base-and-extension-audio-data decoding portion 1060-2 has free space to store the TS packets. Specifically, based on the input bit rate Rx2 from the transport buffer 1062-2 to the elementary buffer 1063-2, the capacity of the elementary buffer 1063-2, and a PTS (i.e., timing with which extraction is performed by the audio decoder 1064-2) corresponding to the TS packets, the control section 835 determines whether the elementary buffer 1063-2 has free space to store the TS packets (188 bytes).

If, in step S658, it is determined that the elementary buffer 1063-2 of the base-and-extension-audio-data decoding portion 1060-2 has the free space to store the TS packets, the process proceeds to step S659 and the control section 835 determines that the TS packets (i.e., extension audio TS packets) can be multiplexed. In other words, if it is affirmatively determined in step S658, by performing steps S657 and S658, the result in FIG. 60 of determining TS packet multiplexing when assuming the base-and-extension-audio-data decoding portion 1060-2 indicates the ability to multiplex the TS packets. Thus, it is determined that the extension audio TS packets to be transmitted can be multiplexed. More specifically, steps S657 and S658 in FIG. 61 correspond to the extension audio TS packets in the result in FIG. 60 of determining TS packet multiplexing when assuming the base-and-extension-audio-data decoding portion 1060-2. If the results of the determinations in both steps are affirmative (YES), it is determined that the extension audio TS packets can be multiplexed.

In other words, if, in step S651, the TS packets to be transmitted which include a PTS audio access unit are extension audio TS packets, determination of whether the TS packets can be multiplexed may be performed only by the base-and-extension-audio-data decoding portion 1060-2. This is because the extension audio TS packets are not used by the base-audio-data decoding portion 1060-1 but are used only by the base-and-extension-audio-data decoding portion 1060-2. Accordingly, if it is negatively determined (NO) in step S651, determination concerning the base-audio-data decoding portion 1060-1 is not performed, and only steps S657 and S658 are performed.

As described above, as shown in FIG. 60, even if the result of determining TS packet multiplexing when assuming the base-audio-data decoding portion 1060-1 indicates "inability to multiplex TS packets", when the result of determining TS packet multiplexing when assuming the base-and-extension-audio-data decoding portion 1060-2 indicates "ability to multiplex TS packets", and the TS packets to be transmitted which include a PTS audio access unit are extension audio TS packets, it is determined that the TS packets can be multiplexed. After step S659, the process finishes.

If, in step S652, it is determined that the transport buffer 1062-1 of the base-audio-data decoding portion 1060-1 has no free space to store TS packets, if, in step S653, it is determined that the transport buffer 1062-2 of the base-and-extension-audio-data decoding portion 1060-2 has no free space to store TS packets, if, in step S654, it is determined that the elementary buffer 1063-1 of the base-audio-data decoding portion 1060-1 has no free space to store TS packets, if, in step S655, it is determined that the elementary buffer 1063-2 of the base-and-extension-audio-data decoding portion 1060-2 has no free space to store TS packets, if, in step S657, it is determined that the transport buffer 1062-2 of the base-and-extension-audio-data decoding portion 1060-2 has no free space to store TS packets, or, if, in step S658, it is determined that the elementary buffer 1063-2 of the base-and-extension-audio-data decoding portion 1060-2 has no free space to store TS packets, the process proceeds to step S660.

In step S660, the control section 835 determines that the TS packets have inability to be multiplexed. For example, when step S660 is executed after it is negatively determined in one of steps S652, S653, S654, and S655, the TS packets determined to have inability to be multiplexed are base audio TS packets. In addition, when step S660 is executed after it is negatively determines in one of steps S657 and S658, the TS packets determined to have inability to be multiplexed are extension audio TS packets. After step S660, the process finishes.

Figure 61:
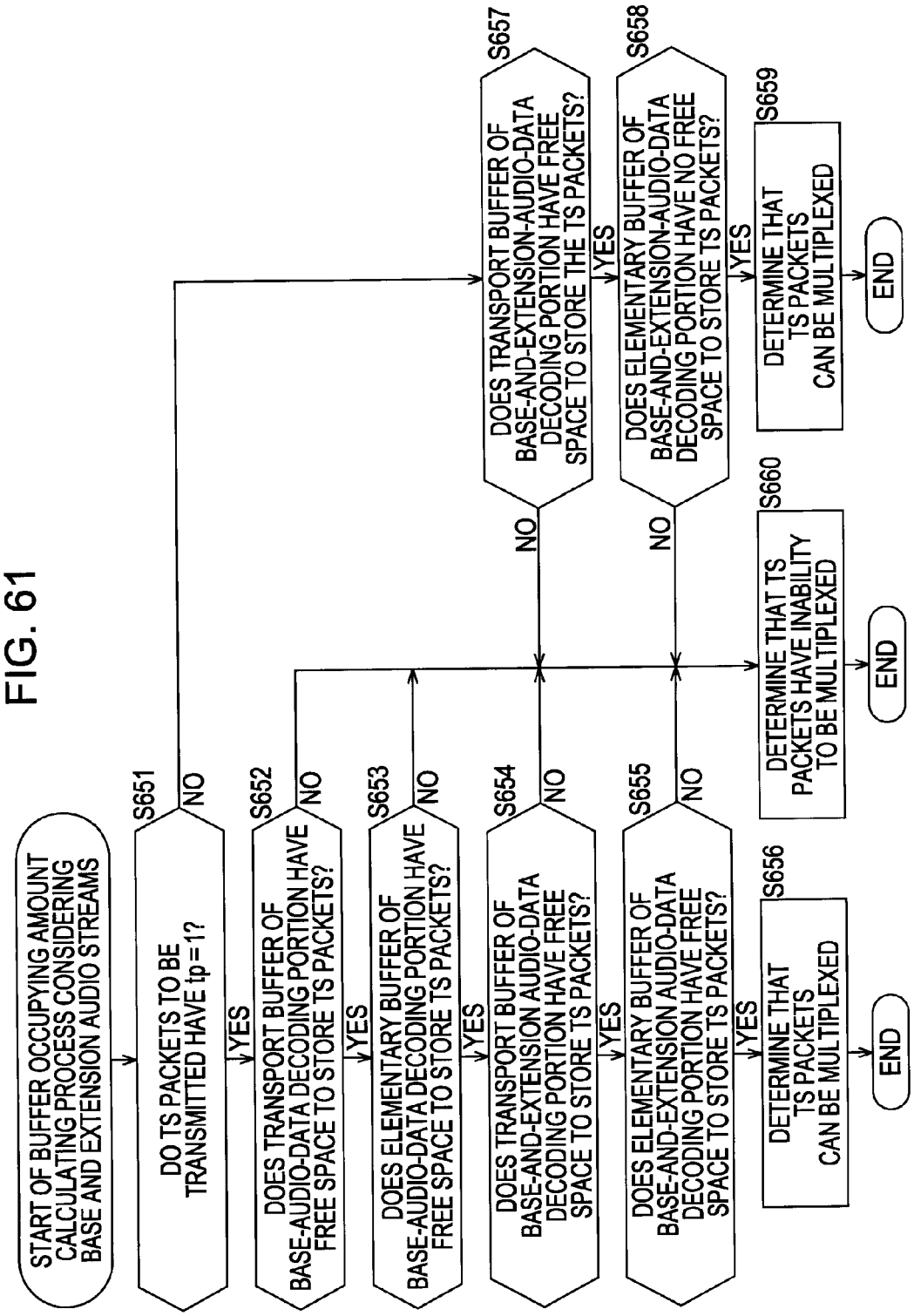
FIG. 61 is a flowchart illustrating a process, corresponding to the method in FIG. 60, for calculating a buffer occupying amount of an audio stream.

The process in FIG. 61 is executed after step S518 in FIG. 57 is executed. The process in FIG. 61 is repeatedly executed.

As described above, the control section 835 calculates buffer occupying amounts by assuming the first virtual decoder including the base-audio-data decoding portion 1060-1 capable of decoding only a base audio stream and assuming the second virtual decoder including the base-and-extension-audio-data decoding portion 1060-2 capable of decoding base and extension audio streams. Based on the calculated amounts, the control section 835 determines whether TS packets to be multiplexed can be multiplexed.

In other words, the control section 835 calculates buffer occupying amounts by assuming the base-audio-data decoding portion 1060-1 and base-and-extension-audio-data decoding portion 1060-2 in FIG. 55, and determines whether TS packets to be multiplexed can be multiplexed. This ensured that, in both a decoder (actual decoder) capable of decoding only a base audio stream and a decoder (actual decoder) capable of decoding base and extension audio streams, the base audio stream can be decoded without causing overflowing and underflowing of the buffer occupying amounts.

In addition, in a case in which the control section 835 multiplexes base audio TS packets, when the "inability to multiplex TS packets" is indicated by at least one of the result of determining TS packet multiplexing when assuming the base-audio-data decoding portion 1060-1 and the result of determining TS packet multiplexing when assuming the base-and-extension-audio-data decoding portion 1060-2, the control section 835 determines that the TS packets have inability to be multiplexed. In a case in which the control section 835 multiplexes extension audio TS packets, even if the "inability to multiplex TS packets" is indicated by the result of determining TS packet multiplexing when assuming the base-audio-data decoding portion 1060-1, if the "ability to multiplex TS packets" is indicated by the result of determining TS packet multiplexing when assuming the base-and-extensionaudio-data decoding portion 1060-2, the control section 835 determines that the extension audio TS packets can be multiplexed.

In the above manner, even if Method 1 determines "inability to multiplex TS packets", Method 2 can determine that the extension audio TS packets can be multiplexed, thus expanding multiplexing restriction.

Specifically, when the "inability to multiplex TS packets" is indicated by the result of determining TS packet multiplexing when assuming the base-audio-data decoding portion 1060-1, and the "ability to multiplex TS packets" is indicated by the result of determining TS packet multiplexing when assuming the base-and-extension-audio-data decoding portion 1060-2, Method 1 determines the "inability to multiplex TS packets" even if TS packets to be transmitted (multiplexed) are of any type, but Method 2 determines the "ability to multiplex TS packets" if TS packets to be transmitted (multiplexed) are extension audio TS packets. Therefore, according to Method 2, the flexibility of multiplexing can be improved.

In the size relationship (B1<B2) of the elementary buffer 1063-1 (B1) and elementary buffer 1063-2 (B2) described with reference to FIG. 55, and the relationship (Rx1<Rx2) between the leak rates Rx1 and Rx2, the base-audio-data decoding portion 1060-1 has inability to perform multiplexing. However, a case in which the base-and-extension-audio-data decoding portion 1060-2 can perform multiplexing is likely to occur (the higher an audio stream bit rate, the higher the frequency of the occurrence). Thus, according to Method 2, the flexibility of multiplexing can be improved.

According to the foregoing, when hierarchically coded audio streams including a base audio stream and an extension audio stream are encoded into an MPEG2-TS for transmission, based on consideration of the capability of a receiver at a receiving end, TS packets can be transmitted so that the TS packets can be decoded by even the virtual receiver 812 as a first virtual decoder which includes a decoder capable of handling only the base audio stream. In other words, when the virtual receiver 812 includes a decoder (first virtual decoder) that can decode only the base audio stream, and the virtual receiver 812 extracts only the base audio stream for decoding, the transmitter 811 determines transmitting timing for transmitting TS packets of hierarchically coded audio streams (including a base audio stream and an extension audio stream) so that a predetermined sized decoder buffer for the base audio stream does not overflow and underflow. Thus, even if only the base audio stream is decoded at the receiving end, smooth decoding can be performed.

Specifically, in the transmitter 811 in FIG. 41, timing for transmitting a transport stream obtained by multiplexing TS packets of a base audio stream and an extension audio stream can be adjusted based on consideration of the capability of a virtual receiver, and, in the transmitter 811 in FIG. 51, when multiplexing TS packets of a base audio stream and an extension audio stream are multiplexed, multiplexing timing can be adjusted based on consideration of the capability of a virtual receiver, whereby a transport stream can be accordingly transmitted based on consideration of the capability of the receiving end. Thus, smooth decoding can be performed at the receiving end.

In other words, the transmitter 811 determines timing for transmitting TS packets of hierarchically coded audio streams so that, in both a first receiver including a decoder (first virtual decoder) capable of decoding only a base audio stream, and a second virtual receiver including a decoder (second virtual decoder) capable of decoding a base audio stream and an extension audio stream, the transport buffer 1062 (the transport buffer 1062-1 and transport buffer 1062-2 in FIG. 55) does not overflow and the capacity of the elementary buffer 1063 (the elementary buffer 1063-1 and elementary buffer 1063-2 in FIG. 55) does not overflow and underflow. Thus, even if the base audio stream is decoded at the receiving end, and, even if base and extension audio streams are decoded at the receiving end, smooth decoding can be performed.

As shown in FIGS. 40 to 61, the PES packetizing section 836 (FIG. 41 or 51) controls the buffer 833 (including the base buffer 841 and the extension buffer 842) to acquire a base audio stream and an extension audio stream, and generates one PES packet stream 891 (FIG. 42 or 52) by packetizing the audio streams into PES packets. In addition to the above, the audio encoder 832 may adjust the order of a base audio stream and an extension audio stream and may arrange the streams to output one elementary stream (ES).

In other words, in the foregoing, the PES packetizing section 836 generates one PES packet stream 891 (FIG. 42 or FIG. 52), considering the order of a base audio stream and an extension audio stream which are separately input. However, the audio encoder 832 may generate one elementary stream (ES), considering the order of the base audio stream and the extension audio stream, and the elementary stream may be supplied to the PES packetizing section 836.

Figure 62:
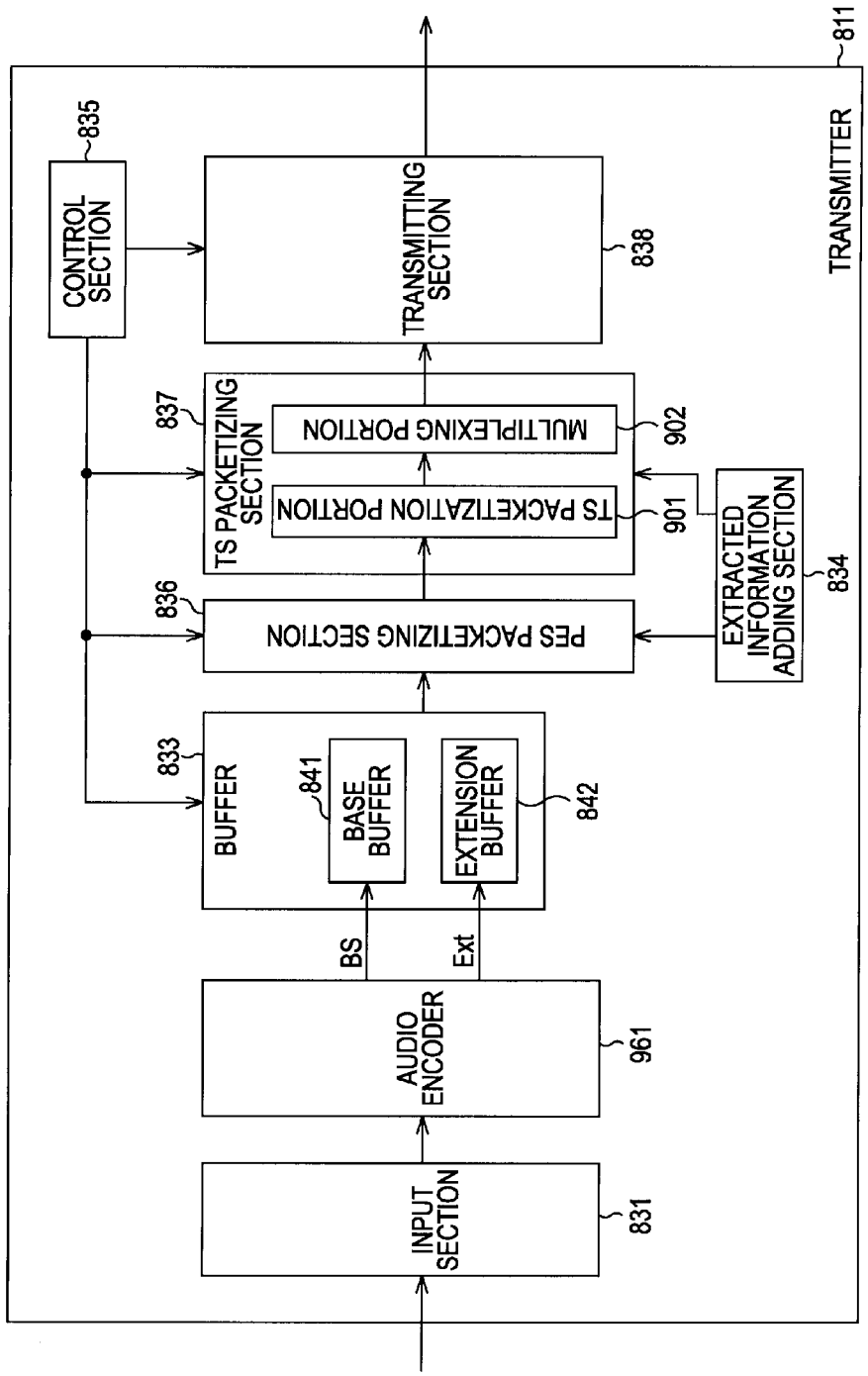
FIG. 62 is a block diagram showing another example of the configuration of the transmitter.

In this case, the transmitter may be a transmitter 451 having the configuration shown in, for example, FIG. 62. In FIG. 62, portions corresponding to those in FIGS. 41 and 51 are denoted by identical reference numerals, and descriptions thereof are omitted for avoiding repetition.

In the transmitter 451 in FIG. 62, when an audio encoder 461 encodes audio streams, the audio encoder 461 respectively supplies a base audio stream and an extension audio stream to the base buffer 841 and the extension buffer 842, considering the order of the base audio stream and the extension audio stream. In other words, since the buffer 833 that includes the base buffer 841 and the extension buffer 842 is sequentially supplied with audio streams whose order is adjusted, the buffer 833 merges the supplied streams. Accordingly, the audio stream output from the buffer 833 is an elementary stream in which the order of the base audio stream and the extension audio stream is adjusted.

Figure 63:
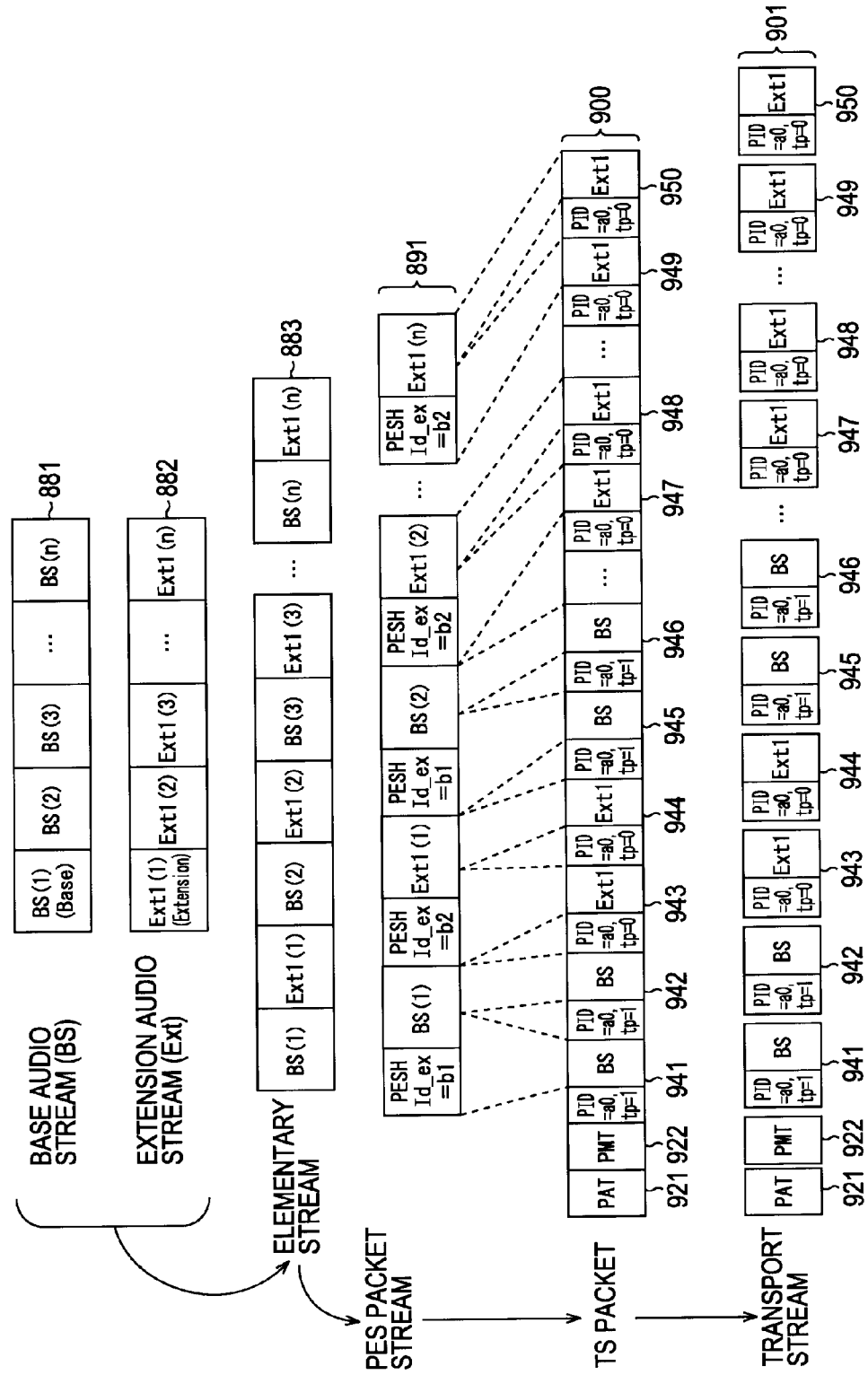
FIG. 63 is an illustration of the structures of streams for the transmitter shown in FIG. 25.

For example, when only base and extension audio streams are generated and transmitted (multiplexed), the audio encoder 461 controls the order of the base audio stream 881 and extension audio stream 882 shown in FIG. 63, and supplies them to the base buffer 841 and extension buffer 842 of the buffer 833. Thus, as a result, the buffer 833 supplies the PES packetizing section 836 with an elementary stream 883 in which the base audio stream 881 and the extension audio stream 882 are combined (arranged) into one. After that, similarly to FIGS. 41 and 51, the elementary stream 883 is packetized into a PES packet stream 891 by the PES packetizing section 836, and the PES packet stream 891 is packetized into a transport stream (TS).

As described above, at the time of the elementary stream 883 (at the time the elementary stream 883 is output from the buffer 833), the base audio stream and the extension audio stream are combined into one, whereby the order of this elementary stream is guaranteed. The PES packetizing section 836 may sequentially packetize the elementary stream 883 supplied from the buffer 833 into PES packets, so that packetization into PES packets can be performed without considering the order of the base audio stream and the extension audio stream.

According to the transmitting/receiving system of the third embodiment, streams can be multiplexed by encoding the streams in consideration of the capability of a receiving end. In particular, hierarchically coded audio streams that include base and extension streams can be multiplexed so as to be smoothly decoded by a receiver.

The present invention is not limited to the transmitter 811 including the audio encoder, and can be applied to all information processing apparatuses that perform encoding. In addition, the present invention is not limited to the transmitter 811, and can be also applied to a multiplexer that performs packetization into TS packets and multiplexing to generate a transport stream. In other words, the multiplexer may be a block of the transmitter 811 that performs multiplexing and may be independent.

In the foregoing, cases in which the present invention is applied to audio stream encoding and decoding have been described. However, the present invention is not limited thereto, but can be applied to video stream encoding and decoding. In other words, the present invention can be applied to various types of streams such as audio streams or video streams.

The above-described consecutive processing can be executed by hardware or by software. In this case, the processing is executed by the personal computer 1500 shown in FIG. 64.

Figure 64:
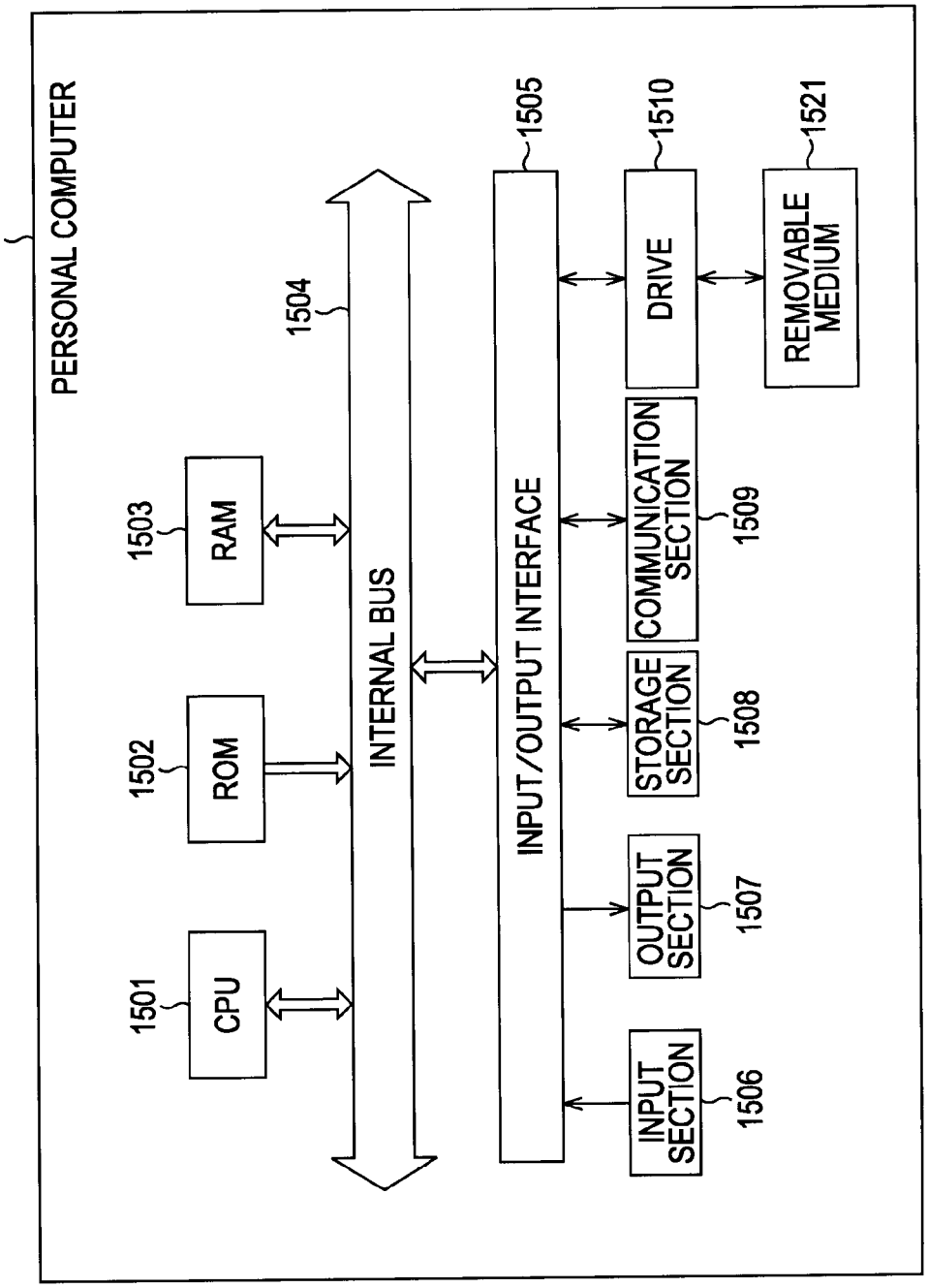
FIG. 64 is a block diagram showing an example of the configuration of a personal computer.

In FIG. 64, a CPU 1501 executes various types of processing in accordance with programs stored in a ROM 1502 or programs loaded from a storage section 808 into a RAM 1503. The RAM 1503 also stores data, etc., which are necessary for the CPU 1501 to execute the various types of processing, if necessary.

The CPU 1501, the ROM 1502, and the RAM 1503 are connected to one another by an internal bus 1504. The internal bus 1502 connects to an input/output interface 1505.

The input/output interface 1505 connects to an input section 1506 including a keyboard and a mouse, an output section 1507 including a display, such as a cathode-ray tube or liquid crystal display, and a speaker, a storage section 1508 including a hard disk, and a communication section 1509 including a modem and a terminal adapter. The communication section 1509 performs communication through various networks including a telephone line and CATV.

The input/output interface 1505 also connects to a drive 1510, if necessary. In the drive 1510, a removable medium 1521, such as a magnetic disk, an optical disc, a magneto-optical disc, or a semiconductor memory, is loaded, and a computer program read from the medium is installed in the storage section 1508, if necessary.

When the consecutive processing is executed by software, programs constituting the software are installed from a network or a recording medium.

This recording medium is formed not only by package media which has the program-recorded removable medium 1521 and which is distributed in order to provide programs to a user, separately to a computer, as shown in FIG. 64, but also by a hard disk or the like which is provided to a user in a state built into the personal computer, and which includes a hard disk including the ROM 1502 and the storage section 1508, in which programs are recorded.

In this specification, steps constituting a computer program definitely include processing steps executed in a time-series manner in accordance with the order given, and processing steps executed in parallel or separately if the processing steps are not necessarily executed in a time-series manner.

The invention claimed is:

1. An information processing apparatus comprising:
an acquisition mechanism in which, when a different apparatus performs:
encoding a predetermined stream so that, among types of a base stream and the first to n-th (n represents an integer value equal to one or greater) extension streams having extensibility for the base stream, at least one type of stream is included;
adding different unique values as stream IDs (Identifications) to one or more streams actually obtained as the result of encoding, and packetizing said one or more streams having the added stream IDs into one or more PES (Packetized Elementary Stream) packets;
packetizing each of said one or more PES packets into predetermined packets;
generating stream-presence/absence information indicating whether each of packets of one or more types including the type of the base stream among the base stream and the first to n-th extension streams is present among said one or more packets; and
outputting a stream formed by said one or more packets and the stream-presence/absence information, the acquisition mechanism acquires the stream and the stream-presence/absence information;
a storage device which restores said one or more PES packets from the stream acquired by the acquisition mechanism;
a decoder which decodes, among said one or more PES packets stored in the storage means, PES packets read from the storage device; and
a controller which determines, based on the stream-presence/absence information acquired by the acquisition mechanism, whether or not, among the types of the base audio stream and the first to n-th extension streams, packets of types capable of being processed by the decoder are included in the stream acquired by the acquisition mechanism, and which performs control to prohibit reading of PES packets from the storage device when the controller determines that the packets of the types are not included, and performs control to read the PES packets having the added stream IDs, which correspond to types capable of being processed by the decoder, when the controller determines that the packets of the types are included, wherein:
information representing an encoding type at the time the predetermined stream is encoded is output from the different apparatus;
the acquisition mechanism further acquires the information; and
the controller further performs recognizing the encoding type of the stream acquired by the acquisition mechanism on the basis of the information acquired by the acquisition mechanism, and determining whether or not the packets of the types capable of being processed by the decoder can be included in the stream, and, when the c controller determines that the packets of the types can be included, the controller performs determination of whether or not the packets of the types capable of being processed by the decoder are included in the TS, and, when the controller determines that the packets of the types cannot be included, the controller prohibits the determination.

2. A transmitting apparatus comprising:
an encoder which encodes an input stream so that a base stream and an extension stream having extensibility for the base stream are included;
a packetizer which packetizes each of the base stream and extension stream obtained by the encoder into TS (Transport Stream) packets;

a controller which controls timing with which the TS packets obtained by the packetizer are transmitted; and a transmitter which transmits the TS packets to a receiver with the timing controlled by the controller, wherein the controller controls the TS-packet transmitting timing at the time that, in a first virtual receiver including a first virtual decoder which handles only the base stream and which assumes that an elementary buffer has a first capacity and an input bit rate to the elementary buffer is a first rate, and a second virtual receiver including a second virtual decoder which handles the base stream and the extension stream and which assumes that an elementary buffer has a second capacity and an input bit rate to the elementary buffer is a second rate, the elementary buffers in the first and second virtual receivers are prevented from overflowing and underflowing.

3. The transmitting apparatus according to claim 2, wherein:

the first capacity of the elementary buffer is less than the second capacity; and the first rate as the input bit rate to the elementary buffer is less than the second rate.

4. The transmitting apparatus according to claim 2, wherein the controller controls the TS-packet transmitting timing by assuming that TS packets acquired by the first virtual receiver are only TS packets forming the base stream among the TS packets transmitted by the transmitter, and assuming that TS packets acquired by the second virtual receiver are TS packets forming the base stream and extension stream transmitted by the transmitter.

5. The transmitting apparatus according to claim 2, wherein:

the first virtual receiver and the second virtual receiver further include transport buffers, respectively, in a stage before the elementary buffers in the first virtual receiver and the second virtual receiver; and the controller controls the TS-packet transmitting timing at the time that the transport buffers are prevented from overflowing.

6. The transmitting apparatus according to claim 2, wherein, after calculating timing which prevents the elementary buffer in the first virtual receiver from overflowing and underflowing, by calculating timing which prevents the elementary buffer in the second virtual receiver from overflowing and underflowing, the controller controls the TS-packet transmitting timing.

7. A multiplexing apparatus comprising:

an encoder which encodes an input stream so that a base stream and an extension stream having extensibility for the base stream are included;

a packetizer which packetizes each of the base stream and extension stream obtained by the encoder into TS (Transport Stream) packets;

a controller which controls timing with which the TS packets obtained by the packetizer are multiplexed; and a multiplexer which multiplexes the TS packets with the timing controlled by the controller, wherein the controller controls the TS-packet multiplexing timing at the time that, in a first virtual receiver including a first virtual decoder which handles only the base stream and which assumes that an elementary buffer has a first capacity and an input bit rate to the elementary buffer is a first rate, and a second virtual receiver including a second virtual decoder which handles the base stream and the extension stream and which assumes that an elementary buffer has a second capacity and an input bit rate to the elementary buffer is a second rate, the elementary buffers in the first and second virtual receivers are prevented from overflowing.

8. The multiplexing apparatus according to claim 7, wherein:

the first capacity of the elementary buffer is less than the second capacity; and the first rate as the input bit rate to the elementary buffer is less than the second rate.

9. The multiplexing apparatus according to claim 7, wherein the controller controls the TS-packet multiplexing timing by assuming that TS packets acquired by the first virtual receiver are only TS packets forming the base stream among the TS packets multiplexed by the multiplexer, and assuming that TS packets acquired by the second virtual receiver are TS packets forming the base stream and extension stream multiplexed by the multiplexer.

10. The multiplexing apparatus according to claim 7, wherein:

the first virtual receiver and the second virtual receiver further include transport buffers, respectively, in a stage before the elementary buffers; and the controller controls the TS-packet multiplexing timing at the time that the transport buffers are prevented from overflowing.

11. The multiplexing apparatus according to claim 7, wherein, after calculating timing which prevents the elementary buffer in the first virtual receiver from overflowing and underflowing, by calculating timing which prevents the elementary buffer in the second virtual receiver from overflowing and underflowing, the controller controls the TS-packet multiplexing timing.

12. The multiplexing apparatus according to claim 7, wherein the controller controls the transport-stream packet multiplexing timing at the time that the elementary buffers in the first virtual receiver and the second virtual receiver are prevented from overflowing and underflowing.

13. The multiplexing apparatus according to claim 7, further comprising a recording controller which performs control so that the TS packets multiplexed by the multiplexer are recorded in a recording medium.

14. The multiplexing apparatus according to claim 7, wherein the input stream includes at least one of an audio stream portion and a video stream portion.

15. A multiplexing apparatus comprising:

an interface that receives video data with a base stream and an extension stream having extensibility for the base stream;

a packetizer which packetizes each of the base stream and extension stream obtained by the interface into TS (Transport Stream) packets;

a controller which controls timing with which the TS packets obtained by the packetizer are transmitted; and a transmitter which transmits the TS packets to a receiver with the timing controlled by the controller, wherein the controller controls the TS-packet transmitting timing at the time that, in a first virtual receiver including a first virtual decoder which handles only the base stream and which assumes that an elementary buffer has a first capacity and an input bit rate to the elementary buffer is a first rate, and a second virtual receiver including a second virtual decoder which handles the base stream and the extension stream and which assumes that an elementary buffer has a second capacity and an input bit rate to the elementary buffer is a second rate, the elementary buffers in the first and second virtual receivers are prevented from overflowing and underflowing.

* * * * *